US010516771B2

(12) United States Patent
Kwak et al.

(10) Patent No.: US 10,516,771 B2
(45) **Date of Patent: *Dec. 24, 2019**

(54) APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

(71) Applicant: LG ELECTRONICS INC., Seoul (KR)

(72) Inventors: Minsung Kwak, Seoul (KR); Jangwon Lee, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,630

(22) Filed: Feb. 2, 2018

(65) Prior Publication Data

US 2018/0176345 A1 Jun. 21, 2018

Related U.S. Application Data

(63) Continuation of application No. 15/022,273, filed as application No. PCT/KR2016/001030 on Jan. 29, 2016, now Pat. No. 9,936,054.

(Continued)

(51) Int. Cl.
*H04L 29/08* (2006.01)
*H04L 29/06* (2006.01)
(Continued)

(52) U.S. Cl.
CPC ............ *H04L 69/324* (2013.01); *H04L 65/80* (2013.01); *H04L 69/326* (2013.01);
(Continued)

(58) Field of Classification Search
CPC ..... H04L 65/80; H04L 69/324; H04L 69/326; H04L 21/643; H04L 21/4383;
(Continued)

(56) References Cited

U.S. PATENT DOCUMENTS 7,844,012 B2 11/2010 Park et al.
8,365,060 B2 1/2013 Wang et al.
(Continued)

FOREIGN PATENT DOCUMENTS

CN 1981464 A 6/2007
CN 103067437 A 4/2013
(Continued)

OTHER PUBLICATIONS

The Extended European Search Report, dated Jun. 11, 2018, for European Application No. 16743747.4.
(Continued)

*Primary Examiner* — Jianye Wu
(74) *Attorney, Agent, or Firm* — Birch, Stewart, Kolasch & Birch, LLP

(57) ABSTRACT

A method and apparatus for transmitting or receiving a broadcast signal are discussed. The method for transmitting includes generating service data of a broadcast service, first signaling information for signaling the service data and second signaling information including information for locating the first signaling information, wherein the second signaling information further includes information for identifying the broadcast service and uniform resource locator (URL) information for obtaining the first signaling information, wherein the URL information to which additional information is appended is used for generating a request for obtaining the first signaling information, and wherein the additional information includes information for indicating which type of the first signaling information is requested;
(Continued)

generating a broadcast signal including the service data and the second signaling information; and transmitting the broadcast signal.

10 Claims, 104 Drawing Sheets

Related U.S. Application Data

(60) Provisional application No. 62/109,602, filed on Jan. 29, 2015, provisional application No. 62/109,604, filed on Jan. 29, 2015, provisional application No. 62/112,132, filed on Feb. 4, 2015.

(51) Int. Cl.

| | |
|---|---|
| ***H04N 21/643*** | (2011.01) |
| ***H04N 21/438*** | (2011.01) |
| ***H04N 21/61*** | (2011.01) |
| ***H04N 21/6405*** | (2011.01) |
| ***H04N 21/6408*** | (2011.01) |
| ***H04N 21/845*** | (2011.01) |
| ***H04N 21/854*** | (2011.01) |

(52) U.S. Cl.
CPC ..... *H04N 21/4383* (2013.01); *H04N 21/6112* (2013.01); *H04N 21/6125* (2013.01); *H04N 21/643* (2013.01); *H04N 21/6405* (2013.01); *H04N 21/6408* (2013.01); *H04N 21/64322* (2013.01); *H04N 21/8456* (2013.01); *H04N 21/85406* (2013.01)

(58) Field of Classification Search
CPC ............. H04L 21/6112; H04L 21/6125; H04L 21/6405; H04L 21/6408; H04L 21/6432; H04L 21/8456; H04L 21/85406
See application file for complete search history.

(56) References Cited

U.S. PATENT DOCUMENTS

| | | | | |
|---|---|---|---|---|
| 9,402,046 | B2 * | 7/2016 | Hong ........................ | H04N 5/76 |
| 2008/0076425 | A1 * | 3/2008 | Khetawat .............. | H04W 88/12 455/436 |
| 2009/0034442 | A1 | 2/2009 | Song et al. | |
| 2011/0286546 | A1 | 11/2011 | Song et al. | |
| 2012/0331508 | A1 | 12/2012 | Väre et al. | |
| 2013/0036234 | A1 | 2/2013 | Pazos et al. | |
| 2014/0198875 | A1 | 7/2014 | Kim et al. | |
| 2014/0380391 | A1 | 12/2014 | Song et al. | |

FOREIGN PATENT DOCUMENTS

| | | | |
|---|---|---|---|
| KR | 10-2014-0071315 | A | 6/2014 |
| KR | 10-2014-0090977 | A | 7/2014 |
| WO | WO 2012/036429 | A2 | 3/2012 |
| WO | WO 2014/209057 | A1 | 12/2014 |
| WO | WO 2016/112157 | A1 | 7/2016 |

OTHER PUBLICATIONS

Advanced Television Systems Committee, "ATSC Candidate Standard: Signaling, Delivery, Synchronization, and Error Protection (A/331)," Doc. S33-174r1, Jan. 5, 2016, pp. 1-123) 131 pages total), XP055332043.

Chernock, Next Generation Television: ATSC 3.0, San Diego BTS Chapter, Oct. 30, 2014, 46 pages.

* cited by examiner

FIG. 2

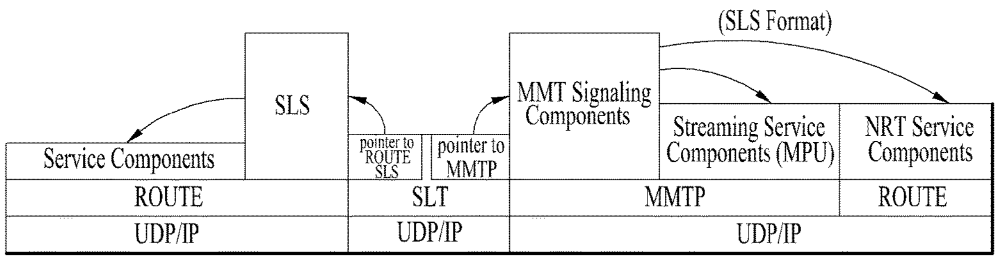

FIG. 3

| Element or Attribute Name | | | Use |
|---|---|---|---|
| SLT | | | |
| | @bsid | | 1 |
| | @sltSectionVersion | | 1 |
| | @sltSectionNumber | | 0..1 |
| | @totalSltSectionNumbers | | 0..1 |
| | @language | | 0..1 |
| | @capabilities | | 0..1 |
| | InetSigLoc | | 0..1 |
| | Service | | 1..N |
| | | @serviceId | 1 |
| | | @SLT serviceSeqNumber | 1 |
| | | @protected | 0..1 |
| | | @majorChannelNo | 1 |
| | | @minorChannelNo | 1 |
| | | @serviceCategory | 1 |
| | | @shortServiceName | 1 |
| | | @hidden | 0..1 |
| | | @sls ProtocolType | 1 |
| | | BroadcastSignaling | 0..1 |
| | | @slsPlpId | 0..1 |
| | | @slsDestinationIpAddress | 0..1 |
| | | @slsDestinationUdpPort | 0..1 |
| | | @slsSourceIpAddress | 0..1 |
| | | @slsMajorProtocolVersion | 0..1 |
| | | @SlsMinorProtocolVersion | 0..1 |
| | | @serviceLanguage | 0..1 |
| | | @broadbandAccessRequired | 0..1 |
| | | @capabilities | 0..1 |
| | | InetSigLoc | 0..1 |

FIG. 5

| Element or Attribute Name | Use |
|---|---|
| bundleDescription | |
| userServiceDescription | |
| @serviceId | M |
| @atsc: serviceId | M |
| @atsc: serviceStatus | OD |
| @atsc: fullMPDUri | M |
| @atsc: sTSIDUri | M |
| name | 0..N |
| lang | CM |
| serviceLanguage | 0...N |
| atsc: capabilityCode | 0...1 |
| deliveryMethod | 1..N |
| r12: broadcastAppService | 1..N |
| basePattern | 1..N |
| r12: unicastAppService | 0..N |
| basePattern | 1..N |

FIG. 6

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | Use |
|---|---|
| bundleDescription | |
| userServiceDescription | |
| @serviceId | M |
| @atsc: serviceId | M |
| Name | 0..N |
| Lang | CM |
| serviceLanguage | 0..N |
| atsc: capabilityCode | 0..1 |
| atsc: Channel | 1 |
| @atsc: majorChannelNo | M |
| @atsc: minorChannelNo | M |
| @atsc: serviceLang | O |
| @atsc: serviceGenre | O |
| @atsc: serviceIcon | M |
| atsc: ServiceDescription | 0..N |
| @atsc: serviceDescrText | M |
| @atsc: serviceDescrLang | O |
| atsc:mpuComponent | 0..1 |
| @atsc: mmtPackageId | M |
| @atsc: next MmtPackageId | O |
| atsc: routeComponent | 0..1 |
| @atsc: sTSIDUri | M |
| @slsPlpId | OD |
| @slsDestinationIpAddress | OD |
| @slsDestinationUdpPort | M |
| @slsSourceIpAddress | M |
| @slsMajorProtocolVersion | OD |
| @SlsMinorProtocolVersion | OD |
| atsc: broadbandComponent | 0..1 |
| @atsc: fullfMPDUri | M |
| atsc: ComponentInfo | 1..N |
| @atsc: component Type | M |
| @atsc: component Role | M |
| @atsc: component ProtectedFlag | OD |
| @atsc: component Id | M |
| @atsc: component Name | O |

FIG. 14 tsib14010

| Syntax | Number of bits | Mnemonic |
|---|---|---|
| Link_Mapping_Table() { | | |
| signaling_type | 8 | "0x01" |
| PLP_ID | 6 | uimsbf |
| Reserved | 2 | |
| num_session | 8 | uimsbf |
| for(i = 0 ; i < num_session ; i + +) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '000000' |
| if (SID_flag = = "1") { | | |
| SID | 8 | uimsbf |
| } | | |
| if (compressed_flag = = "1') { | | |
| context_id | 8 | uimsbf |
| } | | |
| } | | |
| } | | |

tsib14020

| Syntax | Number of bits | Mnemonic |
|---|---|---|
| ROHC-U_description_table { | | |
| signaling_type | 8 | "0x02" |
| PLP_ID | 6 | uimsbf |
| adaptation_mode | 2 | uimsbf |
| context_config | 2 | bslbf |
| reserved | 6 | bslbf |
| context_id | 8 | uimsbf |
| context_profile | 8 | uimsbf |
| if (context_config = 0x01) { | | |
| context_length | 8 | uimsbf |
| static_chain_byte () | var | uimsbf |
| } | | |
| else if (context_config = 0X02) { | | |
| context_length | 8 | uimsbf |
| dynamic_chain_byte () | var | uimsbf |
| } | | |
| else if (context_config = 0x03) { | | |
| context_length | 8 | uimsbf |
| static_chain_byte () | var | uimsbf |
| dynamic_chain_byte () | var | uimsbf |
| } | | |
| } | | |

(a)

$$S_{demux\_in}(i)=\{b_i(0),b_i(1),b_i(2),\ldots,b_i(\eta_{MOD}-1)\},$$

$$S_{demux\_out}(i)=\{c_i(0),c_i(1),c_i(2),\ldots,c_i(\eta_{MOD}-1)\},$$

$$c_i(1)=b_i(i\%\eta_{MOD}),c_i(2)=b_i((i+1)\%\eta_{MOD}),\ldots,c_i(\eta_{MOD}-1)=b_i((i+1)\%\eta_{MOD})$$

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
| FRU_PHY_PROFILE | 3 |
| FRU_FRAME_LENGTH | 2 |
| FRU_GI_FRACTION | 3 |
| RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 25

| Content | Bits |
|---|---|
| FIC_FLAG | 1 |
| AUX_FLAG | 1 |
| NUM_DP | 6 |
| for i = 1: NUM_DP | |
| DP_ID | 6 |
| DP_TYPE | 3 |
| DP_GROUP_ID | 8 |
| BASE_DP_ID | 6 |
| DP_FEC_TYPE | 2 |
| DP_COD | 4 |
| DP_MOD | 4 |
| DP_SSD_FLAG | 1 |
| if PHY_PROFILE = '010' | |
| DP_MIMO | 3 |
| end | |
| DP_TI_TYPE | 1 |
| DP_TI_LENGTH | 2 |
| DP_TI_BYPASS | 1 |
| DP_FRAME_INTERVAL | 2 |
| DP_FIRST_FRAME_IDX | 5 |
| DP_NUM_BLOCK_MAX | 10 |
| DP_PAYLOAD_TYPE | 2 |
| DP_INBAND_MODE | 2 |
| DP_PROTOCOL_TYPE | 2 |
| DP_CRC_MODE | 2 |
| if DP_PAYLOAD_TYPE = = TS('00') | |
| DNP_MODE | 2 |
| ISSY_MODE | 2 |
| HC_MODE_TS | 2 |
| if HC_MODE_TS = = '01' or '10' | |
| PID | 13 |
| end | |
| if DP_PAYLOAD_TYPE == IP('01') | |
| HC_MODE_IP | 2 |
| end | |
| RESERVED | 8 |
| end | |
| if FIC_FLAG = = 1 | |
| FIC_VERSION | 8 |
| FIC_LENGTH_BYTE | 13 |
| RESERVED | 8 |
| end | |
| if AUX_FLAG = = 1 | |
| NUM_AUX | 4 |
| AUX_CONFIG_RFU | 8 |
| for - 1 : NUM_AUX | |
| AUX_STREAM_TYPE | 4 |
| AUX_PRIVATE_CONF | 28 |
| end | |
| end | |

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID<br>DP_START | 6<br>15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

FIG. 33

The main-PRBS generator is defined based on the $(N_a - 1)$-bit binary word sequence $R_n$ with $N_a = \log_2 N_{max}$ $0 \le n < 2$ $$R_n[N_a - 2, N_a - 3, \ldots, 1, 0] = 0, 0, \ldots, 0, 0$$

$n = 2$ $$R_n[N_a - 2, N_a - 3, \ldots, 1, 0] = 0, 0, \ldots, 0, 1$$

$2 < n < N_{max}$ $$R_n[N_a - 3, N_a - 4, \ldots, 1, 0] = R_n[N_a - 2, N_a - 3, \ldots, 2, 1]$$

where $R_n[N_a - 2]$ is defined as:

in 8K FFT mode: $R_n[11] = R_{n-1}[0] \oplus R_{n-1}[1] \oplus R_{n-1}[4] \oplus R_{n-1}[6]$ in 16K FFT mode: $R_n[12] = R_{n-1}[0] \oplus R_{n-1}[1] \oplus R_{n-1}[4] \oplus R_{n-1}[5] \oplus R_{n-1}[9] \oplus R_{n-1}[11]$ in 32K FFT mode: $R_n[13] = R_{n-1}[0] \oplus R_{n-1}[1] \oplus R_{n-1}[2] \oplus R_{n-1}[12]$ (a)

| FFT mode | Nmax |
|---|---|
| 8K | 8192 |
| 16K | 16384 |
| 32K | 32768 |

The sub-PRBS generator is defined based on the $(N_b-1)$-bit binary word sequence $G_k$ with $N_b=\log_2(0.5N_{\max})$ $0\le k<4$ $G_k[N_b-2, N_b-3,\ldots,1,0]=0,0,,\ldots,0,0$ $k=4$ $G_k[N_b-2, N_b-3,\ldots,1,0]=1,1,,\ldots,1,1$ $4<k<N_{\max}$ $G_k[N_b-3, N_b-4,\ldots,1,0]=G_k[N_b-2, N_b-3,\ldots,2,1]$ where $G_k[N_b-2]$ is defined as:

in 8K FFTmode: $G_k[10]=G_{k-1}[0]\oplus G_{k-1}[2]$ in 16K FFTmode: $G_k[11]=G_{k-1}[0]\oplus G_{k-1}[1]\oplus G_{k-1}[4]\oplus G_{k-1}[6]$ in 32K FFTmode: $G_k[12]=G_{k-1}[0]\oplus G_{k-1}[1]\oplus G_{k-1}[4]\oplus G_{k-1}[5]\oplus G_{k-1}[9]\oplus G_{k-1}[11]$ (a)

$p=0;$ $for\ (n=0; n<N_{\max}; n=n+1)$ $\{T(n)=(n\bmod 2)\cdot 2^{N_a-1}+\sum_{i=0}^{N_a-2}(2^i\ ?R_n[i]);$ $S_l(n)=(T(n)+A_{\lfloor l/2\rfloor})\bmod N_{\max};$ $if\ S_l(n)<N_{data}$ $\{H_l(p)=S_l(n);$ $p=p+1;\ \}$ $\}$ $(n\bmod 2)\cdot 2^{N_a-1}$ denotes 1-bit toggling, i.e.,, $R_n[N_a-1]=0,1,0,1,\ldots$ and the cyclic-shifting value $A_{\lfloor l/2\rfloor}$ is calculated for every OFDM symbol pair (b)

FIG. 36
| PLP_NUM | 1 | >1 |
|---|---|---|
| Interleaving type | CI | CI+BI |
FIG. 37
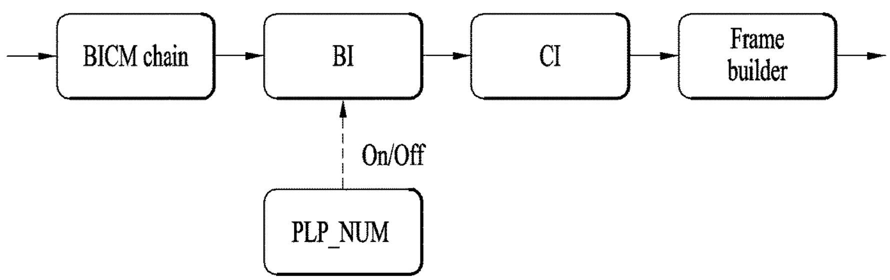
<Hybrid TI structure: example-1>
FIG. 38
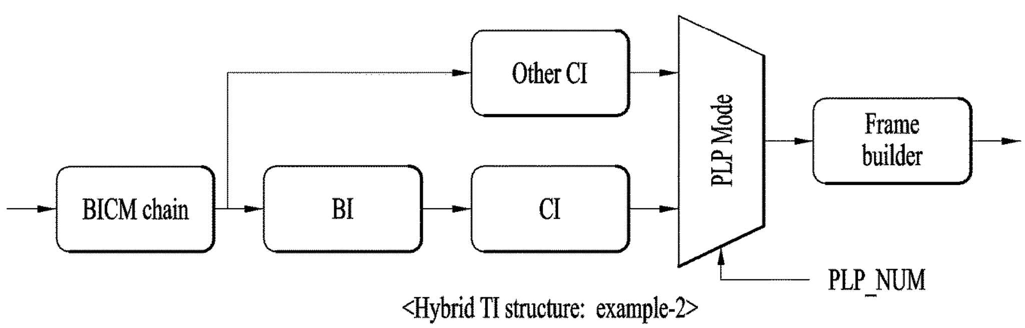
<Hybrid TI structure: example-2>

<Hybrid TI structure: example-1>

<Hybrid TI structure: example-2>

FIG. 43

| Syntax | No. of Bits | Format |
|---|---|---|
| FIC_payload() { | | |
| FIC_protocol_version | 8 | uimsbf |
| broadcast_stream_id | 16 | uimsbf |
| num_services | 8 | uimsbf |
| for (i=0; i<num_services;i++) { | | |
| service_id | 16 | uimsbf |
| service_data_version | 8 | uimsbf |
| service_channel_number | 16 | uimsbf |
| service_category | 5 | uimsbf |
| short_service_name_length | 3 | uimsbf |
| for ( j=0; j<short_name_length; j++) { | | |
| short_service_name_byte pair | 16 | bslbf |
| } | | |
| partition_id | 8 | uimsbf |
| service_status | 3 | uimsbf |
| sp_indicator | 1 | bslbf |
| broadcast_SLS_bootstrap_flag | 1 | bslbf |
| broadband_SLS_bootstrap_flag | 1 | bslbf |
| num_min_capability | 2 | uimsbf |
| for (k=0;k<num_min_capability;k++){ | | |
| min_capability | 8 | uimsbf |
| } | | |
| If (broadcast_SLS_bootstrap_flag) { | | |
| reserved | 6 | '111111' |
| IP_version_flag | 1 | bslbf |
| SLS_source_IP_address_flag | 1 | bslbf |
| If (SLS_source_IP_address_flag) { | | |
| SLS_source_IP_address | 32 or 128 | uimsbf |
| } | | |
| SLS_destination_IP_address | 32 or 128 | uimsbf |
| SLS_destination_UDP_port | 16 | uimsbf |
| SLS_TSI | 16 | uimsbf |
| SLS_DP_ID | 8 | uimsbf |
| } | | |
| If (broadband_SLS_bootstrap_flag) { | | |
| SLS_url_length | 8 | |
| SLS_url | SLS_url_length*8 | bslbf |
| } | | |
| reserved | 4 | '1111' |
| num_service_level_descriptors | 4 | |
| for (j=0;j<num_service_level_descriptors;j++){ | | |
| service_level_descriptor() | var | |
| } | | |
| } | | |
| reserved | 4 | '1111' |
| num_FIC_level_descriptors | 4 | uimsbf |
| for (n=0; n<num_FIC_level_descriptors; n++) | | |
| FIC_level_descriptor() | var | |
| } | | |

FIG. 44

| Syntax | No. of Bits | Format |
|---|---|---|
| signaling_table_section() { | | |
| num_of_tables | 8 | uimsbf |
| for (i=0; i<num_of_tables; i++) { | | |
| table_offset | 16 | uimsbf |
| table_id | 8 | uimsbf |
| table_version_number | 8 | uimsbf |
| table_encoding | 4 | uimsbf |
| indicator_flags { | | |
| table_id_extension_indicator | 1 | |
| URI_indicator | 1 | bslbf |
| valid_from_indicator | 1 | bslbf |
| expiration_indicator | 1 | bslbf |
| } | | |
| if (table_id_extension_indicator ) { | | |
| table_id_extension | 16 | uimsbf |
| } | | |
| if (URI_indicator) { | | |
| URI_length | 8 | uimsbf |
| URI | URI_legnth*8 | bslbf |
| } | | |
| if (valid_from_indicator) { | | |
| valid_from | 32 | uimsbf |
| } | | |
| if(expiration_indicator) { | | |
| expiration | 32 | uimsbf |
| } | | |
| } | | |
| num_encapsulation_descriptors | 8 | uimsbf |
| for (i=0; i<num_encapsulation_descriptors; i++) { | | |
| encapsulation_descriptor() | var | |
| } | | |
| } | | |

FIG. 45

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Table ID    |        Table ID Extension     |      VN       |
+-+-+-+-+-+-+-+-+-+-+-+-+-+-+-+-+-+-+-+-+-+-+-+-+-+-+-+-+-+-+-+-+
```

FIG. 46

| Element/Attribute | Cardinality |
|---|---|
| Service | 1 |
| @serviceID | 1 |
| ServiceName | 0..N |
| @lang | 0..1 |
| Capabilities | 0..1 |
| AdditionalROUTESession | 0..N |
| @sourceIPAddr | 0..1 |
| @destIPAddr | 1 |
| @destUDPPort | 1 |
| @lsidDatapipeID | 1 |
| ComponentMapDescription | 0..1 |
| @mpdID | 0..1 |
| @perID | 0..1 |
| BroadcastComp | 0..N |
| @urlPattern | 1 |
| BroadbandComp | 0..N |
| @urlPattern | 1 |
| ForeignComp | 0..N |
| @broadcastStreamID | 1 |
| ComponentParameters | 0..N |
| @sourceIPAddr | 1 |
| @destIPAddr | 1 |
| @destUDPPort | 1 |
| @datapipeID | 1 |
| @tsi | 1 |
| ContentAdvisoryRating | 0..1 |
| CaptionServiceDescription | 0..1 |

| Element/Attribute | Cardinality |
|---|---|
| URL Signaling Description | |
| @service_id | 1 |
| @sm tURL | 0..1 |
| @mpdURL | 0..1 |
| @astURL | 0..1 |

t49010

Channel Map Example

| Idx | ServiceID | BCStreamID | PartitionID | category | ... | short name | Sp_indicator | SLS_Bootstrapping | SLS_URL |
|---|---|---|---|---|---|---|---|---|---|
| 0 | 0×1001 | 0×10 | 10 | 1 | ... | ABC | 0 | slp#1/dlp#1/dPort#1/DP#1/tsi#1 | http://service1/url/ |
| 1 | 0×1002 | 0×10 | 10 | 1 | ... | DEF | 1 | slp#2/dlp#2/dPort#2/DP#2/tsi#2 | |
| 2 | 0×1064 | 0×10 | 10 | 3 | ... | GHI | 0 | slp#3/dlp#3/dPort#3/DP#3/tsi#3 | http://.../url |

Channel Map Example

| Idx | ServiceID | BCStreamID | PartitionID | category | ... | name | ... | SLS_Bootstrapping | SLS_URL | Additional ROUTE session |
|---|---|---|---|---|---|---|---|---|---|---|
| 0 | 0×1001 | 0×10 | 10 | 1 | ... | ABC SPORTS | ... | slp#1/dlp#1/dPort#1/DP#1/tsi#1 | http://service1/url/ | slP/dlP/Port/DP/tsi |
| 1 | 0×1002 | 0×10 | 10 | 1 | ... | DEF MOVIE | ... | slp#2/dlp#2/dPort#2/DP#2/tsi#2 | | |
| 2 | 0×1064 | 0×10 | 10 | 3 | ... | GHI ESG | ... | slp#3/dlp#3/dPort#3/DP#3/tsi#3 | http://.../url | |

FIG. 58

| Table(s) Requested | Query Term(s) |
|---|---|
| SLS Set | ?table=SLS |
| SMT | ?table=SMT |
| S-LSIDT | ?table=S-LSIDT |
| UST | ?table=UST |

FIG. 59

| Element/@Attribute | | | | Use | Description |
|---|---|---|---|---|---|
| S-LSID | | | | | Service LCT Session Instance Description |
| | @svcID | | | M | Service ID(matches service_id in FIT) |
| | @version | | | 0 | Version of S-LSID |
| | @validFrom | | | 0 | Date and time from which this S-LSID is valid |
| | @expires | | | 0 | Date and time after whichthis S-LSID is no longer valid |
| | RS | | | 1..N | ROUTE session |
| | | @bsid | | OD | Broadcast stream ID(default current broadcast stream) |
| | | @sIpAddr | | 0 | Source IP address (M for non-primary session) |
| | | @dIpAddr | | 0 | Destination IPaddress (M for non-primarysession) |
| | | @dport | | 0 | Destination port (M for non-primary session) |
| | | @PLPID | | M | Default Physical Layer Pipe ID for ROUTE session |
| | | LS | | 1..N | LCTSession |
| | | | @tsi | M | TSIvalue |
| | | | @PLPID | OD | PLP ID (overrides default ROUTE session value) |
| | | | @bw | 0 | Maximum bandwidth |
| | | | @startTime | 0 | Start time |
| | | | @endTime | 0 | Endtime |
| | | | SrcFlow | 0..1 | SourceFlow |
| | | | RprFlow | 0..1 | RepairFlow |
| | | | | | |
| SrcFlow | | | | | Source Flow |
| | @nrt | | | OD | Absent for RTcontent; present for NRTcontent |
| | @minBuffSize | | | 0 | Min buffer size needed tohandle data |
| | @appID | | | 0 | Application specific identifier of content carried in this session -e.g., ID of DASH Representation |
| | EFDT | | | 0..1 | |
| | | @idref | | 0 | URI forEFDT, when delivered in band |
| | | @version | | 0 | Version of EFDT |
| | | @maxExpiresDelta | | 0 | ???confusingdefinition |
| | | @maxTransportSize | | 0 | Max transport size of any object in this EFDT |
| | | @fileTemplate | | 0 | Mapping of LCT TOI to URI for object |
| | | FDTParameters | | 0 | Anyparameters allowed in FLUTE FDT |
| | Payload | | | 1..N | Mapping of Codepoint fieldn LCT header to payload format of packet |
| | | @codePoint | | | Value of codepoint field in LCT header |
| | | @formatID | | | Deliveryobject format ID(code fromtable) |
| | | @frag | | | Fragmentation code (fromtable) |
| | | @order | | | Delivery order (codefromtable) |
| | | @srcFecPayloadID | | | Format of Source FEC PayloadID(value from table) |
| | FECParams | | | 0..1 | Includes FEC encoding-id,instance-id,etc |
| | | | | | |
| RprFlow | | | | | RepairFlow |

FIG. 60

| Syntax | No. of Bits | Format |
|---|---|---|
| broadband_location_descriptor() { | | |
| descriptor_tag | 8 | uimsbf |
| descriptor_length | 8 | uimsbf |
| url_length | 16 | uimsbf |
| url_bytes | 8*url_length | |
| } | | |

FIG. 61

| Table(s) Requested | Query Term(s) |
|---|---|
| SLS Set | ?table=SLS[svc=<service_id>] |
| SMT | ?table=SMT[svc=<service_id>] |
| S-LSIDT | ?table=S-LSIDT[svc=<service_id>] |
| UST | ?table=UST[svc=<service_id>] |

FIG. 68

| Link Layer Organization Type | Logical Data Path | | |
|---|---|---|---|
| | Normal Data Path | Base Data Pipe | Dedicated Channel |
| Organization Type 1 | 0 | X | X |
| Organization Type 2 | 0 | 0 | X |
| Organization Type 3 | 0 | X | 0 |
| Organization Type 4 | 0 | 0 | 0 |

FIG. 74

| Synrax | No. Bits | Format |
|---|---|---|
| Fast_Information_Table(){ | | |
| table_id | 8 | uimsbf |
| section_syntax_indicator | 1 | '0' |
| private_indicator | 1 | '1' |
| reserved | 2 | '11' |
| section_length | 12 | uimsbf |
| table_id_extension | 16 | uimsbf |
| reserved | 2 | '11' |
| FIT_data_version | 5 | uimsbf |
| current_next_indicator | 1 | bslbf |
| section_number | 8 | uimsbf |
| last_section_number | 8 | uimsbf |
| number_broadcast | 8 | uimsbf |
| for(i=0;i<num_brdadcast;i++){ | | |
| broadcast_id | 16 | uimsbf |
| delivery_system_id | 16 | uimsbf |
| base_DP_id | 8 | uimsbf |
| base_DP_version | 5 | uimsbf |
| reserved | 3 | '111' |
| num_service | 8 | uimsbf |
| for(i=0;j<num_service;j++){ | | |
| service_id | 16 | uimsbf |
| service_category | 6 | uimsbf |
| service_hidden_flag | 1 | bslbf |
| SP_indicator | 1 | bslbf |
| num_component | 8 | uimsbf |
| for(k=0;k<num_component;k++){ | | |
| component_id | 8 | bslbf |
| DP_id | 8 | bslbf |
| RoHC_init_descriptor(){ | | |
| context_id | 8 or 16 | |
| context_profile | 8 | uimsbf |
| max_cid | 8 | uimsbf |
| large_cid | 8 | bslbf |
| } | | |
| } | | |
| } | | |
| } | | |
| } | | |

FIG. 75

| Synrax | No. Bits | Format |
|---|---|---|
| Emergency_Alert_Table (){ | | |
| table_id | 8 | uimsbf |
| section_synax-indicator | 1 | '0' |
| private_indicator | 1 | '1' |
| reserved | 2 | '11' |
| secion_length | 12 | uimsbf |
| table_id_extension { | | |
| EAT_protocol_version | 8 | 0X0 |
| reserved | 8 | uimsbf |
| } | | |
| reserved | 2 | '11' |
| version_number | 5 | uimsbf |
| current_next_indicator | 1 | '1' |
| section_number | 8 | uimsbf |
| last_section_number | 8 | uimsbf |
| automatic_thing_flag | 1 | bslbf |
| num_EAS_messages | 7 | uimsbf |
| IF(automatic_tuning_flag==0X01) { | | |
| automatic_tuning_channel_number | 8 | uimsbf |
| automatic_tuning_DP_id | 8 | uimsbf |
| automatic_tuning_service_id | 16 | uimsbf |
| } | | |
| for (m=0; m<num_EAS_messages; m++) { | | |
| EAS_message_id | 32 | uimsbf |
| EAS_IP_version_flag | 1 | bslbf |
| EAS_message_transfer_type | 3 | uimsbf |
| EAS_message_encoding_type | 3 | uimsbf |
| EAS_NRT_flag | 1 | bslbf |
| if(EAS_message_transfer_type==0X02) { | | |
| reserved | 4 | '1111' |
| EAS_message_length/*N*/ | 12 | uimsbf |
| EAS_message_bytes() | 8*N | var |
| } | | |
| else if (EAS_message_transfer_type==0X003) { | | |
| IP_address | 32 or 128 | uimsbf |
| UDP_port_num | 16 | uimsbf |
| DP_id | 8 | uimsbf |
| } | | |
| if(EAS_NRT_flag==0X01){ | | |
| EAS_NRT_service_id | 16 | uimsbf |
| } | | |
| } | | |
| } | | |

| Packet_Type Value | Meaning |
|---|---|
| 000 | IPv4 |
| 001 | IPv6 |
| 010 | Compressed IP Packet |
| 011 | MPEG-2 Transport Stream |
| 100 | Reserved |
| 101 | Reserved |
| 110 | Signaling |
| 111 | Framed_Packet_Type |

FIG. 79

| Syntax | Bits | Format |
|---|---|---|
| FIC_payload( ){ | | |
| FIC_protocol_version | 8 | |
| transport_stream_id | 16 | |
| num_partitions | 8 | |
| for (i= 0 ; i<num_partitions ; i++) { | | |
| partition_id | 8 | uimsbf |
| partition_protocol_version | 8 | uimsbf |
| num_services | 8 | uimsbf |
| for (j= 0 ; j<num_services ;j++) { | | |
| service_id | 8 | uimsbf |
| service_data_version | 8 | uimsbf |
| service_channel_number | 8 | uimsbf |
| service_category | 8 | uimsbf |
| service_status | 3 | uimsbf |
| service_distribution | 2 | uimsbf |
| sp_indicator | 1 | bslbf |
| IP_version_flag | 1 | bslbf |
| SSC_source_IP_address_flag | 1 | bslbf |
| if( SSC_source_IP_address_flag) | | |
| SSC_source_IP_address | 32 or 128 | uimsbf |
| SSC_destination_IP_address | 32 or 128 | uimsbf |
| SSC_destination_UDP_port | 16 | uimsbf |
| SSC_TSI | 16 | uimsbf |
| SSC_DP_ID | 8 | uimsbf |
| } | | |
| num_partition_level_descriptors | 8 | uimsbf |
| for (k= 0 ; k< num_partition_level_descriptors ; k++ | | |
| partition_level_descriptor( ) | var | |
| } | | |
| num_FIC_level_descriptors | 8 | uimsbf |
| for (n= 0 ; n<num_FIC_level_descriptors ; n++) | | |
| FIC_level_descriptor() | var | |
| } | | |

FIG. 82

| Flag | | Operation | | PHY Input Format |
|---|---|---|---|---|
| HCF | EF | Header Compression | Encapsulation | |
| 1 | 1 | Enable | Enable | Link Layer Packet with Compressed IP payload |
| 1 | 0 | Enable | Disable | Not used |
| 0 | 1 | Disable | Enable | Link Layer Packet with IP payload |
| 0 | 0 | Disable | Disable | IP Packet direct input |

FIG. 83

| Syntax | No. Bits | Format |
|---|---|---|
| Link_Layer_mode_control_descriptor() { | | |
| descriptor_tag | 8 | uimsbf |
| descriptor_length | 8 | uimsbf |
| num_DP | 8 | uimsbf |
| for(i=0;i<num_dp;i++) { | | |
| DP_id | 8 | uimsbf |
| HCF | 1 | bslbf |
| EF | 1 | bslbf |
| reserved | 6 | uimsbf |
| } | | |
| } | | |

FIG. 86

| Index | Field value | Encapsulation Mode |
|---|---|---|
| 0 | 00 | None (Bypass) |
| 1 | 01 | Encapsulation 1 (Default) |
| 2 | 10 | Encapsulation 2 |
| 3 | 11 | Encapsulation 3 |

FIG. 87

| Index | Field value | Header Compression Mode |
|---|---|---|
| 0 | 000 | None (No Compression) |
| 1 | 001 | RoHC (default) |
| 2 | 010 | Header Compression 2 |
| 3 | 011 | Header Compression 3 |
| 4 | 100 | Reserved |
| 5 | 101 | Reserved |
| 6 | 110 | Reserved |
| 7 | 111 | Reserved |

FIG. 88

| Index | Field value | Packet Reconfiguration Mode |
|---|---|---|
| 0 | 00 | None (No Reconfiguration) |
| 1 | 01 | Reconfiguration 1 (default) |
| 2 | 10 | Reconfiguration 2 |
| 3 | 11 | Reconfiguration 3 |

FIG. 89

| Index | Field value | Context Transmission Mode |
|---|---|---|
| 0 | 000 | Transmission Mode 1 |
| 1 | 001 | Transmission Mode 2 |
| 2 | 010 | Transmission Mode 3 |
| 3 | 011 | Transmission Mode 4 |
| 4 | 100 | Transmission Mode 5 |
| 5 | 101 | Reserved |
| 6 | 110 | Reserved |
| 7 | 111 | Reserved |

FIG. 90

| Syntax | No . Bits | Format |
|---|---|---|
| RoHC_Initialization_in_link( ){ | | |
| link_id | 8 | uimsbf |
| max_cid | 16 | uimbf |
| large_cids | 1 | bslbf |
| reserved | 3 | 111 |
| num_profiles | 4 | uimsbf |
| for(j= 0;j<num_profiles ; j++) { | | |
| profiles( ) | 8 | uimsbf |
| } | | |
| num_IP_stream | 8 | uimsbf |
| for(k= 0;k<num_IP_stream ; k++) | | |
| { | | |
| IP_address() | 32 | uimsbf |
| } | | |
| } | | |

FIG. 91

| Index | Field value | Signaling path | Priority |
|---|---|---|---|
| 0 | 000 | None (No signaling path) | - |
| 1 | 001 | Dedicated Data Pipe | 1 |
| 2 | 010 | Specific signaling channel (FIC) | 2 |
| 3 | 011 | Specific signaling channel (EAC) | 3 |
| 4 | 100 | Reserved | 4 |
| 5 | 101 | Reserved | 5 |
| 6 | 110 | Reserved | 6 |
| 7 | 111 | Reserved | 7 |

FIG. 92

| Bit position | Field value | Signaling path mapping |
|---|---|---|
| b0 (MSB) | 0 : disable<br>1 : enable | Dedicated Data Pipe |
| b1 | | Specific signaling channel (FIC) |
| b2 | | Specific signaling channel (EAC) |
| b3(LSB) | | Specific signaling channel (other) |

FIG. 95

| Syntax | No . Bits | Format |
|---|---|---|
| Link_Layer_Initialization_descriptor( ) { | | |
|     descriptor_tag | 8 | uimsbf |
|     descriptor_length | 8 | uimsbf |
|     num_link | 8 | uimsbf |
|     for(i= 0 ; i<num_link ; i++) { | | |
|         link_id | 8 | uimsbf |
|         encapsulation_mode | 2 | bslbf |
|         if (encapsulation_mode==0) { | | |
|             reserved | 6 | bslbf |
|         } | | |
|         else { | | |
|             header_compression_mode | 3 | bslbf |
|             if (header_compression_mode ==0) { | | |
|                 reserved | 3 | |
|             } | | |
|             else { | | |
|                 packet_reconfiguration_mode | 2 | |
|                 context_transmission_mode | 3 | bslbf |
|                 reserved | 1 | bslbf |
|                 max_cid | 16 | uimbf |
|                 large_cids | 1 | bslbf |
|                 num_profiles | 4 | uimsbf |
|                 for(j= 0 ;j<num_profiles ; j++) { | | |
|                     profiles( ) | | |
|                 } | 8 | uimsbf |
|             } | | |
|         } | | |
|     } | | |
| } | | |

FIG. 96

| Syntax | No. Bits | Format |
|---|---|---|
| Link_Layer_Initialization_descriptor( ) { | | |
| descriptor_tag | 8 | uimsbf |
| descriptor_length | 8 | uimsbf |
| num_link | 8 | uimsbf |
| for(i=0;i<num_link;i++){ | | |
| link_id | 8 | uimsbf |
| encapsulation_mode | 2 | bslbf |
| if (encapsulation _mode ==0) { | | |
| reserved | 6 | bslbf |
| } | | |
| else { | | |
| header_compression_mode | 3 | bslbf |
| if (header_compression_mode ==0) { | | |
| reserved | 3 | |
| } | | |
| else { | | |
| packet_reconfiguration_mode | 2 | bslbf |
| context_transmission_mode | 3 | bslbf |
| reserved | 6 | bslbf |
| } | | |
| } | | |
| } | | |
| } | | |

FIG. 97

| Syntax | No. Bits | Format |
|---|---|---|
| Link_Layer_Initialization_descriptor() { | | |
| descriptor_tag | 8 | uimsbf |
| descriptor_length | 8 | uimsbf |
| num_link | 8 | uimsbf |
| signaling_path_configuration | 4 | bslbf |
| reserved | 4 | bslbf |
| if (signaling_path_configuration >='1000') { | | |
| dedicated_DP_id | 8 | uimsbf |
| } | | |
| for(i=0;i<num_link;i++){ | | |
| link_id | 8 | uimsbf |
| encapsulation_mode | 2 | bslbf |
| if (encapsulation _mode ==0) { | | |
| reserved | 6 | bslbf |
| } | | |
| else { | | |
| header_compression_mode | 3 | bslbf |
| if (header_compression_mode ==0) { | | |
| reserved | 3 | |
| } | | |
| else { | | |
| packet_reconfiguration_mode | 2 | bslbf |
| context_transmission_mode | 3 | bslbf |
| reserved | 6 | bslbf |
| } | | |
| } | | |
| } | | |
| } | | |

FIG. 105

| Element or Attribute Name | Use | Description |
|---|---|---|
| LSID | | LCT Session Instance Description |
| @id | M | Identifier of the LSID instance, whose value may be the same as userServiceDescription @s erviceId in the User Service Bundle Description fragment, to which this LSID metadata frag ment pertains |
| TransportSession | 1...N | Provides information about the LCT transport sessions which carry the source and/or repair flows associated with the content components of the user service. |
| @tsi | M | Specifies the transport session identifier of the associated source and/or repair flow. The value must not be 0. |
| @BStreamID | 0..1 | Identifier of the Broadcast Stream in which the contents of this LCT session are carried. |
| @PLPID | 0..1 | Identifier of the PLP within the Broadcast Stream identified by @ BPStreamID in which the contents of this LCT session are carried. |
| @senderIPAddress | 0 | Specifies the IP address of the sender of the ROUTE session and therefore the child LCT transport session which scopes the TSI. This attribute is optional when the parent ROUTE sessi on is the same ROUTE session to which the LCT session, carrying the SCS fragments for this user service (including this LSID fragment), belongs. |
| @destIPAddress | 0 | Specifies the destination IP address of the ROUTE session in which the source flow and/or repair flow carried by this LCT session is contained. This attribute is optional when the parent ROUTE session is the same ROUTE session to which the LCT session, carrying the SCS fragments for this user service (including this LSID fragment), belongs. |
| @port | 0 | Specifies the destination UDP port of the ROUTE session in which the source flow and/or repair flow carried by this LCT session is contained. This attribute is optional when the parent ROUTE session is the same ROUTE session to which the LCT session, carrying the SCS frag ments for this user service (including this LSID fragment), belongs. |
| @bandwidth | 0 | Specifies the maximum bit-rate required by this LCT session and represents the largest sum of the sizes of all packets transmitted during any one second long period of the session, expressed as kilobits. |
| @startTime | OD default=0 | Specifies the start time of this LCT session as represented by the 32-bit integer part of an NTP time stamp. If this attribute is not present or is set to ?? and @endTime is also "0", the n the session is regarded as permanent. |
| @endTime | OD default=0 | Specifies the end time of this LCT session as represented by the 32-bit integer part of an NT P time stamp. If this attribute is not present or is set to "0", then the session is not bounded, although it will not become active until after the start time. |
| @scheduleReference | 0..1 | URI reference to Schedule fragment providing the detailed transmission schedule for the ccarried on this LCT session |
| SourceFlow | 0 ... 1 | Provides information of a source flow carried on this tsi |
| RepairFlow | 0 ... 1 | Provides information of a repair flow carried on the tsi . For more details refer to Section 7 |

FIG. 108

| element/attribute | type | minOccurs | maxOccurs |
|---|---|---|---|
| e BD | | | |
| e USD | | 1 | 1 |
| @ atsc:protocolVersion | xs:unsignedByte | optional | |
| @ atsc:atscServiceId | xs:unsignedShort -- link to FIT | optional | |
| @ atsc:fullMpdUri | atsc:fullMpdUri | optional | |
| @ atsc:IsidUri | atsc:fullMpdUri | optional | |
| e name | xs:string | 0 | unbounded |
| @ lang | xs:langauge | optional | |
| e serviceLanguage | xs:langauge | 0 | unbounded |
| e requiredCapabilities | | 0 | 1 |
| e feature | xs:unsignedInt | 1 | unbounded |
| e deliveryMethod | | 1 | unbounded |
| e r7:unicastAccesURI | | 0 | unbounded |
| e basePattern | xs:anyURI | 1 | unbounded |
| e r8:alternativeAccessDelivery | | 0 | 1 |
| e unicastAccessURI | xs:anyURI | 0 | unbounded |
| a timeShfitingBuffer | xs:unsignedInt | optional | default = 0 |
| e r12:unicastAppService | | 0 | unbounded |
| e basePattern | xs:anyURI | 1 | unbounded |
| e serviceArea | xs:unsignedShort | 0 | unbounded |
| e r12:unicastAppService | | 0 | unbounded |
| e basePattern | xs:anyURI | 1 | unbounded |
| atsc:atscForeignBroadcastAppService | | 0 | unbounded |
| e basePattern | xs:anyURI | 1 | unbounded |
| e atsc:atscBroadcastAppservice | | 0 | unbounded |
| @ broadcastStreamid | xs:unsignedInt | required | |
| e basePattern | xs:anyURI | 1 | unbounded |
| @ accessGroupId | xs:nonNegativeInteger | optional | |
| @ associatedProcedureDescriptionURI | xs:anyURI | optional | |
| @ protectionDescriptionURI | xs:anyURI | optional | |
| @ sessionDescriptionURI | xs:anyURI | optional | |
| @ accessPointName | xs:anyURI | optional | |
| e r9:mediaPresentationDescription | | 0 | x |
| e mpdURI | xs:anyURI | 1 | |
| e r12:appService | | 0 | x |
| e identicalContent | | 0 | unbounded |
| e basePatten | xs:anyURI | 2 | unbounded |
| e alternativeContent | | | |
| e basePattern | xs:anyURI | 0 | unbounded |
| @ appServiceDesriptionURI | xs:anyURI | required | |
| @ mimeType | xs:string | required | |
| @ serviceId | xs:anyURI -- link to ESG | required | |
| @ fecDescriotionURI | xs:anyURI | optional | |

FIG. 109

| | Element/@Attribute | | | Use | Description |
|---|---|---|---|---|---|
| S-LSID | | | | | Service LCT Session Instance Description |
| | @svcID | | | M | Service ID (matches service_id in FIT) |
| | @version | | | O | Version of S-LSID |
| | @validFrom | | | O | Date and time from which this S-LSID is valid |
| | @expires | | | O | Date and time after which this S-LSID is no longer valid |
| | RS | | | 1..N | ROUTE session |
| | | @bsid | | OD | Broadcast stream ID (default: current broadcast stream) |
| | | @sIpAddr | | O | Source IP address (M for non-primary session) |
| | | @dIpAddr | | O | Destination IP address (M for non-primary session) |
| | | @dport | | O | Destination port (M for non -primary session) |
| | | @PLPID | | M | Default Physical Layer Pipe ID for ROUTE session |
| | | LS | | 1..N | LCT Session |
| | | | @tsi | M | TSI value |
| | | | @PLPID | OD | PLP ID (overrides default ROUTE session value) |
| | | | @bw | O | Maximum bandwidth |
| | | | @startTime | O | Start time |
| | | | @endTime | O | End time |
| | | | SrcFlow | 0..1 | Source Flow |
| | | | RprFlow | 0..1 | Repair Flow |

FIG. 110

| Element/@Attribute | Use | Description |
|---|---|---|
| S-LSID | | Service LCT Session Instance Description |
| @svcID | M | Service ID (matches service_id in FIT) |
| @version | O | Version of S-LSID |
| @validFrom | O | Date and time from which this S-LSID is valid |
| @expires | O | Date and time after which this S-LSID is no longer valid |
| RS | 1..N | ROUTE session |
| @bsid | OD | Broadcast stream ID (default: current broadcast stream) |
| @sIpAddr | O | Source IP address (M for non-primary session) |
| @dIpAddr | O | Destination IP address (M for non-primary session) |
| @dport | O | Destination port (M for non-primary session) |
| @PLPID | OD | Default Physical Layer Pipe ID for ROUTE session (default: matches SLS_PLP_ID in FIT) |
| LS | 1..N | LCT Session |
| @tsi | M | TSI value |
| @PLPID | OD | PLP ID (overrides default ROUTE session value) |
| @bw | O | Maximum bandwidth |
| @startTime | O | Start time |
| @endTime | O | End time |
| SrcFlow | 0..1 | Source Flow |
| RprFlow | 0..1 | Repair Flow |

FIG. 111

| Element/@Attribute | Use | Description |
|---|---|---|
| S-LSID | | Service LCT Session Instance Description |
| @svcID | M | Service ID (matches service_id in FIT) |
| @version | O | Version of S-LSID |
| @validFrom | O | Date and time from which this S-LSID is valid |
| @expires | O | Date and time after which this S-LSID is no longer valid |
| TS | 1..N | Transport Session in one ROUTE session<br>(TS's intention to use not-LCT transport in the ROUTE) |
| @tsi | M | TSI value |
| @PLPID | OD | PLP ID (overrides default ROUTE session value) |
| @bw | O | Maximum bandwidth |
| @startTime | O | Start time |
| @endTime | O | End time |
| SrcFlow | 0..1 | Source Flow |
| RprFlow | 0..1 | Repair Flow |
| RS | 0..N | Additional ROUTE session |
| @bsid | OD | Broadcast stream ID (default: current broadcast stream) |
| @sIpAddr | O | Source IP address (M for non-primary session) |
| @dIpAddr | O | Destination IP address (M for non-primary session) |
| @dport | O | Destination port (M for non-primary session) |
| @PLPID | OD | Default Physical Layer Pipe ID for ROUTE session (default: matches SLS_PLP_ID in FIT) |
| TS | 1..N | Transport Session of ROUTE (mother-element) |
| @tsi | M | TSI value |
| @PLPID | OD | PLP ID (overrides default ROUTE session value) |
| @bw | O | Maximum bandwidth |
| @startTime | O | Start time |
| @endTime | O | End time |
| SrcFlow | 0..1 | Source Flow |
| RprFlow | 0..1 | Repair Flow |

FIG. 112

| Element/@Attribute | Use | Description |
|---|---|---|
| S-LSID | | Service LCT Session Instance Description |
| @svcID | M | Service ID (matches service_id in FIT) |
| @version | O | Version of S -LSID |
| @validFrom | O | Date and time from which this S-LSID is valid |
| @expires | O | Date and time after which this S -LSID is no longer valid |
| TransportSession | 1..N | LCT Session |
| @tsi | M | TSI value |
| @PLPID | OD | PLP ID (overrides default ROUTE session value) |
| @bw | O | Maximum bandwidth |
| @startTime | O | Start time |
| @endTime | O | End time |
| SrcFlow | 0..1 | Source Flow |
| RprFlow | 0..1 | Repair Flow |
| RS | 0..N | Additional ROUTE session |
| @bsid | OD | Broadcast stream ID (default: current broadcast stream) |
| @sIpAddr | O | Source IP address (M for non-primary session) |
| @dIpAddr | O | Destination IP address (M for non -primary session) |
| @dport | O | Destination port (M for non -primary session) |
| @PLPID | OD | Default Physical Layer Pipe ID for ROUTE session (default: matches SLS_PLP_ID in FIT) |
| LS | 1..N | LCT Session |
| @tsi | M | TSI value |
| @PLPID | OD | PLP ID (overrides default ROUTE session value) |
| @bw | O | Maximum bandwidth |
| @startTime | O | Start time |
| @endTime | O | End time |
| SrcFlow | 0..1 | Source Flow |
| RprFlow | 0..1 | Repair Flow |

FIG. 113

| Element/Attribute | Cardinality | Description |
|---|---|---|
| Service | 1 | |
| @serviceID | 1 | |
| ServiceName | 0..N | long service name |
| @lang | 0..1 | |
| Capabilities | 0..1 | type: string; essential capabilities |
| ComponentMapDescription | 0..1 | |
| @mpdID | 0..1 | can be used for finding cached MPD |
| @perID | 0..1 | DASH Period id |
| BroadcastComp | 0..N | |
| @urlPattern | 1 | |
| BroadbandComp | 0..N | |
| @urlPattern | 1 | |
| ForeignComp | 0..N | within the same service |
| @broadcastStreamID | 1 | essentially needed |
| ContentAdvisoryRating | 0..1 | |
| CaptionServiceDescription | 0..1 | |

FIG. 115

| | element/attribute | type | minOccurs | maxOccurs |
|---|---|---|---|---|
| e | BD | | | |
| | e USD | | 1 | unbounded |
| | @ atsc:fullMpdURi | xs:anyURI | optional | |
| | @ atsc:ISidUri | xs:anyURI | optional | |
| | e name | xs:string | 0 | unbounded |
| | @ lang | xs:langaue | optional | |
| | e serviceLanguage | xs:langaue | 0 | unbounded |
| | e requiredCapabilities | | 0 | 1 |
| | e feature | xs:unsignedInt | 1 | unbounded |
| | e deliveryMethod | | 1 | unbounded |
| | e r7:unicastAccesURI | | 0 | unbounded |
| | e basePattern | xs:anyURI | 1 | unbounded |
| | r8:alternativeAccessDelivery | | 0 | 1 |
| | e unicastAccessURI | xs:anyURI | 0 | unbounded |
| | a timeShfitingBuffer | xs:unsignedInt | optional | default=0 |
| | e r12:broadcastAppService | | 0 | unbounded |
| | e basePattern | xs:anyURI | 1 | unbounded |
| | e serviceArea | xs:unsignedShort | 0 | unbounded |
| | e r12:unicastAppService | | 0 | unbounded |
| | e basePattern | xs:anyURI | 1 | unbounded |
| | e atsc:atscBroadcastAppservice | | 0 | unbounded |
| | e basePattern | xs:anyURI | 1 | unbounded |
| | e atsc:atscForeignBroadcastAppSercvice | | 0 | unbounded |
| | @ broadcastStreamid | xs:unsignedInt | required | |
| | e basePattern | xs:anyURI | 1 | unbounded |
| | @ accessGroupid | xs:nonNegativeInteger | optional | |
| | @ associatedProcedureDescriptionURI | xs:anyURI | optional | |
| | @ protectionDescriptionURI | xs:anyURI | optional | |
| | @ sessionDescriptionURI | xs:anyURI | optional | |
| | @ accessPointName | xs:anyURI | optional | |
| | e r9:mediaPresentationDescription | | 0 | x |
| | e mpdURI | xs:anyURI | 1 | |
| | e r9:schedule | | 0 | x |
| | e scheduleDescriptionURI | xs:anyURI | 1 | |
| | e r12:appService | | 0 | x |
| | e identicalContent | | 0 | unbounded |
| | e basePattern | xs:anyURI | 2 | unbounded |
| | e alternativeContent | | | |
| | e basePattern | xs:anyURI | 0 | unbounded |
| | @ appServiceDescriptionURI | xs:anyURI | required | |
| | @ mimeType | xs:string | required | |
| | e r12:KeepUpdataedService | | 0 | x |
| | e registrationServer | xs:anyURI | x | unbounded |
| | @ serviceId | xs:anyURI -- same as USBD @ BdId | required | |
| | @ r7:serviceClass | xs:string | x | |
| | @ fecDescriptionURI | xs:anyURI | optional | |
| | @ atsc:protocolVersion | xs:unsignedByte | optional | |
| | @ atsc:atscServiceId | xs:unsignedShort -- link to FIT | required | |
| | @ BDId | xs:anyURI -- link to ESG | required | |

APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

CROSS-REFERENCE TO RELATED APPLICATIONS

This Application is a Continuation of U.S. patent application Ser. No. 15/022,273 filed on Mar. 16, 2016 (now U.S. Pat. No. 9,936,054 issued Apr. 3, 2018), which is the National Phase of PCT International Application No. PCT/KR2016/001030 filed on Jan. 29, 2016, which claims the benefit under 35 U.S.C. § 119(e) to U.S. Provisional Application Nos. 62/109,602 filed on Jan. 29, 2015, 62/109,604 filed on Jan. 29, 2015 and 62/112,132 filed on Feb. 4, 2015, all of which are hereby expressly incorporated by reference into the present application.

BACKGROUND OF THE INVENTION

Field of the Invention

The present invention relates to an apparatus for transmitting a broadcast signal, an apparatus for receiving a broadcast signal and methods for transmitting and receiving a broadcast signal.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

The present invention provides a system capable of effectively supporting future broadcast services in an environment supporting future hybrid broadcasting using terrestrial broadcast networks and the Internet and related signaling methods.

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 14 illustrates a link mapping table (LMT) and an RoHC-U description table according to an embodiment of the present invention;

FIG. 24 is a table illustrating PLS1 data according to an embodiment of the present invention;

FIG. 25 is a table illustrating PLS2 data according to an embodiment of the present invention;

FIG. 33 illustrates a main PRBS used for all FFT modes according to an embodiment of the present invention;

FIG. 34 illustrates a sub-PRBS used for FFT modes and an interleaving address for frequency interleaving according to an embodiment of the present invention;

FIG. 36 is a table illustrating an interleaving type applied according to the number of PLPs;

FIG. 37 is a block diagram including a first example of a structure of a hybrid time interleaver;

FIG. 38 is a block diagram including a second example of the structure of the hybrid time interleaver;

FIG. 43 illustrates an SLT according to another embodiment of the present invention;

FIG. 44 illustrates a normal header used for service signaling according to another embodiment of the present invention;

FIG. 45 illustrates a method of filtering a signaling table according to another embodiment of the present invention;

FIG. 46 illustrates a service map table (SMT) according to another embodiment of the present invention;

FIG. 58 illustrates query terms for a signaling table request according to an embodiment of the present invention;

FIG. 59 illustrates a configuration of service LCT session instance description (SLSID) according to an embodiment of the present invention;

FIG. 60 illustrates a configuration of broadband_location_description according to an embodiment of the present invention;

FIG. 61 illustrates a query term for a signaling table request according to another embodiment of the present invention;

FIG. 68 illustrates definition according to link layer organization type according to an embodiment of the present invention;

FIG. 74 illustrates a syntax of a fast information channel (FIC) according to an embodiment of the present invention;

FIG. 75 illustrates a syntax of an emergency alert table (EAT) according to an embodiment of the present invention;

FIG. 79 is a syntax of an FIC according to another embodiment of the present invention;

FIG. 82 illustrates operations in a link layer and formats of a packet delivered to a physical layer according to flag values according to an embodiment of the present invention;

FIG. 83 illustrates a descriptor for signaling a mode control parameter according to an embodiment of the present invention;

FIG. 86 illustrates information for identifying an encapsulation mode according to an embodiment of the present invention;

FIG. 87 illustrates information for identifying a header compression mode according to an embodiment of the present invention;

FIG. 88 illustrates information for identifying a packet reconfiguration mode according to an embodiment of the present invention;

FIG. 89 illustrates a context transmission mode according to an embodiment of the present invention;

FIG. 90 illustrates initialization information when RoHC is applied as a header compression scheme according to an embodiment of the present invention;

FIG. 91 illustrates information for identifying a link layer signaling path configuration according to an embodiment of the present invention;

FIG. 92 illustrates information about a signaling path configuration, which is represented through a bit mapping method according to an embodiment of the present invention;

FIG. 95 illustrates a signaling format for transmitting an initialization parameter according to an embodiment of the present invention;

FIG. 96 illustrates a signaling format for transmitting the initialization parameter according to another embodiment of the present invention;

FIG. 97 illustrates a signaling format for transmitting the initialization parameter according to another embodiment of the present invention;

FIG. 105 illustrates a configuration of extended LCT session instance description (Extended SID) according to an embodiment of the present invention;

FIG. 108 illustrates a configuration of USBD according to an embodiment of the present invention;

FIG. 109 illustrates a configuration of SLSID according to another embodiment of the present invention;

FIG. 110 illustrates a configuration of SLSID according to another embodiment of the present invention;

FIG. 111 illustrates a configuration of SLSID according to another embodiment of the present invention;

FIG. 112 illustrates a configuration of SLSID according to another embodiment of the present invention;

FIG. 113 illustrates a configuration of a service map table (SMT) according to an embodiment of the present invention;

FIG. 115 illustrates a configuration of USBD according to another embodiment of the present invention;

FIG. 119 is a flowchart illustrating a method for receiving a broadcast signal according to an embodiment of the present invention; and FIG. 120 illustrates a configuration of an apparatus for receiving a broadcast signal according to an embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
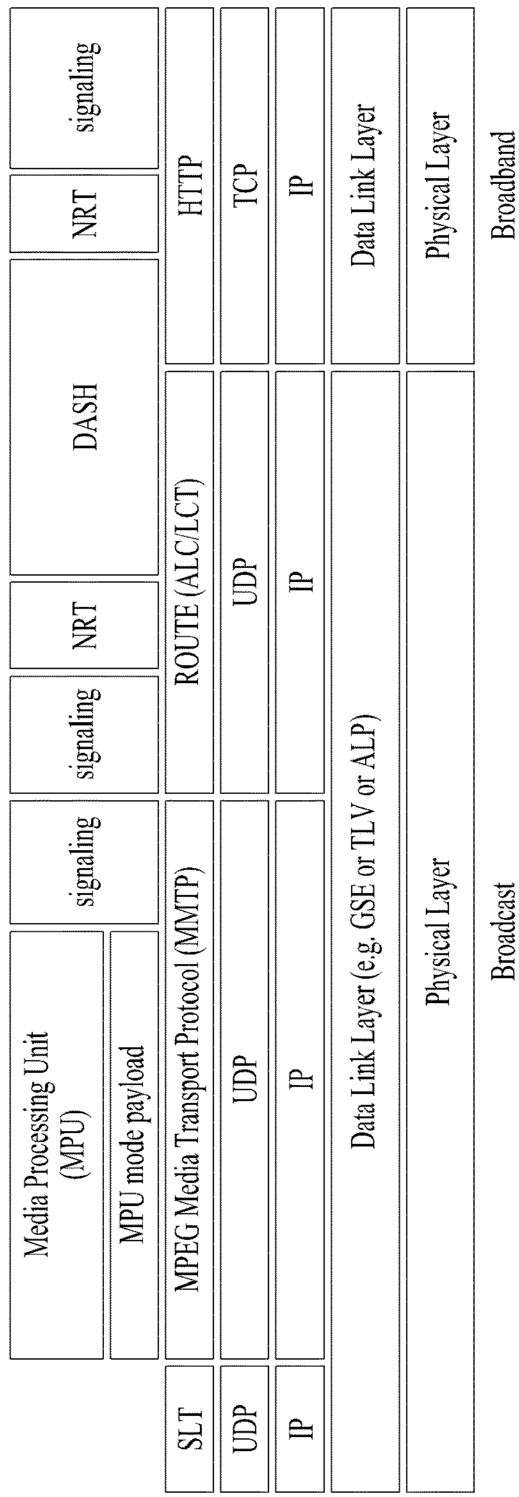
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other flies is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique, to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to “1” (true), that one or more components necessary for meaningful presentation is protected. When set to “0” (false), this flag indicates that no components necessary for meaningful presentation of the service are protected. Default value is false.

@majorChannelNo is an integer number representing the “major” channel number of the service. An example of the field may have a range of 1 to 999.

@minorChannelNo is an integer number representing the “minor” channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be a Boolean value that when present and set to “true” indicates that the service is intended for testing or proprietary use, and is not to be selected by ordinary TV receivers. The default value is “false” when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the sit root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
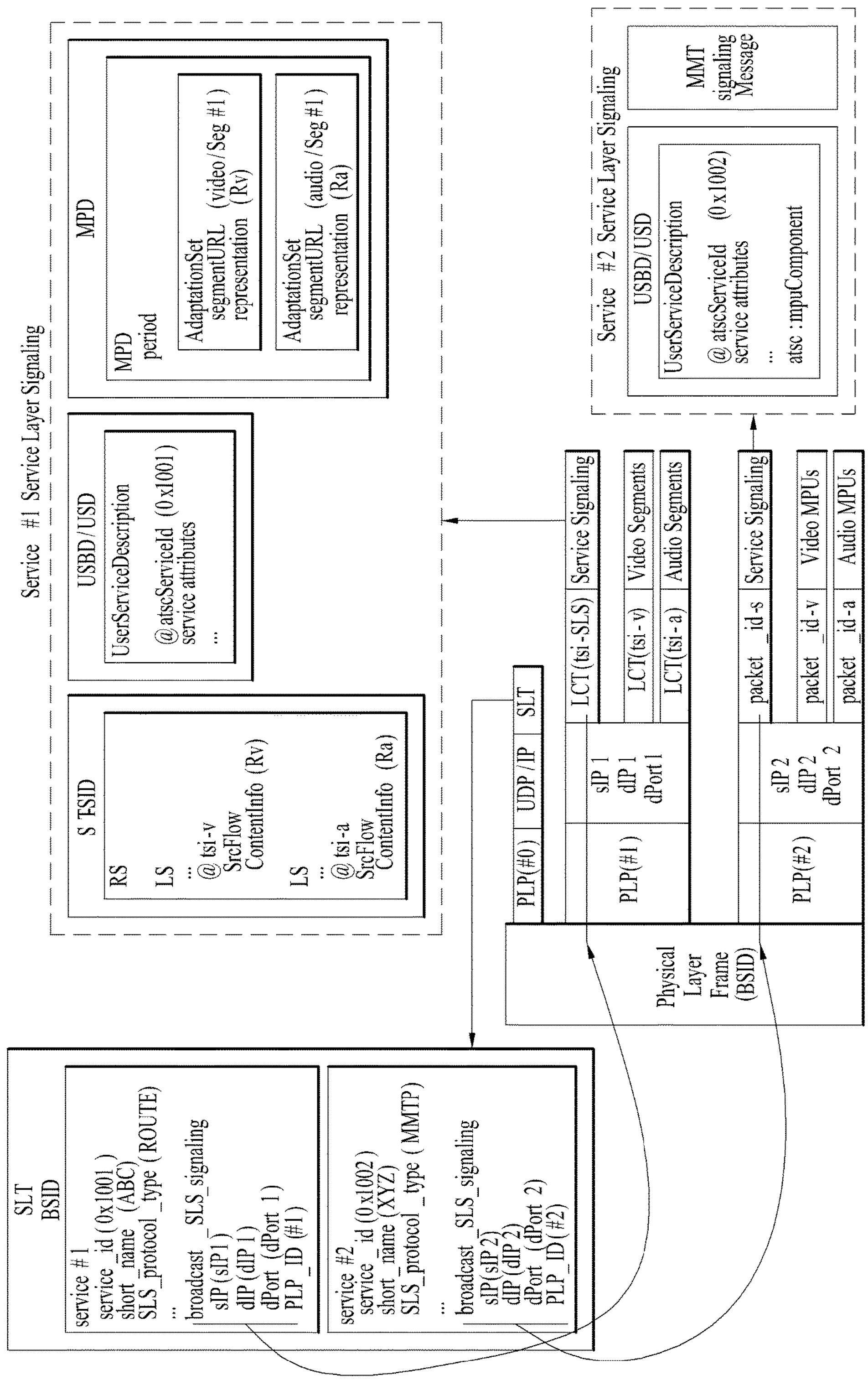
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transmission mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding-service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute, name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transmission mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above, atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc: serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service, (default: current physical layer pipe).

@sTSIDDestinationIpAddress can be a string containing the dotted-IPv4 destination address of the packets carrying S-TSID for this service, (default: current MMTP session's source IP address)

@sTSIDDestinationUdpPort can be a string containing the port number of the packets carrying S-TSID for this service.

@sTSIDSourceIpAddress: can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy, reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
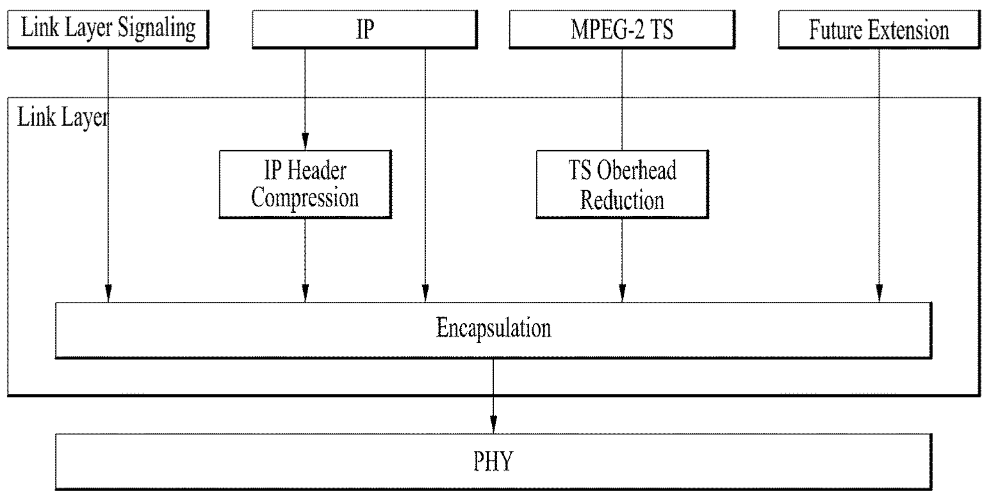
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the pay load of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
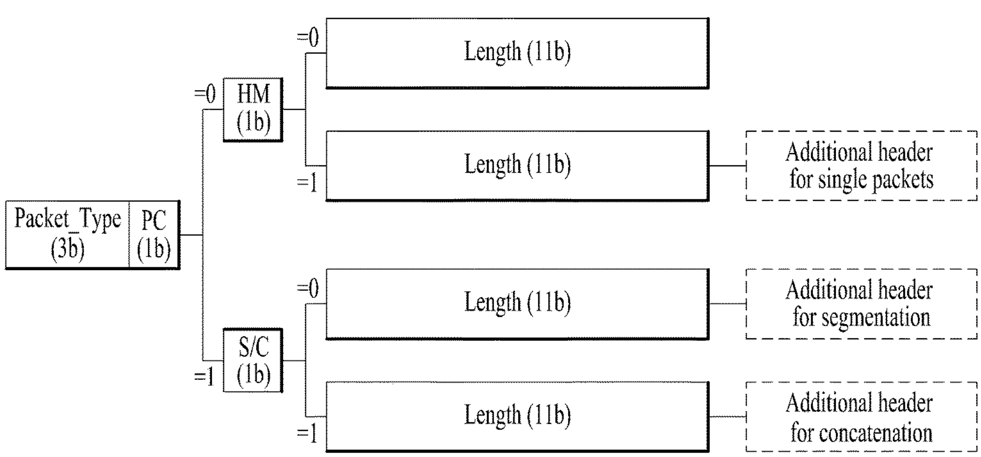
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is “000”, “001” “100” or “111”, that is the original data type of an ALP packet is one of an IPv4 packet, a compressed IP packet, link layer signaling or extension packet. When the MPEG-2 TS packet is encapsulated, the value of Packet_Type can be “010”. Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be an 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with art additional header, a segmented packet and a concatenated packet. According to a given embodiment, more packet configurations may be made through a combination of each additional header, an optional header, an additional header for signaling information to be described below, and an additional header for time extension.

Figure 10:
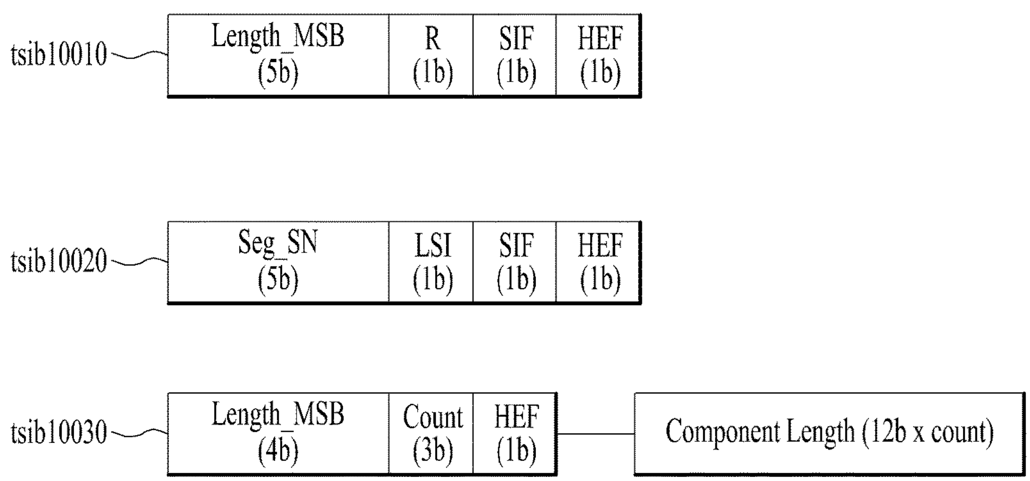
FIG. 10 illustrates a structure of an additional header of a link layer packet according to an embodiment of the present invention.

FIG. 10 illustrates a structure, of an additional header of a link layer packet according to an embodiment of the present invention.

Various types of additional headers may be present. Hereinafter, a description will be given of an additional header for a single packet.

This additional header for single packet can be present when Header_Mode (HM)=“1”. The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)=“0”. Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be an 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header_Extension ( ).

Extension_Length can be an 8-bit field that can indicate the length of the Header Extension ( ) in bytes counting from the next byte to the last byte of the Header_Extension ( ).

Extension_Byte can be a byte representing the value of the Header_Extension ( ).

Figure 11:
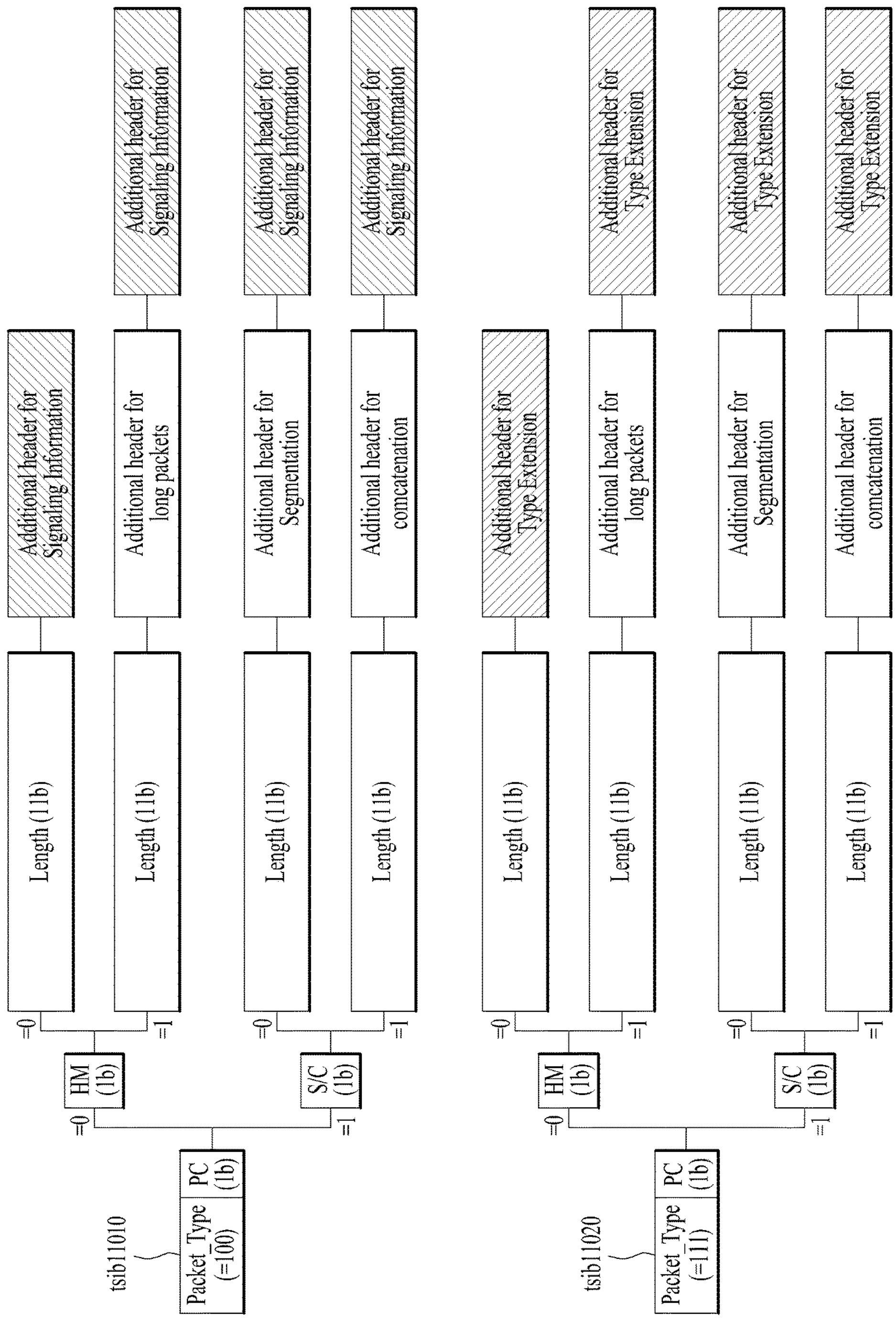
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

Figure 12:
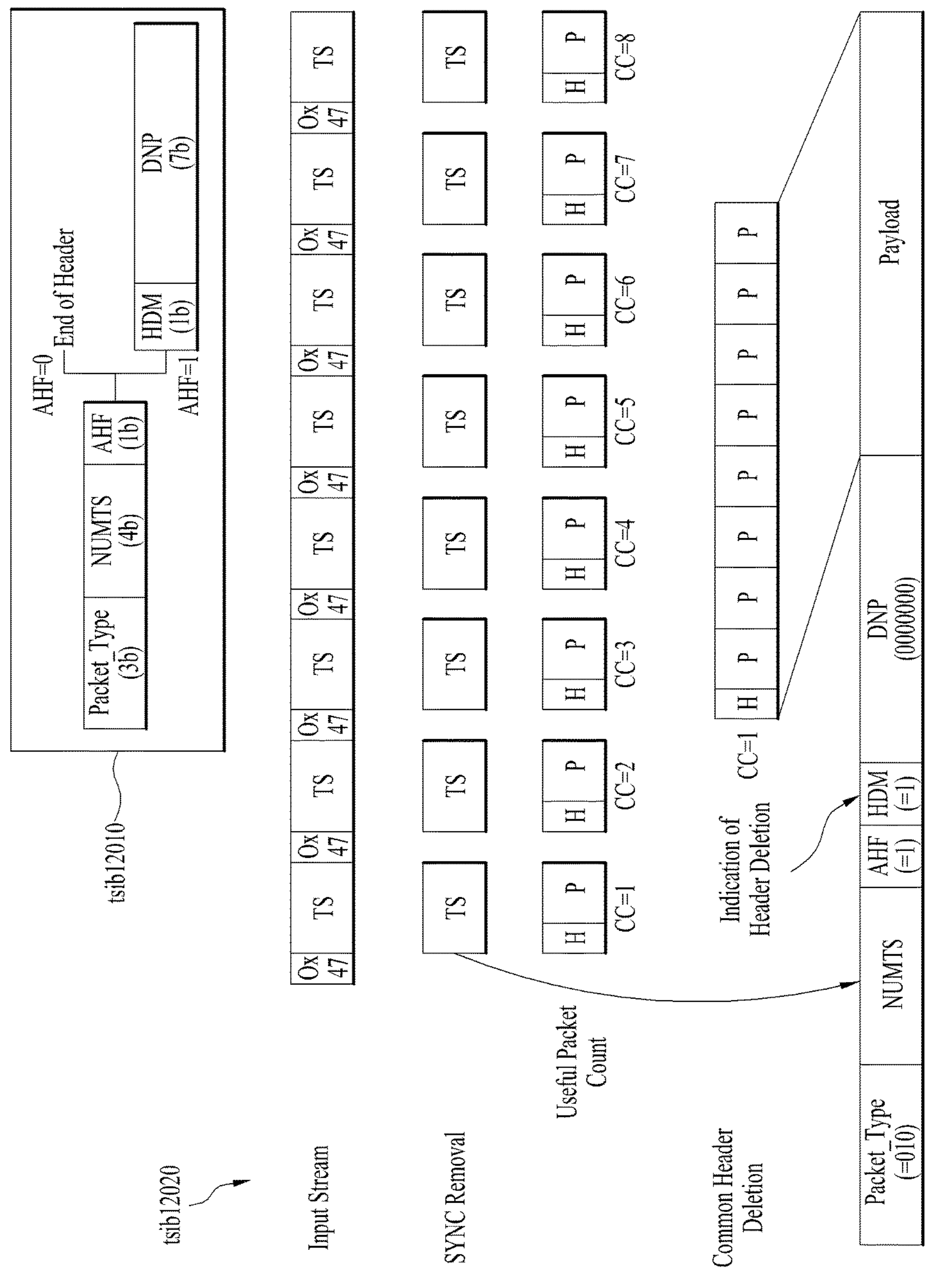
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

Figure 13:
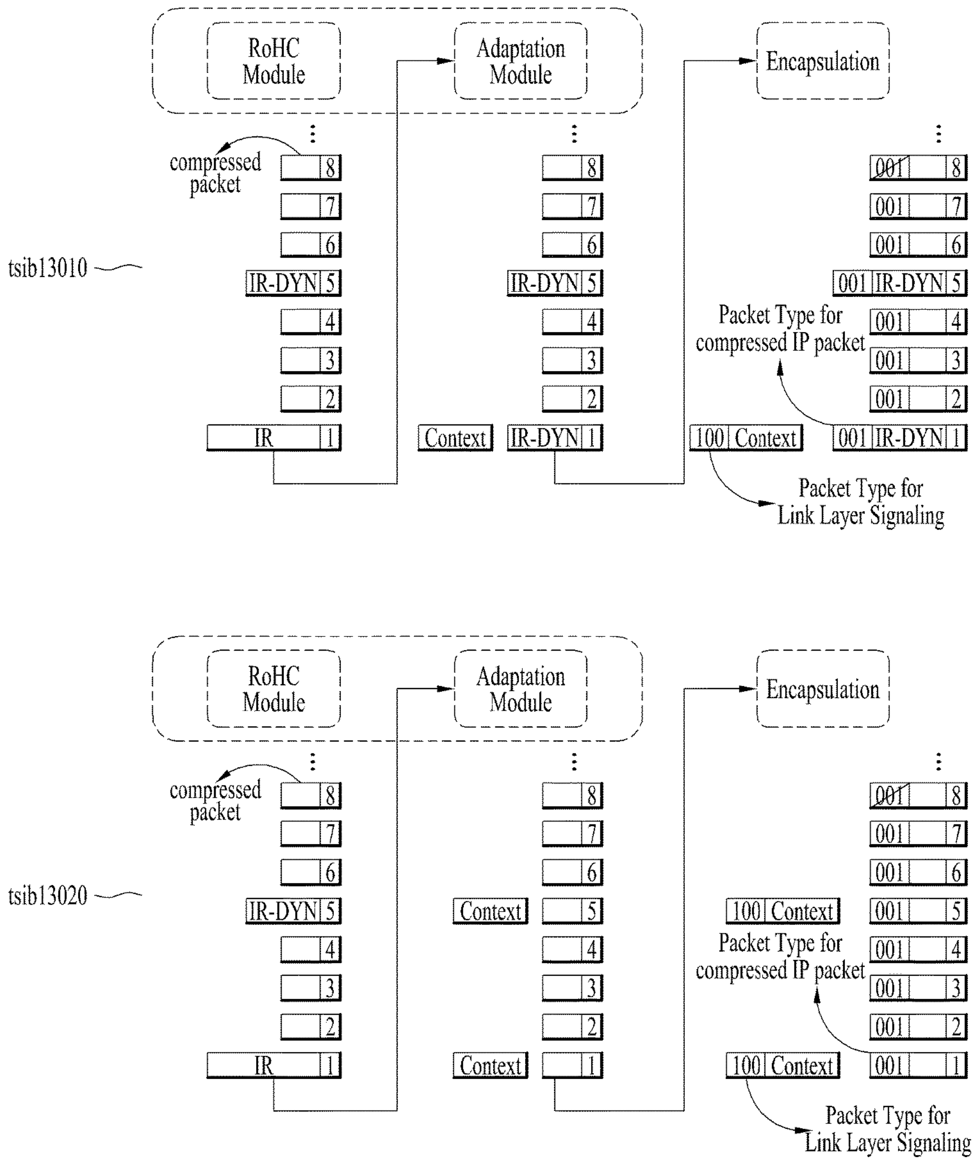
FIG. 13 illustrates an example of adaptation modes in IP header compression according to an embodiment of the present invention (transmitting side)

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirectional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling In Adaptation Mode 2 (tsib13010), the adaptation module can detect the IR packet from ROHC packet flow and extract the context, information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to “100”.

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit-Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to “0x02”.

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to “0x0”. If the static_chain( ) or dynamic_chain( ) byte is included in this table, this field may be set to “0x01” or “0x02” respectively. If both of the static_chain( ) and dynamic_chain( ) byte are included in this table, this field may be set to “0x03”.

context_length can be an 8-bit field that indicates the length of the static chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

Figure 15:
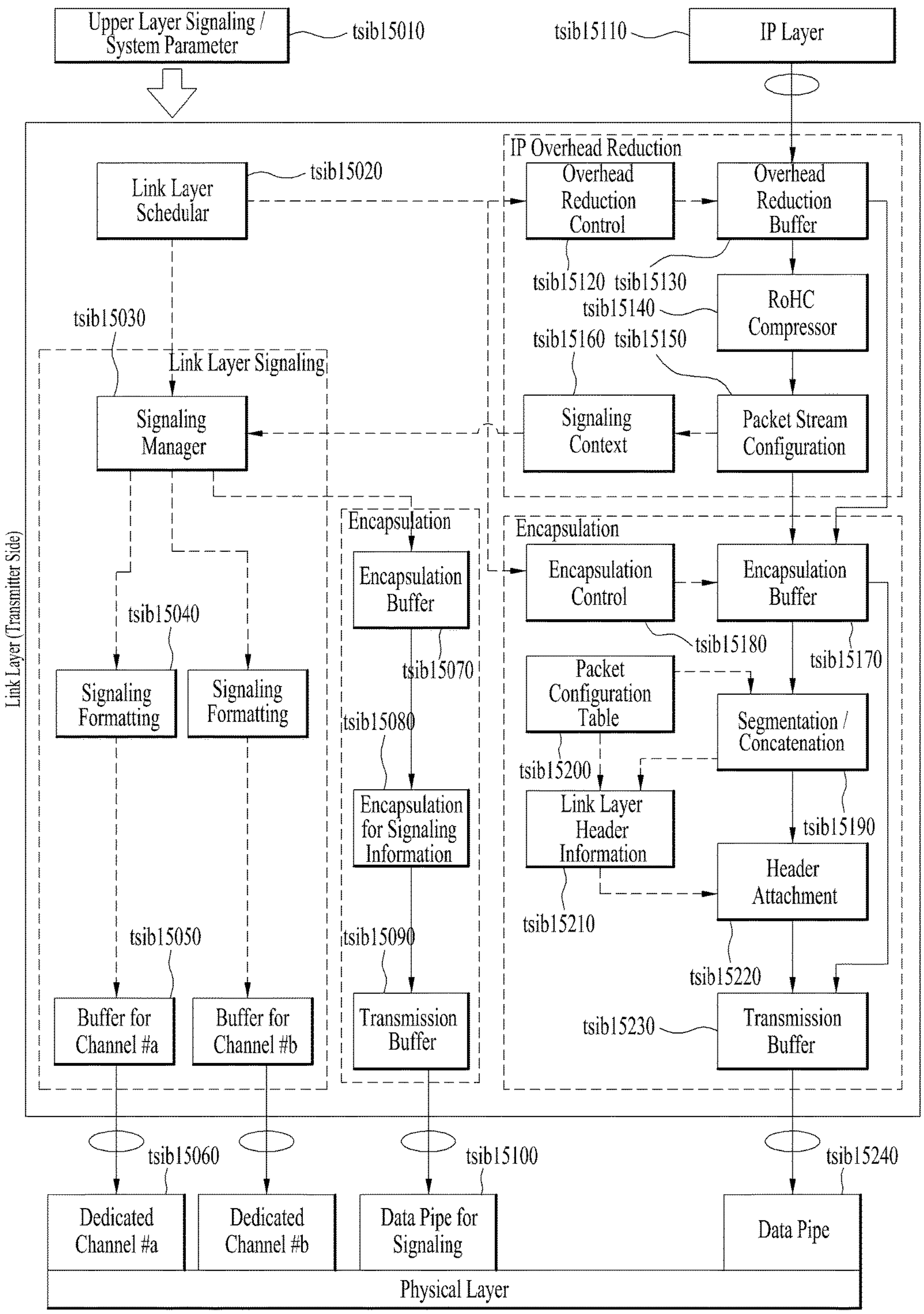
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet pay loads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
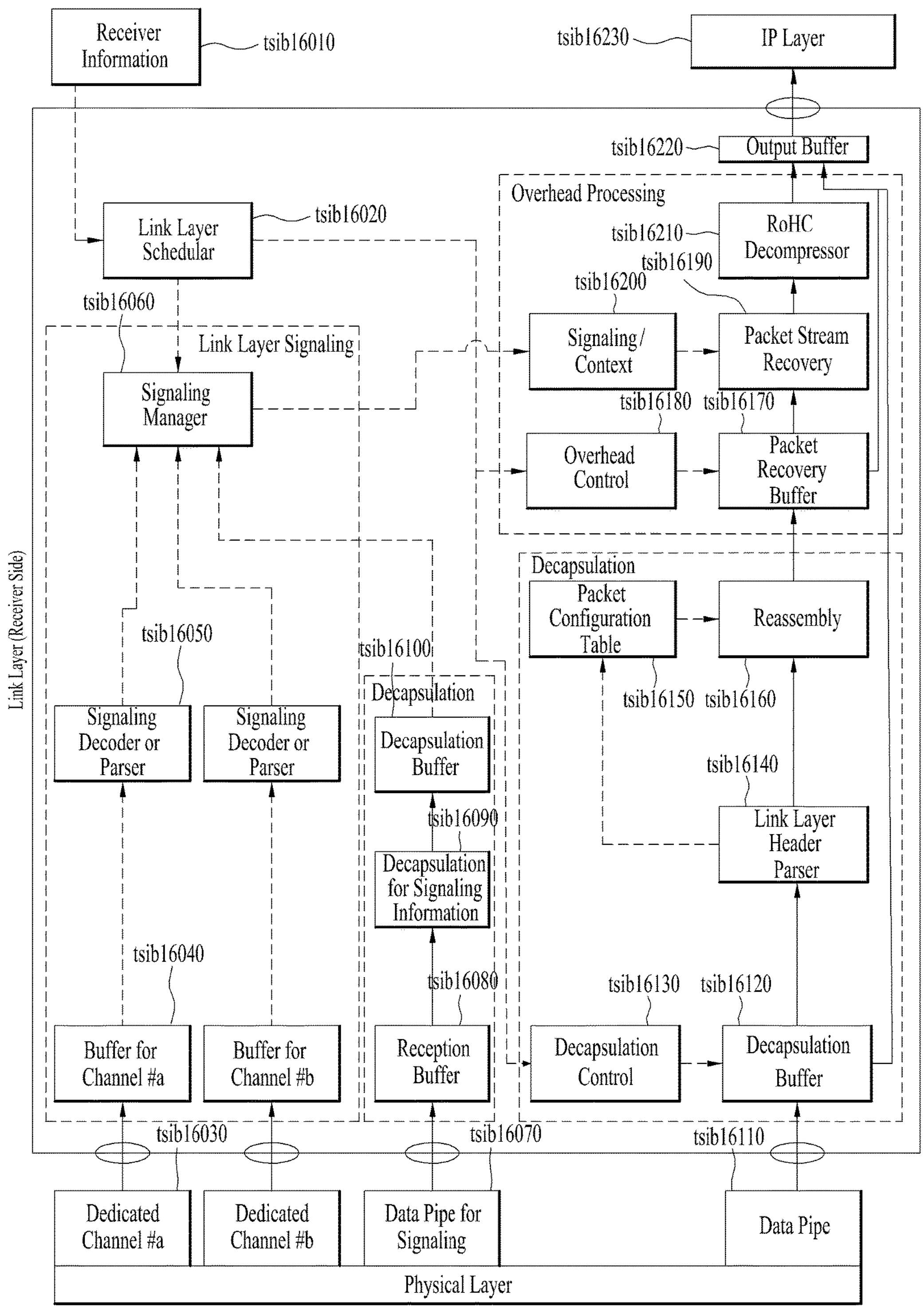
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
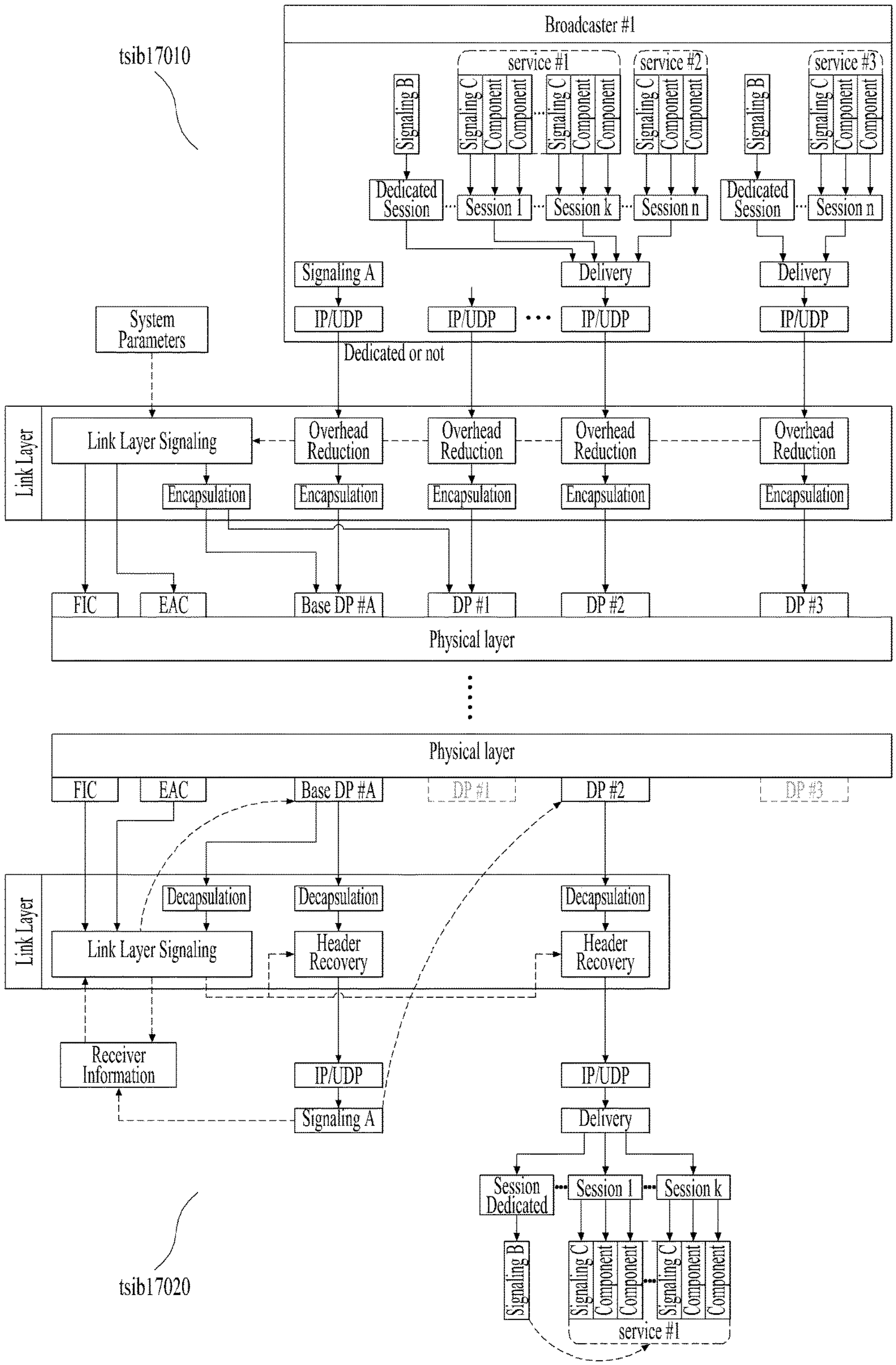
FIG. 17 illustrates a configuration of signaling transmission through a link layer according to an embodiment of the present invention (transmitting/receiving sides)

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators Base data pipe: data pipe that carries service signaling data Baseband frame (or BBFRAME): set of Kbch bits which form the input to one FEC encoding process (BCH and LDPC encoding)

Cell: modulation value that is carried by one carrier of orthogonal frequency division multiplexing (OFDM) transmission Coded block: LDPC-encoded block of PLS1 data or one of the LDPC-encoded blocks of PLS2 data Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol)

DP_ID: this 8-bit field identifies uniquely a DP within the system identified by the SYSTEM_ID Dummy cell: cell carrying a pseudo-random value used to fill the remaining capacity not used for PLS signaling, DPs or auxiliary streams Emergency alert channel (EAC): part of a frame that carries EAS information data Frame: physical layer time slot that starts with a preamble and ends with a frame edge symbol Frame repetition unit: a set of frames belonging to the same or different physical layer profiles including an FEF, which is repeated eight times in a superframe Fast information channel (FIC): a logical channel in a frame that carries mapping information between a service and the corresponding base DP FECBLOCK: set of LDPC-encoded bits of DP data FFT size: nominal FFT size used for a particular mode, equal to the active symbol period Ts expressed in cycles of an elementary period T Frame signaling symbol: OFDM symbol with higher pilot density used at the start of a frame in certain combinations of FFT size, guard interval and scattered pilot pattern, which carries a part of the PLS data Frame edge symbol: OFDM symbol with higher pilot density used at the end of a frame in certain combinations of FFT size, guard interval and scattered pilot pattern Frame group: the set of all frames having the same PHY profile type in a superframe Future extension frame: physical layer time slot within the superframe that may be used for future extension, which starts with a preamble Futurecast UTB system: proposed physical layer broadcast system, the input of which is one or more MPEG2-TS, IP or general stream(s) and the output of which is an RF signal Input stream: a stream of data for an ensemble of services delivered to the end users by the system Normal data symbol: data symbol excluding the frame signaling symbol and the frame edge symbol PHY profile: subset of all configurations that a corresponding receiver should implement PLS: physical layer signaling data including PLS1 and PLS2

PLS1: a first set of PLS data carried in a frame signaling symbol (FSS) having a fixed size, coding and modulation, which carries basic information about a system as well as parameters needed to decode PLS2

NOTE: PLS1 data remains constant for the duration of a frame group

PLS2: a second set of PLS data transmitted in the FSS, which carries more detailed PLS data about the system and the DPs PLS2 dynamic data: PLS2 data that dynamically changes frame-by-frame PLS2 static data: PLS2 data that remains static for the duration of a frame group Preamble signaling data: signaling data carried by the preamble symbol and used to identify the basic mode of the system Preamble symbol: fixed-length pilot symbol that carries basic PLS data and is located at the beginning of a frame The preamble symbol is mainly used for fast initial band scan to detect the system signal, timing thereof, frequency offset, and FFT size.

Reserved for future use: not defined by the present document but may be defined in future Superframe: set of eight frame repetition units Time interleaving block (TI block): set of cells within which time interleaving is carried out, corresponding to one use of a time interleaver memory TI group: unit over which dynamic capacity allocation for a particular DP is carried out, made up of an integer, dynamically varying number of XFECBLOCKs NOTE: The TI group may be mapped directly to one frame or may be mapped to a plurality of frames. The TI group may contain one or more TI blocks.

Figure 18:
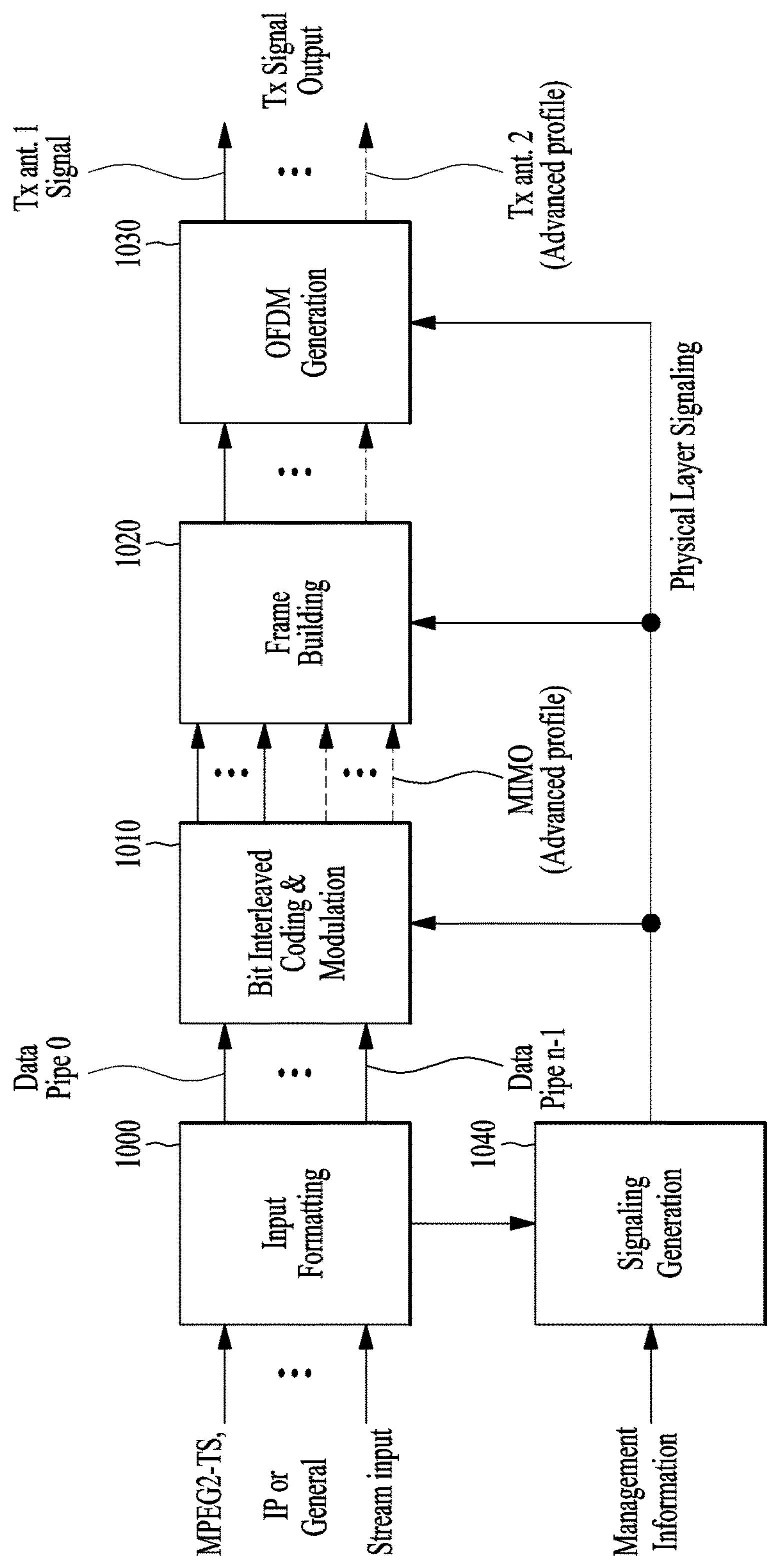
FIG. 18 is a block diagram illustrating a configuration of a broadcast signal transmission apparatus for future broadcast services according to an embodiment of the present invention.

Type 1 DP: DP of a frame where all DPs are mapped to the frame in time division multiplexing (TDM) scheme Type 2 DP: DP of a frame where all DPs are mapped to the frame in frequency division multiplexing (FDM) scheme XFECBLOCK: set of Ncells cells carrying all the bits of one LDPC FECBLOCK FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side. Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

Figure 19:
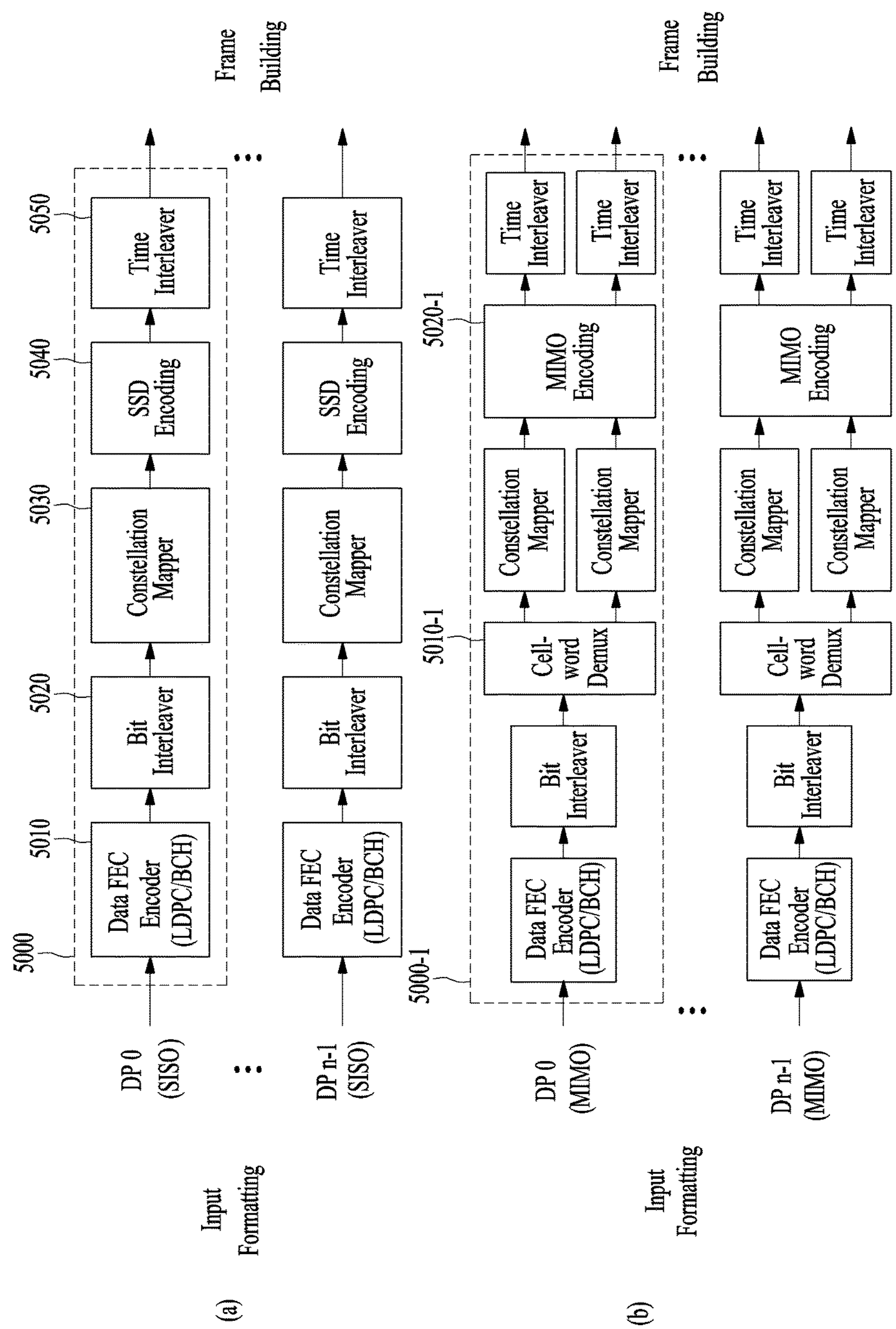
FIG. 19 is a block diagram illustrating a bit interleaved coding & modulation (BICM) block according to an embodiment of the present invention.

FIG. 19 illustrates a BICM block according to an embodiment of the present invention.

The BICM block illustrated in FIG. 19 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

(a) shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, e1. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2 x2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ (e1,i and e2,i) corresponding to a pair of constellation mapper outputs is fed to an input of a MIMO encoder. Paired MIMO encoder output (g1,i and g2,i) is transmitted by the same carrier k and OFDM symbol 1 of respective TX antennas thereof.

The above-described blocks may be omitted or replaced by blocks having similar or identical functions.

Figure 20:
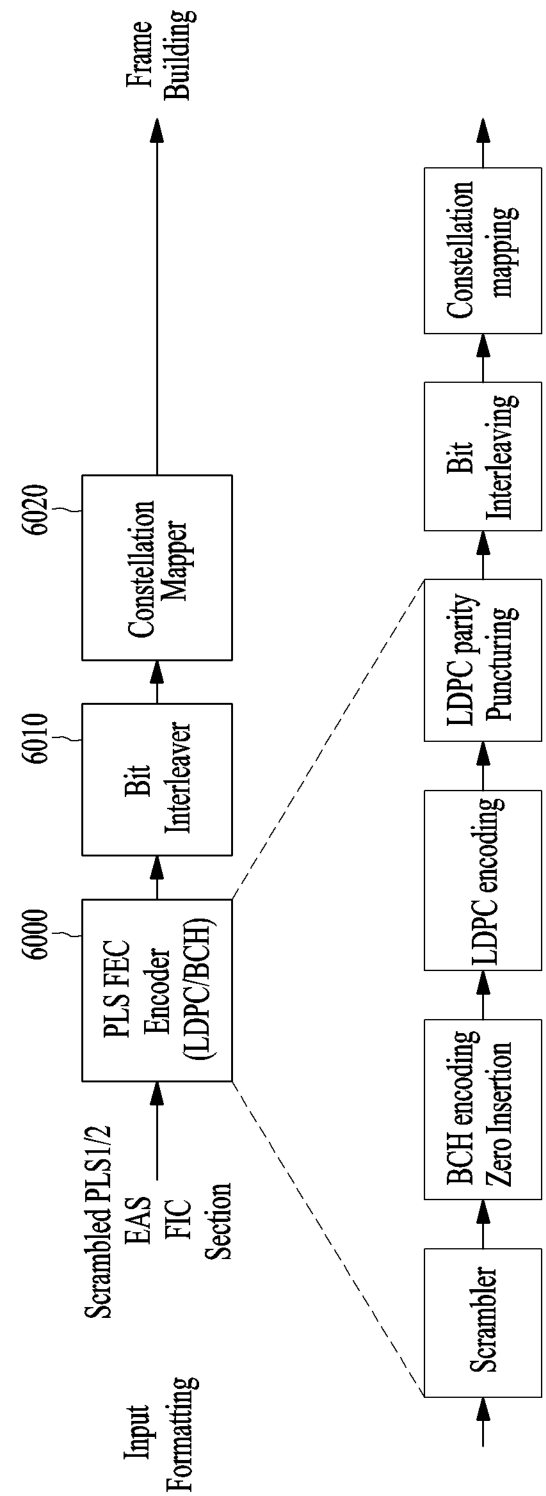
FIG. 20 is a block diagram illustrating a BICM block according to another embodiment of the present invention.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS 1/2 data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS 1/2 data using a shortened BCH code for PLS protection, and insert zero bits after BCH encoding. For PLS1 data only, output bits of zero insertion may be permitted before LDPC encoding.

The LDPC encoding block may encode an output of the BCH encoding/zero insertion block using an LDPC code. To generate a complete coded block. Cldpc and parity bits Pldpc are encoded systematically from each zero-inserted PLS information block Ildpc and appended thereto.

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}] \quad \text{[Equation 1]}$$

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-ineterleaved PLS1 data and PLS2 data to constellations.

The above-described blocks may be omitted or replaced by blocks having similar or identical functions.

Figure 21:
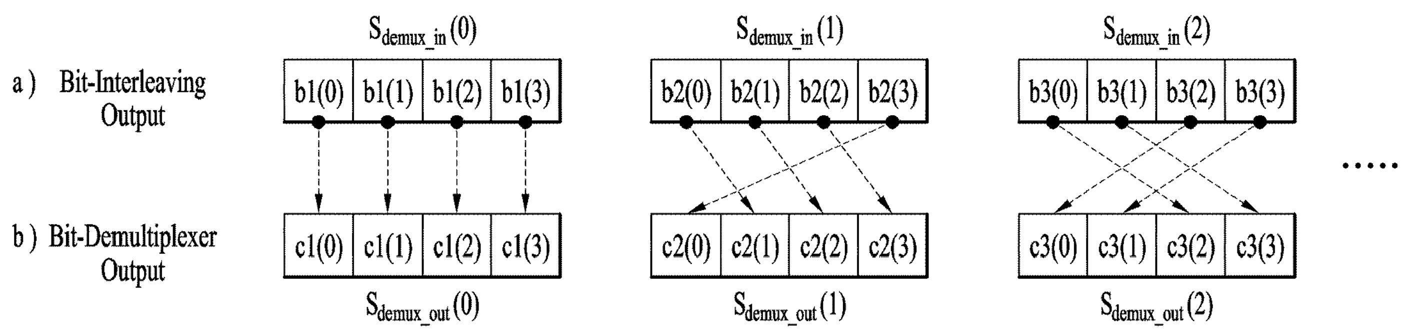
FIG. 21 illustrates a bit interleaving process of physical layer signaling (PLS) according to an embodiment of the present invention.

FIG. 21 illustrates a bit interleaving process of PLS according to an embodiment of the present invention.

Figure 22:
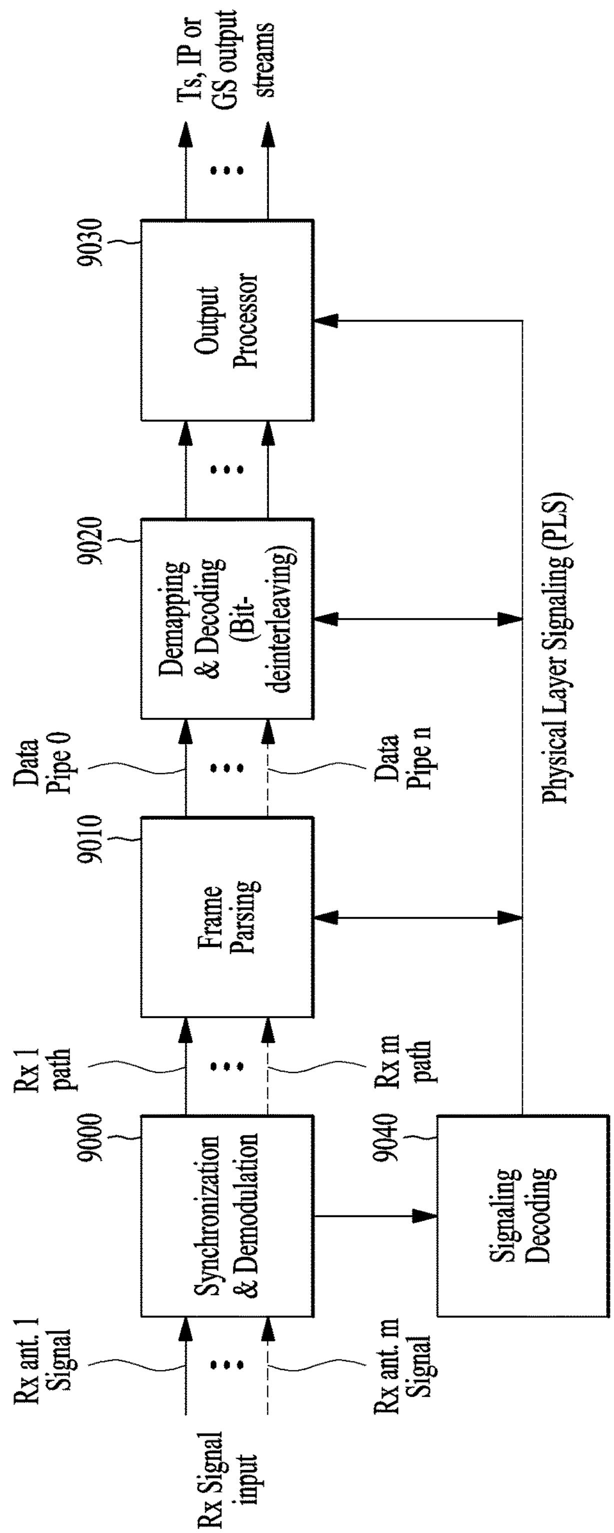
FIG. 22 is a block diagram illustrating a configuration of a broadcast signal reception apparatus for future broadcast services according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo NFEC addition with cyclic shifting value floor(NFEC/2), where NFEC is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column.

Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

Figure 23:
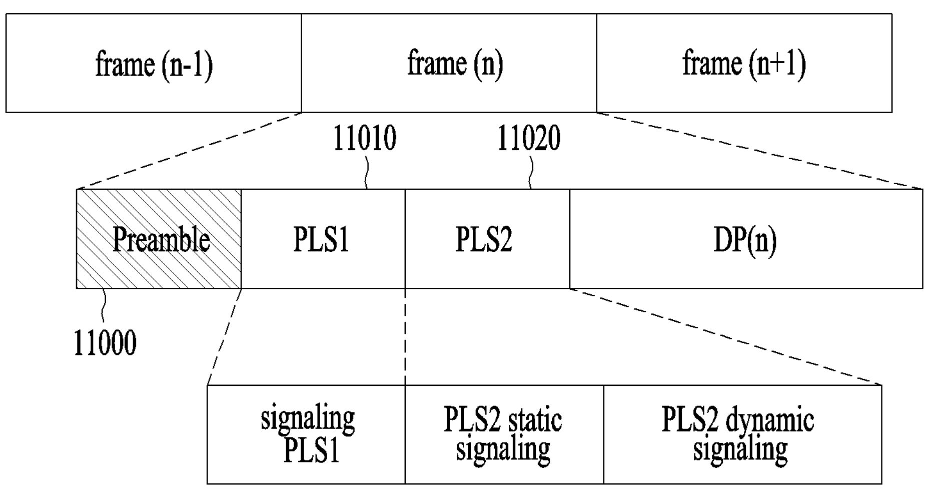
FIG. 23 illustrates a signaling hierarchy structure of a frame according to an embodiment of the present invention.

In the cases of QAM-16 and NUQ-64 mapped to a QAM symbol, the rule of operation is described in FIG. 23(*a*). As shown in FIG. 23(*a*), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast futurecast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
|---|---|
| 00 | 8K FFT |
| 01 | 16K FFT |
| 10 | 32K FFT |
| 11 | Reserved |

GI_FRACTION: This 3-bit field indicates a guard interval fraction value in a current superframe as described in the following Table 2.

TABLE 2

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110 to 111 | Reserved |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '2', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC_FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type |
|---|---|
| 1XX | TS is transmitted. |
| X1X | IP stream is transmitted. |
| XX1 | GS is transmitted. |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicates major version information. A change in the major version field indicates a non-backward-compatible change. A default value is '0000'. For a version described in this standard, a value is set to '0000'.

Minor version: The LSB corresponding to four bits of SYSTEM_VERSION field indicates minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK_ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an (i+1)th (i is a loop index) frame of an associated FRU. This field uses the same signaling format as shown in Table 8.

FRU_FRAME_LENGTH: This 2-bit field indicates a length of an (i+1)th frame of an associated FRU. Using FRU_FRAME_LENGTH together with FRU_GI_FRACTION, an exact value of a frame duration may be obtained.

FRU_GI_FRACTION: This 3-bit field indicates a guard interval fraction value of an (i+1)th frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content | PLS2 FEC type |
|---|---|
| 00 | 4K-1/4 and 7K-3/10 LDPC codes |
| 01 to 11 | Reserved |

PLS2_MOD: This 3-bit field indicates a modulation type used by PLS2. The modulation type is signaled according to Table 5.

TABLE 5

| Value | PLS2_MODE |
|---|---|
| 000 | BPSK |
| 001 | QPSK |
| 010 | QAM-16 |
| 011 | NUQ-64 |
| 100 to 111 | Reserved |

PLS2_SIZE_CELL: This 15-bit field indicates Ctotal_partial_block, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is Constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2_REP_SIZE_CELL: This 15-bit field indicates Ctotal_partial_block, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates Ctotal_full_block, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2__NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP_MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
|---|---|
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field.

PLS2_NEXT_AP_SIZE_CELL: This 15-bit field indicates a size (specified as the number of QAM cells) of additional parity bits of PLS in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of a current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM_DP+1.

DP_ID: This 6-bit field identifies uniquely a DP within a PHY profile.

DP_TYPE; This 3-bit field indicates a type of a DP. This is signaled according to the following Table 7.

TABLE 7

| Value | DP Type |
|---|---|
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP. The FEC type is signaled according to the following Table 8.

TABLE 8

| Value | FEC_TYPE |
|---|---|
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY_PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
|---|---|
| 000 | FR-SM |
| 001 | FRFD-SM |
| 010 to 111 | Reserved |

DP_TI_TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP_TI_TYPE field as follows.

If DP_TI_TYPE is set to a value of '1', this field indicates PI, the number of frames to which each TI group is mapped, and one TI block is present per TI group (NTI=1). Allowed values of PI with the 2-bit field are defined in Table 12 below.

If DP_TI_TYPE is set to a value of '0', this field indicates the number of TI blocks NTI per TI group, and one TI group is present per frame (PI=1). Allowed values of PI with the 2-bit field are defined in the following Table 12.

TABLE 12

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates a frame interval ($I_{JUMP}$) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames. For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31.

DP__NUM_BLOCK_MAX: This 10-bit field indicates a maximum value of DP_NUM_B LOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
|---|---|
| 00 | TS |
| 01 | IP |
| 10 | GS |
| 11 | Reserved |

DP_INBAND_MODE: This 2-bit field indicates whether a current DP carries in-band signaling information. An in-band signaling type is signaled according to the following Table 14.

TABLE 14

| Value | In-band mode |
|---|---|
| 00 | In-band signaling is not carried. |
| 01 | INBAND-PLS is carried |
| 10 | INBAND-ISSY is carried |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAYLOAD_TYPE is TS | If DP_PAYLOAD_TYPE is IP | If DP_PAYLOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not TS ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'), ISSY_MODE is signaled according to Table 18 below. If DP_PAYLOAD_TYPE is not TS ('00'), ISSY_MODE is set to the value of '00'.

TABLE 18

| Value | ISSY mode |
|---|---|
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following fields appear only if FIC_FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

Figures 26, 27:
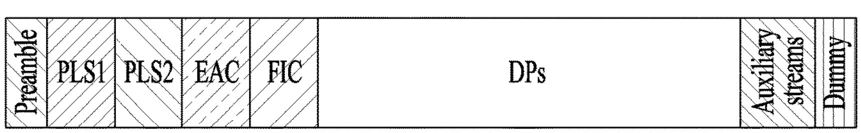
FIG. 26 is a table illustrating PLS2 data according to another embodiment of the present invention.
FIG. 27 illustrates a logical structure of a frame according to an embodiment of the present invention.

FIG. 26 illustrates PLS2 data according to another embodiment of the present invention.

FIG. 26 illustrates PLS2-DYN data of the PLS2 data. Values of the PLS2-DYN data may change during the duration of one frame group while sizes of fields remain constant.

Details of fields of the PLS2-DYN data are as below.

FRAME_INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next superframe.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| | DP_START field size | |
|---|---|---|
| PHY profile | 64K | 16K |
| Base | 13 bits | 15 bits |
| Handheld | — | 13 bits |
| Advanced | 13 bits | 15 its |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame. This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE.

If the EAC_FLAG field is equal to '0', the following 12 bits are allocated to EAC_COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for future use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

Figure 28:
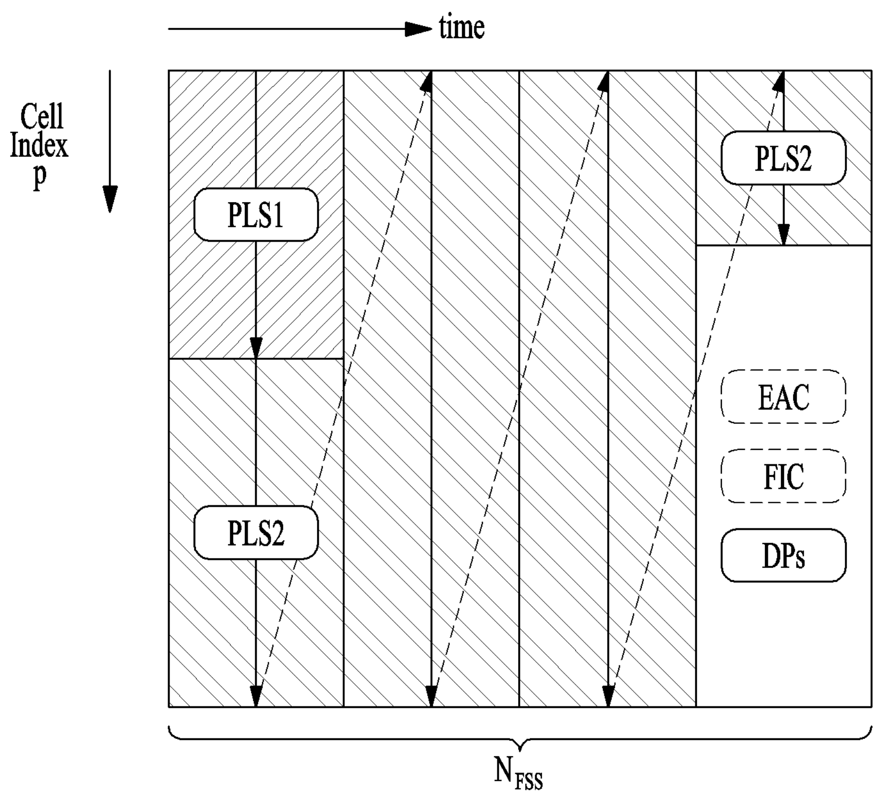
FIG. 28 illustrates PLS mapping according to an embodiment of the present invention.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF (Kbch bits), and then LDPC encoding is applied to BCH-encoded BBF (Kldpc bits=Nbch bits).

A value of Nldpc is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 23

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |

TABLE 23-continued

| LDPC rate | $N_{ldpc}$ | $K_{ldpc}$ | $K_{bch}$ | BCH error correction capability | $N_{bch}-K_{bch}$ |
|---|---|---|---|---|---|
| 11/15 | | 11880 | 11712 | | |
| 12/15 | | 12960 | 12792 | | |
| 13/15 | | 14040 | 13872 | | |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed Bldpc (FECBLOCK), Pldpc (parity bits) is encoded systematically from each Ildpc (BCH—encoded BBF), and appended to Ildpc. The completed Bldpc (FECBLOCK) is expressed by the following Equation.

$$B_{ldpc}=[I_{ldpc}P_{ldpc}]=[i_0,i_1,\ \ldots\ ,i_{K_{ldpc}-1},p_0,p_1,\ \ldots\ ,p_{N_{ldpc}-K_{ldpc}-1}] \quad \text{[Equation 2]}$$

Parameters for the long FECBLOCK and the short FECBLOCK are given in the above Tables 22 and 23, respectively.

A detailed procedure to calculate Nldpc−Kldpc parity bits for the long FECBLOCK, is as follows.

1) Initialize the parity bits $$p_0=p_1=p_2=\ \ldots\ p_{N_{ldpc}-K_{ldpc}-1}=0$$

2) Accumulate a first information bit—i0, at a parity bit address specified in a first row of addresses of a parity check matrix. Details of the addresses of the parity check matrix will be described later. For example, for the rate of 13/15.

$$p_{983}=p_{983}\oplus i_0\ p_{2815}=p_{2815}\oplus i_0$$

$$p_{4837}=p_{4837}\oplus i_0\ p_{4989}=p_{4989}\oplus i_0$$

$$p_{6138}=p_{6138}\oplus i_0\ p_{6458}=p_{6458}\oplus i_0$$

$$p_{6921}=p_{6921}\oplus i_0\ p_{6974}=p_{6974}\oplus i_0$$

$$p_{7572}=p_{7572}\oplus i_0\ p_{8260}=p_{8260}\oplus i_0$$

$$p_{8496}=p_{8496}\oplus i_0 \quad \text{[Equation 4]}$$

3) For the next 359 information bits, is, s=1, 2, . . . , 359, accumulate is at parity bit addresses using following Equation.

$$\{x+(s \bmod 360)\times Q_{ldpc}\} \bmod (N_{ldpc}-K_{ldpc}) \quad \text{[Equation 5]}$$

Here, x denotes an address of a parity bit accumulator corresponding to a first bit i0, and Qldpc is a code rate dependent constant specified in the addresses of the parity check matrix. Continuing with the example, Qldpc=24 for the rate of 13/15, so for an information bit i1, the following operations are performed.

$$p_{1007}=p_{1007}\oplus i_1\ p_{2839}=p_{2839}\oplus i_1$$

$$p_{4861}=p_{4861}\oplus i_1\ p_{5013}=p_{5013}\oplus i_1$$

$$p_{6162}=p_{6162}\oplus i_1\ p_{6482}=p_{6482}\oplus i_1$$

$$p_{6945}=p_{6945}\oplus i_1\ p_{6998}=p_{6998}\oplus i_1$$

$$p_{7596}=p_{7596}\oplus i_1\ p_{8284}=p_{8284}\oplus i_1$$

$$p_{8520}=p_{8520}\oplus i_1 \quad \text{[Equation 6]}$$

4) For a 361th information bit i360, an address of the parity bit accumulator is given in a second row of the addresses of the parity check matrix. In a similar manner, addresses of the parity bit accumulator for the following 359 information bits is, s=361, 362, . . . , 719 are obtained using Equation 6, where x denotes an address of the parity bit accumulator corresponding to the information bit i360, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$$p_1=p_1\oplus p_{i-1},i=1,2,\ \ldots\ ,N_{ldpc}-K_{ldpc}-1 \quad \text{[Equation 7]}$$

Here, final content of pi (i=0, 1, . . . , $N_{ldpc}=K_{ldpc}-1$) is equal to a parity bit pi.

TABLE 24

| Code rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for the short FECBLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 29:
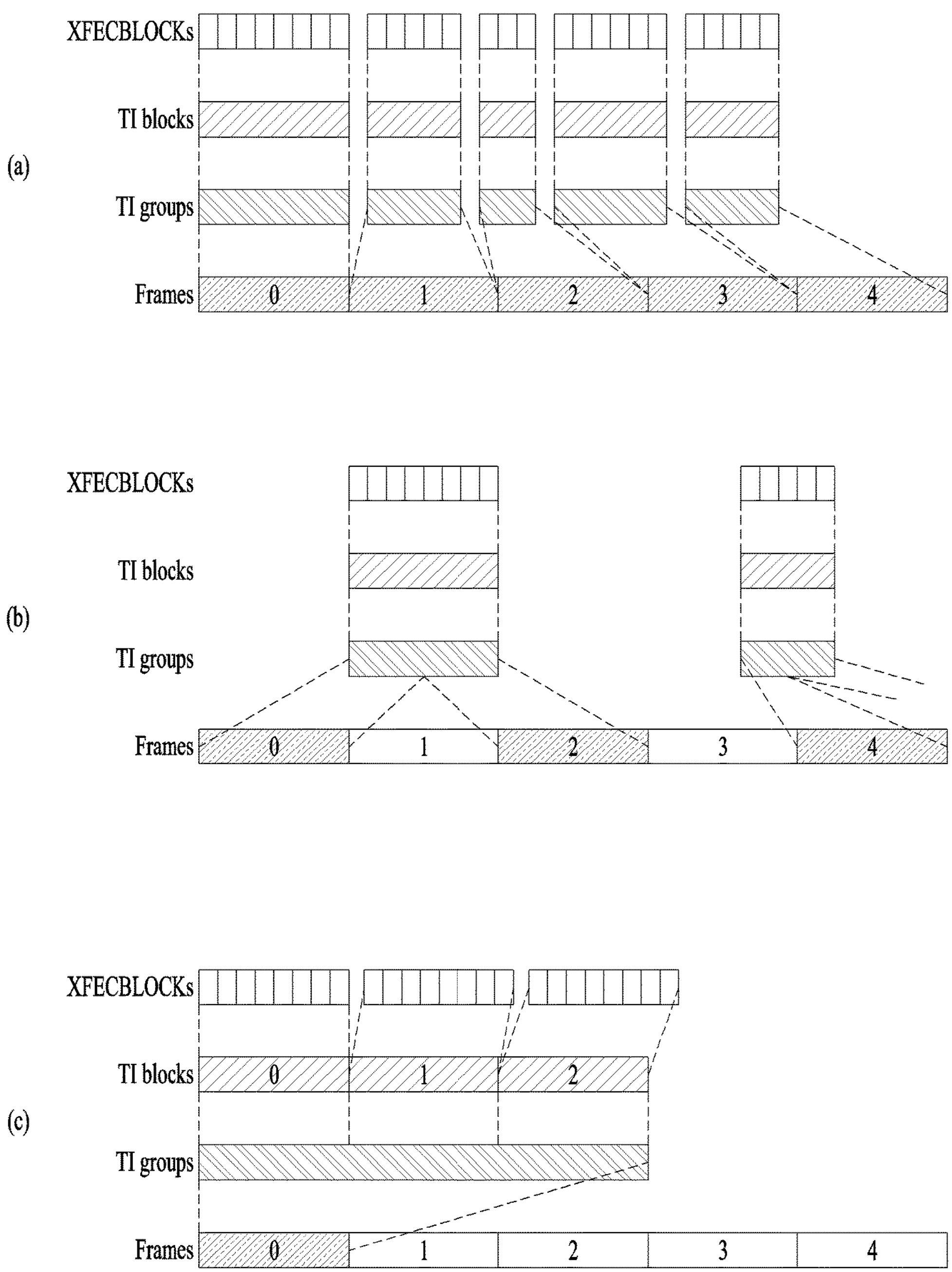
FIG. 29 illustrates time interleaving according to an embodiment of the present invention.

FIG. 29 illustrates time interleaving according to an embodiment of the present invention.

(a) to (c) show examples of a TI mode.

A time interleaver operates at the DP level. Parameters of time interleaving (TI) may be set differently for each DP.

The following parameters, which appear in part of the PLS2-STAT data, configure the TI.

DP_TI_TYPE (allowed values: 0 or 1): This parameter represents the TI mode. The value of '0' indicates a mode with multiple TI blocks (more than one TI block) per TI group. In this case, one TI group is directly mapped to one frame (no inters frame interleaving). The value of '1', indicates a mode with only one TI block per TI group. In this case, the TI block may be spread over more than one frame (inter-frame interleaving).

DP_TI_LENGTH: If DP TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): This parameter represents the maximum number of XFECBLOCKs per TI group.

DP_FRAME_INTERVAL (allowed values: 1, 2, 4, and 8): This parameter represents the number of the frames IJUMP between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups. That is, each TI group is a set of an integer number of XFECBLOCKs and contains a dynamically variable number of XFECBLOCKs. The number of XFECBLOCKs in the TI group of index n is denoted by NxBLOCK_Group(n) and is signaled as DP_NUM_BLOCK in the PLS2-DYN data. Note that NxBLOCK_Group(n) may vary from a minimum value of 0 to a maximum value of NxBLOCK_Group_MAX (corresponding to DP_NUM_BLOCK_MAX), the largest value of which is 1023.

Each TI group is either mapped directly to one frame or spread over PI frames. Each TI group is also divided into more than one TI block (NTI), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

TABLE 26

| Modes | Descriptions |
|---|---|
| Option 1 | Each TI group contains one TI block and is mapped directly to one frame as shown in (a). This option is signaled in PLS2-STAT by DP__TI__TYPE = '0' and DP__TI__LENGTH = '1' ($N_{TI}$ = 1). |
| Option 2 | Each TI group contains one TI block and is mapped to more than one frame. (b) shows an example, where one TI group is mapped to two frames, i.e., DP__TI__LENGTH = '2' ($P_I$ = 2) and DP__FRAME__INTERVAL ($I_{JUMP}$ = 2). This provides greater time diversity for low data-rate services. This option is signaled in PLS2-STAT by DP__TI__TYPE = '1'. |
| Option 3 | Each TI group is divided into multiple TI blocks and is mapped directly to one frame as shown in (c). Each TI block may use a full TI memory so as to provide a maximum bit-rate for a DP. This option is signaled in PLS2-STAT by DP__TI__TYPE = '0' and DP__TI__LENGTH = $N_{TI}$, while $P_I$ = 1. |

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an sth TI block of an nth TI group, the number of rows Nr of a TI memory is equal to the number of cells Ncells, i.e., Nr=Ncells while the number of columns Nc is equal to the number NxBLOCK_TI(n,s).

Figure 30:
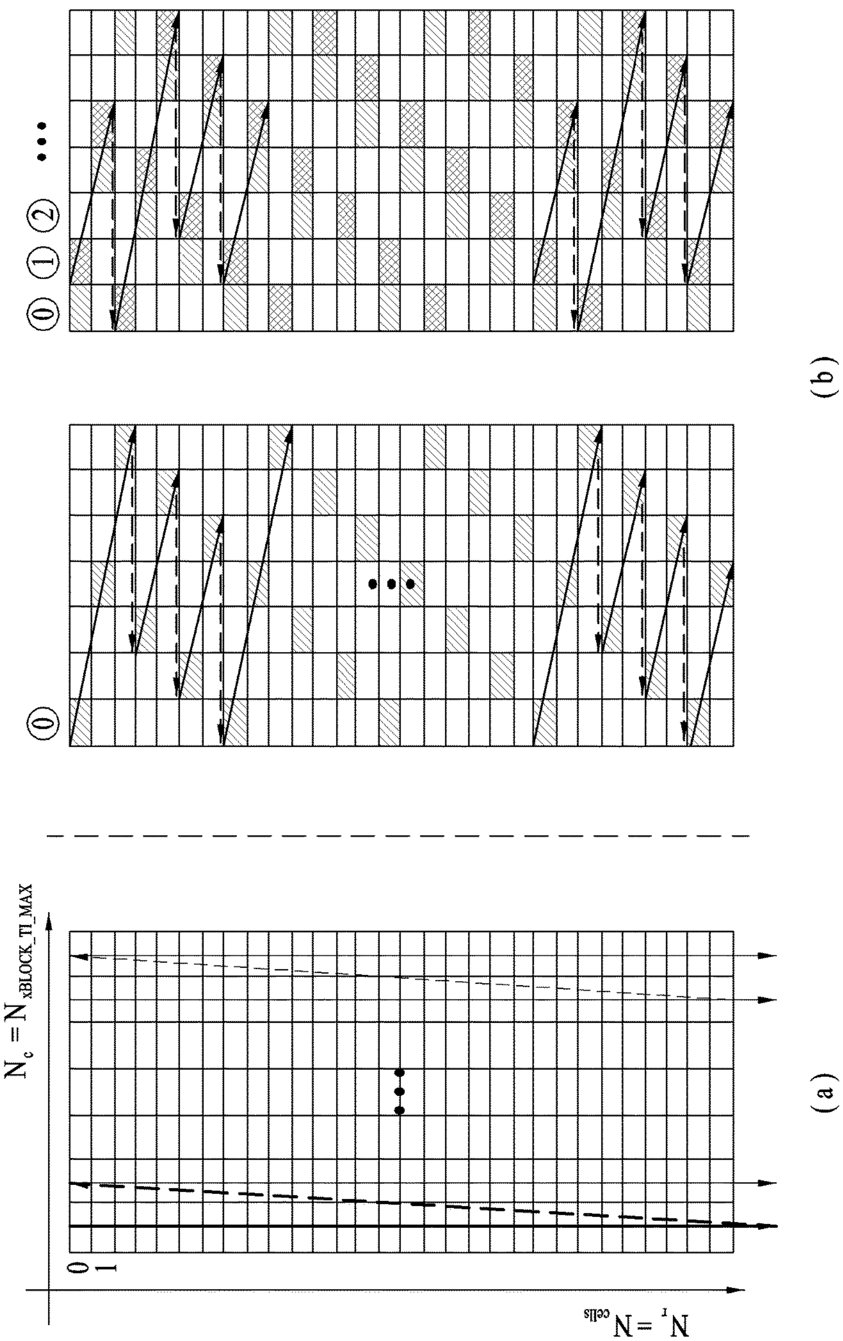
FIG. 30 illustrates a basic operation of a twisted row-column block interleaver according to an embodiment of the present invention.

FIG. 30 illustrates a basic operation of a twisted row-column block interleaver according to an embodiment of the present invention.

FIG. 30(*a*) shows a write operation in the time interleaver and FIG. 30(*b*) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, Nr cells are read out as shown in (b). In detail, assuming $z_{n,s,t}$($i=0, \ldots, N_rN_c$) as a TI memory cell position to be read sequentially, a reading process in such an interleaving array is performed by calculating a row index $R_{n,s,t}$, a column index $C_{n,s,t}$, and an associated twisting parameter $T_{n,s,t}$ as in the following Equation.

[Equation 8]

$$\begin{aligned} &\text{GENERATE}(R_{n,s,i}, C_{n,s,i}) = \\ &\{ \\ &R_{n,s,i} = \text{mod}(i, N_r), \\ &T_{n,s,i} = \text{mod}(S_{shift} \times R_{n,s,i}, N_c), \\ &C_{n,s,i} = \text{mod}\left(T_{n,s,i} + \left\lfloor \frac{i}{N_r} \right\rfloor, N_c\right) \\ &\} \end{aligned}$$

Here, $S_{shift}$ is a common shift value for a diagonal-wise reading process regardless of $N_{xBLOCK\_TI}$(n,s), and the shift value is determined by $N_{xBLOCK\_TI\_MAX}$ given in PLS2-STAT as in the following Equation.

[Equation 9]

for $$\begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases},$$

$$S_{shift} = \frac{N'_{xBLOCK\_TI\_MAX} - 1}{2}$$

As a result, cell positions to be read are calculated by coordinates $z_{n,s,t}=N_rC_{n,s,t}+R_{n,s,t}$.

Figure 31:
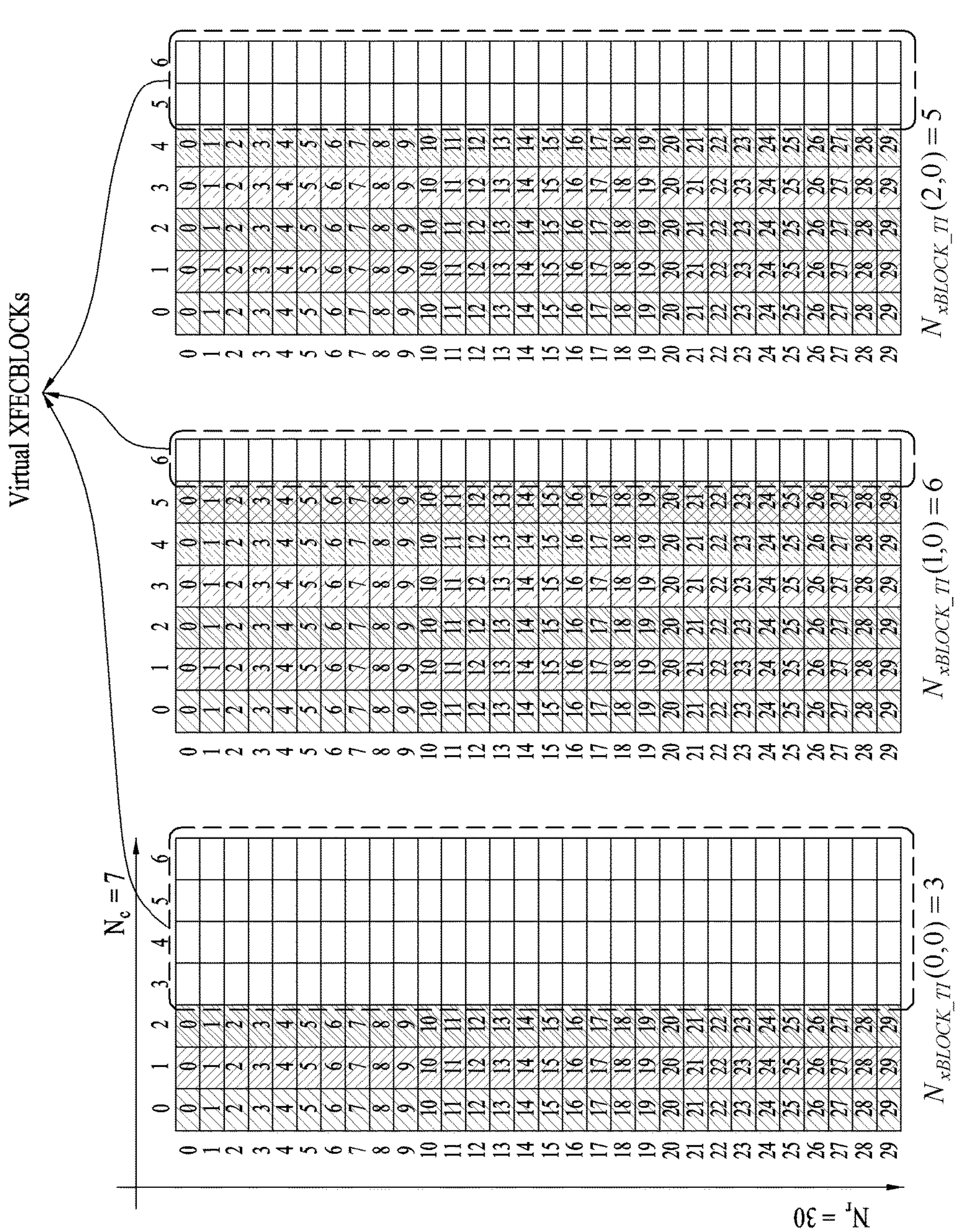
FIG. 31 illustrates an operation of a twisted row-column block interleaver according to another embodiment of the present invention.

FIG. 31 illustrates an operation of a twisted row-column block interleaver according to another embodiment of the present invention.

More specifically, FIG. 31 illustrates an interleaving array in a TI memory for each TI group, including virtual XFECBLOCKs when $N_{xBLOCKTI}(0,0)=3$, $N_{xBLOCK\_TI}(1,0)=6$, and $N_{xBLOCK\_TI}(2,0)=5$.

A variable number $N_{xBLOCK\_TI}(n,s)=N_r$ may be less than or equal to $N_{xBLOCK\_TI\_MAX}$. Thus, in order to achieve single-memory deinterleaving at a receiver side regardless of $N_{xBLOCK\_TI}$(n,s), the interleaving array for use in the twisted row-column block interleaver is set to a size of $N_r \times N_c = N_{cells} \times N_{xBLOCK\_TI\_MAX}$ by inserting the virtual XFECBLOCKs into the TI memory and a reading process is accomplished as in the following Equation.

[Equation 10]

$$
\begin{aligned}
&p = 0;\\
&\text{for } i = 0;\ i < N_{cells} N'_{xBLOCK\_TI\_MAX};\ i = i + 1\\
&\{\text{GENERATE}(R_{n,s,i},\ C_{n,s,i});\\
&V_i = N_r C_{n,s,i} + R_{n,s,i}\\
&\text{if } V_i < N_{cells} N_{xBLOCK\_TI}(n, s)\\
&\{\\
&Z_{n,s,p} = V_i;\ p = p + 1;\\
&\}\\
&\}
\end{aligned}
$$

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. A maximum number of XFECBLOCKs is signaled in the PLS2-STAT data by NxBLOCK_Group_MAX, which leads to $$\lfloor N_{xBLOCK\_Group\_MAX}/N_{TI} \rfloor = N_{xBLOCK\_TI\_MAX} = 6.$$

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

Figure 32:
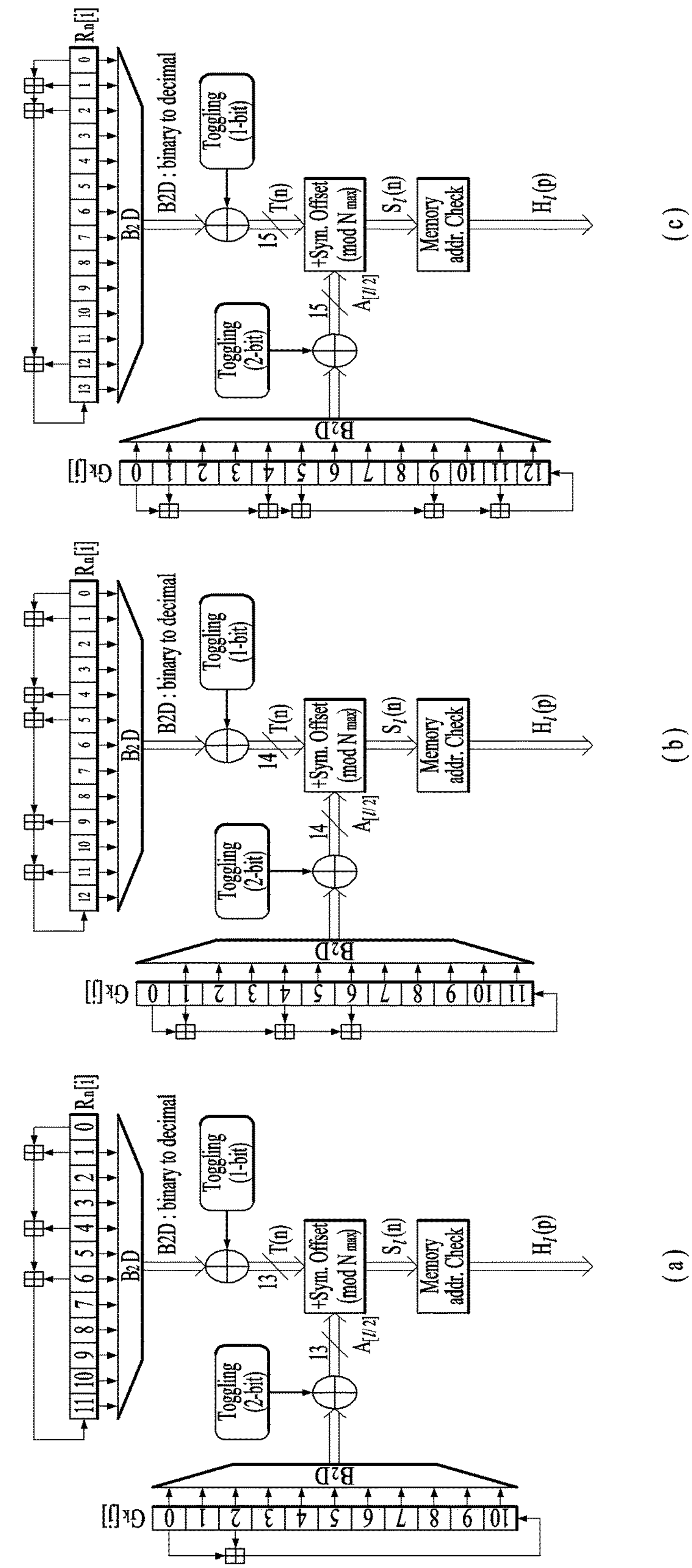
FIG. 32 is a block diagram illustrating an interleaving address generator including a main pseudo-random binary sequence (PRBS) generator and a sub-PRBS generator according to each FFT mode according to an embodiment of the present invention.

FIG. 32 illustrates an interleaving address generator including a main pseudo-random binary sequence (PRBS) generator and a sub-PRBS generator according to each FIT mode according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol Om,l is defined as $O_{m,l} = [x_{m,l,0}, \ldots, x_{m,l,p}, \ldots, x_{m,l,N_{data}-1}]$ for $l = 0, \ldots, N_{sym}-1$, where xm,l,p is the pth cell of the lth OFDM symbol in the mth frame and Ndata is the number of data cells: Ndata=CFSS for the frame signaling symbol(s), Ndata=Cdata for the normal data, and Ndata=CFES for the frame edge symbol. In addition, the interleaved data cells are defined as $P_{m,l} = [v_{m,l,0}, \ldots, v_{m,l,N_{data}-1}]$ for $l = 0, \ldots N_{sym}-1$.

For the OFDM symbol pair, the interleaved. OFDM symbol pair is given by $v_{m,l,H_i(p)} = x_{ml,lp}$, $p = 0, \ldots, N_{data}-1$, for the first OFDM symbol of each pair $v_{m,l,p} = x_{m,l,H_i(p)}$, $p = 0, \ldots, N_{data}-1$, for the second OFDM symbol of each pair, where $H_l(p)$ is the interleaving address generated by a PRBS generator.

FIG. 33 illustrates a main PRBS used for all FFT modes according to an embodiment of the present invention.

(a) illustrates the main PRBS, and (b) illustrates a parameter Nmax for each FFT mode.

FIG. 34 illustrates a sub-PRBS used for FFT modes and an interleaving address for frequency interleaving according to an embodiment of the present invention.

(a) illustrates a sub-PRBS generator, and (b) illustrates an interleaving address for frequency interleaving. A cyclic shift value according to an embodiment of the present invention may be referred to as a symbol offset.

Figure 35:
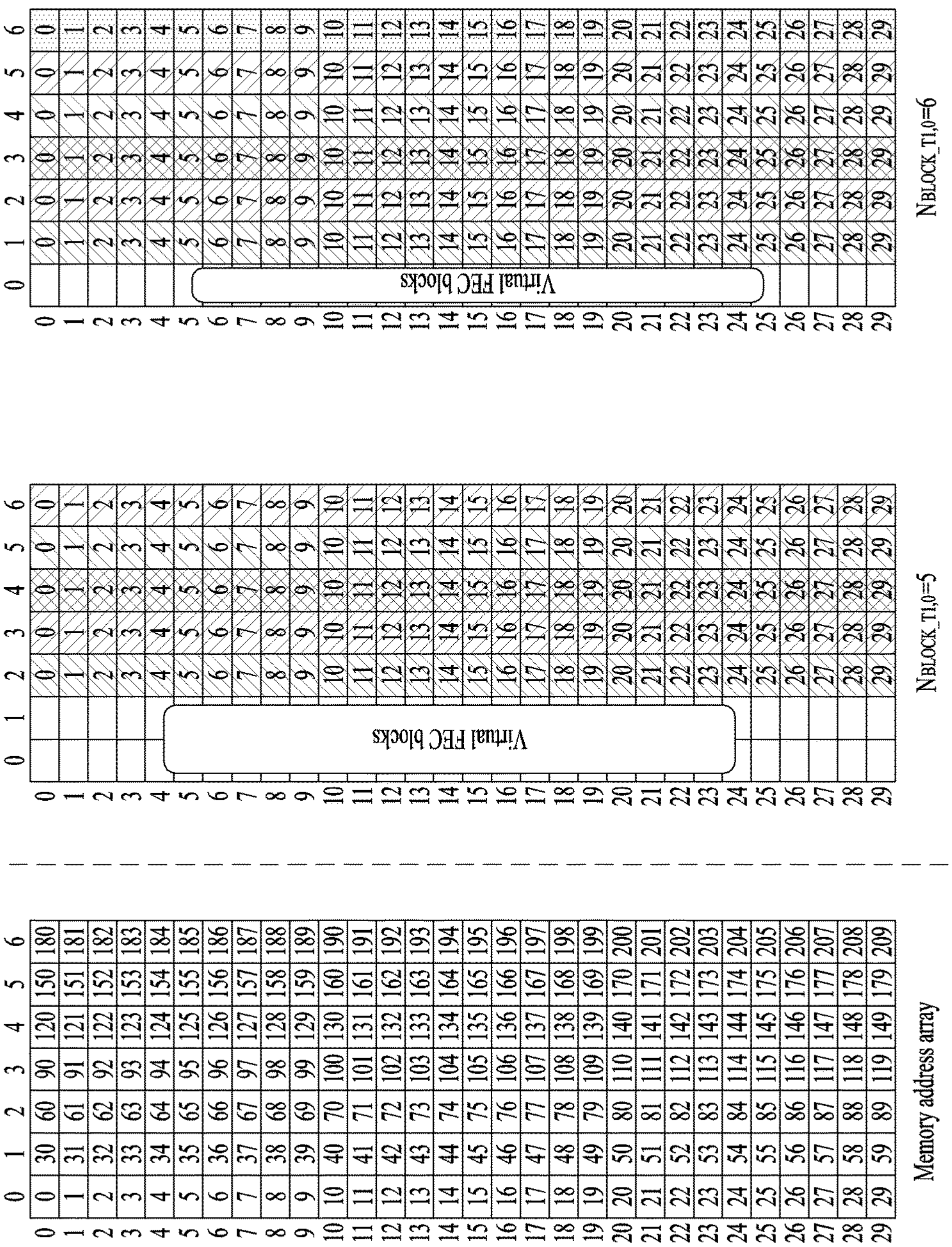
FIG. 35 illustrates a write operation of a time interleaver according to an embodiment of the present invention.

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both,a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more. PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM >1 may be the same as or similar to a structure and an operation of the CI applied when PLP_NUM=1.

FIG. 38 is a block diagram including-a second example of the structure of the hybrid time interleaver described above.

An operation of each block included in the second example of the structure of the hybrid time interleaver is the same as the above description in FIG. 20. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

Figure 39:
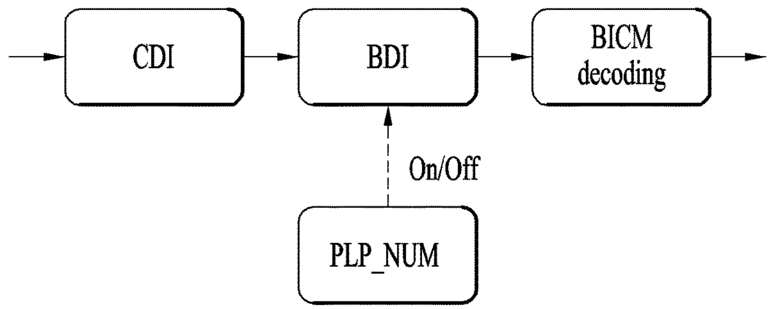
FIG. 39 is a block diagram including a first example of a structure of a hybrid time deinterleaver.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1.

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

Figure 40:
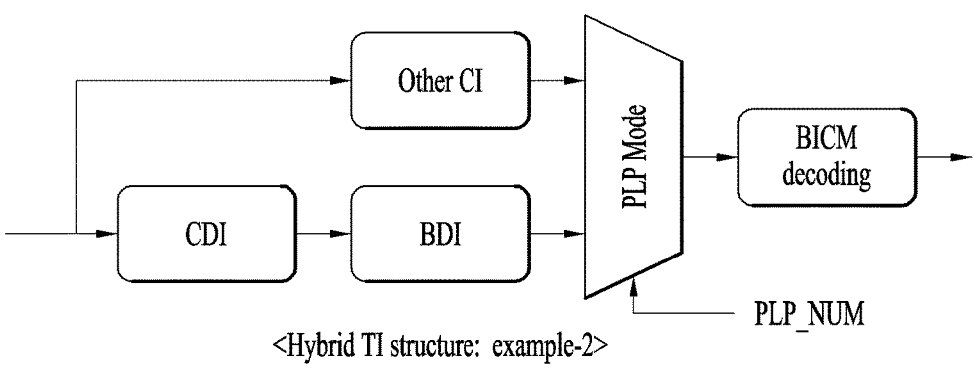
FIG. 40 is a block diagram including a second example of the structure of the hybrid time deinterleaver.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

Figure 41:
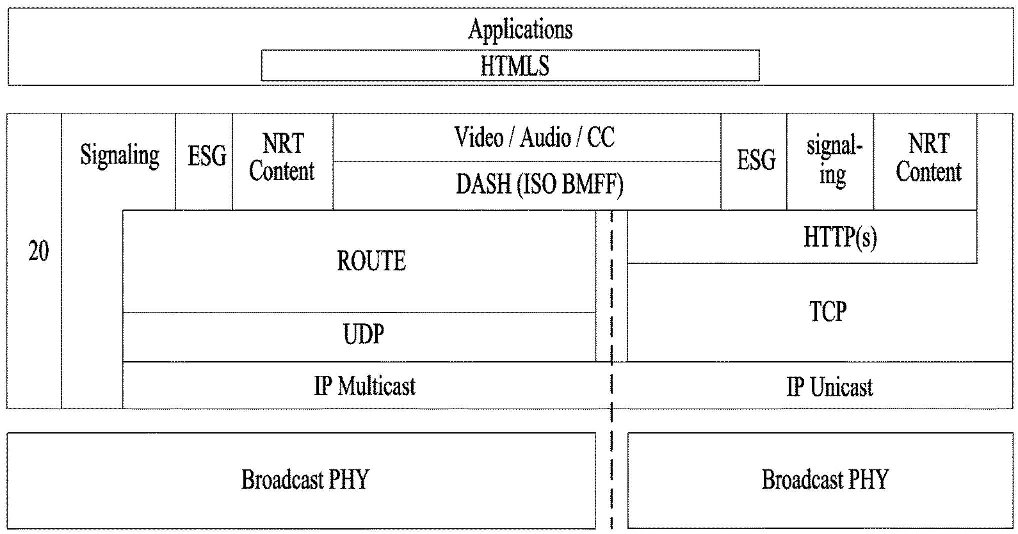
FIG. 41 illustrates a protocol stack according to another embodiment of the present invention.

FIG. 41 illustrates a protocol stack according to another embodiment of the present invention.

The present invention proposes methods for delivering service data. The illustrated protocol stack may include a service management level, a delivery level and a physical level. The service management level may include a protocol about an application related to a service. According to an embodiment, the application may be executed using HTML5. The physical level may perform processing such as encoding and interleaving on service data processed at the delivery level, generate a broadcast signal and transmit the broadcast signal.

At the delivery level, the service data may be processed to be delivered through a broadcast network or a broadband network. The service data may include streaming data transmitted in real time, such as video/audio/closed captioning data. Such data may be processed into DASH segments according to ISO MBFF. The service data may further include files transmitted in non-real time and information according thereto, such as non-real time (NRT) content, signaling data for signaling the service data and an electronic service guide (ESG).

When the service data is delivered through a broadcast network, the service data may be delivered through an ALC/LCT session included in a ROUTE session. As described above, when the service data is delivered through the broadcast network, the service data may be delivered through an MMT session according to MMTP. The service data may be delivered through the broadcast network using both ROUTE and MMT protocols. The service data processed according to ROUTE or MMT may be processed according to the UDP protocol and then encapsulated into IP packets in an IP layer. The IP packets may be delivered through IP multicast.

When the data is delivered through a ROUTE session, each DASH representation may be included in each ALC/LCT session and delivered. According to an embodiment, one LCT session can deliver one DASH representation. According to an embodiment, one LCT session may deliver one adaptive set. When MMT is used, an MMTP packet flow identified by one packet UD can deliver one or more pieces of MPU asset data.

The IP packets or transport packets at the delivery level may be processed in a link layer prior to being processed in a physical layer, which is not shown. The link layer may encapsulate input packets into link layer packets and output the link layer packets. In this process, an overhead reduction technique such as header compression may be applied. This has been described above.

When the service data is delivered through the broadband network, the service data may be delivered through HTTP or HTTPS. The service data may be processed according to HTTP(S) and delivered through TCP/IP. In this case, the service data may be delivered via the broadcast network through unicast.

Here, each service may include a collection of ROUTE sessions. That is, when an arbitrary ALC/LCT session belonging to one ROUTE session is included in a specific service, all ALC/LCT sessions of the ROUTE session can be included in the specific service. This is applied when the MMTP session is used or both the ROUTE session and MMTP session are used.

Each LCT session may be included in one PLP. That is, one LCT session may not be delivered over a plurality of PLPs. Different LCT sessions of one ROUTE session may be delivered over a plurality of LPLPs. This is applicable to MMTP packet flows even when the MMTP session is used or when both the ROUTE session and the MMTP session are used.

Figure 42:
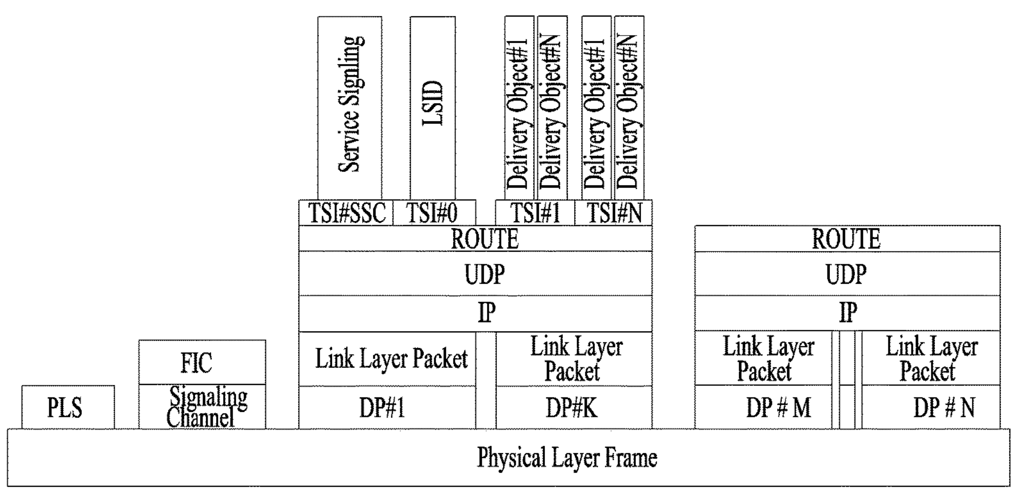
FIG. 42 illustrates a hierarchical signaling structure according to another embodiment of the present invention.

FIG. 42 illustrates a hierarchical signaling structure according to another embodiment of the present invention.

A description will be given of a physical layer frame. The physical layer frame has been described above in detail.

A physical layer may deliver a series of physical layer frames. Each physical layer frame may include bootstrap information. PLS information and/or a collection of PLPs. The bootstrap information may differ from bootstrap information included in an SLT.

The bootstrap information signals the number of PLPs of a broadcast stream and may signal physical layer parameters. A receiver can locate and decode PLPs through the bootstrap information. The PLP information may include parameter information related to the physical layer and PLPs. The PLPs may deliver service data.

The SLT may be delivered through a pre-designated IP stream transmitted through a PLP. Emergency alert system (EAS) related information may be regarded as a single service and delivered through a method of delivering normal services. According to an embodiment, the SLT and EAC related information may be delivered through a PLP, PLS or a separate dedicated channel (e.g. FIC) in a signal frame.

A description will be given of an embodiment in which a fast information channel (FIC), which is a dedicated channel for SLT delivery, is used.

The FIC may be used to efficiently deliver bootstrap information. Here, the bootstrap information may be information necessary for rapid scan and acquisition of a broadcast service. Information included in the SLT may provide minimum information for configuring a channel map, such as a service ID, a service name and a channel number related to each service. In addition, this information may include information for bootstrapping SLS. The SLT has been described above in detail. The dedicated channel such as the FIC may not be used, as described above, and the SLT may be delivered through a PLP. In this case, the SLT can be delivered through a specific IP stream transmitted through the PLP. The IP address and UDP port number of the IP stream may be pre-designated.

The SLS is described. The SLS has been described in detail.

A service may have an LCT session that delivers service layer signaling (SLS) information signaling the service. The SLS may be located through the source IP address, the destination IP address and/or the destination port number of a ROUTE session and a transport session identifier (TSI) of the corresponding LCT session. According to an embodiment, PLP ID information of a PLP which delivers the SLS may be needed.

As described above, the LCT session delivering the SLS may be called a service signaling channel and identified by a dedicated tsi value. That is, when the ROUTE session in which the SLS is delivered is identified by bootstrap information, the SLS can be acquired through the LCT session identified by a dedicated tsi (e.g. tsi=0) of the ROUTE session. When a pre-designated tsi is used, tsi information may not be needed to acquire the SLS.

The SLS may include USBD/USD, STSID and/or MPD, as described above. According to an embodiment, the SLS may further include a service map table (SMT). The SMT includes information for signaling a service and may be omitted. According to an embodiment, the SLS may further include an MPD table (MPDT). The MPDT includes information corresponding to MPD and may be omitted. According to an embodiment, the SLS may further include LCT session instance description (LSID), a URL signaling table (UST), an application signaling table (AST) and/or a security description table (SDT). The UST, AST and SDT may also be omitted. Particularly, in signaling using the USBD/USD, STSID and/or MPD, the SMT, MPDT and LSID may not be used.

The illustrated hierarchical signaling structure is described. The signaling structure according to the present invention has been described. In the illustrated embodiment, signaling is performed through ROUTE. The signaling structure which will be described later may be similarly used in a case in which the MMTP session is used.

In the illustrated embodiment, a physical layer frame delivers PLS and PLPs. The PLS has been described. In addition, while it is assumed that an FIC is used in the present embodiment, the FIC may not be used, as described above, and an SLT may be delivered through a specific IP stream of a PLP. The SLT information delivered through the specific IP stream may be acquired first. A path through which SLS for a specific service is delivered may be located using bootstrap information included in the SLT.

The physical layer frame may include a plurality of PLPs. In FIG. 42, PLPs are indicated as data pipes (DPs). The PLPs have link layer packets which may encapsulate data delivered through IP streams.

An IP stream identified by IP/UDP information may include a ROUTE session. The ROUTE session may include a plurality of LCT sessions. In the present embodiment, one ROUTE session is delivered through a plurality of PLPs, and one LCT session is included in one PLP. However, one LCT session may not be delivered through a plurality of PLPs.

Each LCT session may deliver SLS or a service component. In the illustrated embodiment, while an LCT session TSI#SCC delivering service signaling and an LCT session TSI#0 delivering LSID are separated from each other, service signaling information may be delivered in one LCT session. This LCT session may be called a service signaling channel and identified by tsi=0. The LSID may not be used, as described above.

When the SLS is acquired by accessing the LCT session which delivers the SLS, service data of the corresponding broadcast service can be obtained using the SLS. An LCT session which delivers a service component of the corresponding broadcast service can be identified using tsi information. When the service data is delivered through a ROUTE session other than the ROUTE session which delivers the SLS, information for identifying the other ROUTE session may be included in the SLS. If required, PLP ID information of a PLP through which the service data is delivered may be included in the SLS.

Correct wall clock information needs to be delivered to the physical layer. Wall clock reference information may be included in EXT_TIME header corresponding to an extension of the header of an LCT packet and delivered. This LCT packet can deliver related service data in an LCT session.

FIG. 43 illustrates an SLT according to another embodiment of the present invention.

As described above, the SLT can support rapid channel scan and acquisition. The SLT may have information about each service of a broadcast stream. For example, the SLT can include information for presenting a significant service list to a user and information for locating SLS. Here, the service list can be used for the user to select a service. The SLS can be delivered through a broadcast network or a broadband network.

The SLS in the illustrated embodiment may include FIC_protocol_version, broadcast_stream_id and/or num_services. In addition, the SLT may include information about each service. The SLT may further include SLT level descriptors. According to an embodiment, the SLT may be in XML format. Here, the SLT may be called an FIC payload.

FIC_protocol_version can indicate the version of the SLT. This field may indicate the version of the SLT structure.

Broadcast_stream_id can indicate the identifiers of all broadcast streams described by the SLT.

Num_services can indicate the number of services described by the SLT. Here, the services may refer to services having components delivered through corresponding broadcast streams.

Signaling information corresponding to services can be located according to the number indicated by num_services. This will now be described.

Service_id can indicate the service ID of a corresponding service. The service ID may be represented in the form of a 16-bit unsigned integer. The service ID may be unique in the coverage of the corresponding broadcast network. The uniqueness scope of the service ID may be changed according to embodiments.

Service_data_version can indicate the version of service data of the corresponding service. The value of this field can increase whenever service entry of the corresponding service is changed. A receiver can be aware of a service which has a change point simply by monitoring the SLT through service_data_version.

Service_channel_n umber can indicate the channel number of the corresponding service. According to an embodiment, this field may be divided into a major channel number and a minor channel number.

Service_category can indicate the category of the corresponding service. According to an embodiment, this field may indicate whether the corresponding service is an A/V service, an ESG service or a CoD service. For example, the corresponding service is an A/V service when the value of this field is 0x01, an audio service when the value of this field is 0x02, an application based service when the value of this field is 0x03 and a service guide when the value of this field is 0x08. The remaining values can be reserved for future use.

Partition_id can be an identifier of a partition which broadcasts the corresponding service. According to an embodiment, a plurality of service providers/broadcasters may provide services through one broadcast stream. In this case, one broadcast stream can be divided into a plurality of partitions. The identifier of each partition may be regarded as the identifier of a service provider. According to an embodiment, partitioned may be defined at a different level. For example, this field can serve as a provider ID for all services described by the SLT by being defined at the SLT level. According to an embodiment, this field may be defined in a header region of a low level signaling (LLS) table used to deliver information of the SLT and the like. Here, LLS table may be a low level signaling format which includes and delivers information of an SLT, an RRT and the like. In this case, this field can serve as a provider ID for all services described by the SLT included in the LLS table.

Short_service_name_length can indicate the length of short_service_name. The value of this field can indicate the number of byte pairs of short_service_name. When the corresponding service has no short name, this field can have a value of 0. Short_service_name can indicate the short name of the corresponding service. Each character of a short name can be encoded according to UTF8. When the short name is represented by an odd number of bytes, the second byte of the last byte pair can have a value of 0x00.

Service_status can indicate the status of the corresponding service. Here, service status can indicate whether the corresponding service is active or suspended status, or hidden or shown status. The MSB can indicate whether the corresponding service is active (1) or inactive (0). Active/inactive can indicate whether the corresponding service is active or not. The LSB can indicate whether the corresponding service is hidden (1) or not (0). Hidden status can represent that the corresponding service is a service which cannot be viewed by normal consumers, such as a test service. When the service is in a hidden status, the service cannot be viewed by a normal receiver. The MSB and LSB of this field may be divided into different fields.

Sp_indicator may be a service protection flag for the corresponding service. That is, this field can indicate whether the corresponding service is protected. Here, protection may refer to a case in which at least one component of the corresponding service, which is necessary for significant reproduction the corresponding service, is protected.

Broadcast_SLS_bootstrap_flag can indicate whether broadcast bootstrap information is present in the SLT. That is, this field can indicate whether service signaling is delivered through the broadcast network.

Broadband_SLS_bootstrap_flag can indicate whether broadband bootstrap information is present in the SLT. That is, this field can indicate whether service signaling is delivered through a broadband network.

Num_min_capability can indicate the number of minimum capability codes for the corresponding service.

Min_capability_value can indicate a minimum capability code for the corresponding service. This information refers to minimum capability necessary to provide the corresponding service. For example, when the corresponding service is provided in video resolutions of UHD and HD, the minimum capability of the corresponding service can be HD. That is, a receiver having capability of providing at least HD can process the corresponding service. Capability information related to audio may be present in addition to video resolution. When this information is defined at the SLT level, the information may be capability information necessary to significantly present all services described by the SLT. This information may be defined in USBD.

IP_version_flag can be a 1-bit indicator which indicates the version of an IP address. This field can indicate whether an SLS source ID address and an SLS destination IP address correspond to an IPv4 address or an IPv6 address.

SLS_source_IP_address_flag can indicate whether source IP address information on a transport path of SLS of the corresponding service is included in the SLT.

SLS_source_IP_address, SLS_destination_IP_address and/or SLS_destination_UDP_port may be similar to the aforementioned fields @slsSourceIpAddress, @slsDestinationIpAddress and @slsDestinationUdpPort. This information can specify an LCT session in which SLS is delivered, a ROUTE session including an MMTP packet flow or an MMTP session.

SLS_TSI can indicate tsi information of the LCT session in which the SLS of the corresponding service is delivered. However, the SLS may be delivered through a dedicated LCT session of a ROUTE/MMTP session and/or an MMTP packet flow, identified by the aforementioned information, as described above. In this case, this field can be omitted since the SLS can be delivered through a pre-designated LCT session (corresponding to tsi=0).

SLS_DP_ID can correspond to the aforementioned @slsPlpId. This field can specify a PLP including the LCT session which delivers the SLS. In general, a most robust PLP from among PLPs delivering the corresponding service can be used to deliver the SLS.

SLS_url can indicate URL information of the SLS. Each character of the URL information may be encoded according to UTF8.

Num_service_level_descriptors indicate the number of descriptors defined at the service level, and service_level_descriptor( ) refers to a service level descriptor which provides additional information about the corresponding service. Num_FIC_level_descriptors indicate the number of descriptors defined at the SLT level, and FIC_level_descriptor( ) refers to an SLT level descriptor which provides additional information applicable to all services described by the SLT.

The SLT according to the present embodiment is merely an example and information of the SLT may be added/deleted/changed according to embodiments. Information defined in the SLTs according to the aforementioned embodiments and information of the SLT according to the present embodiment may be combined. That is, an SLT according to an embodiment of the present invention may further include fields defined in an SLT according to another embodiment of the present invention. Information of the aforementioned SLTs may be combined to constitute an SLT according to another embodiment of the present invention.

FIG. 44 illustrates a normal header used for service signaling according to another embodiment of the present invention.

SLS may include the aforementioned various types of signaling information tables. The signaling information tables may be called signaling information, signaling tables, signaling objects, signaling instances, signaling fragments and the like. The signaling tables may have an encapsulation header. The encapsulation header can provide information about signaling tables delivered individually or as a group.

The encapsulation header according to the illustrated embodiment may include num_of_tables, information about each signaling table and descriptors.

Num_of_tables can indicate the number of signaling tables included in a group when the signaling tables are delivered as a group. When signaling tables are individually delivered, this field can have a value of 1. This field can be followed by information about the number of signaling tables, indicated by this field.

Table_offset can indicate an offset of a corresponding signaling table in bytes. Table_id can indicate the ID of the corresponding signaling table. Table_encoding can indicate an encoding method of the corresponding signaling table. For example, when table_encoding has a value of 0x00, the corresponding table is in binary format. When table_encoding has a value of 0x01, the corresponding table is in XML format. When table_encoding has a value of 0x02, the corresponding table is in XML format compressed by gzip. The remaining values may be reserved for future use.

Table_version_number can indicate the version number of the corresponding signaling table. This field can be incremented by 1 when data of the corresponding signaling table is changed. When the version number overflows, this field may have a value of 0.

Table_id_extension_indicator, URI_indicator, valid_from_indicator and expiration_indicator can indicate whether values of table_id_extension, URI_byte, valid_from and expiration with respect to the corresponding signaling table are present in the encapsulation header.

Table_id_extension may be an extension of the table ID of the corresponding signaling table. The corresponding signaling table can be identified by a combination of table_id_extension and table_id fields. The uniqueness scope of the signaling table can be extended according to table_id_extension.

URI_byte can indicate the URL of the corresponding signaling table. Valid_from can indicate a time from which the corresponding signaling table is valid. Expiration can indicate a time when the corresponding signaling table expires.

Figure 45:
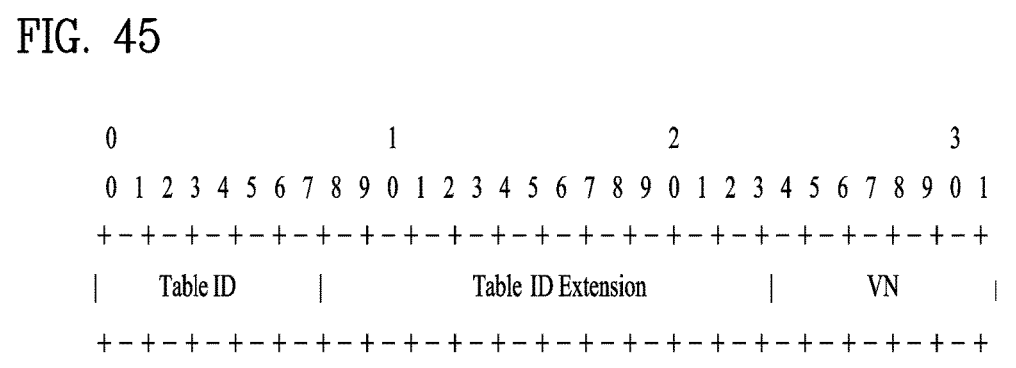

FIG. 45 illustrates a method for filtering a signaling table according to another embodiment of the present invention.

Service signaling information such as the aforementioned SLS can be delivered in the form of an LCT packet. Service signaling information delivered in the form of an LCT packet may include USBD, STSID and MPD. A fragment or fragments of such signaling information can be included in an LCT packet and delivered.

The present invention proposes a transport packet structure for filtering service signaling information and receiving/processing the service signaling information in reception of the service signaling information. A transport object identifier (TOI) element of an LCT packet header may be changed for service signaling information filtering.

The TOI element of the illustrated LCT packet may include a signaling ID field, a signaling ID extension field and/or a version number field. These fields may be respectively called a table ID field, a table ID extension field and a VN field.

The signaling ID field may be an ID for identifying the type of a service signaling information fragment delivered by the corresponding transport packet. According to an embodiment, the signaling ID field may identify the type of signaling information, such as USBD and STSID, by assigning a unique value thereto. For example, when the signaling ID field has a value of 0x01, this indicates that USBD is delivered by a transport object. When the signaling ID field has a value of 0x02, this indicates that STSID is delivered by a transport object. When the signaling ID field has a value of 0x03, this indicates that MPD is delivered by a transport object. When the signaling ID field has a value of 0x04, this field can be reserved for future use. When the signaling ID field has a value of 0x00, this field indicates that signaling information fragments of various types are bundled and delivered. In addition, this field may be used to identify information such as an SMT, CMT and SDP. This field may be called a fragment type field.

The signaling ID extension field may have additional information about corresponding service signaling information. This field can indicate ID extension information about the corresponding service signaling fragment. This field may identify the sub type of the corresponding service signaling fragment. According to an embodiment, when a transport packet has a plurality of fragments, the signaling ID extension field can indicate whether a specific service signaling fragment is included in the transport packet using bits thereof. When the transport packet has one fragment, the signaling ID extension field may have a value derived from the ID of the corresponding service signaling fragment. Furthermore, when transport packets deliver instances of fragments of the same type, the signaling ID extension field may be used as an instance ID. This field may be called a fragment type extension field.

The version number field can indicate version information of the service signaling fragment delivered by the corresponding transport packet. When the contents of the service signaling fragment are changed, the value of this field can be changed. According to an embodiment, when a transport object of a transport packet includes one signaling fragment, the version number field can indicate the version of the signaling fragment. When the transport object of the transport packet includes a plurality of fragments, the version number field can indicate the version of the transport object. That is, when any one of the fragments included in the transport object is changed, the version of the transport object is changed. Accordingly, the version of the transport object is identified by the version number field.

FIG. 46 illustrates a service map table (SMT) according to another embodiment of the present invention.

The SMT may be replaced by the aforementioned STSID and USBD. In this case, the SMT may not be used.

ServiceID can indicate a service ID for identifying a service related to the SMT. The serviceID maybe unique in the broadcast network.

ServiceName can indicate the name of the corresponding service. The service name may be a long name rather than a short name. Each character of the name may be encoded according to UTF8. A short name may be described in an SLT.

lang indicates a language in which the corresponding service name is described.

Capabilities indicate capabilities for significantly reproducing the corresponding service.

AdditionalROUTESession indicates a different ROUTE session which delivers a service component of the corresponding service. Here, the different ROUTE session may refer to a ROUTE session other than the ROUTE session in which the corresponding SLS is delivered. Information about the ROUTE session in which the SLS is delivered has been described in the SLT.

sourceIPAddr, destIPAddr and destUDPPort can include information for identifying the aforementioned "different" ROUTE session. These fields can respectively include the source IP address, destination IP address and destination UDP port information of the "different" ROUTE session.

IsidDatapipeID can indicate PLP ID information of a PLP through which LSID of the "different" ROUTE session is delivered. Here, the LSID may not be used as described above since STSID describes information about all LCT sessions delivering service components of the corresponding service because the STSID provides service based information. Accordingly, the LSID may not be used together with the STSID since the LSID is information about each ROUTE session. When the LSID is not used, IsidDatapipeID can indicate the ID of a PLP through which the "different" ROUTE session is delivered.

ComponentMapDescription can include information indicating whether each component of the corresponding service can be acquired through a broadcast network or a broadband network. In addition, this field can indicate whether each component of the corresponding service can be acquired through a broadcast stream other than the corresponding broadcast stream. This field may be omitted when service data is delivered through only one broadcast network. Information of this field may be provided in the form of a URI pattern. Here, the URI pattern needs to cover not only a media segment but also an initialization segment. A broadcast URI pattern can cover not only the pattern of the corresponding broadcast stream but also the pattern of another broadcast stream delivering the service data.

mpdID can indicate the ID of MPD of the corresponding service. perID can indicate the ID of the current period of the corresponding service.

BroadcastComp may be an envelope with respect to a URL pattern of a segment delivered through a broadcast network. BroadcastComp may correspond to the r12:broadcastAppService field of the aforementioned USBD. url_pattern can indicate a base pattern of broadcast segments of the current period. URLs of the broadcast segments of the current period may have at least one url_pattern value. The receiver can be aware of whether a segment having a specific segment URL can be delivered through a broadcast network using url_pattern.

BroadbandComp may be an envelope with respect to a URL pattern of a segment delivered through a broadband network. BroadbandComp may correspond to the r12:unicastAppService field of the aforementioned USBD. While url_pattern corresponds to url_pattern of BroadcastComp, url_pattern of BroadbandComp may differ from url_pattern of BroadcastComp in that the former indicates a base pattern for broadband segments.

ForeignComp may be an envelope containing information about a "foreign" component. That is, when a service component of the corresponding service is delivered through a broadcast stream other than the broadcast stream delivering the SMT, this field can contain information about the service component. Foreign components may be signaled in the other broadcast stream.

BroadcastStreamID can indicate the ID of a broadcast stream including at least one foreign component.

ComponentParameters can include information for identifying a ROUTE session/LCT session in which at least one foreign component is delivered, in a foreign broadcast stream including the at least one foreign component. If such information is signaled in the foreign broadcast stream, this field can be omitted. This field can be present for rapid service acquisition in the foreign broadcast stream.

sourceIPAddr, destIPAddr and destUDPPort can provide information for acquisition of a foreign service component. This information can be used to identify a transport session of a foreign broadcast stream, through which the foreign service component is delivered. sourceIPAddr, destIPAddr and destUDPPort can respectively include source IP address information, destination IP address information and destination UDP port information.

datapipeID and tsi information can indicate a path through which a foreign service component is delivered in a foreign broadcast stream. The datapipeID and tsi information can respectively indicate the ID of a PLP through which the foreign service component is delivered and the ID of an LCT session in which the foreign service component is delivered.

ContentAdvisoryRating can include information about advisory rating of the corresponding service. This rating information may be provided by MPD or RRT.

CaptionServiceDescription can include description information related to a captioning service of the corresponding service. This information may be provided by MPD. This information may be significant for a video service having caption information.

Figures 47, 48:
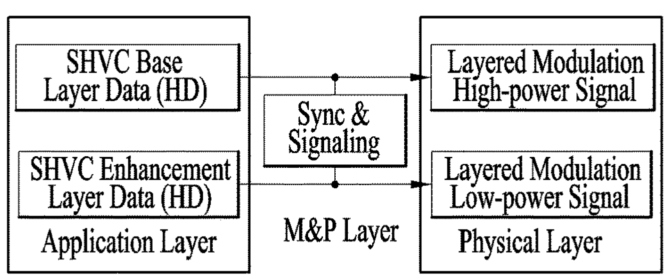
FIG. 47 illustrates a URL signaling table (UST) according to another embodiment of the present invention.
FIG. 48 illustrates a layered service according to an embodiment of the present invention.

FIG. 47 illustrates a URL signaling table (UST) according to another embodiment of the present invention.

In addition to the aforementioned signaling tables, various signaling tables can be defined.

An MPD delivery table (MPDT) may correspond to the aforementioned MPD. As described above, the MPD may be one of signaling information included in SLS. The MPD can be acquired through a broadcast network or a broadband network. When the MPD can be acquired through the broadband network, the MPD may be acquired through the UST which will be described below.

A DASH initialization segment may not be handled as service signaling information. The initialization segment may be delivered along with media segments through an LCT session or an MMTP session. Alternatively, the initialization segment may be delivered through a broadband network. URL information about the initialization segment may be described in the MPD.

LCT session instance description (LSID) can provide description information about LCT sessions with respect to a specific ROUTE session. The LSID can describe session information on the basis of the ROUTE session. The aforementioned STSID can describe session information on the basis of service. That is, the STSID can include description information about LCT sessions in which service components included in the corresponding service are delivered and the LSID can include description information about LCT sessions corresponding to the ROUTE session. As described above, the LSID may be omitted and the STSID instead of the LSID may describe session description information in SLS.

The UST may be a signaling table containing URL information for acquiring signaling information. Signaling information can be acquired through a broadband network using the URL information of the UST. According to an embodiment, a specific field in the SLT may provide URL information for acquiring signaling information, instead of the UST. Signaling information which can be acquired using the URL information may include normal service signaling information and ESG information.

According to an embodiment, a signaling server for acquiring signaling information per type may be present. In this case, a plurality of URLs may be required. According to an embodiment, only one signaling server may be present and different queries may be used. In this case, only one URL can be necessary and this URL can be defined in the SLT instead of the additional UST.

In the illustrated embodiment, the UST may include @service_id for identifying a service. @smtURL can indicate a URL for an SMT, @mpdURL can indicate a URL of MPD and @astURL can indicate a URL for an AST. According to an embodiment, URLs for acquiring an ESG and other SLSs may be included in the UST.

When a URL for a signaling server is included in the SLT, an element which provides the URL may be defined. @urlType may be present as a lower property of the element and may indicate the type of the URL.

An application signaling table (AST) may be signaling information providing information related to NRT data files for an application and/or application-based enhancement. The AST can be delivered along with SLS when transmitted through a broadcast network. When the AST is delivered through a broadband network, the AST can be acquired through URL information provided by the SLT.

A security description table (SDT) may include information related to conditional access. The SDT may be delivered along with SLD through a broadcast network or delivered through a broadband network.

A rating region table (RRT) is low level signaling (LLS) and may be delivered through the aforementioned LLS table. The LLS table can deliver the aforementioned SLT or RRT. The RRT may be delivered through a broadband network. The RRT may provide rating information of content.

FIG. 48 illustrates a layered service according to an embodiment of the present invention.

A signaling system can support the following. First of all, the signaling system needs to provide an environment in which services and related parameters can be efficiently acquired, and to track changes in services. In addition, dynamic configuration/reconfiguration through combination/separation/acquisition/removal need to be supported for delivery and consumption of components. Dynamic and flexible broadcast capacity needs to be supported in two or more broadcast stations.

A description will be given of signaling for the layered service. The system can provide the layered service. The layered service serves to efficiently provide the same content to a plurality of devices having different properties and different environments. The layered service can include a more robust base content layer and a less robust enhancement layer. The enhancement layer provides the same content with higher quality. For example, the base layer can include data for providing video content in HD. The enhancement layer can include data for providing the same video content in UHD. The data of the base layer and the data of the enhancement layer need to be synchronized and signaling therebetween may be needed. To achieve this, cross-layer communication between an application layer and a physical layer may be needed. This may be necessary to send the base layer with a high-power signal and to send the enhancement layer with a low-power signal.

Figure 49:
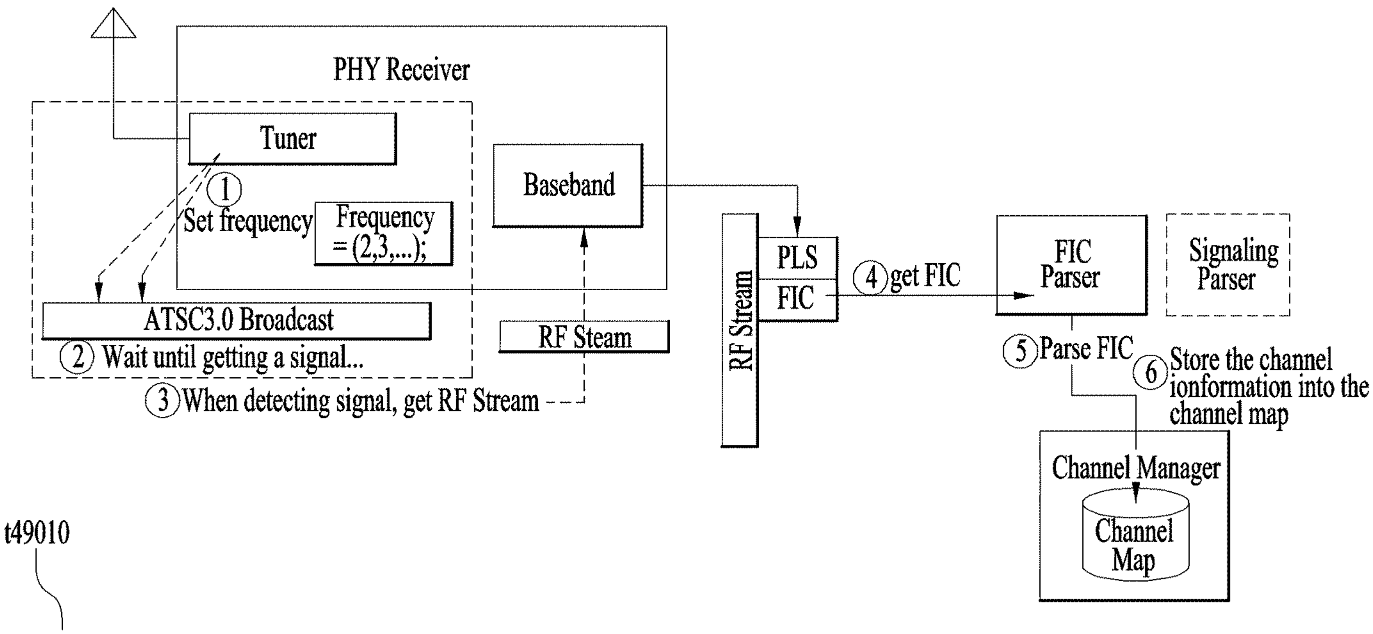
FIG. 49 illustrates a rapid scan procedure using an SLT according to another embodiment of the present invention.

FIG. 49 illustrates a rapid scan procedure using an SLT according to another embodiment of the present invention.

A receiver may include a tuner, a baseband processor and/or an internal storage. The receiver can perform rapid service scan using the SLT.

First of all, the receiver can check frequencies one by one using the tuner. These frequencies may be acquired using a predefined frequency list. For each frequency, the tuner can wait until a signal is acquired.

When a signal is detected at a specific frequency, the baseband processor can extract the SLT from the signal. When an FIC is used, the SLT may be extracted from the FIC. If the FIC is not used, the SLT may be acquired from a PLP including the SLT. In this case, the PLP including the SLT can be identified using information of PLS. The baseband processor can deliver the acquired SLT to a middleware module.

The middleware module can deliver the SLT to an SLT parser. The SLT parser is represented as an FIC parser in the figure. The SLT parser can parse data and acquire information. Information of the SLT has been described. It may be desirable to parse the SLT even when the SLT has the same version number as an SLT acquired through previous scan. This is because SLTs having different versions may have the same version number when the version number field overflows. Alternatively, the receiver may initialize the SLT version number such that the aforementioned situation does not occur.

The acquired information can be stored in a channel map. After service scan, information shown in table t49010 may be stored in the channel map. Three services are stored in the channel map, and each service can include a service ID, an ID of a broadcast network through which the corresponding service is delivered, a provider ID (partition ID), service category information, a short name, information indicating whether the corresponding service is protected, SLS bootstrapping information, and URL information when SLS is delivered through a broadband network. This information may correspond to the information included in the aforementioned SLT.

Figure 50:
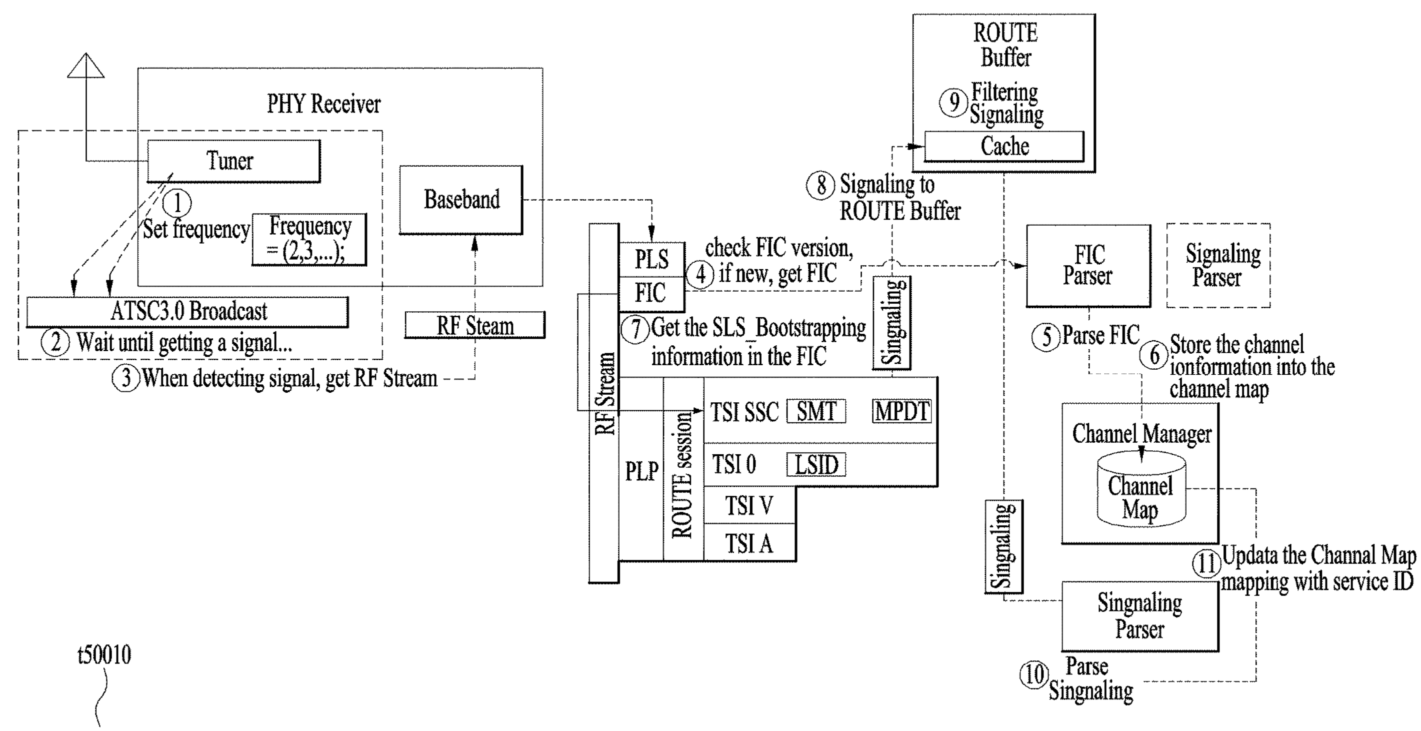
FIG. 50 illustrates a full service scan using an SLT according to another embodiment of the present invention.

FIG. 50 illustrates a full service scan procedure using an SLT according to another embodiment of the present invention.

The receiver can perform full service scan. When full service scan is performed, service signaling information about each service can be acquired and stored. For example, a long name instead of a short name of a service can be acquired. The long name can be mapped through the service ID of the service and stored along with the short name in the channel map. The short name may be information acquired through rapid scan prior to full service scan.

The receiver can start to receive each frequency defined in a frequency list. The tuner of the receiver can wait until a signal is acquired for each frequency. When a signal is detected, the baseband processor can acquire an SLT and deliver the SLT to the middleware module.

The receiver can check whether the SLT is a new SLT by checking the version thereof. As described above, even if the SLT has the same version number as the previous SLT, the SLT may need to be acquired. When the SLT is a new SLT, the middleware module can send the SLT to the SLT parser. The SLT parser can parse the SLT and extract information. The extracted information is stored in the channel map.

Subsequently, the receiver can acquire SLS using bootstrapping information of the SLT. Upon acquisition of the bootstrapping information of the SLT, the receiver can deliver the bootstrapping information to a ROUTE client or an MMTP client.

The receiver can employ the aforementioned filtering scheme using the TOI in the case of an SLS IP packet transmitted according to ROUTE protocol. The receiver can acquire information (STSID, USBD, etc.) of the SLS through the filtering scheme. The receiver can store the acquired SLS information.

The SLS can be parsed by a signaling parser. For the same reason as described above, it is desirable to parse the SLS even if the SLS has the same version number as previous SLS. The receiver can update the SLS information in the channel map. In this case, the receiver can match and store the SLS information in the channel map using prestored service ID information.

The channel map after full service scan may be as shown in table t50010. Distinguished from the aforementioned channel after rapid scan, additional information has been stored in the channel map. For example, long service name information and additional ROUTE session information have been additionally stored for each service.

Figure 51:
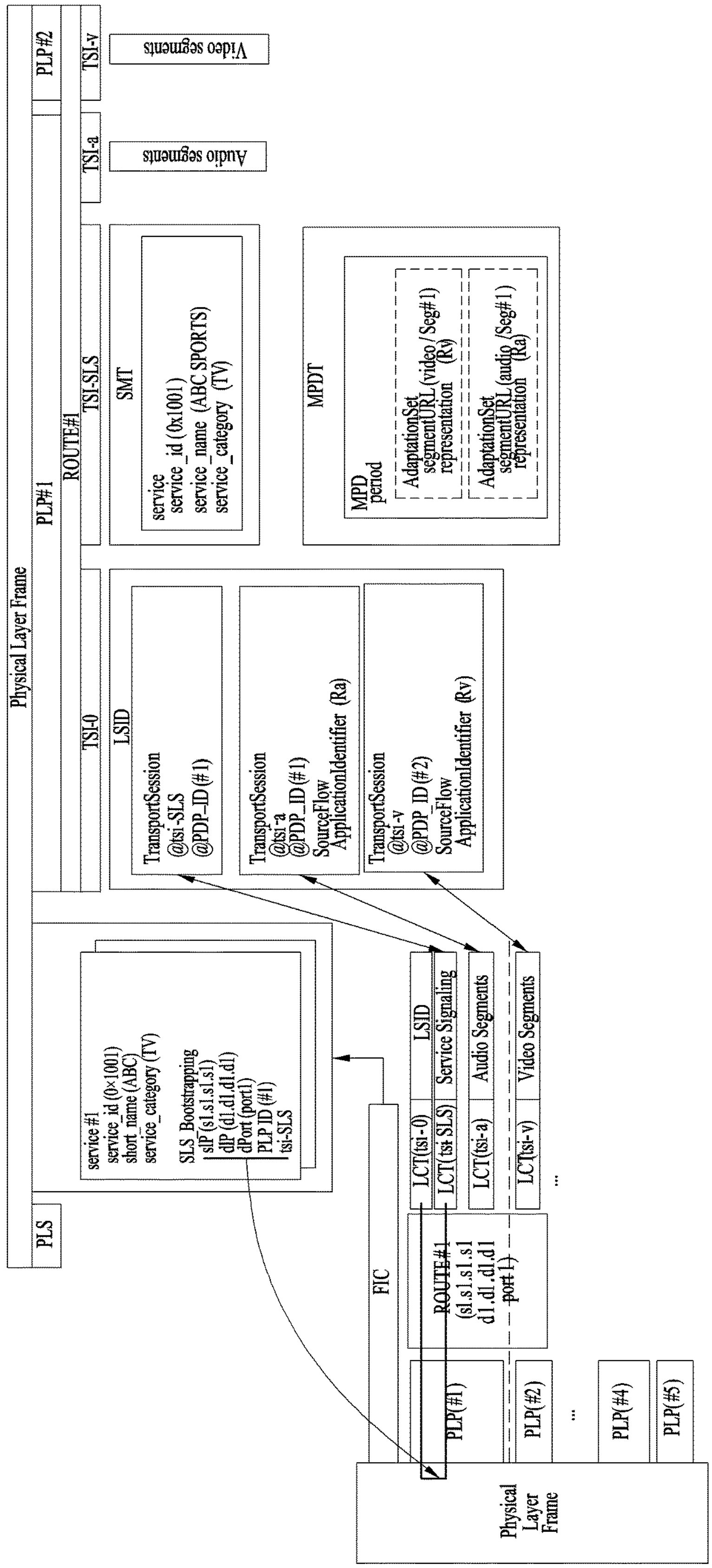
FIG. 51 illustrates a process of acquiring a service delivered through only a broadcast network according to another embodiment of the present invention (a single ROUTE session)

FIG. 51 illustrates a process of acquiring a service delivered through only a broadcast network according to another embodiment of the present invention (single ROUTE session).

FIG. 51 shows a service acquisition process when video/audio segments included in a single broadcast service are delivered through only a broadcast network (pure broadcast). Particularly, the illustrated embodiment assumes a pure broadcast situation using only one ROUTE session.

A path through which SLS of a broadcast service to be acquired is delivered can be acquired through an SLT. As described above, the SLT can indicate whether the SLS of the corresponding broadcast service is delivered through ROUTE or MMTP. In addition, the SLT can include IP/UDP information of the ROUTE session in which the SLS is delivered on the assumption that the SLS is delivered through ROUTE. Accordingly, the SLT can provide bootstrap information for acquiring the SLS. As described above, an FIC may not be used according to an embodiment.

In the ROUTE session in which the SLS is delivered, a specific LCT of the ROUTE session can deliver the SLS. The LCT session delivering the SLS may be called a service signaling channel. The LCT session may be pre-designated to tsi=0. In this case, the LCT session can deliver STSID, MPD and/or USBD/USD and further deliver an additional SLS instance such as an AST. Here, LSID may not be used.

According to an embodiment, an LCT session corresponding to tsi=0 may deliver LSID and LCT sessions identified by other tsi values may deliver the remaining SLS instances. In this case, the LSID is used. Here, LCT sessions identified by other tsi values may be called service signaling channels. The number of LCT sessions through which SLS instances are delivered and tsi values used for LCT sessions may be changed by a designer.

The USBD, STSID and MPD may be acquired and parsed by the receiver. Then, the receiver may select a representation to be presented. To signal a representation delivered through a broadcast network, the STSID can be checked.

The receiver can send the SLS information to a segment acquisition module. The segment acquisition module may provide user preference using SLS information. For example, the segment acquisition module can provide information indicating whether the user prefers Spanish audio to English audio.

The segment acquisition module can determine whether a service component can be retrieved from a broadcast stream using information of the USBD/USD. The USBD/USD can be used for the segment acquisition module to determine a source from which service components can be retrieved. If the aforementioned SMT is used, the SMT can substitute for the USBD.

When a DASH client requests a segment from an internal proxy server, the internal proxy server may need to determine whether to send a request for the corresponding segment to a remote broadband server or to wait until the corresponding segment appears in a broadcast stream (if the segment has not appeared). The USBD can include multicast base pattern information and unicast base pattern information in the aforementioned deliveryMethod element. The proxy server can check whether a substring of a segment URL is a unicast base pattern or a multicast base pattern and perform operation according to the checked result. In a pure broadcast case, the receiver can be aware of a source from which service components can be retrieved without the deliveryMethod element of the USBD.

The receiver can recognize which one (Spanish/English) of service components of the corresponding broadcast service needs to be selected, a path through which the service component is acquired and how the acquired component is reproduced, using the information of the SLS.

Figure 52:
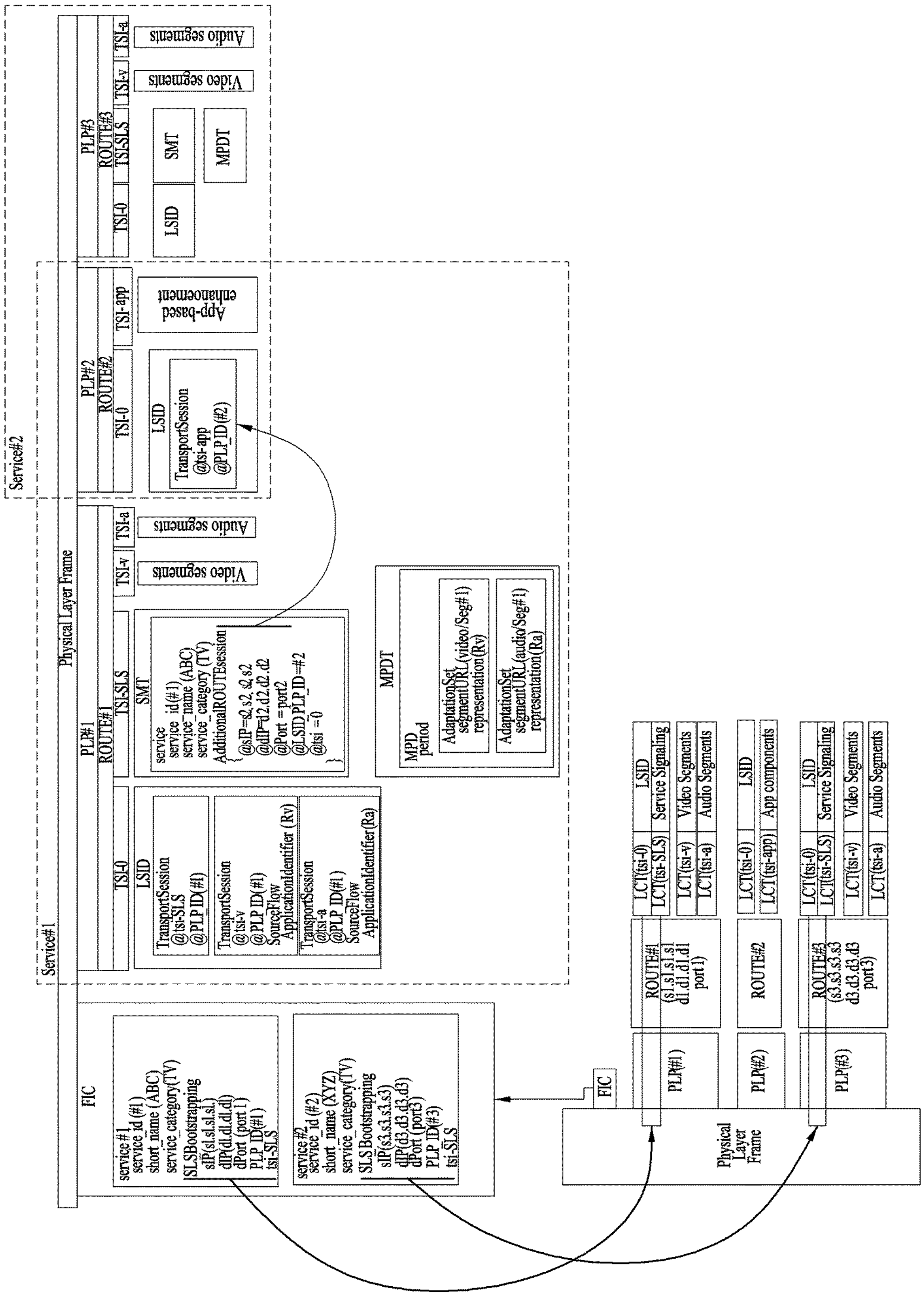
FIG. 52 illustrates a process of acquiring a service delivered through only a broadcast network according to another embodiment of the present invention (a plurality of ROUTE sessions)

FIG. 52 illustrates a process of acquiring a service delivered through only a broadcast network according to another embodiment of the present invention (a plurality of ROUTE sessions).

As described above, one service may be delivered through a plurality of transport sessions. A broadcast service can be delivered through a plurality of ROUTE sessions or a plurality of MMTP sessions. According to an embodiment, a broadcast service may be delivered according to a combination of two protocols.

In this case, the STSID can include information about an additional ROUTE session, as described above. Here, the additional ROUTE session is a ROUTE session other than the ROUTE session through which SLS is delivered and may refer to a ROUTE session through which service data of the corresponding service is delivered.

As described above, the STSID can include IP/UDP information of an additional ROUTE session and tsi information of an LCT session which delivers a service component of the corresponding service in the additional ROUTE session. In addition, the STSID can provide the ID of a PLP through which the service component is delivered. The service data delivered through the additional ROUTE session can be acquired through the STSID.

When the aforementioned SMT is used, information provided by the STSID can be provided by the SMT. According to an embodiment, the service data delivered through the additional ROUTE session may be optional service data in service rendering.

In the illustrated embodiment, a path through which SLS of service #1 delivered can be acquired through the SLT. A transport path of a service component (App component of ROUTE#2) delivered through the additional ROUTE session as well as the corresponding ROUTE session can be recognized using the SLS of service #1. In the illustrated embodiment, the LSID describes LCT sessions of the additional ROUTE session. However, the LSID may not be needed according to an embodiment, as described above. Instead, STSID of ROUTE#1 can describe a transport path of a service component of the corresponding service, which is delivered through ROUTE#2. The STSID can describe information about an LCT session of ROUTE#2, through which the service component of the corresponding service is delivered.

Service #2 of the SLT can also use the App component delivered through ROUTE#2. In this case, STSID of service #2, delivered through ROUTE#3, can describe a transport path of the App component delivered through ROUTE#2.

Figure 53:
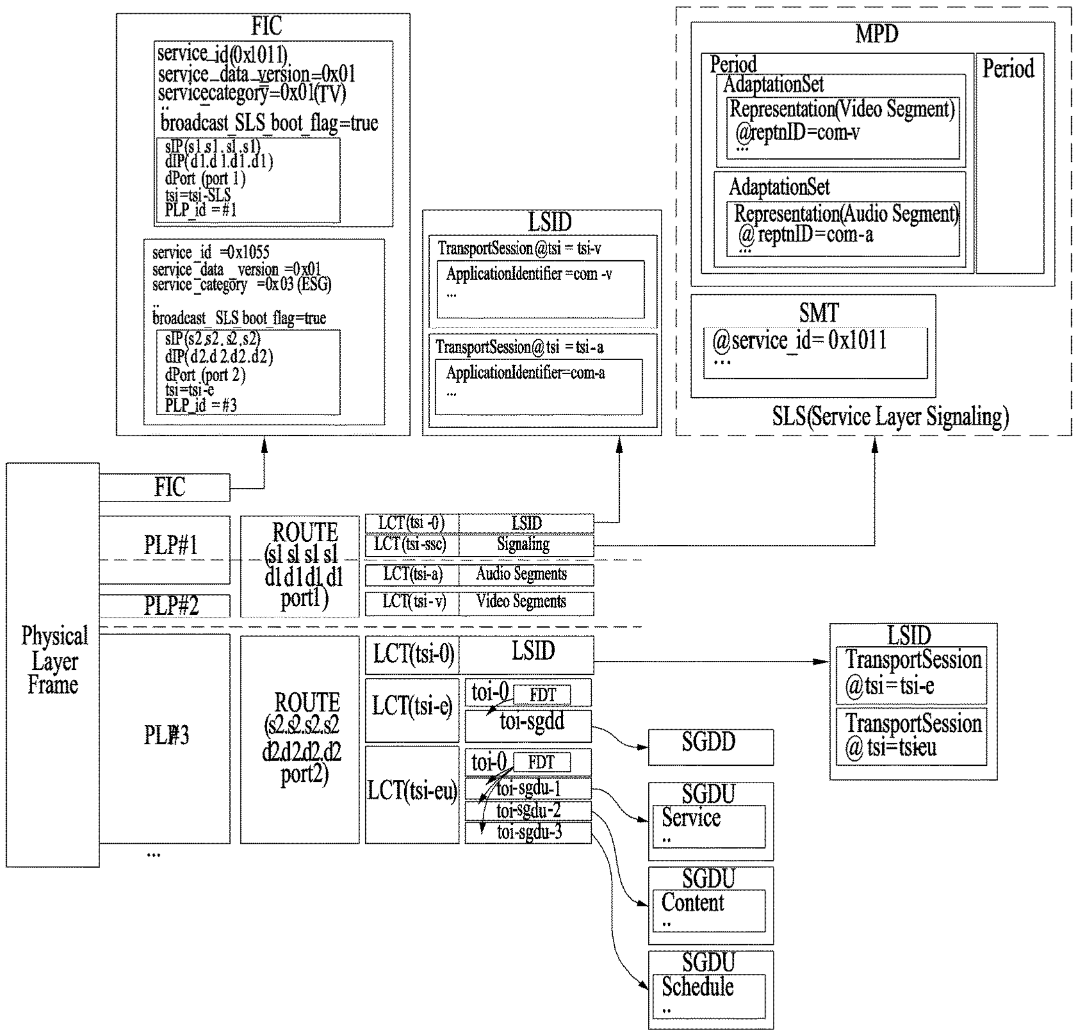
FIG. 53 illustrates a process of bootstrapping ESG information through a broadcast network according to another embodiment of the present invention.

FIG. 53 illustrates a process of bootstrapping ESG information through a broadcast network according to another embodiment of the present invention.

The ESG information can be delivered through a broadcast network or a broadband network. When the ESG information is delivered through the broadcast network, the ESG information can be delivered in the form of a service.

In the illustrated embodiment, an ESG service (service ID=0x1055) can be delivered through a ROUTE session delivered through PLP#3. LCT sessions which deliver the ESG service can be identified through SLS of the ROUTE session. The ESG information may include SGDD and SGDU in the present embodiment. However, the ESG information may be configured in various formats by the designer.

The SLS can indicate LCT sessions which deliver SGDD and LCT sessions which deliver SGDUs. An FDT can be delivered through an LCT packet corresponding to TOI=0 in the LCT sessions. The TOI of a transport object which delivers SGDD can be identified through the FDT of the LCT session which delivers the SGDD. The TOIs of transport objects which deliver desired SGDUs can be identified through an FDT of LCT sessions in which the SGDUs are delivered. The receiver can acquire an ESG through the TOIs.

In a normal case in which an ESG is not composed of SGDD and SGDU, the SLS can identify LCT sessions in which ESG pieces are delivered. The receiver can acquire the ESG pieces through the LCT sessions and acquire the whole ESG information using the ESG pieces.

When an ESG is delivered through a broadcast network, the ESG may be delivered through methods other than the illustrated embodiment.

Figure 54:
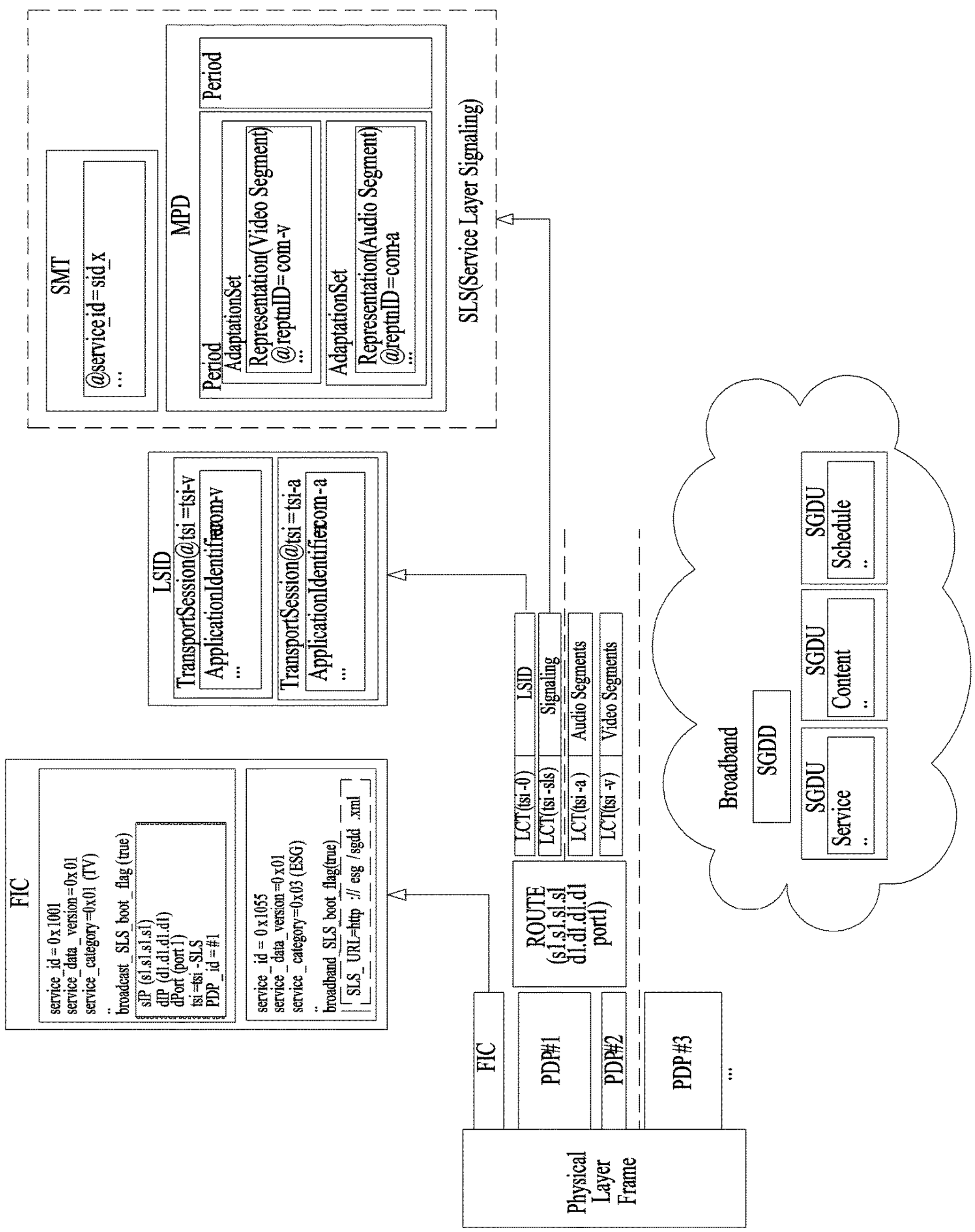
FIG. 54 illustrates a process of bootstrapping ESG information through a broadband network according to another embodiment of the present invention.

FIG. 54 illustrates a process of bootstrapping ESG information through a broadband network according to another embodiment of the present invention.

When the ESG information is delivered through the broadband network, the SLT can provide information for bootstrapping the ESG information. As described above, the SLT can include URL information for receiving the ESG. The SLT can include inetLoc element. The inetLoc element can provide URL information related to services. The inetLoc element can have @urlType attribute. @urlType attribute can indicate the type of a URL provided by the inetLoc element. @urlType attribute indicates that the corresponding URL is the URL of an ESG server for receiving the ESG, and the inetLoc element can include URL information of the ESG server. The inetLoc element may correspond to the aforementioned InetSigLoc element.

The receiver can send a request for the ESG information to the ESG server using the URL information provided by the SLT. According to an embodiment, the ESG may include SGDD and SGDU. The receiver can acquire the ESG information through the SGDD and SGDU. The request sent to the ESG server can be defined in various manners according to embodiments.

Figure 55:
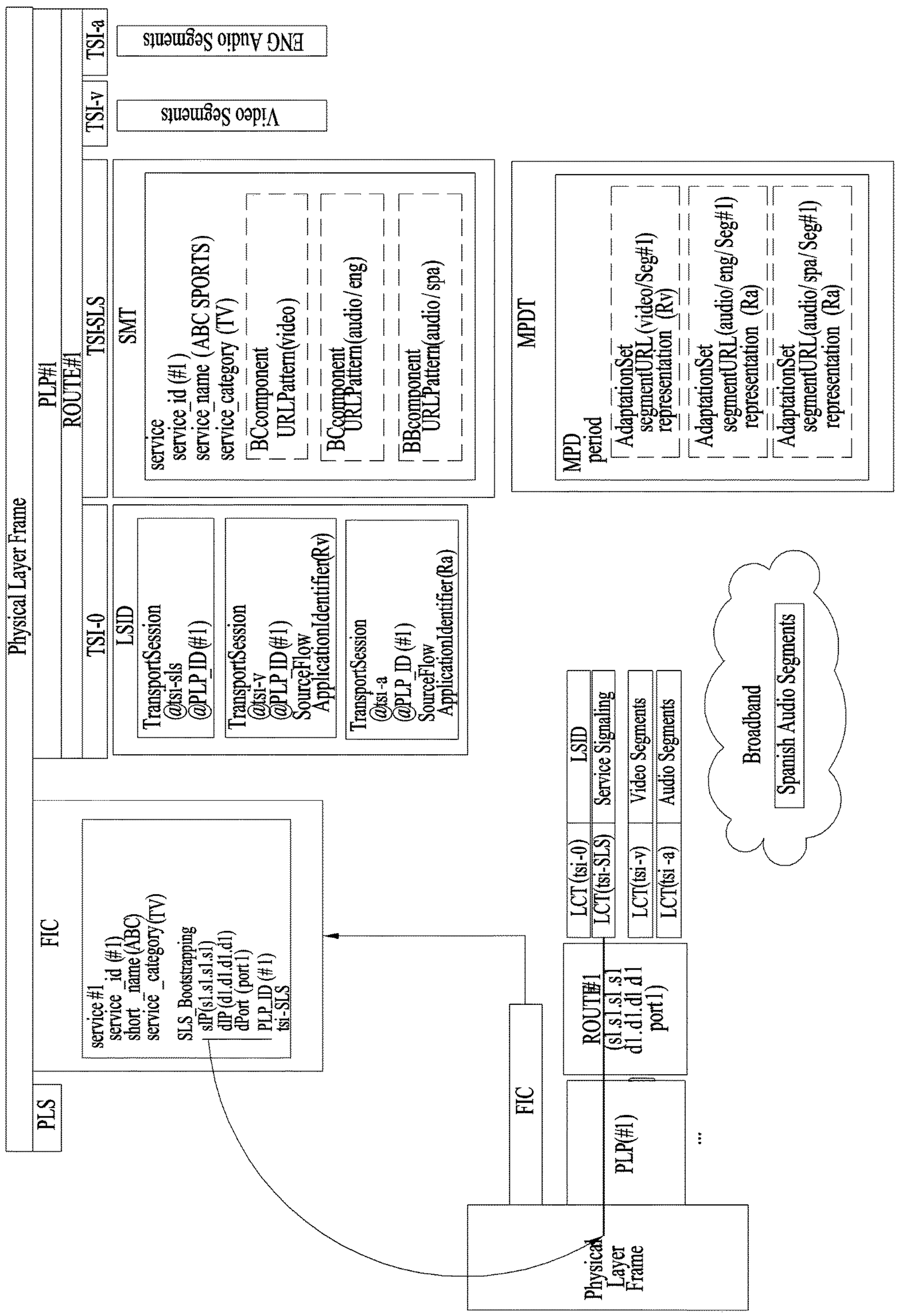
FIG. 55 illustrates a process of acquiring services delivered through a broadcast network and a broadband network according to another embodiment of the present invention (hybrid)

FIG. 55 illustrates a process of acquiring services delivered through a broadcast network and a broadband network according to another embodiment of the present invention (hybrid).

Two or more audio components according to different languages may be delivered through different transport paths. For example, an English audio component can be delivered through the broadcast network and a Spanish audio component can be delivered through the broadband network. The STSID can describe all components delivered through the broadcast network. A ROUTE client can acquire a desired component through the STSID. In a case using the LSID, the LSID can substitute for the STSID.

In addition, the USBD can include base URL pattern information of segments delivered through the broadcast network and base URL pattern information of segments delivered through the broadband network, as described above. When a DASH client requests a segment, the middleware of the receiver can describe which segment is delivered through the broadcast network and which segment is delivered through the broadband network using the base URL pattern information. The middleware can be aware of whether to send a request for the corresponding segment to the remote broadband server or to detect the corresponding segment from data that has been delivered or will be delivered through the broadcast network. In a case of using the SMT, the SMT can substitute for the USBD.

A service component delivered through the broadcast network can be acquired by filtering a specific LCT session according to SLS. A service component delivered through the broadband network can be acquired by sending a request for corresponding segments to the remote server. In the present embodiment, the Spanish audio component may need to be played due to user preference change while the English audio component delivered through the broadcast network is provided to the user. In this case, the receiver can receive the Spanish audio component from the server (or may have received the Spanish audio component from the server) and provide the Spanish audio component to the user.

Figure 56:
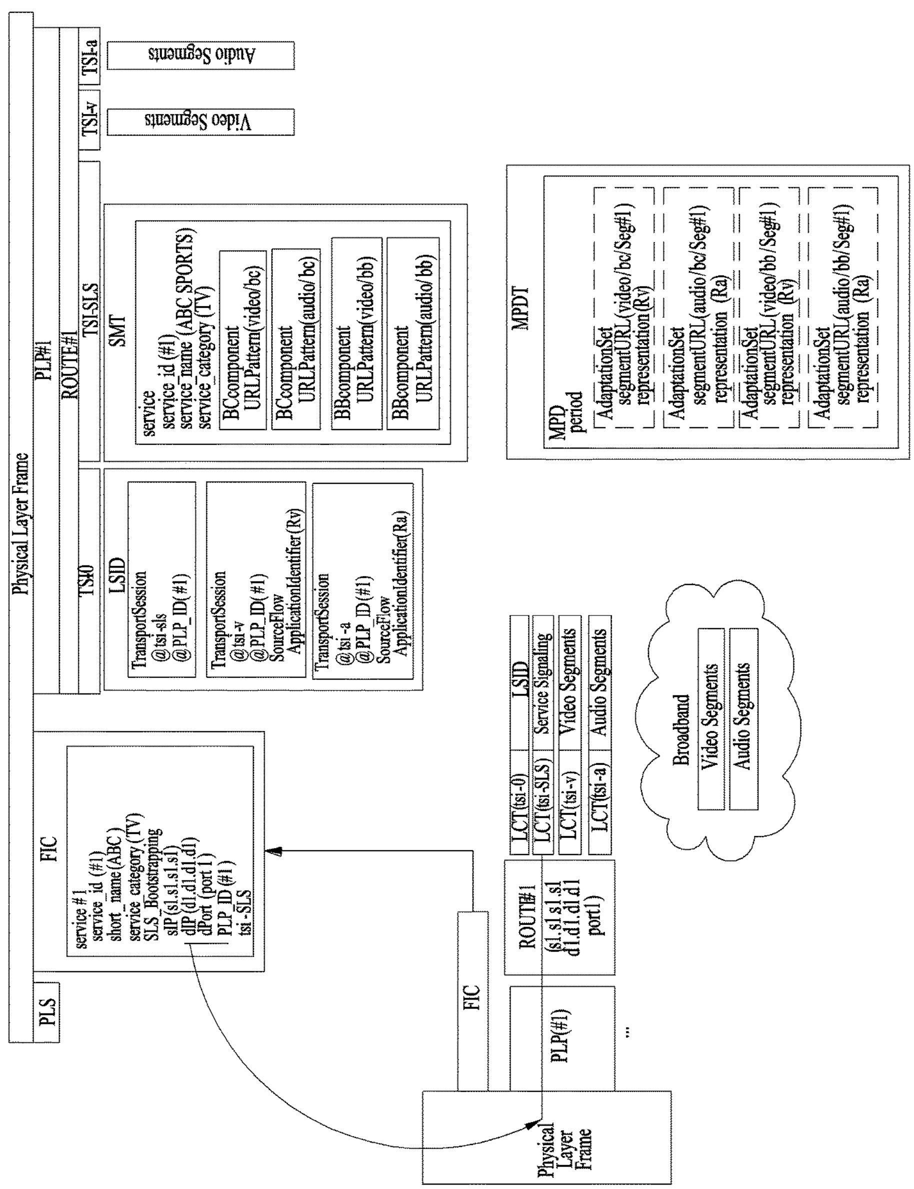
FIG. 56 illustrates a signaling process in a handoff state according to another embodiment of the present invention.

FIG. 56 illustrates a signaling procedure in a handoff situation according to another embodiment of the present invention.

The receiver may need to perform a handoff operation. For example, while a service is provided through a broadcast network, the receiver may have difficulty in receiving the service due to reception environment change. In this case, the receiver can switch reception through the broadcast network to reception through a broadband network. If the reception environment is enhanced, the receiver can receive the service through the broadcast network.

Such handoff operation can be performed using signaling information of the USBD. The USBD can describe which component is delivered through the broadcast network and which component is delivered through the broadband network, as described above. When a specific service component provided through the broadcast network can be acquired even through the broadband network, the middleware of the receiver can switch the reception path to the broadband network and receive the specific service component therethrough. In a case of using the SMT, the SMT can substitute for the USBD.

Figure 57:
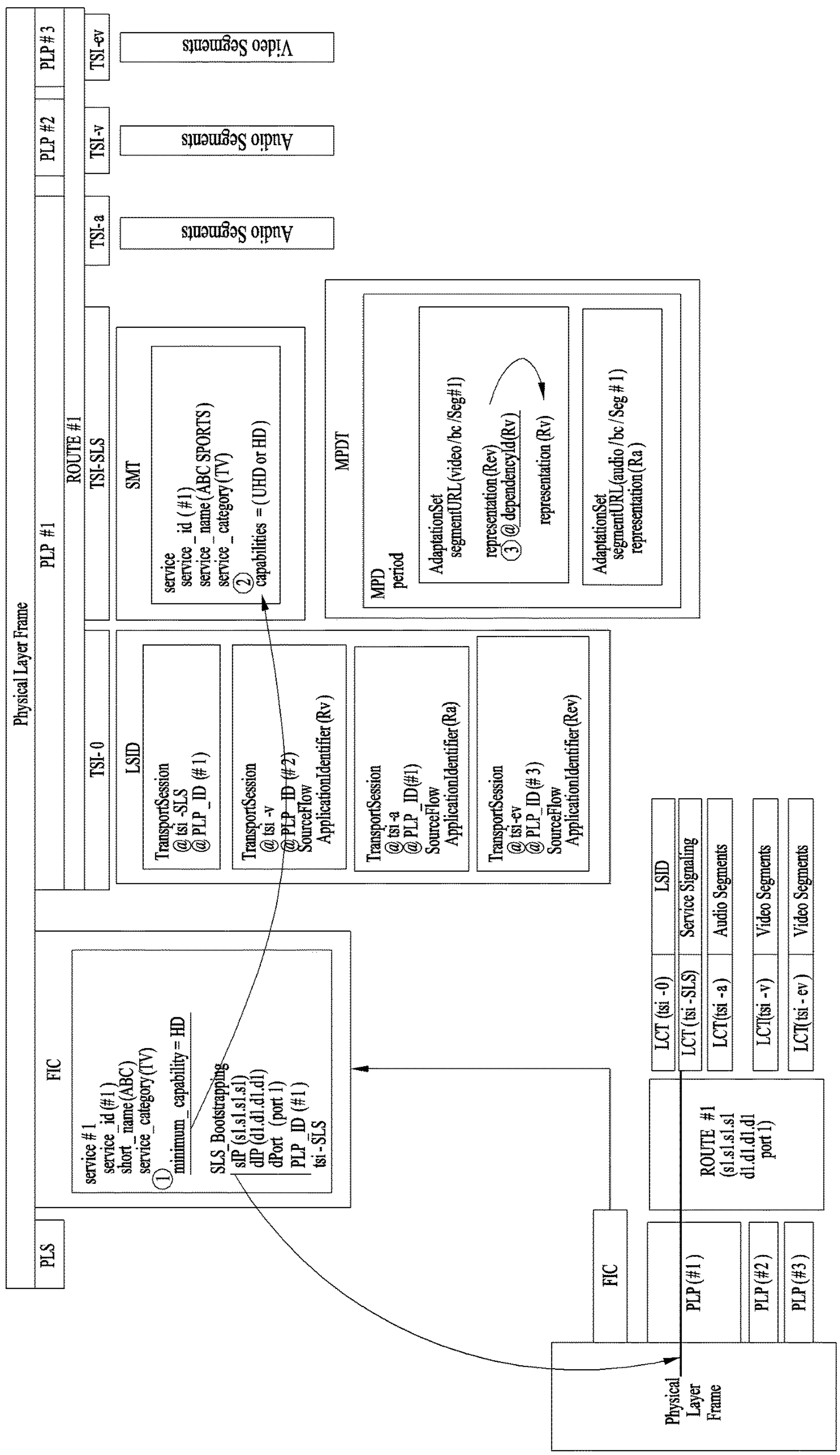
FIG. 57 illustrates a signaling process according to scalable coding according to another embodiment of the present invention.

FIG. 57 illustrates a signaling procedure according to scalable coding according to another embodiment of the present invention.

The USBD can describe all capabilities necessary to render a corresponding broadcast service. For example, video resolution can be essential capability for decoding a video service. Accordingly, the USBD can provide video resolution capability information about the corresponding service. The USBD may provide other capability information (audio, closed captioning and application) related to the corresponding service.

According to an embodiment, the capability information of the USBD may have a value of "HD or UHD" for video resolution. This value may mean that the receiver needs to be able to process HD or UHD in order to significantly present the corresponding service. In addition, this value may mean that the corresponding broadcast service can be provided in HD or UHD. In a case of using the SMT, the SMT can substitute for the USBD with respect to this function.

The receiver may need to know which service component should be selected to provide the service in specific video resolution. Information for selecting the service component can be provided by the MPD. The receiver can be aware of which service component needs to be selected to provide the service in HD using information of the MPD. Similarly, the receiver can be aware of which service component needs to be selected to provide the service in UHD. As described above, the MPD includes information related to presentation of each service component and may have information about properties of each representation.

According to an embodiment, the USBD may provide minimum capability information necessary to significantly present the corresponding service rather than providing all capabilities. In this case, a video resolution capability value can be "HD" in the corresponding embodiment.

According to an embodiment, the SLT can also provide capability information. The capability information of the SLT can include all capabilities necessary to significantly present all services described by the SLT. According to an embodiment, for each service, the capability information of the SLT may include all capabilities necessary to significantly present each service. According to an embodiment, the capability information of the SLT may include minimum capability information necessary to significantly present all services described by the SLT. According to an embodiment, for each service, the capability information of the SLT may include minimum capability information necessary to significantly present each service.

When minimum capability information is provided by the SLT or USBD, if the value thereof is "HD", a receiver capable of providing HD and a receiver capable of providing UHD can include the corresponding service/services in the channel map. A receiver capable of providing only, video resolution lower than HD may not include the corresponding service/services in the channel map.

FIG. 58 illustrates query terms for a signaling table request according to an embodiment of the present invention, Referring to FIG. 58, "?tableSLS", "?table=SMT", "?table=SLSIDT" and "?table=UST" as query terms can be respectively used to request "SLS set", "SMT", "SLSIDT" and "UST". Here, the SLS set refers to a service layer signaling set including the SMT, SLSIDT and UST. According to an embodiment of the present invention, the SMT can execute the same functions as the USBD and/or STSID and the SLSIDT can execute the same function as the STSID.

According to an embodiment of the present invention, a base URL can be extended by one of the aforementioned query terms. That is, the base URL to which one of the aforementioned query terms has been affixed can identify one of the aforementioned signaling tables and indicate a requested signaling table.

As described above, the SLT can include an SLS_url element which indicates the URL of service layer signaling (SLS). According to an embodiment of the present invention, the URL indicated by SLS_url can include the aforementioned query terms.

According to an embodiment of the present invention, SLS_url element is included in each service since this element is included in the SLT service level. Since all pieces of signaling information indicated by SLS_url element belong to one service, service_id may not be included in query terms for requesting the SLSIDT and/or the UST.

FIG. 59 illustrates a configuration of service LCT session instance description (SLSID) according to an embodiment of the present invention.

The SLSID according to an embodiment of the present invention is service layer signaling and may correspond to a service signaling table. The SLSID may be included in the same ALC/LCT session as the ALC/LCT session in which SLS is delivered and transmitted. One SLSID may group components by a ROUTE session. Accordingly, the corresponding IP address and port may not appear more than once in the SLSID. Furthermore, when only one ROUTE session is present in the SLSID, the IP address and port may not be present in the SLSID since the IP address and port are included in the SLT (FIT).

According to an embodiment of the present invention, the initial ROUTE session for a service may be a ROUTE session including SLS.

According to an embodiment of the present invention, the SLSID may be included in the SLS. That is, the SLSID is a signaling table for the service.

According to an embodiment of the present invention, the SLSID may serve as STSID.

SLSID elements according_to an embodiment of the present invention may include @svcID, @version, @validFrom, @expires and/or an RS element.

@svcID indicates a service ID and corresponds to service_id field of the SLT (FIT). That is, this field can be used as information for connecting the SLSID and the SLT.

According to another embodiment of the present invention, @svcID can refer to the service element of USD. That is, this field can be used as information for connecting the SLSID and the USD and the value of this field can refer to a service having a serviceId value corresponding to the value of this field.

@version indicates the version of the SLSID. The receiver can recognize whether the SLSID has been changed using this field.

@validFrom indicates a date and time from which the SLSID is valid.

@expires indicates a date and time when the SLSID expires.

One or more RS elements may be included in one SLSID, and one RS element includes information about one ROUTE session.

The RS element according to an embodiment of the present invention may include @bsid, @sIpAddr, @dIpAddr, @dport, @PLPID and/or an LS element.

@bsid indicates the ID of a broadcast stream. This field indicates the ID of a broadcast stream through which a ROUTE session is delivered. When the value of this field is not present, a broadcast stream set to a default value may be the current broadcast stream. That is, the broadcast stream through which the SLSID is delivered can be set to the default value. That is, this field indicates the ID of a broadcast stream which delivers a content component of a broadcastAppService element. The broadcastAppService element is included in the USD and indicates a DASH representation including a media component belonging to the corresponding service. When the value of this field is not present, a broadcast stream set to the default value may be a broadcast stream having a PLP through which an SLS fragment for the corresponding service is delivered. The value of this field may correspond to the value of @bsid of the SLT.

@sIpAddr indicates the source IP address of a ROUTE session. When the value of this field is not present, a source IP address set to a default value may be the IP address of the current ROUTE session. That is, the IP address of the ROUTE session in which the SLSID is delivered can be set to the default value. When the corresponding ROUTE session is not a primary session, the value of @sIpAddr must be present. The primary session indicates the ROUTE session in which SLS is delivered.

@dIpAddr indicates the destination IP address of the ROUTE session. When the value of this field is not present, a destination IP address set to a default value may be the IP address of the current ROUTE session. That is, the IP address of the ROUTE session in which the SLSID is delivered can be set to the default value. When the corresponding ROUTE session is not a primary session, the value of @dIpAddr must be present. The primary session indicates the ROUTE session in which SLS is delivered.

@dport indicates the destination port of the ROUTE session. When the value of this field is not present, a destination port set to a default value may be the destination port of the current ROUTE session. That is, the destination port of the ROUTE session in which the SLSID is delivered can be set to the default value. When the corresponding ROUTE session is not a primary session, the value of @dIpAddr must be present. The primary session indicates the ROUTE session in which SLS is delivered.

@PLPID indicates the ID of a PLP for the ROUTE session. When the value of this field is not present, a PLP ID set to a default value indicates the IP of the current PLP. That is, the ID of the PLP through which the SLSID is delivered can be set to the default value.

One or more LS elements may be included in one RS element, and the LS element includes information about an LCT channel.

The LS element according to an embodiment of the present invention may include @tsi, @PLPID, @bw, @startTime, @endTime, a SrcFlow element and/or a RprFlow element.

@tsi indicates the TSI value of the LCT channel.

@PLPID indicates the ID of a PLP in which the LCT channel is transmitted. The value of this field can override @PLPID included in the RS element.

@bw indicates the maximum bandwidth of the LCT channel.

@startTime indicates a start time.

@endTime indicates an end time.

The SrcFlow element indicates a source flow.

The RprFlow element indicates a repair flow.

The SrcFlow element according to an embodiment of the present invention may include @nrt, @minBuffSize, @appID, an EFDT element, a payload element and/or an FECParams element. The SrcFlow element according to another embodiment of the present invention may further include a ContentInfo element.

The ContentInfo element can provide additional information which can be mapped to an application service delivered through the corresponding transport, session. For example, this element can provide representation ID of DASH content and/or Adaptation Set parameters of DASH Media Representation for selection of an LCT channel for rendering.

@nrt indicates whether content is RT content or NRT content. When this field is not present, the content is RT content. When this field is present, the content is NRT content. According to another embodiment of the present invention, @rt instead of @nrt can be included in the SrcFlow element. When @rt is not present, the corresponding content is not RT content. When the corresponding SrcFlow element delivers streaming media, @rt is present and can be set to “true”.

@minBuffSize indicates a minimum buffer size necessary to process data. This field can indicate a minimum size value of kilobytes of a receiver dedicated buffer for LCT channels. This field can have a value of “true” when @nrt is not present or when @rt is present.

@appID indicates the application ID of content delivered through the corresponding LCT channel. For example, this field can indicate the ID of DASH representation.

The EFDT element indicates an extended FDT instance. When an EFDT is provided, the EFDT element contains details of file delivery data included in the format of EFDT instance including FDT instance parameters. The EFDT element may be provided or included as a reference. When the EFDT element is provided as a reference, the EFDT element can be updated independently of signaling metadata. When the EFDT element is referred to and transmitted as an invent object of a source flow delivered through an LCT channel separate from the LCT channel through which the signaling metadata is delivered, the TOI of the EFDT can be 0. When the referred EFDT is delivered through an LCT channel different from an LCT channel through which content that refers to the SrcFlow element is delivered, the TOI of the EFDT can be 1.

The Payload element indicates information about payloads of ROUTE packets which deliver objects of the source flow, codepoint field of an LCT header can be mapped to a packet payload format.

The FECParams element may include FEC encodingid and instanceid. The FECParams element defines parameters of FEC schema associated with the corresponding source flow. This element can use the format of FEC Object Transmission Information. FEC parameters can be applied to Source FEC Payload ID in a ROUTE (ALC) packet header.

The EFDT element according to an embodiment of the present invention may include @idref, @version, @maxExpiresDelta, @maxTransportSize, @fileTemplate and/or FDT Parameters element. According to another embodiment of the present invention, the EFDT element may further include @tsi @tsi indicates the TSI of an LCT channel through which the referred EFDT is delivered.

@idref indicates the URI of the EFDT in the case of in-band delivery. That is, when the EFDT is delivered in-band along with the source flow as a reference delivery object, this field indicates the EFDT ID in URI format.

@version indicates the version of the EFDT. That is, this field indicates the version of an EFDT instance descriptor and the value thereof increases by 1 whenever the EFDT instance descriptor is updated. A received EFDT having the highest version number may be a currently valid version.

@maxExpiresDelta indicates expiration time of the related EFDT. When @maxExpiresDelta is added to wall clock time in the receiver, this field indicates a time interval having an integer value in seconds when the receiver acquires the first ROUTE packet which delivers an object described by the EFDT. When @maxExpiresDelta is not present, the EFDT expiration time can be obtained by adding a) to b). Here, a) is the value of the ERT field in EXT_TIME header of the corresponding ROUTE packet and b) is the time when the receiver parses the header of the ROUTE packet.

@maxTransportSize indicates a maximum transport size of objects in the EFDT. That is, this field indicates a maximum transport size of objects described by the EFDT. This field can exist if not present in FEC_OTI.

@fileTemplate can map an LCT TOI to the URI of an object. This field can indicate a template format for derivation of a file URL or a file URI. This field may have the format of an element.

The FDTParameters element indicates parameters permitted in a FLUTE FDT.

The Payload element according to an embodiment of the present invention may include @codePoint, @formatID, @frag, @order and/or @srcFecPayloadID.

@codePoint indicates the same value as the value of CP (codepoint) field in the LCT header. This field indicates numerical representation of combinations of values of lower elements and attributes of the Payload element.

@formatID indicates the payload format of a delivery object.

@frag indicates a fragmentation code. This field includes unsignedByte value which indicates how payloads of ROUTE packets delivering objects of the corresponding source flow are fragmented for delivery. When the value of this field is 0, this indicates "arbitrary" which represents that a ROUTE packet payload delivers a neighboring part of a delivery object. Here, delivery object fragmentation may occur at arbitrary byte boundaries. When the value of @frag is 1, this indicates "application specific (sample based)" which represents that the ROUTE packet payloads deliver one or more pieces of media data having a complete sample format. The term "sample" is defined in ISO/IEC 1449612. Use of this value is related to MDE mode. Here, a packet can robustly deliver an MDE data block including samples stored in 'mdat' box. When the value of @frag is 2, this indicates "application specific (a collection of boxes)" which represents that the ROUTE packet payloads include complete data content of one or more boxes. The term "box" is defined in ISO/IEC 1449612. Use of this value is related to MDE mode. Here, each packet can deliver a part of an MDE data block starting with RAP and deliver a part of an MDE data block including boxes containing metadata. The metadata can include styp, sidx, moof and/or subordinate boxes included in these boxes. A value of @frag, 3127, may be reserved for future use and 128255 may be reserved for proprietary use. This field may have a default value of 0.

@order indicates whether the payloads of the ROUTE packets which deliver the objects of the source flow, like DASH segments, are transmitted in generation order according to a DASH encoder and how the payloads are transmitted. When the value of this field is 0, this indicates "arbitrary". In this case, the packets deliver part of DASH segments. Here, the order of DASH segments may be related to part of the same DASH segments delivered by other packets. When the value of @order is 1, this indicates "inorder delivery", and concatenation of payloads of neighboring packets which deliver one DASH segment may have the same order as segments generated by the DASH encoder. When the value of @order is 2, this indicates inorder delivery of media samples and prior to movie fragment box, and concatenation of payloads of neighboring packets which deliver media samples of one movie fragment may have the same order as samples generated by the DASH encoder. Here, the packets may be transmitted prior to packets which deliver the movie fragment box and moof. The value of 2 can be used in the MDE mode. A value of this field, 3127, may be reserved for future use and 128255 may be reserved for proprietary use. This field may have a default value of 0.

@srcFecPayloadID indicates the format of the source FEC payload ID. When this field has a value of 0, the source FEC payload ID is not present and all delivery objects are included in the corresponding packet. Here, the FECParams element may not be present. When this field has a value of 1, the source FEC payload ID may have a 32-bit unsigned integer value which represents a start offset in objects. The start offset indicates the position of a start byte of the next one/neighboring one of delivery objects transmitted in the current ROUTE packet. When this field has a value of 2, the FECParams element can define the format of the source FEC payload ID. This field has a default value of 1.

FIG. 60 illustrates a configuration of broadband_location_descriptor according to an embodiment of the present invention.

According to an embodiment of the present invention, descriptors may be included in descriptor loops of signaling tables (e.g., SLT and SLS) in order to provide additional information. The descriptors can be identified by descriptor_tag. The receiver can recognize that descriptors can be present in descriptor loops of signaling tables.

Broadband_location_descriptor according to an embodiment of the present invention can provide the URL of a resource when the resource can be used in a broadband network environment.

Broadband_location_descriptor according to an embodiment of the present invention may include descriptor_tag, descriptor_length, url_length and/or url_bytes. The descriptor_tag indicates information for identifying the descriptor. The descriptor_length indicates the length of the descriptor. The url_length indicates the length of the URL of the descriptor. The url_bytes indicates the URL of the descriptor.

According to an embodiment of the present invention, when the descriptor is included in an SLT (FIT) and delivered, the URL of the descriptor can indicate the URL of SLS. Each character of the URL can be encoded according to UTF8. The URL can be used by a query term. According to an embodiment of the present invention, a base URL can be extended by one of query terms which will be described later. That is, the base URL to which one of the query terms which will be described later has been affixed can identify one of the aforementioned signaling tables and indicate a requested signaling table.

According to an embodiment of the present invention, when the descriptor is included in a service level descriptor loop and delivered, the descriptor can indicate a URL through which SLS belonging to the corresponding service can be acquired from broadband connection. When broadcast stations want different SLS URLs for respective services, this descriptor can be used. In this case, an optional string svc following a query string may not be used.

According to an embodiment of the present invention, when the descriptor is included in a PLP level descriptor loop (FIC level descriptor loop) and delivered, the descriptor can provide a URL through which the receiver can acquire SLS through a broadband network for all services described in the corresponding PLP. In this case, the optional string svc can be used, and the receiver can request SLS for a specific service when a svc query string is added to the end of a query term. The query term is shown in FIG. 61.

FIG. 61 illustrates query terms for a signaling table request according to another embodiment of the present invention.

Referring to FIG. 61, query terms "?tableSLS", "?table=SMT", "?table=SLSIDT" and "?table=UST" can be respectively used to request "SLS Set", "SMT", "SLSIDT" and "UST". Here, the SLS set represents a service layer signaling set including the SMT, SLSIDT, UST, etc. According to an embodiment of the present invention, the SMT can execute the same functions as the USBD and/or STSID and the SLSIDT can execute the same function as the STSID.

According to an embodiment of the present invention, a signaling table for a specific service can be requested by adding the optional string svc to the end of a query term. For example, when S_LSIDT for a service having a specific service_id is requested, a query term such as "?table=UST [svc=<service_id>]" can be used as shown in the figure.

Figure 62:
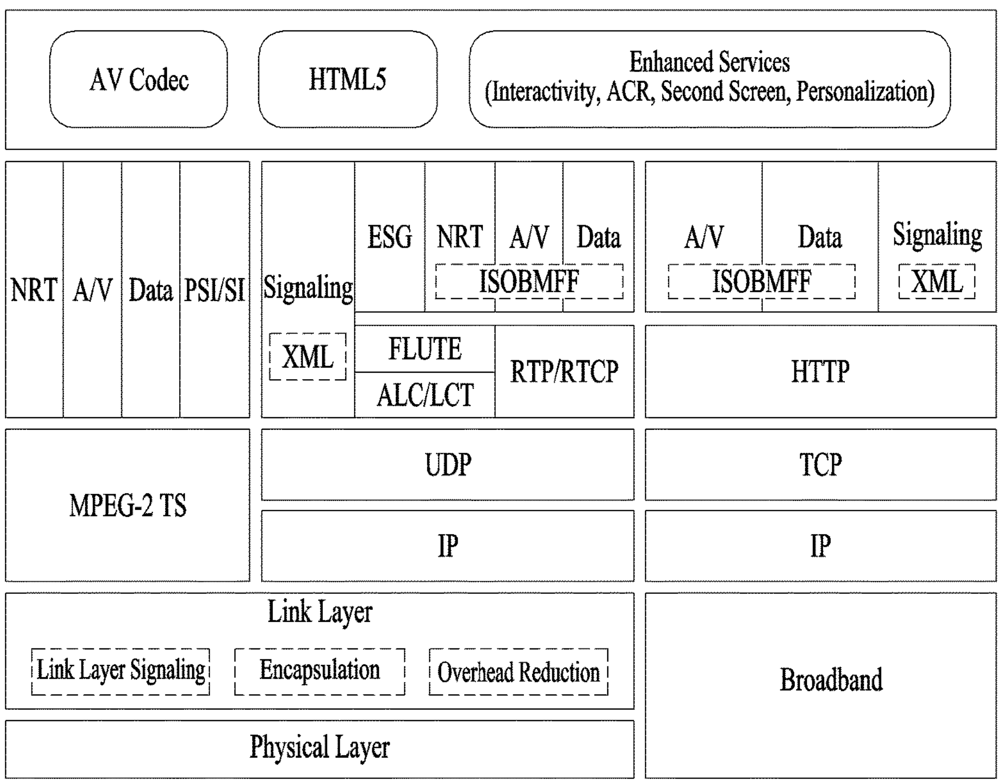
FIG. 62 illustrates a protocol stack for future broadcast systems according to an embodiment of the present invention.

FIG. 62 illustrates a protocol stack for a future broadcast system according to an embodiment of the present invention.

The broadcast system according to the present invention may correspond to a hybrid broadcast system based on a combination of an IP centric broadcast network and a broadband network.

The broadcast system according to the present invention may be designed to maintain compatibility with existing MPEG2 based broadcast systems.

The broadcast system according to the present invention may correspond to a hybrid broadcast system based on a combination of an IP centric broadcast network, a broadband network and/or a mobile communication network (or cellular network).

Referring to FIG. 62, the physical layer can use a physical protocol employed by broadcast systems such as an ATSC system and/or a DVB system. For example, in the physical layer according to the present invention, a transmitter/receiver can transmit/receive terrestrial broadcast signals and convert transport frames including broadcast data into appropriate forms.

In the encapsulation layer, IP datagrams are acquired from information obtained from the physical layer or the acquired IP datagrams are converted into a specific frame (e.g., RS Frame, GSElite, GSE or signal frame). Here, the frame may include a set of IP datagrams. For example, in the encapsulation layer, the transmitter includes data processed in the physical layer in a transport frame or the receiver extracts MPEG2 TS and IP datagrams from a transport frame acquired from the physical layer.

A fast information channel (FIC) includes information (e.g. information on mapping between service IDs and frames) for accessing services and/or content. The FIC may be called a fast access channel (FAC).

The broadcast system according to the present invention may use protocols such as IP (Internet Protocol), UDP (User Datagram Protocol), TCP (Transmission Control Protocol), ALC/LCT (Asynchronous Layered Coding/Layered Coding Transport), RCP/RTCP (Rate Control Protocol/RTP Control Protocol), HTTP (Hypertext Transfer Protocol) and FLUTE (File Delivery over Unidirectional Transport). Refer to the protocol stack shown in FIG. 62 for a stack of these protocols.

In the broadcast system according to the present invention, data can be transmitted in ISOBMFF (ISO base media file format). ESG (Electronic Service Guide), NRT (Non Real Time), A/V (Audio/Video) and/or normal data can be transmitted in ISOBMFF.

Delivery of data through a broadcast network may include delivery of linear content and/or delivery of nonlinear content.

Delivery of RTP/RTCP based A/V and data (closed captioning, emergency alert message and the like) may correspond to delivery of linear content.

An RTP payload can be delivered in the form of an RTP/AV stream including a NAL (Network Abstraction Layer) and/or in the form of being encapsulated in the ISO based media file format. Delivery of the RTP payload may correspond to delivery of linear content. Delivery in the form of being encapsulated in the ISO based media file format may include MPEG DASH media segments for A/V.

FLUTE based ESG delivery, nontimed data delivery and NRT content delivery may correspond to nonlinear content delivery. The ESG, nontimed data and NRT content may be delivered in the form of a MIME type file and/or in the form of being encapsulated in the ISO based media file format. Delivery in the form of being encapsulated in the ISO based media file format may include MPEG DASH media segments for A/V.

Delivery through a broadband network may be divided into delivery of content and delivery of signaling data.

Delivery of content includes delivery of linear content (A/V and data (closed captioning, emergency alert message and the like)) and delivery of nonlinear content (ESG, nontimed data and the like), MPEG DASH based media segment (A/V and data) delivery.

Delivery of signaling data may include delivery of signaling tables (including MPEG DASH MPD) delivered through a broadcast network.

The broadcast system according to the present invention can support synchronization between linear/nonlinear content delivered through a broadcast network or synchronization between content delivered through a broadcast network and content delivered through a broadband network. For example, when one piece of UD content is segmented and simultaneously delivered through a broadcast network and a broadband network, the receiver can adjust a timeline dependent on a transport protocol, synchronize the content delivered through the broadcast network with the content delivered through the broadband network and then reconfigure the one piece of UD content.

The application layer of the broadcast system according to the present invention can implement technical features such as interactivity, personalization, second screen, and ACR (automatic content recognition). Such features are important in extension of ATSC2.0 to ATSC3.0. For example, HTML5 can be used for interactivity.

In the presentation layer of the broadcast system according to the present invention, HTML and/or HTML5 may be used to specify spatial and temporal relationships between components or interactive applications.

In the present invention, signaling includes signaling information for supporting effective acquisition of content and/or services. Signaling data can be represented in binary or XML format and delivered through a terrestrial broadcast network or a broadband network.

Real-time broadcast A/V content and/or data can be represented in the ISO Base media File Format. In this case, the broadcast A/V content and/or data can be delivered through a terrestrial broadcast network in real time or delivered in non-real time on the basis of IP/UDP/FLUTE. Alternatively, the broadcast A/V content and/or data may be streamed or requested and received in real time using DASH (Dynamic Adaptive Streaming over HTTP) through the Internet. The broadcast system according to an embodiment of the present invention can provide various enhanced services such as an interactive service and a second screen service to viewers by combining the broadcast A/V content and/or data delivered in the aforementioned manners.

In a TS and IP based hybrid broadcast system, a link layer can be used to transmit TS or IP stream type data. The link layer can convert various types of data into a format supported by a physical layer and deliver the converted data to the physical layer when the data needs to be delivered through the physical layer. Accordingly, various types of data can be delivered through the same physical layer. Here, the physical layer may refer to a stage of interleaving, multiplexing and/or modulating data and delivering the data according to a transmission scheme such as MIMO/MISO.

The link layer needs to be designed to minimize the influence of configuration change of the physical layer on operation of the link layer. That is, it is necessary to decide operation of the link layer such that the link layer can be compatible with various physical layers.

The present invention provides a link layer which can independently operate without regard to types of upper layers and lower layers. Accordingly, various upper layers and lower layers can be supported. Here, upper layers refer to layers of TS or IP data streams and lower layers refer to physical layers. In addition, the present invention provides a link layer having a modifiable structure in which functions supportable by the link layer can be extended/added/deleted. Furthermore, the present invention provides a method of configuring an overhead reduction function in a link layer for efficient use of radio resources.

The illustrated protocols and layers such as IP (Internet Protocol), UDP (User Datagram Protocol), TCP (Transmission Control Protocol), ALC/LCT (Asynchronous Layered Coding/Layered Coding Transport), RCP/RTCP (Rate Control Protocol/RTP Control Protocol), HTTP (Hypertext Transfer Protocol) and FLUTE (File Delivery over Unidirectional Transport) have been described above.

In the figure, the link layer may be another embodiment of the aforementioned data link (encapsulation) part. The present invention provides the structure and/or operation of the link layer t88010. The link layer t88010 provided by the present invention can process signaling necessary for operations of link layers and/or physical layers. In addition, the link layer t88010 provided by the present invention can perform encapsulation of TS and IP packets and overhead reduction during encapsulation.

The link layer t88010 provided by the present invention may be called a data link layer, an encapsulation layer, layer 2 or the like. According to an embodiment, the link layer may be given a new name.

Figure 63:
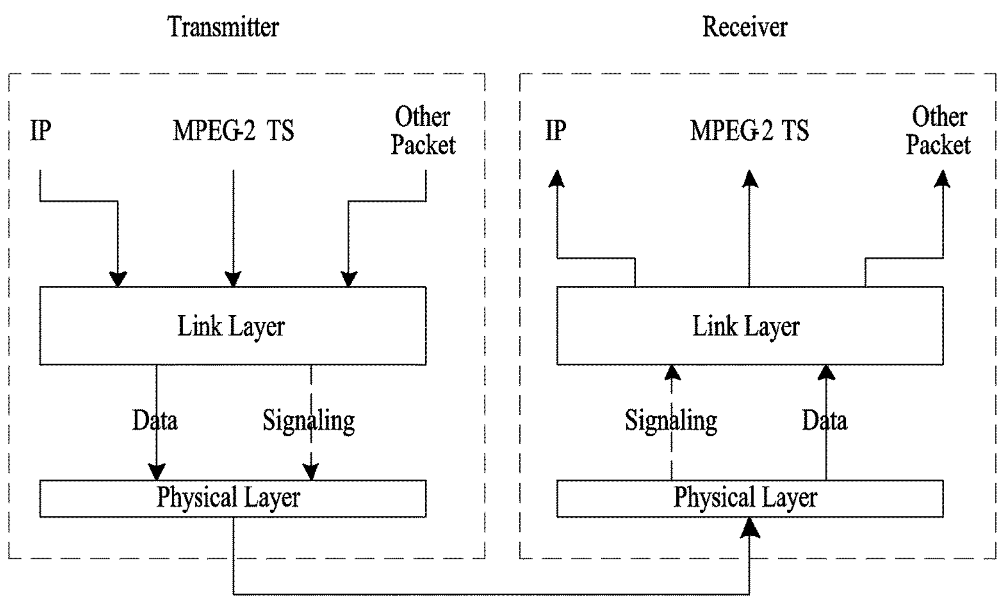
FIG. 63 illustrates a link layer interface according to an embodiment of the present invention.

FIG. 63 illustrates a link layer interface according to an embodiment of the present invention.

FIG. 63 shows a case in which a transmitter uses an IP packet and/or an MPEG2 TS packet used in digital broadcast as an input signal. The transmitter may support a packet structure in a new protocol available in future broadcast systems. Encapsulated data and/or signaling information of a link layer of the transmitter can be delivered to a physical layer. The transmitter can process the delivered data (including signaling data) according to a protocol of the physical layer, which is supported by the corresponding broadcast system, and transmit a signal including the data.

A receiver restores data and/or signaling information received from the physical layer into data that can be processed by an upper layer. The receiver can read a packet header and determine whether a packet received from the physical layer includes signaling information (or signaling data) or normal data (or content data).

The signaling information (i.e. signaling data) delivered from the transmitter may include: first signaling information that is received from an upper layer and needs to be delivered to an upper layer of the receiver; second signaling information that is generated in the link layer and provides information related to data processing in the link layer of the receiver; and/or third signaling information that is generated in the upper layer or the link layer and delivered to rapidly identify specific data (e.g. a service, content and/or signaling data) in the physical layer.

Figure 64:
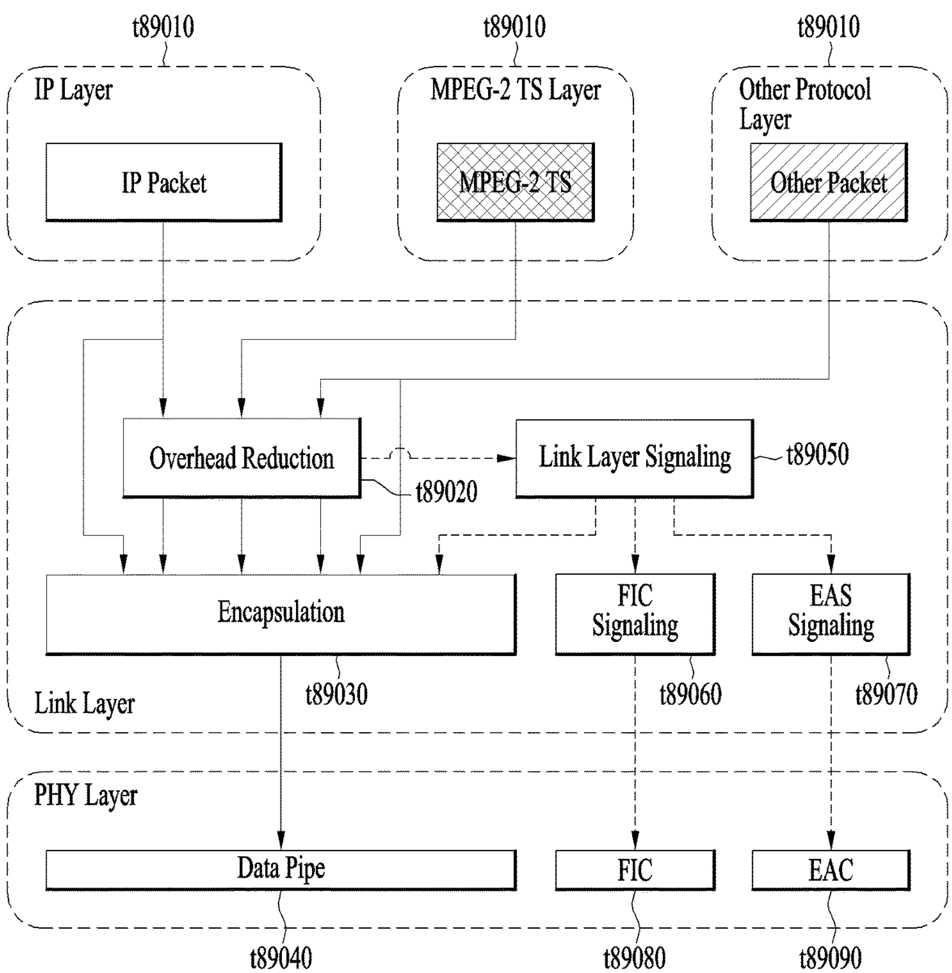
FIG. 64 illustrates operation of a normal mode from among operation modes of a link layer according to an embodiment of the present invention.

FIG. 64 is an operation diagram of a normal mode from among operation modes of the link layer according to an embodiment of the present invention.

The link layer provided by the present invention may have various operation modes for compatibility with upper layers and lower layers. The present invention proposes a normal mode and a transparent mode of the link layer. The two operation modes can coexist in the link layer and which mode is used can be designated using a signaling or system parameter. According to an embodiment, only one of the two modes may be implemented. Different modes can be applied according to an IP packet and a TS packet input to the link layer. Furthermore, different modes can be applied according to streams of an IP layer and streams of a TS layer.

According to an embodiment, a new operation mode may be added to the link layer. The new operation mode can be added on the basis of configurations of upper layers and lower layers. The new operation mode may include other interfaces on the basis of the configurations of the upper layers and lower layers. Whether the new operation is used may be designated using a signaling or system parameter.

In the normal mode, data can be processed through all functions supported by the link layer and then delivered to the physical layer.

Specifically, packets can be delivered to the link layer from an IP layer, an MPEG2 TS layer and/or another specific layer t89010. That is, an IP packet can be delivered to the link layer from the IP layer, an MPEG2 TS packet can be delivered to the link layer from the MPEG2 TS layer, and a specific packet can be delivered to the link layer from a specific protocol layer.

The packets delivered to the link layer can be encapsulated t89030 after passing through overhead reduction t89020 or without passing through overhead reduction.

Specifically, the IP packet can be encapsulated t89030 after passing through overhead reduction t89020 or without passing through overhead reduction. Whether overhead reduction is performed can be designated by a signaling or system parameter. According to an embodiment, overhead reduction may be performed or not be performed per IP stream. The encapsulated IP packet can be delivered to the physical layer.

The MPEG2 TS packet can be encapsulated t89030 after passing through overhead reduction t89020. According to an embodiment, overhead reduction may be omitted in processing of the MPEG2 TS packet. However, since the TS packet has a sync byte (0x47) at the head thereof in general, it may be efficient to remove such fixed overhead. The encapsulated TS packet can be delivered to the physical layer.

A packet other than the IP packet and the TS packet can be encapsulated t89030 after passing through overhead reduction t89020 or without passing through overhead reduction. Whether overhead reduction is performed can be determined according to characteristics of the packet. Whether overhead reduction is performed can be designated by a signaling or system parameter. The encapsulated packet can be delivered to the physical layer.

The size of an input packet can be reduced through an appropriate method during overhead reduction t89020. Specific information can be extracted or generated from the input packet during overhead reduction. The specific information is information related to signaling and can be transmitted through a signaling region. This signaling information is used for a receiver to restore the input packet to the original packet format by recovering changes in the packet during overhead reduction. The signaling information can be delivered through link layer signaling t89050.

The link layer signaling t89050 can perform delivery and management of signaling information extracted/generated during overhead reduction. The physical layer may have physically/logically separated transport paths for signaling. The link layer signaling t89050 may deliver signaling information to the physical layer according to the separated transport paths. Here, the separated transport paths may include FIC signaling t89060 and EAS signaling t89070. Signaling information which is not delivered through the transport paths can be delivered to the physical layer through encapsulation t89030.

Signaling information managed by link layer signaling t89050 may include signaling information delivered from an upper layer, signaling information generated in the link layer and/or system parameters. Specifically, the signaling information may include signaling information that is delivered from an upper layer and needs to be delivered to an upper layer of the receiver, signaling information that is generated in the link layer and needs to be used for operation of the link layer and signaling information that is generated in an upper layer or the link layer and used for rapid detection in the physical layer of the receiver.

Data encapsulated and delivered to the physical layer can be transmitted through a data pipe (DP) (t89040). Here, the DP may be a physical layer pipe (PLP). The aforementioned signaling information may be delivered through respective transport paths. For example, FIC signaling information can be delivered through a dedicated FIC t89080 in a physical frame. EAS signaling information can be delivered through a designated EAC t89090 in the physical frame. Information about presence of a specific channel such as the FIC or the EAC may be signaled in a preamble region of the physical frame and transmitted or signaled by scrambling a preamble using a specific scrambling sequence. According to an embodiment, FIC signaling/EAS signaling information may be delivered through normal DP regions, PLP regions or preambles instead of dedicated special channels.

The receiver can receive data and signaling information through the physical layer. The receiver can process the data and signaling information into formats that can be processed in an upper layer and deliver the processed data and signaling information to the upper layer. This process can be performed in the link layer of the receiver. The receiver can recognize whether a received packet is related to signaling information or data through a method such as a method of reading the header of the packet. In addition, when overhead reduction has been performed at the transmitter, the receiver can restore a packet having overhead reduced through overhead reduction to the original packet. In this process, the signaling information received by the receiver can be used.

Figure 65:
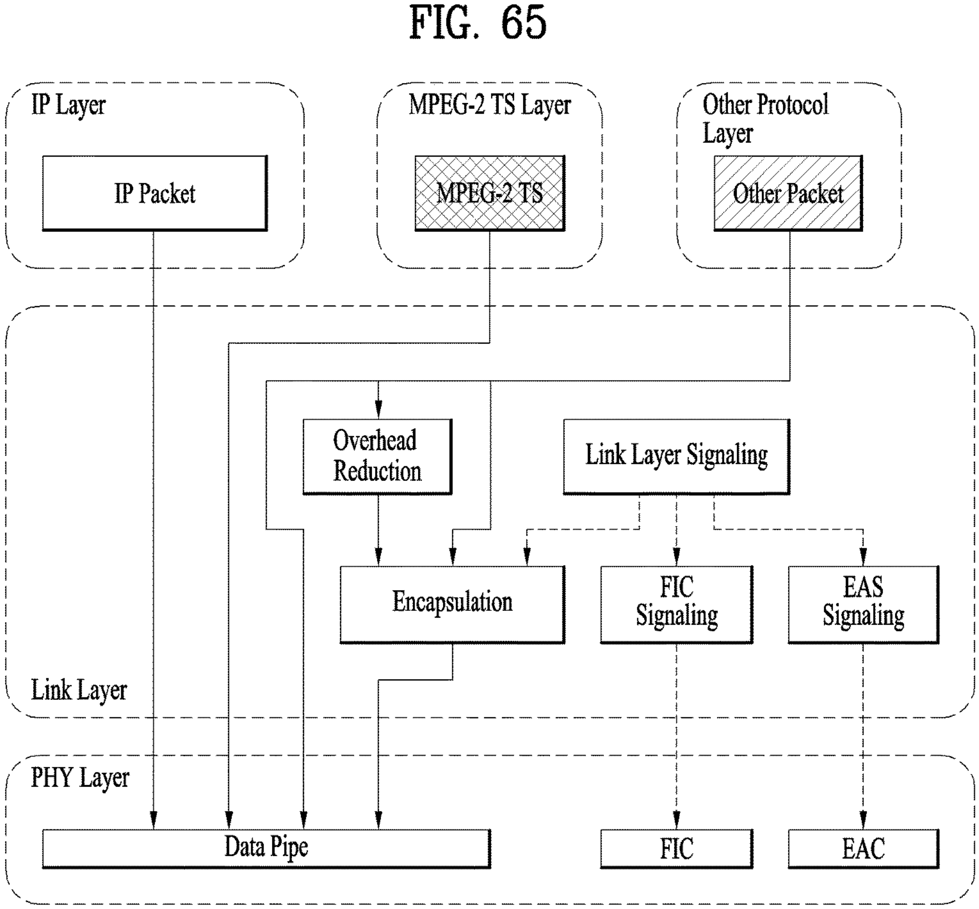
FIG. 65 illustrates operation of a transparent mode from among the operation modes of the link layer according to an embodiment of the present invention.

FIG. 65 is an operation diagram of the transparent mode from among operation modes of the link layer according to an embodiment of the present invention.

In the transparent mode, data can be delivered to the physical layer without passing through functions supported by the link layer or after passing through only part of the functions. That is, a packet delivered from an upper layer can be transmitted to the physical layer without passing through overhead reduction and/or encapsulation in the transparent mode. Some packets may pass through overhead reduction and/or encapsulation. The transparent mode may be called a bypass mode or given other names.

According to an embodiment, some packets may be processed in the normal mode and some packets may be processed in the transparent mode on the basis of packet characteristics and system operation.

Packets to which the transparent mode is applicable may be packets of types well-known in the system. When the corresponding packets can be processed in the physical layer, the transparent mode can be used. For example, since TS or IP packets can pass through overhead reduction and input formatting in the physical layer, the transparent mode can be used in the link layer. When the transparent mode is applied and a packet is processed through input formatting in the physical layer, operation such as the aforementioned TS header compression can be performed in the physical layer. When the normal mode is applied, a processed link layer packet can be handled as a GS packet and processed in the physical layer.

Even in the transparent mode, a link layer signaling module may be provided when delivery of signaling needs to be supported. The link layer signaling module can perform delivery and management of signaling information as described above. Signaling information may be encapsulated and delivered through a DP, and FIC signaling information and EAS signaling information having separated transport paths may be respectively delivered through an FIC and an EAC.

In the transparent mode, whether information is signaling information can be indicated using a method of using a fixed IP address and port number. In this case, the corresponding signaling information may be filtered to configure a link layer packet and delivered through the physical layer.

Figure 66:
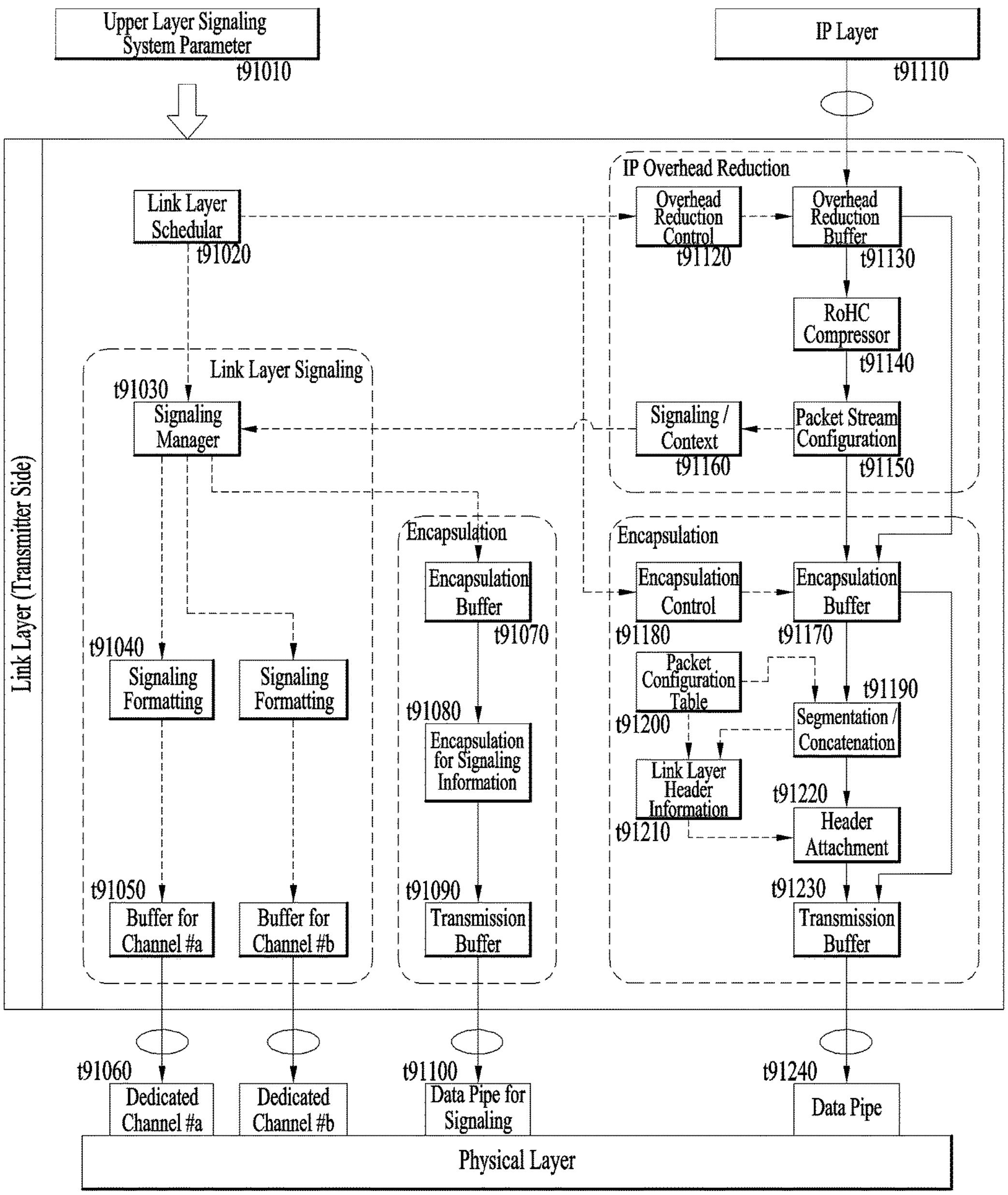
FIG. 66 illustrates a link layer structure of a transmitter according to an embodiment of the present invention (normal mode)

FIG. 66 illustrates a link layer structure at a transmitter according to an embodiment of the present invention (normal mode).

In the present embodiment, it is assumed that IP packets are processed. The link layer of the transmitter may include a link layer signaling part for processing signaling information, an overhead reduction part and/or an encapsulation part from a functional point of view. In addition, the link layer of the transmitter may include a scheduler for control and scheduling of the entire link layer operation and/or an input/output part of the link layer.

Signaling information and/or a system parameter t91010 of an upper layer can be delivered to the link layer. In addition, IP streams including IP packets can be delivered from an IP layer t91110 to the link layer.

A scheduler t91020 can determine and control operations of modules included in the link layer, as described above. The signaling information and/or system parameter t91010 delivered to the link layer can be filtered or used by the scheduler t91020. Information necessary for the receiver, from among the delivered signaling information and/or system parameter t91010, can be delivered to the link layer signaling part. Information necessary for operation of the link layer, from among the signaling information, may be delivered to an overhead reduction control block t91120 or an encapsulation control block t91180.

The link layer signaling part can collect information to be delivered as signaling information in the physical layer and convert/configure the collected information into a format suitable for delivery. The link layer signaling part may include a signaling manager t91030, signaling formatters t91040 and/or buffers t91050 for channels.

The signaling manager t91030 can receive signaling information delivered from the scheduler t91020 and/or signaling information and/or context information delivered from the overhead reduction part. The signaling manager t91030 can determine paths through which the signaling information will be delivered, for the received data. The signaling information can be delivered through the paths determined by the signaling manager t91030. Signaling information to be transmitted through separated channels such as an FIC and an EAS, as described above, can be delivered to the signaling formatters t91040 and other signaling information can be delivered to an encapsulation buffer t91070.

The signaling formatters t91040 format the signaling information delivered thereto into forms adapted to separate channels such that the signaling information can be delivered through the channels. As described above, the physical layer may include physically/logically separated channels. Such channels can be used to deliver FIC signaling information and EAS related information. FIC related information and EAS related information can be classified by the signaling manager t91030 and input to the signaling formatters t91040. The signaling formatters t91040 can format the signaling information such that the signaling information is adapted to separate channels corresponding thereto. When the physical layer is designed to deliver specific signaling information through a separate channel other than an FIC and an EAS, a signaling formatter for the specific signaling information can be added. In this manner, the link layer can be compatible with various physical layers.

The buffers t91050 for channels can respectively deliver signaling information received from the signaling formatters t91040 to dedicated channels t91060. The number and contents of dedicated channels may be changed according to embodiments.

As described above, the signaling manager t91030 can deliver signaling information which is not delivered to a specific channel to the encapsulation buffer t91070. The encapsulation buffer t91070 receives signaling information that is not delivered to a specific channel.

An encapsulation block t91080 for signaling information can encapsulate the signaling information that is not delivered to a specific channel. A transmission buffer t91090 can deliver the encapsulated signaling information to a DP t91100 for signaling information. The DP t91100 for signaling information may refer to the aforementioned PLP region.

The overhead reduction part can enable efficient delivery by reducing overhead of packets delivered to the link layer. As many overhead reduction parts as the number of IP streams input to the link layer can be configured.

The overhead reduction buffer t91130 can receive an IP packet delivered from an upper layer. The IP packet can be input to the overhead reduction part through the overhead reduction buffer t91130.

The overhead reduction control block t91120 can determine whether to perform overhead reduction on packet streams input to the overhead reduction buffer t91130. The overhead reduction control block t91120 can determine whether to perform overhead reduction per packet stream. When overhead reduction is performed on packets, the packets can be delivered to an RoHC compressor t91140 and overhead reduction is performed thereon. When overhead reduction is not performed on packets, the packets are delivered to the encapsulation part and encapsulated without overhead reduction. Whether to perform overhead reduction on packets can be determined by the signaling information t91010 delivered to the link layer. The signaling information can be delivered to the overhead reduction control block t91180 by the scheduler t91020.

The RoHC compressor t91140 can perform overhead reduction on packet streams. The RoHC compressor t91140 can compress headers of packets. Various methods can be used for overhead reduction. Overhead reduction can be performed according to the aforementioned methods proposed by the present invention. While IP streams are used and the RoHC compressor is described in the present embodiment, the name of the RoHC compressor may be changed according to embodiments, and operation is not limited to IP stream compression and overhead reduction of all kinds of packets can be performed by the RoHC compressor t91140.

A packet stream configuration block t91150 can divide IP packets with compressed headers into information to be delivered through a signaling region and information to be delivered through packet streams. The information to be delivered through packet streams may refer to information to be delivered through a DP region. The information to be delivered through a signaling region can be delivered to a signaling and/or context control block t91160. The information to be delivered through packet streams can be delivered to the encapsulation part.

The signaling and/or context control block t91160 can collect signaling and/or context information and deliver the collected information to the signaling manager in order to transmit the signaling and/or context information through a signaling region.

The encapsulation part can encapsulate packets into forms suitable for delivery to the physical layer. As many encapsulation parts as the number of IP streams can be configured.

The encapsulation buffer t91170 can receive packet streams for encapsulation. The encapsulation buffer t91170 can receive overhead-reduced packets when overhead reduction is performed and receive input IP packets when overhead reduction is not performed.

The encapsulation control block t91180 can determine whether to encapsulate input packet streams. When encapsulation is performed, the packet streams can be delivered to a segmentation/concatenation block t91190. When encapsulation is not performed, the packet streams can be delivered to a transmission buffer t91230. Whether to encapsulate packets can be determined by the signaling information t91010 delivered to the link layer. The signaling information can be delivered to the encapsulation control block t91180 by the scheduler t91020.

In the segmentation/concatenation block t91190, packets can be segmented or concatenated, as described above. That is, when an input IP packet is longer than a link layer packet which is an output of the link layer, the IP packet can be segmented into a plurality of segments to generate a plurality of link layer packet payloads. When an input IP packet is shorter than the link layer packet, a plurality of IP packets can be concatenated to generate a single link layer packet payload.

A packet configuration table t91200 can have configuration information of segmented and/or concatenated link layer packets. The transmitter and the receiver can have the same information as the information of the packet configuration table t91200. The transmitter and the receiver can refer to the information of the packet configuration table t91200. Index values of the information of the packet configuration table t91200 can be included in the headers of the link layer packets.

A link layer header information block t91210 can collect header information generated during encapsulation. In addition, the link layer header information block t91210 can collect the information stored in the packet configuration table t91200. The link layer header information block 191210 can configure header information according to link layer packet header structure.

A header attachment block t91220 can add headers to the payloads of the segmented and/or concatenated link layer packets. The transmission buffer t91230 can deliver the link layer packets to a DP t91240 of the physical layer.

The blocks, modules and parts may be configured as a single module/protocol or a plurality of modules/protocols in the link layer.

Figure 67:
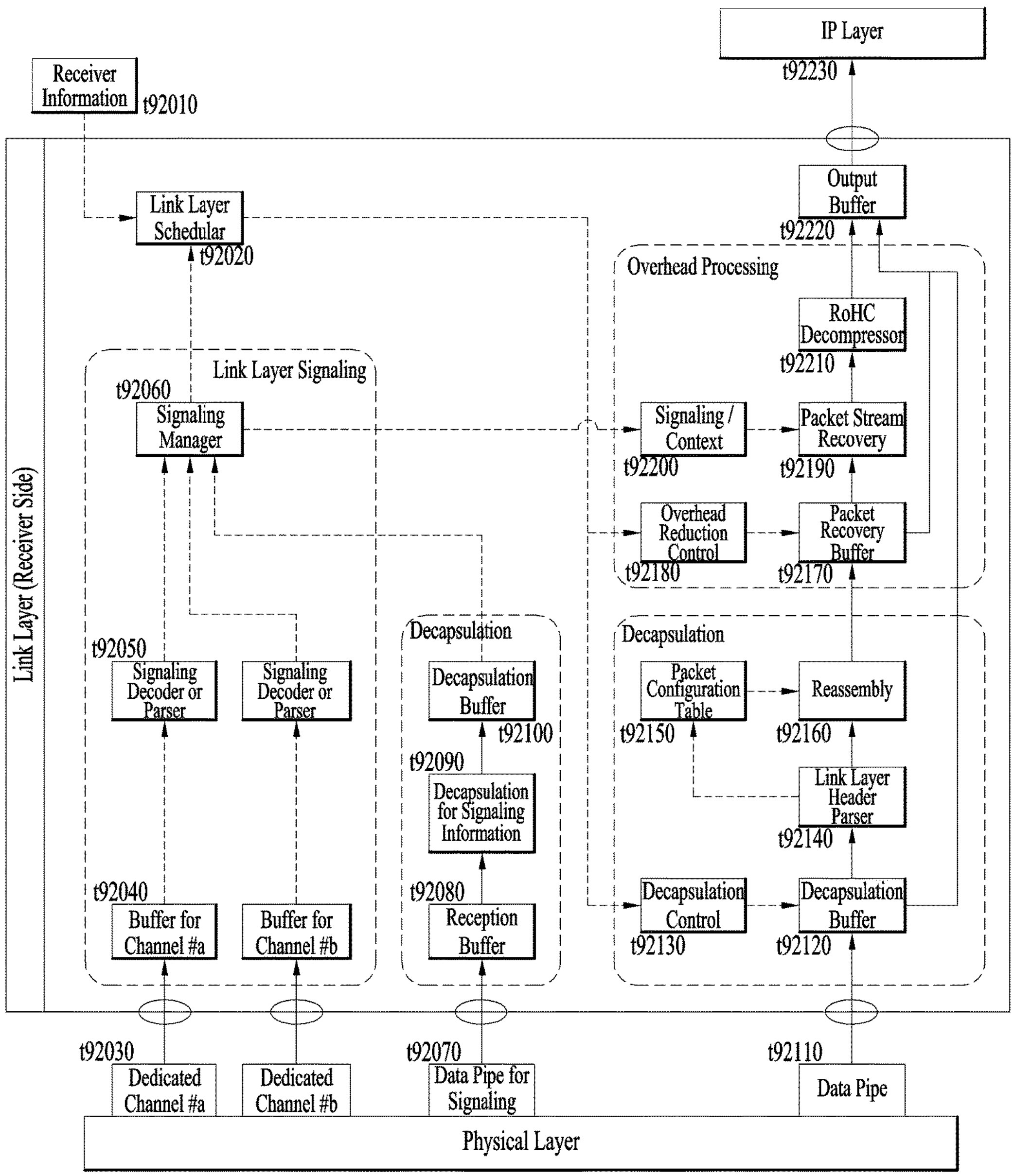
FIG. 67 illustrates a link layer structure of a receiver according to an embodiment of the present invention (normal mode)

FIG. 67 illustrates a link layer structure at a receiver according to an embodiment of the present invention (normal mode).

In the present embodiment, it is assumed that IP packets are processed. The link layer of the receiver may include a link layer signaling part for processing signaling information, an overhead processing part and/or a decapsulation part from a functional point of view. In addition, the link layer of the receiver may include a scheduler for control and scheduling of the entire link layer operation and/or an input/output part of the link layer.

Information transmitted through the physical layer can be delivered to the link layer. The link layer can process the information into the original form prior to being processed by the transmitter and deliver the information to an upper layer. In the present embodiment, the upper layer may be an IP layer.

Signaling information delivered through separate dedicated channels t92030 in the physical layer can be transmitted to the link layer signaling part. The link layer signaling part can check the signaling information received from the physical layer and deliver the signaling information to the respective parts of the link layer.

Buffers t92040 for channels can receive signaling information delivered through dedicated channels. When physically/logically separated dedicated channels are present in the physical layer, as described above, the buffers t92040 for channels can receive signaling information delivered through the dedicated channels. When the signaling information received from the dedicated channels has been segmented, the buffers t92040 for channels can store the segmented information until the information is restored to the form before being segmented.

Signaling decoders/parsers t92050 can check the formats of the signaling information received through the dedicated channels and extract information to be used in the link layer from the signaling information. When the signaling information received through the dedicated channels has been encoded, the signaling decoders/parsers t92050 can decode the signaling information. According to an embodiment, the signaling decoders/parsers t92050 can check integrity of the signaling information.

A signaling manager t92060 can combine signaling information received through a plurality of paths. Signaling information received through a DP t92070 for signaling, which will be described later, can be combined by the signaling manager t92060. The signaling manager t92060 can deliver signaling information necessary for the parts in the link layer. For example, the signaling manager t92060 can deliver context information for packet recovery to the overhead processing part. In addition, the signaling manager t92060 can deliver signaling information for control to the scheduler t92020.

Normal signaling information that is not received through a dedicated channel can be received through the DP t92070 for signaling. Here, the DP for signaling may refer to PLS. The signaling information received from the DP for signaling can be delivered to a reception buffer t92080. A decapsulation block t92090 for signaling information can decapsulate received signaling information. The decapsulated signaling information can be delivered to the signaling manager t92060 through a decapsulation buffer t92100. As described above, the signaling manager t92060 can collect signaling information and deliver the signaling information to parts that require the signaling information in the link layer.

The scheduler t92020 can determine and control operations of modules included in the link layer. The scheduler t92020 can control parts of the link layer using receiver information t92010 and/or information received from the signaling manager t92060. In addition, the scheduler t92020 can determine operation modes of the parts of the link layer. The receiver information t92010 may refer to information prestored in the receiver. The scheduler t92020 can use information changed by a user, such as channel change, for control.

The decapsulation part can filter packets received from a DP t92110 of the physical layer and separate the packets according to types of the packets. As many decapsulation parts as the number of DPs that can be simultaneously decoded in the physical layer can be configured.

A decapsulation buffer t92110 can receive packet streams from the physical layer for decapsulation. A decapsulation control block t92130 can determine whether to decapsulate the received packet streams. The packet streams can be delivered to a link layer header parser t92140 when decapsulation is performed. The packet streams can be delivered to an output buffer t92220 when decapsulation is not performed. Whether to perform decapsulation can be determined using signaling information delivered from the scheduler t92020.

The link layer header parser t92140 can check headers of link layer packets delivered thereto. The link layer header parser t92140 can confirm configuration of IP packets included in pay loads of the link layer packets by checking the headers. For example, the IP packets have been segmented or concatenated.

A packet configuration table t92150 can include information on payloads of segmented and/or concatenated link layer packets. The packet configuration table t92150 may include the same information as the information of the transmitter and the receiver. The transmitter and the receiver can refer to the information of the packet configuration table t92150. Values necessary for reassembly can be detected on the basis of index information included in the link layer packets.

Reassembly block t92160 can reassemble the original IP stream packets from payloads of segmented and/or concatenated link layer packets. The reassembly block t92016 can reassemble one IP packet by collecting segments or reassemble a plurality of IP packet streams by dividing concatenated packets. The reassembled IP packets can be delivered to the overhead processing part.

The overhead processing part is a reverse process of overhead reduction performed in the transmitter and restores overhead-reduced packets to the original packets. This operation can be called overhead processing. As many overhead processing parts as the number of DPs through which packets can be simultaneously processed in the physical layer can be configured.

A packet recovery buffer t92170 can receive decapsulated RoHC packets or IP packets for overhead processing.

An overhead control block t92180 can determine whether to perform packet recovery and/or decompression on the decapsulated packets. When packet recovery and/or decompression are performed, the packets can be delivered to a packet stream recovery block t92190. When packet recovery and/or decompression are not performed, the packets can be delivered to an output buffer t92220. Whether to perform packet recovery and/or decompression can be determined on the basis of signaling information delivered by the scheduler t92020.

The packet stream recovery block t92190 can combine packets streams segmented by the transmitter and context information of the packet streams. This operation may correspond to a process of recovering the packet streams such that an RoHC decompressor t92210 can process the packet streams. During this process, signaling information and/or context information can be delivered to the packet stream recovery block t92190 from a signaling and/or context control block t92200. The signaling and/or context control block t92200 can identify signaling information delivered from the transmitter and send the signaling information to the packet stream recovery block t92190 such that the signaling information can be mapped to a stream matched to the corresponding context ID.

The RoHC decompressor t92210 can decompress the headers of packets of packet streams. Accordingly, the packets of the packet streams can be restored to the original IP packets. That is, the RoHC decompress or t92210 can perform overhead processing.

The output buffer t92220 can serve as a buffer prior to delivery of output streams to the IP layer t92230.

The link layers of the transmitter and the receiver can include the aforementioned blocks and modules. Accordingly, the link layers can independently operate irrespective of upper layers and lower layers and efficiently perform overhead reduction. In addition, functions supportable according to upper layers can be easily decided and/or added to/deleted from the link layer.

FIG. 68 illustrates definition of link layer organization types according to an embodiment of the present invention.

When the link layer is implemented as an actual protocol layer, the link layer can transmit and receive broadcast services through a single frequency slot. Here, a broadcast channel having a specific bandwidth can be exemplified as the single frequency slot. As described above, the present invention can define a link layer which is compatible when a physical layer configuration is changed in a broadcast system or in a plurality of broadcast systems having different physical layer structures.

A physical layer can have a logical data path to interface with a link layer. The link layer is connected to the logical data path of the physical layer to send information related to the data path. The following data paths can be considered as data paths of the physical layer interfacing with the link layer.

In a broadcast system, a normal data pipe (normal DP) may be present as a data path. The normal data pipe is a data pipe for delivering normal data and one or more data pipes may be present according to physical layer configuration.

In a broadcast system, a base data pipe (base DP) may be present as a data path. The base data pipe is used for a specific purpose and can deliver signaling information (all or part of the signaling information described in the present invention) and/or common data in corresponding frequency slots. For efficient bandwidth management, data delivered through the normal data pipe may be delivered through the base data pipe. When a dedicated channel is present and the size of information to be delivered through the dedicated channel exceeds capacity of the dedicated channel, the base data pipe can complement the dedicated channel. That is, data that exceeds capacity of the dedicated channel can be delivered through the base data pipe.

While a single designated data pipe is continuously used as the base data pipe, in general, one or more data pipes may be dynamically selected for the base data pipe using methods such as physical layer signaling and link layer signaling for efficient data pipe operation.

In a broadcast system, a dedicated channel may be present in the form of a data pipe. The dedicated channel is used for signaling in a physical layer or a specific purpose similar thereto and can include a fast information channel (FIC) for rapid acquisition of services provided in the current frequency slot and an emergency alert channel (EAC) for immediately delivering emergency alert to the user.

A logical data path is generally implemented in a physical layer in order to deliver the normal data pipe. A logical data path for the base data pipe and/or a dedicated channel may not be implemented in the physical layer.

A structure for delivering data in a link layer can be defined as shown in the figure.

Organization Type 1 indicates a case in which a logical data path includes a normal data pipe only.

Organization Type 2 indicates a case in which a logical data path includes a normal data pipe and a base data pipe.

Organization Type 3 indicates a case in which a logical data path includes a normal data pipe and a dedicated channel.

Organization Type 4 indicates a case in which a logical data path includes a normal data pipe, a base data pipe and a dedicated channel.

A logical data path may include a base data pipe and/or a dedicated channel as necessary.

According to an embodiment of the present invention, a signaling information delivery procedure can be determined according to logical data path configuration. Detailed information of signaling delivered through a specific logical data path can be determined according to the protocol of an upper layer of the link layer defined in the present invention. In a procedure described in the present invention, signaling information parsed through the upper layer can also be used, and the signaling information can be delivered from the upper layer in the form of an IP packet and then encapsulated into a link layer packet and delivered.

When such signaling information has been delivered, a receiver can extract detailed signaling information using session information included in IP packet streams according to protocol configuration. When the signaling information of the upper layer is used, a database (DB) or a shared memory may be used. For example, when the signaling information is extracted using the session information included in the IP packet streams, the extracted signaling information can be stored in a DB, a buffer and/or a shared memory of the receiver. When a procedure of processing data in a broadcast signal requires the signaling information, the signaling information can be acquired from the aforementioned storage devices.

Figure 69:
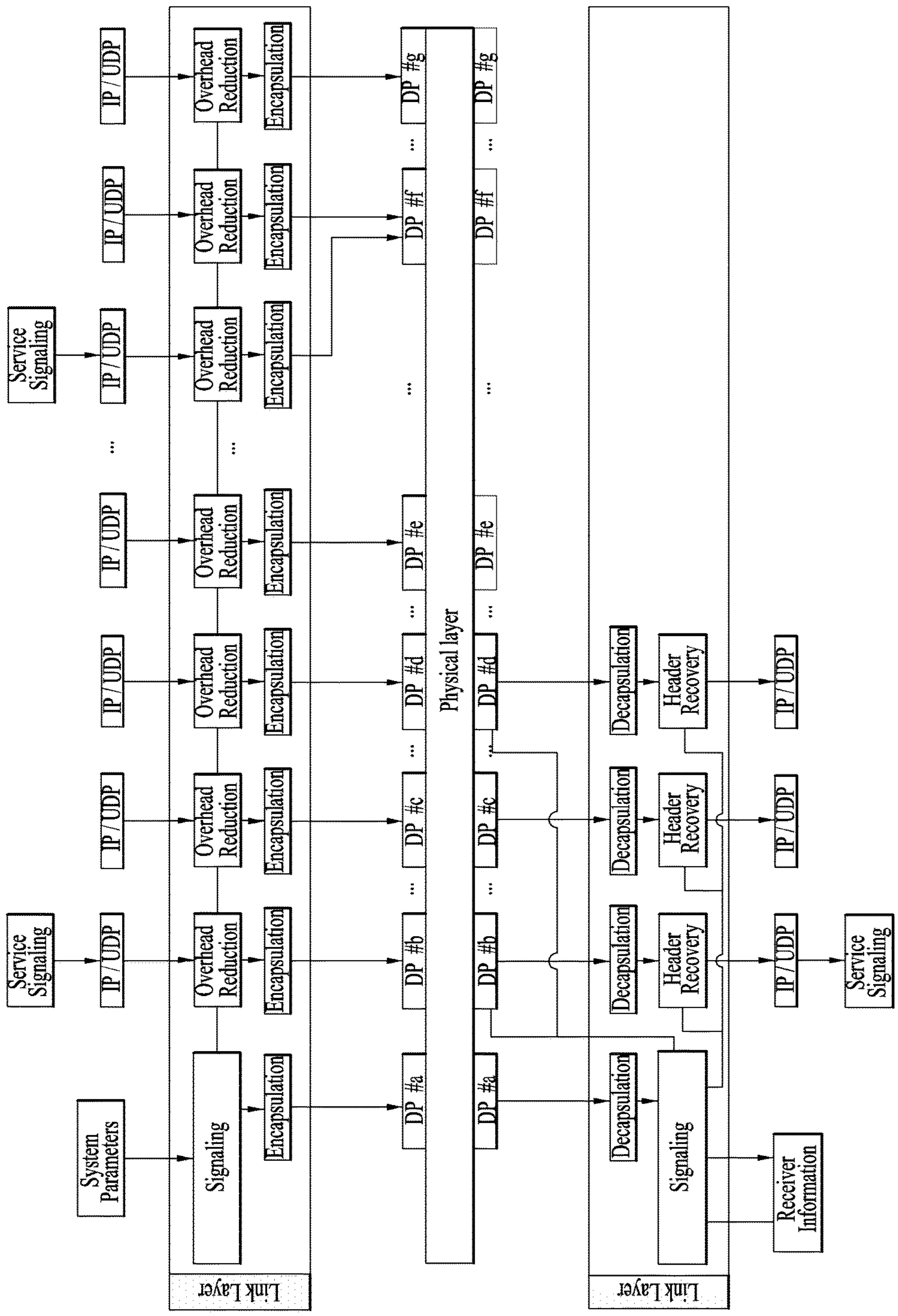
FIG. 69 illustrates broadcast signal processing when a logical data path includes only normal data pipes according to an embodiment of the present invention.

FIG. 69 illustrates broadcast signal processing when logical data paths include normal data pipes only according to an embodiment of the present invention.

A link layer structure when logical data paths of a physical layer include normal data pipes only is shown in the figure. As described above, a link layer may include a link layer signaling processor, an overhead reduction processor and an encapsulation (decapsulation) processor. One of main functions of the link layer is to deliver information output from functional modules (which can be implemented as hardware or software) to appropriate data paths of the physical layer.

A plurality of IP packet streams configured in an upper layer of the link layer can be transmitted according to transmission data rate, overhead reduction and encapsulation can be performed per packet stream. A plurality of data pipes corresponding to logical data paths, which can be accessed by the link layer, can be configured in a single frequency band in the physical layer, and the packet streams processed in the link layer can be respectively delivered to the data pipes. When the number of DPs is less than the number of packet streams that need to be delivered, some packet streams may be multiplexed in consideration of the data rate and input to DPs.

The signaling processor checks transmission system information, related parameters and/or signaling delivered from the upper layer and collects signaling information to be delivered. Since the logical data paths include normal DPs only in the physical layer, the signaling information needs to be delivered in the form of a packet. Accordingly, the signaling information can be indicated using a packet header when link layer packets are configured. In this case, the packet header including the signaling information may contain information indicating whether signaling data is included in the payload of the corresponding packet.

Service signaling delivered in the form of an IP packet from the upper layer can be processed in the same manner as other IP packets, in general. However, information of the IP packet can be read in order to configure link layer signaling. To this end, the packet including the signaling can be detected using an IP address filtering method. For example, since the IP address of 224.0.23.60 is set to ATSC service signaling in IANA, IP packets having the IP address can be identified and used to configure link layer signaling. Even in this case, the IP packets need to be delivered to a receiver, and thus the IP packets are processed. The receiver can acquire data for signaling in the link layer thereof by parsing the IP packets delivered to the specific IP address.

When a plurality of broadcast services is delivered through a single frequency band, it is efficient for the receiver to check signaling information first and to decode only DPs related to a necessary service instead of decoding all DPs. Accordingly, the following procedure can be performed with respect to operation for the link layer of the receiver.

When the user selects or changes a service to be received, the receiver tunes to the frequency corresponding to the service and reads receiver information related to the channel corresponding to the service, which is stored in a DB.

The receiver checks information about a DP through which link layer signaling is delivered, decodes the DP and acquires link layer signaling packets.

The receiver acquires information about a DP through which data related to the service selected by the user is delivered and overhead reduction information about packet streams delivered through the DP, from among one or more DPs delivered through the current channel, by parsing the link layer signaling packets. The receiver can acquire information that identifies the DP through which the data related to the service selected by the user is delivered from the link layer signaling packets and obtain the DP on the basis of the information. The link layer signaling packets include information indicating overhead reduction applied to the corresponding DP, and the receiver can decode the DP to which overhead reduction has been applied using the information.

The receiver sends information about the DP that needs to be received to a physical layer processor for processing signals and/or data in the physical layer thereof and receives packet streams from the DP.

The receiver performs decapsulation and header recovery on the packet streams decoded in the physical layer processor and sends the packet streams to an upper layer in the form of IP packet streams.

Then, the receiver performs processing according to the protocol of the upper layer and provides the corresponding broadcast service to the user.

Figure 70:
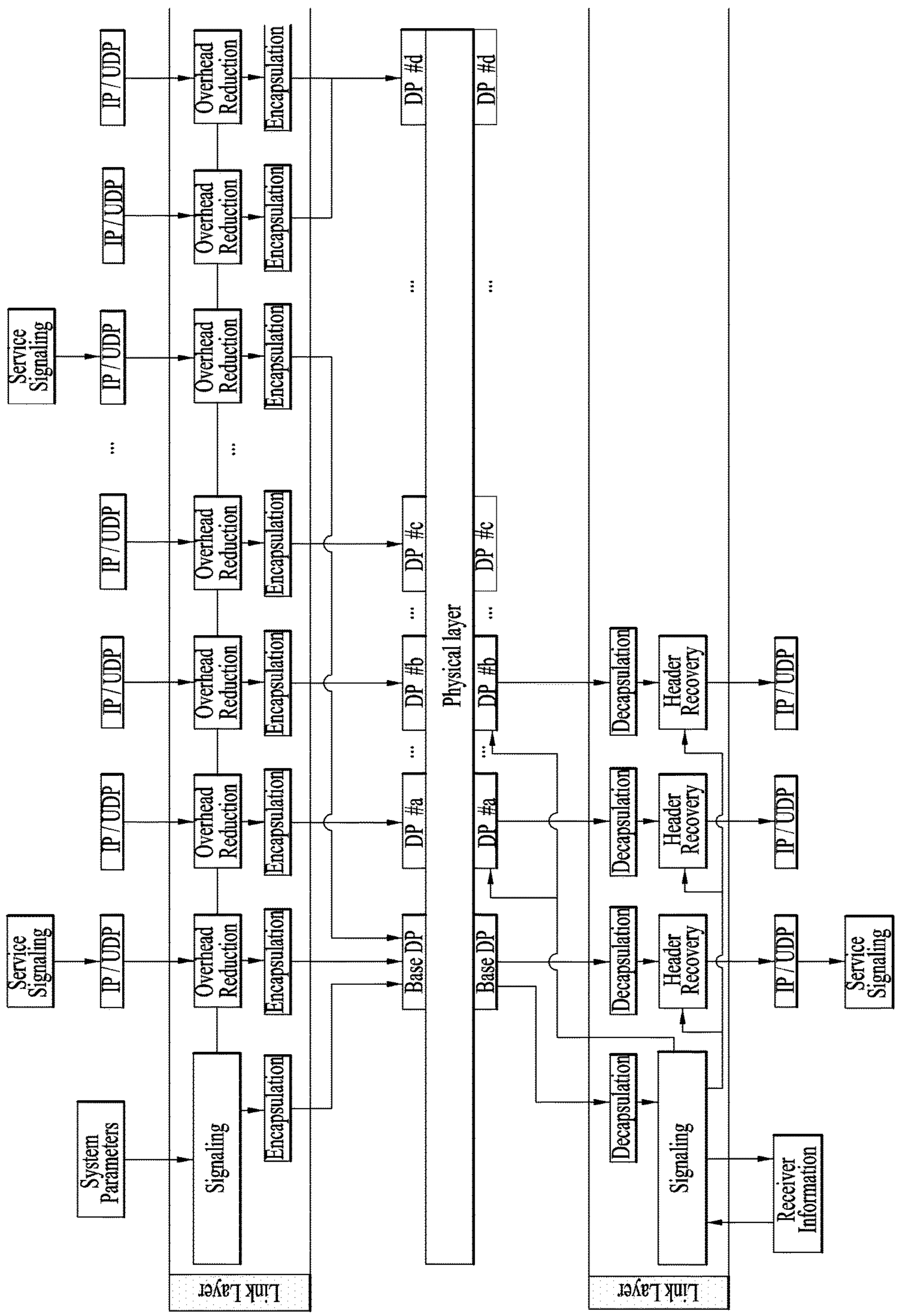
FIG. 70 illustrates broadcast signal processing when a logical data path includes a normal data pipe and a base data pipe according to an embodiment of the present invention.

FIG. 70 illustrates broadcast signal processing when logical data paths include normal data pipes and a base data pipe according to an embodiment of the present invention.

A link layer structure when logical data paths of a physical layer include a base data pipe and normal data pipes is shown in the figure. As described above, a link layer may include a link layer signaling part, an overhead reduction part and an encapsulation part. In this case, a link layer processor for processing signals and/or data in the link layer may include a link layer signaling processor, an overhead reduction processor and an encapsulation (decapsulation) processor.

One of main functions of the link layer is to deliver information output from functional modules (which can be implemented as hardware or software) to appropriate data paths of the physical layer.

A plurality of IP packet streams configured in an upper layer of the link layer can be transmitted according to transmission data rate, overhead reduction and encapsulation can be performed per packet stream.

The physical layer can include a plurality of data pipes corresponding to logical data paths, which can be accessed by the link layer in a single frequency band, and the packet streams processed in the link layer can be respectively delivered to the data pipes. When the number of DPs is less than the number of packet streams that need to be delivered, some packet streams may be multiplexed in consideration of the data rate and input to DPs.

The signaling processor checks transmission system information, related parameters and upper layer signaling and collects signaling information to be delivered. Since a broadcast signal of the physical layer includes the base DP and normal DPs, the signaling information can be delivered through the base DP in consideration of the data rate and signaling data can be delivered in the form of a packet adapted to delivery of the base DP. Here, the signaling information may be indicated using a packet header when link layer packets are configured. For example, a link layer packet header can include information indicating that data included in the payload of the corresponding packet is the signaling data.

In a physical layer structure including a logical data path such as the base DP, it is efficient to deliver data other than audio/video content, such as signaling information, through the base DP, considering the data rate. Accordingly, service signaling transmitted from the upper layer in the form of an IP packet may be delivered to the base DP using IP address filtering. For example, since the IP address of 224.0.23.60 is set to ATSC service signaling in IANA, an IP packet stream having the IP address can be delivered to the base DP.

When a plurality of IP packet streams with respect to the service signaling is present, the IP packet streams may be delivered to one base DP using multiplexing. However, different service signaling packets can be discriminated using source address and/or port fields. Even in this case, information necessary to configure link layer signaling can be read from the service signaling packets.

When a plurality of broadcast services is delivered through a single frequency band, it is efficient for the receiver to check signaling information first and to decode only DPs through which data and/or signals related to the corresponding service are delivered instead of decoding all DPs. Accordingly, the receiver can perform the following operation with respect to processing of data and/or signals in the link layer.

When the user selects or changes a service to be received, the receiver tunes to the frequency corresponding to the service and reads receiver information related to the channel corresponding to the service, which is stored in a DB. Here, the information stored in the DB may include information for identifying the base DP.

The receiver acquires link layer signaling packets included in the base DP by decoding the base DP.

The receiver acquires information about a DP through which the service selected by the user is received and overhead reduction information about packet streams delivered through the DP, from among a plurality of DPs delivered through the current channel, by parsing the link layer signaling packets. The link layer signaling packets may include information for identifying a DP through which signals and/or data related to a specific service are delivered and/or information for specifying the type of overhead reduction applied to packet streams delivered through the DP. The receiver can access one or more DPs for the specific service or decode packets included in the DP using the aforementioned information.

The receiver sends information about the DP that needs to be received for the corresponding service to a physical layer processor for processing signals and/or data according to the protocol of the physical layer and receives packet streams from the DP.

The receiver performs decapsulation and header recovery on the packet streams decoded in the physical layer processor and sends the packet streams to an upper layer in the form of IP packet streams.

Then, the receiver performs processing according to the protocol of the upper layer and provides the corresponding broadcast service to the user.

In the aforementioned process of acquiring the link layer packets by decoding the base DP, information about the base DP (e.g. base DP ID information, location information of the base DP or signaling information included in the base DP) may be detected during previous channel scan and stored in the DB, and the receiver can use the stored base DP. Alternatively, the receiver may acquire the base DP by searching DPs previously accessed thereby.

In the aforementioned process of acquiring the information of the DP for the service selected by the user and overhead reduction information about DP packet streams delivering the service, when the information about the DP through which the service selected by the user is transmitted is delivered through upper layer signaling (e.g. an upper layer of the link layer or the IP layer), the corresponding information can be acquired from a DB, a buffer and/or a shared memory, as described above, and used as information about the DP which needs to be decoded.

When link layer signaling (link layer signaling information) and normal data (e.g. broadcast content data) are delivered through the same DP or when only one type of DP is used in the broadcast system, the normal data delivered through the DP may be temporarily stored in a buffer or a memory while the signaling information is decoded and parsed. Upon acquisition of the signaling information, the receiver may deliver a command for extracting the DP that needs to be acquired according to the signaling information to a DP extraction device using a method of using system internal commands.

Figure 71:
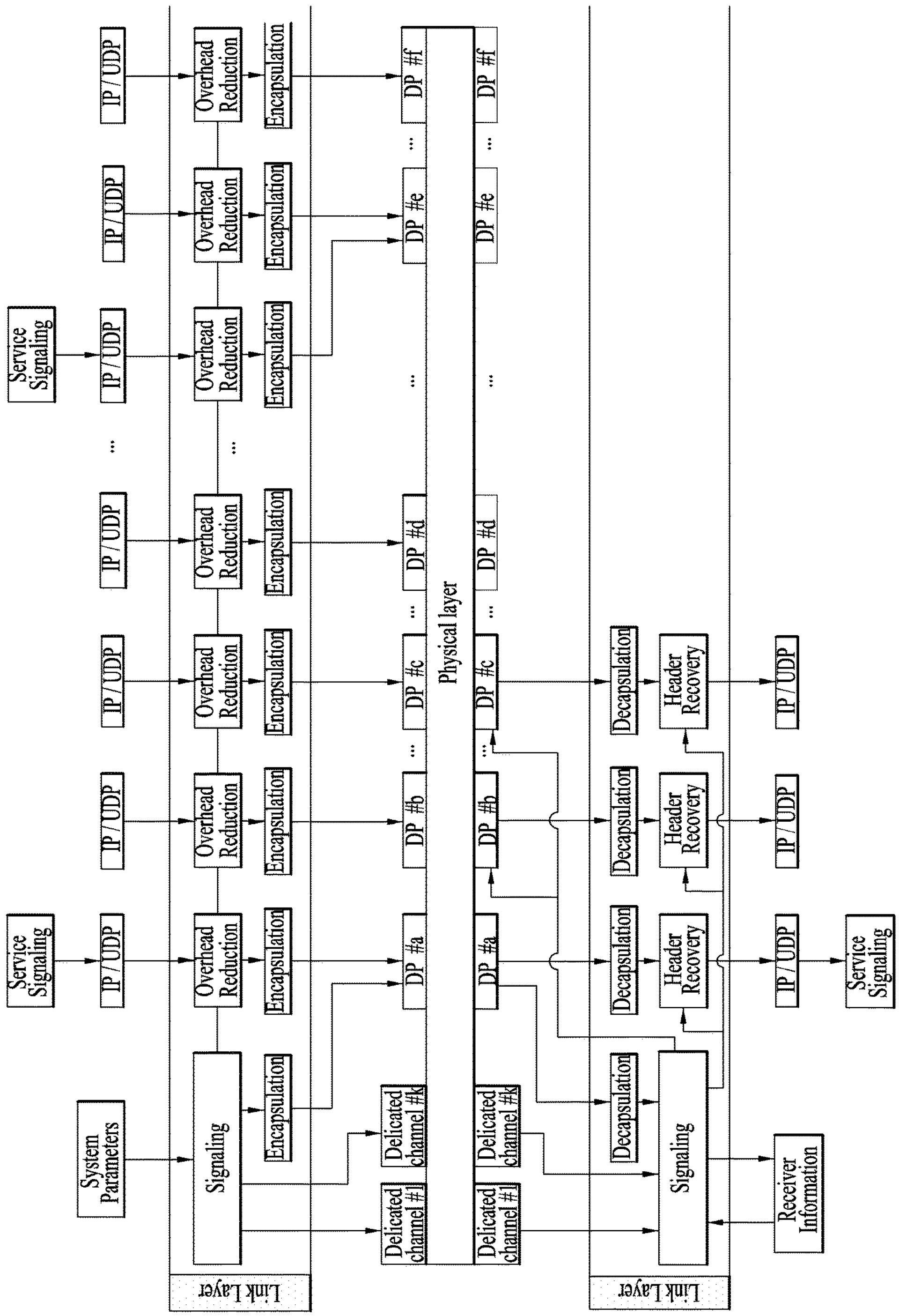
FIG. 71 illustrates broadcast signal processing when a logical data path includes a normal data pipe and a dedicated channel according to an embodiment of the present invention.

FIG. 71 illustrates broadcast signal processing when logical data paths include normal data pipes and dedicated channels according to an embodiment of the present invention.

A link layer structure when logical data paths of a physical layer include dedicated channels and normal data pipes is shown in the figure. As described above, a link layer may include a link layer signaling part, an overhead reduction part and an encapsulation (decapsulation) part. In this case, a link layer processor which can be received in the receiver may include a link layer signaling processor, an overhead reduction processor and an encapsulation (decapsulation) processor. One of the main functions of the link layer is to deliver information output from functional modules (which can be implemented as hardware or software) to appropriate data paths of the physical layer.

A plurality of IP streams configured in an upper layer of the link layer can be transmitted according to transmission data rate, and overhead reduction and encapsulation can be performed per packet stream. The physical layer can include a plurality of data pipes corresponding to logical data paths, which can be accessed by the link layer in a single frequency band, and the packet streams processed in the link layer can be respectively delivered to the data pipes. When the number of DPs is less than the number of packet streams that need to be delivered, some packet streams may be multiplexed in consideration of the data rate and input to DPs.

The signaling processor checks transmission system information, related parameters and/or upper layer signaling and collects signaling information to be delivered. In a physical layer structure including a logical data path such as a dedicated channel, it may be efficient to deliver signaling information through the dedicated channel in consideration of the data rate. However, since delivery of a large amount of data through the dedicated channel requires occupation of a bandwidth corresponding to the dedicated channel, the data rate of the dedicated channel is not set to a high value, in general. In addition, since the dedicated channel is received and decoded faster than DPs, it is efficient to deliver signaling data including information that needs to be rapidly acquired by the receiver, through the dedicated channel. If sufficient signaling data is not delivered through the dedicated channel, signaling data such as the aforementioned link layer signaling packets can be delivered through normal DPs, and the signaling data delivered through the dedicated channel can include information for identifying the link layer signaling packets.

A plurality of dedicated channels may be present as necessary and may be enabled/disabled according to the physical layer.

Service signaling delivered in the form of an IP packet from the upper layer can be processed in the same manner as other IP packets, in general. However, information of the IP packet can be read in order to configure link layer signaling. To this end, the packet including the signaling can be detected using an IP address filtering method. For example, since the IP address of 224.0.23.60 is set to ATSC service signaling in IANA, the receiver can check IP packets having the IP address and use the IP packets to configure link layer signaling. Even in this case, the IP packets need to be delivered to a receiver, and thus the IP packets are processed.

When a plurality of IP packet streams with respect to service signaling is present, the IP packet streams may be delivered along with audio/video data to a single DP using multiplexing. However, service signaling packets and audio/video data packets can be discriminated using source address and/or port fields.

When a plurality of broadcast services is delivered through a single frequency band, it is efficient for the receiver to check signaling information first and to decode only DPs through which signals and/or data related to a necessary service are delivered instead of decoding all DPs. Accordingly, the receiver can perform the following operation with respect to processing according to the protocol of the link layer.

When the user selects or changes a service to be received, the receiver tunes to the frequency corresponding to the service and reads information related to the channel corresponding to the service, which is stored in a DB. The information stored in the DB may include information for identifying the dedicated channels and/or signaling information for acquiring a channel/service/program.

The receiver decodes data delivered through the dedicated channels to perform processing related to signaling fit for the purpose of the corresponding channel. For example, in the case of a dedicated channel delivering an FIC, the receiver can store and update information of services and/or the channel. In the case of a dedicated channel delivering an EAC, the receiver can deliver emergency alert information.

The receiver can acquire information on a DP to be decoded using information delivered through the dedicated channels. When link layer signaling is delivered through the DP, the receiver can decode the DP through which the link layer signaling is delivered first in order to preferentially acquire signaling information and send the DP to a dedicated channel. Link layer signaling packets may be delivered through a normal DP. In this case, signaling data delivered through the dedicated channels may include information for identifying a DP including the link layer signaling packets.

The receiver acquires information about a DP through which the service selected by the user is received and overhead reduction information about packet streams delivered through the DP, from among a plurality of DPs delivered through the current channel, using link layer signaling information. The link layer signaling information may include information for identifying a DP through which signals and/or data related to a specific service are delivered and/or information for specifying the type of overhead reduction applied to packet streams delivered through the DP. The receiver can access one or more DPs for the specific service or decode packets included in the DP using the aforementioned information.

The receiver sends information for identifying a DP that needs to be received to a physical layer processor for processing signals and/or data in the physical layer and receives packet streams from the DP.

The receiver performs decapsulation and header recovery on the packet streams decoded in the physical layer processor and sends the packet streams to an upper layer in the form of IP packet streams.

Then, the receiver performs processing according to the protocol of the upper layer and provides the corresponding broadcast service to the user.

Figure 72:
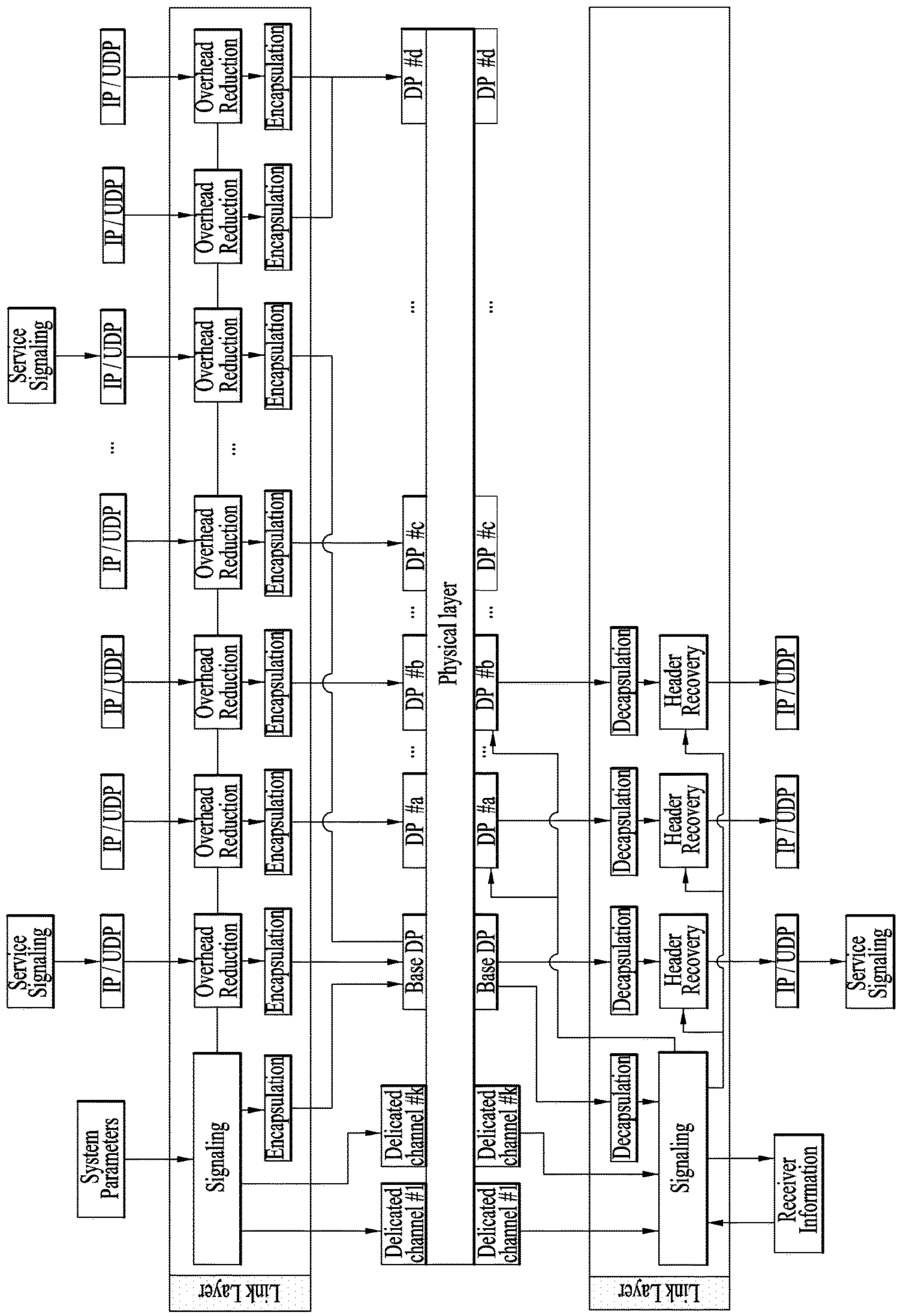
FIG. 72 illustrates broadcast signal processing when a logical data path includes a normal data pipe, a base data pipe and a dedicated channel according to an embodiment of the present invention.

FIG. 72 illustrates broadcast signal processing when logical data paths include normal data pipes, a base DP and dedicated channels according to an embodiment of the present invention.

A link layer structure when logical data paths of a physical layer include dedicated channels a base DP and normal data pipes is shown in the figure. As described above, a link layer may include a link layer signaling part, an overhead reduction part and an encapsulation (decapsulation) part. In this case, a link layer processor which can be received in the receiver may include a link layer signaling processor, an overhead reduction processor and an encapsulation (decapsulation) processor. One of the main functions of the link layer is to deliver information output from functional modules (which can be implemented as hardware or software) to appropriate data paths of the physical layer.

A plurality of IP streams configured in an upper layer of the link layer can be transmitted according to transmission data rate, and overhead reduction and encapsulation can be performed per packet stream. The physical layer can include a plurality of data pipes corresponding to logical data paths, which can be accessed by the link layer in a single frequency band, and the packet streams processed in the link layer can be respectively delivered to the data pipes. When the number of DPs is less than the number of packet streams that need to be delivered, some packet streams may be multiplexed in consideration of the data rate and input to DPs.

The signaling processor checks transmission system information, related parameters and/or upper layer signaling and collects signaling information to be delivered. Since a signal of the physical layer includes the base DP and normal DPs, it may be efficient, to deliver signaling through the base DP in consideration of the data rate. Here, signaling data needs to be transmitted in the form of a packet, which is suitable for delivery through the base DP. Signaling information may be indicated using a packet header when link layer packets are configured. That is, a link layer signaling packet including the signaling data can include information indicating that the signaling data is included in the payload of the corresponding packet.

In a physical layer structure in which a dedicated channel and a base DP are coexist, signaling information can be divided and delivered through the dedicated channel and the base DP. Since the data rate of the dedicated channel is not set to a high value, in general, signaling information that has a small size and needs to be rapidly acquired can be delivered through the dedicated channel and signaling information having a large amount of data can be delivered through the base DP. A plurality of dedicated channels may be present as necessary and may be enabled/disabled according to the physical channel. In addition, the base DP may be configured to have a different structure. Otherwise, one of normal DPs may be used as a base DP.

Service signaling information delivered in the form of an IP packet from an upper layer may be transmitted to the base DP using IP address filtering. An IP packet stream having a specific IP address and including signaling information can be delivered to a base DP. When a plurality of IP packet streams with respect to the service signaling information is present, the IP packet streams may be delivered to one base DP using multiplexing. However, different service signaling packets can be discriminated using values of source address and/or port fields. The receiver can read information necessary to configure link layer signaling from the service signaling packets.

When a plurality of broadcast services is delivered through a single frequency band, it is efficient for the receiver to check signaling information first and to decode only DPs through which signals and/or data related to a necessary service are delivered instead of decoding all DPs. Accordingly, the receiver can perform the following operation with respect to processing according to the protocol of the link layer.

When the user selects or changes a service to be received, the receiver tunes to the frequency corresponding to the service and reads information related to the channel corresponding to the service, which is stored in a DB. The information stored in the DB may include information for identifying the dedicated channels, information for identifying the base DP and/or signaling information for acquiring a channel/service/program.

The receiver decodes data delivered through the dedicated channels to perform processing related to signaling fit for the purpose of the corresponding channel. For example, in the case of a dedicated channel delivering an FIC, the receiver can store and update information of services and/or the channel. In the case of a dedicated channel delivering an EAC, the receiver can deliver emergency alert information.

The receiver acquires information of the base DP using information delivered through the dedicated channels. The information delivered through the dedicated channels may include information for identifying the base DP (e.g. base DP identifier and/or IP address through which the base DP is delivered). Signaling information and related parameters stored in the DB of the receiver may be updated to information delivered through the dedicated channels as necessary.

The receiver acquires link layer signaling packets by decoding the base DP and combines the link layer signaling packets with the signaling information received from the dedicated channel as necessary. The receiver can detect the base DP using the dedicated channels or signaling information prestored in the receiver.

The receiver acquires information about a DP through which the service selected by the user is received and overhead reduction information about packet streams delivered through the DP, from among a plurality of DPs delivered through the current channel, using link layer signaling information. The link layer signaling information may include information for identifying a DP through which signals and/or data related to a specific service are delivered and/or information for specifying the type of overhead reduction applied to packet streams delivered through the DP. The receiver can access one or more DPs for the specific service or decode packets included in the DP using the aforementioned information.

The receiver sends information for identifying a DP that needs to be received to a physical layer processor for processing signals and/or data in the physical layer and receives packet streams from the DP.

The receiver performs decapsulation and header recovery on the packet streams decoded in the physical layer processor and sends the packet streams to an upper layer in the form of IP packet streams.

Then, the receiver performs processing according to the protocol of the upper layer and provides the corresponding broadcast service to the user.

According to an embodiment of the present invention, when information for service signaling is delivered through one or more IP packet streams, the IP packet streams can be multiplexed and delivered to a single base DP. In the receiver, different service signaling packets can be discriminated using source address and/or port fields. The receiver can read information for acquiring/configuring link layer signaling from the service signaling packets.

In the operation of processing signaling information delivered through a dedicated channel, the receiver can acquire information indicating the version of the dedicated channel or whether the dedicated channel has been updated and skip operation (decoding or parsing) of processing the signaling information delivered through the dedicated channel upon determining that the signaling information has not been changed. The receiver can acquire information on the base DP using information prestored in the receiver upon determining that the dedicated channel has not been updated.

In the aforementioned process of acquiring the information of the DP for the service selected by the user and overhead reduction information about DP packet streams delivering the service, when the information about the DP through which the service selected by the user is transmitted is delivered through upper layer signaling (e.g. an upper layer of the link layer or the IP layer), the corresponding information can be acquired from a DB, a buffer and/or a shared memory, as described above, and used as information about the DP which needs to be decoded.

When link layer signaling (link layer signaling information) and normal data (e.g. broadcast content data) are delivered through the same DP or when only one type of DP is used in the broadcast system, the normal data delivered through the DP may be temporarily stored in a buffer or a memory while the signaling information is decoded and parsed. Upon acquisition of the signaling information, the receiver may deliver a command for extracting the DP that needs to be acquired according to the signaling information to a DP extraction device using a method of using system internal commands.

Figure 73:
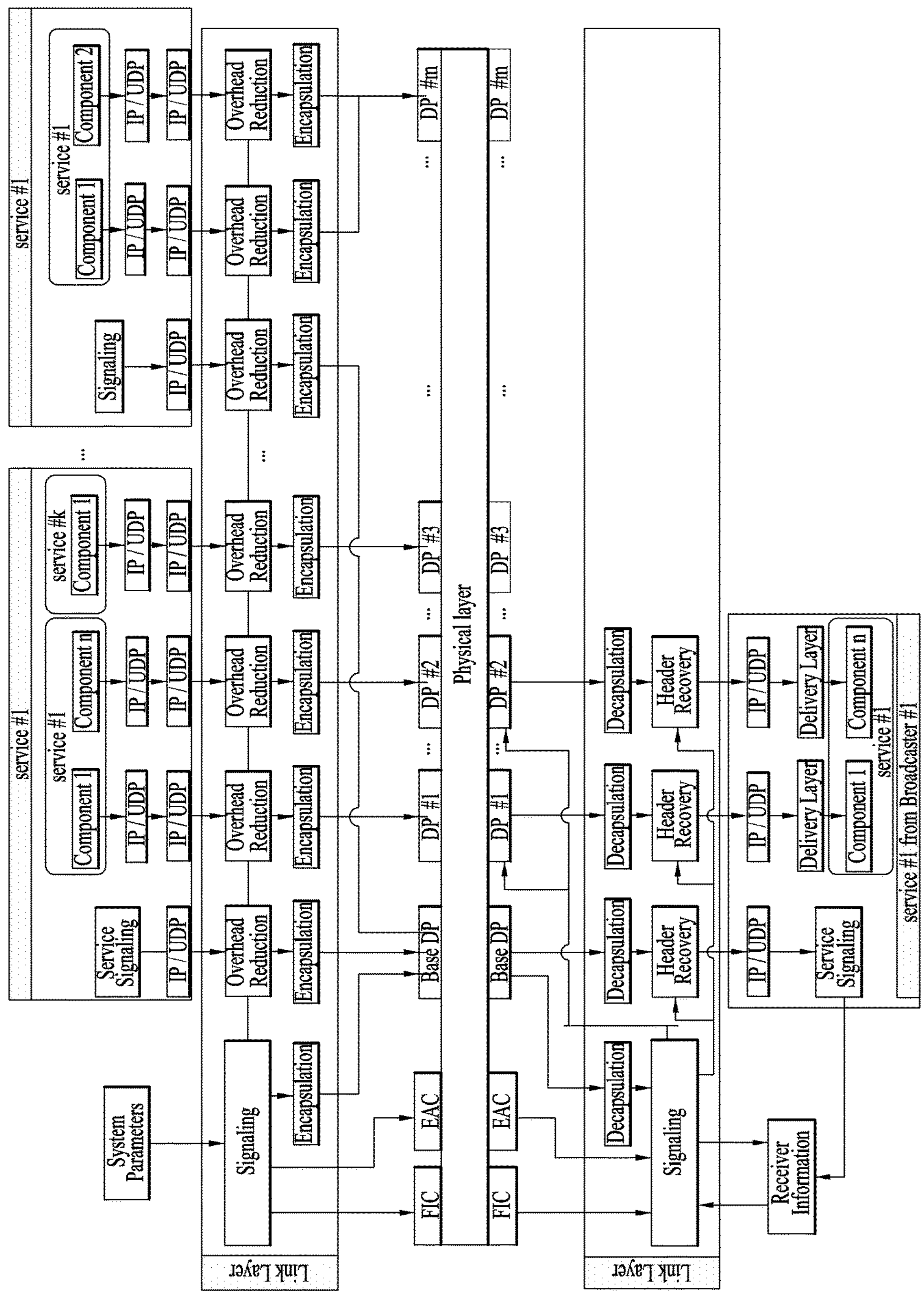
FIG. 73 illustrates operation of processing signals and/or data in a link layer of a receiver when a logical data path includes a normal data pipe, a base data pipe and a dedicated channel according to an embodiment of the present invention.

FIG. 73 illustrates processing of signals and/or data in the link layer of the receiver when logical data paths include normal data pipes, a base DP and dedicated channels according to an embodiment of the present invention.

In the present embodiment, one or more services provided by one or more broadcasters are delivered in one frequency band. One broadcaster transmits one or more services, and one service includes one or more components. A user receives content on a broadcast service basis. Part of one or more components included in one broadcast service may be replaced by other components according to user choice.

An FIC and/or an EAC may be delivered through dedicated channels. A base DP and a normal DP may be separately delivered or managed in a broadcast signal. Information on configurations of the FIC and/or the EAC may be transmitted through physical layer signaling or recognized by the receiver, and the link layer formats signaling according to characteristics of the corresponding channels. Delivery of data through a specific channel of the physical layer is performed from a logical standpoint and actual delivery operation can be performed according to characteristics of the physical layer.

A service of each broadcaster, transmitted at the frequency corresponding to the FIC, and information about a path for receiving the service can be delivered through the FIC. To this end, link layer signaling can provide (signal) the following information:

parameters related to a system parameter transmitter and/or parameters related to broadcasters providing services through the corresponding channel;

context information related to link layer IP header compression and/or IDs of DPs to which the corresponding context is applied; and IP address and/or UDP port number of an upper layer, service and/or component information, emergency alert information, and information about a mapping relationship between the IP address of a packet stream delivered from an IP layer and a DP.

When a plurality of broadcast services is delivered through a single frequency band, it may be efficient for the receiver to check signaling information first and to decode only DPs for a necessary service instead of decoding all DPs. In the broadcast system, the transmitter can transmit information for identifying only a necessary DP through an FIC and the receiver can check a DP that needs to be accessed for a specific service using the FIC. In this case, operation related to the link layer of the receiver may be as follows.

When the user selects or changes a service to be received, the receiver tunes to the frequency corresponding to the service and reads information related to the channel corresponding to the service, stored in a DB thereof. The information stored in the DB of the receiver may be configured using information included in the FIC acquired during initial channel scan.

The receiver receives the FIC and updates the DB or acquires, from the FIC, information about a mapping relationship between components of the service selected by the user and DPs through which the components are delivered. In addition, the receiver can acquire information about the base DP through which signaling is delivered from the FIC.

If signaling information delivered through the FIC includes initialization information related to RoHC (Robust Header Compression), the receiver acquires the initialization information and prepares header recovery.

The receiver decodes the base DP and the DPs through which the service selected by the user is delivered on the basis of the information delivered through the FIC.

The receiver acquires overhead reduction information about the received DPs, which is included in the base DP, performs decapsulation and/or header recovery on packet streams received through normal DPs using the acquired overhead reduction information, and sends the processed packet streams to an upper layer thereof in the form of IP packet streams.

For the received service, the receiver can receive service signaling delivered in the form of an IP packet having a specific address through the base DP and send the packet streams of the service signaling to the upper layer.

In the case of emergency alert, the receiver receives signaling information including a CAP message through signaling, parses the signaling information, immediately delivers the parsed signaling information to the user and, when paths through which audio/video services can be received can be confirmed through signaling, finds a path through which the corresponding service is received and receives service data through the path, in order to rapidly deliver an emergency alert message. When information delivered through a broadband network is present, the receiver receives NRT services and additional information using the URI corresponding to the information. Signaling information related to emergency alert will be described in detail later.

The receiver processes emergency alert as follows.

The receiver recognizes delivery of an emergency alert message through a preamble of the physical layer. The preamble of the physical layer is a signaling signal included in a broadcast signal and may correspond to signaling in the physical layer. The preamble of the physical layer may include information for acquiring data, broadcast frames, data pipes and/or transport parameters included in a broadcast signal.

The receiver checks the configuration of an EAC through physical layer signaling of the receiver, decodes the EAC and acquires an EAT. Here, the EAC may correspond to the aforementioned dedicated channel.

The receiver checks the acquired EAT, extracts a CAP message therefrom and delivers the CAP message to a CAP parser.

When the EAT includes service information related to emergency alert, the receiver receives service data by decoding the corresponding DP. The EAT can include information for identifying a DP through which a service related to the emergency alert is delivered.

When the EAT or the CAP message includes information related to NRT service data, the receiver receives the information through a broadband network.

FIG. 74 illustrates a syntax of an FIC according to an embodiment of the present invention.

Information included in the FIC can be delivered in the form of a fast information table (FIT).

Information included in the FIT can be delivered in XML format and/or in the form of a section table.

The FIT may include table_id information, FIT_data_version information, num_broadcast information, broadcast_id information, delivery_system_id information, base_DP_id information, base_DP_version information, num_service information, service_id information, service_category information, service_hidden_flag information, SP_indicator information, num_component information, component_id information, DP_id information, context_id information, an RoHC_init_descriptor, context_profile information, max_cid information and/or large_cid information.

The table_id information indicates that the corresponding table section is an FIT.

The FIT_data_version information is version information about the syntax and semantics included in the FIT. The receiver can determine whether to process signaling included in the FIT using the FIT_data_version information. The receiver can determine whether to update information on a prestored FIC using this information.

The num_broadcast information can indicate the number of broadcasters who transmit broadcast services and/or content through the corresponding frequency or transport frame.

The broadcast_id information can indicate identifiers of broadcasters who transmit broadcast services and/or content through the corresponding frequency or transport frame. The broadcast_id of a broadcaster who transmits MPEG2 TS based data may be identical to transport_stream_id of MPEG2 TS.

The delivery_system_id information can indicate the identifier of a broadcast delivery system using the same delivery parameter on a broadcast network.

The base_DP_id information identifies a base DP in a broadcast signal. The base DP may refer to a DP which delivers service signaling including PSI/SI (Program Specific Information/System Information) of a broadcaster corresponding to the broadcast_id information and/or overhead reduction information. Otherwise, the base DP may refer to a representative DP through which components of a broadcast service of the corresponding broadcaster can be decoded.

The base_DP_version information can indicate the version of data delivered through the base DP. For example, the value of the base_DP_version information can be incremented by 1 when service signaling such as PSI/SI is delivered through the base DP or when service signaling is changed.

The num_service information can indicate the number of broadcast services delivered from the broadcaster corresponding to the broadcast_id information within the corresponding frequency or transport frame.

The service_id information can be used as an identifier for identifying a broadcast service.

The service_category information can indicate the category of a broadcast service. The service_category information can indicate basic TV when the value thereof is 0x01, basic radio when the value thereof is 0x02, an RI service when the value thereof is 0x03, a service guide when the value thereof is 0x08, and emergency alert when the value thereof is 0x09.

The service_hidden_flag information can indicate whether the corresponding broadcast service is hidden. When the broadcast service is hidden, the broadcast service is a test server or a service used in a broadcast receiver and thus the broadcast receiver can ignore the broadcast service or hide the broadcast service from a service list.

The SP_indicator information can indicate whether service protection is applied to one or more components in the corresponding broadcast service.

The num_component information can indicate the number of components constituting the corresponding broadcast service.

The component_id information can be used as an identifier for identifying the corresponding component in the broadcast service.

The DP_id information can be used as an identifier for identifying a DP through which the corresponding component is delivered.

The RoHC_init_descriptor can include information related to overhead reduction and/or header recovery. The RoHC_init_descriptor can contain information for identifying a header compression scheme used in the transmitter.

The context_id information can indicate a context to which the following RoHC related field corresponds. The context_id information corresponds to a CID (context identifier).

The context_profile information indicates the range of a header compression protocol of RoHC. In RoHC, streams can be compressed and recovered only when a compressor and a decompressor have the same profile.

The max_cid information is used to notify the decompressor of a maximum CID value.

The large_cid information has a Boolean value and indicates whether short CIDs (0 to 15) or embedded CIDs (0 to 16383) are used in a CID configuration. Accordingly, a byte size representing CID is determined.

FIG. 75 illustrates a syntax of an emergency alert table (EAT) according to an embodiment of the present invention.

Information related to emergency alert may be delivered through an EAC. The EAC may correspond to the aforementioned dedicated channel.

The EAT according to an embodiment of the present invention includes EAT_protocol_version information, automatic_tuning_flag information, num_EAS_messages information, EAS_message_id information, EAS_IP_version_flag information, EAS_message_transfer_type information, EAS_message_encoding_type information, EAS_NRT_flag information, EAS_message_length information, EAS_message_byte information, IP_address information, UDP_port_num information, DP_id information, automatic_tuning_channel_number information, automatic_tuning_DP_id information, automatic_tuning_service_id information and/or EAS_NRT_service_id information.

The EAT_protocol_version information indicates the protocol version of the received EAT.

The automatic_tuning_flag information indicates whether the receiver will automatically perform channel change.

The num_EAS_messages information indicates the number of messages included in the EAT.

The EAS_message_id information identifies each EAS message.

The EAS_IP_version_flag information indicates IPv4 when the value thereof is 0 and indicates IPv6 when the value thereof is 1.

The EAS_message_transfer_type information indicates EAS message transfer type. The EAS_message_transfer_type information indicates “not specified” when the value thereof is 000, indicates “No Alert message (only AV content)” when the value thereof is 001, and indicates that the EAT includes an EAS message when the value thereof is 010. To this end, a length field and a field for the corresponding EAS message are added thereto. The EAS_message_transfer_type information indicates delivery of an EAS message through a data pipe when the value thereof is 011. EAS can be transferred in the form of an IP datagram through a data pipe. To this end, IP address information, UDP port information and information on the DP of the physical layer, through which the EAS is transferred, can be added.

The EAS_message_encoding_type information indicates information about encoding type of an emergency alert message. For example, the EAS_message_encoding_type information indicates "not specified" when the value thereof is 000, indicates "no encoding" when the value thereof is 001 and indicates DEFLATE algorithm (RFC1951) when the value thereof is 010. EAS_message_encoding_type information values of 001 to 111 can be reserved for other encoding types.

The EAS_NRT_flag information indicates presence of NRT content and/or NRT data associated with a received message. The EAS_NRT_flag information indicates that NRT content and/or NRT data are not present with respect to the received emergency message when the value thereof is 0 and indicates that NRT content and/or NRT data are present with respect to the received emergency message when the value thereof is 1.

The EAS_message_length information specifies the length of the corresponding EAS message.

The EAS_message_byte information includes the contents of the EAS message.

The IP_address information indicates the IP address of an IP packet through which the EAS message is transferred.

The UDP_port_num information indicates a UDP port number associated with EAS message delivery.

The DP_id information identifies a data pipe through which the EAS message is delivered.

The automatic_tuning_channel_number information includes information on the number of a channel to be switched.

The automatic_tuning_DP_id information identifies a data pipe through which the corresponding content is delivered.

The automatic_tuning_service_id information identifies a service to which the corresponding content belongs.

The EAS_NRT_service_id information identifies an NRT service corresponding to a case in which NRT content and data related to the received emergency alert message are delivered, that is, EAS_NRT_flag in an enable state.

Figure 76:
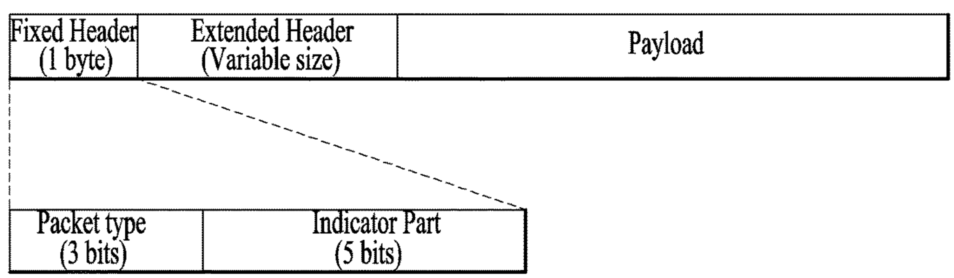
FIG. 76 illustrates a packet delivered through a data pipe according to an embodiment of the present invention.

FIG. 76 illustrates a packet delivered through a data pipe according to an embodiment of the present invention.

According to an embodiment of the present invention, a link layer packet, which is compatible irrespective of change of a protocol of an upper layer or lower layer of the link layer, can be generated by defining a new packet structure in the link layer.

The link layer packet according to an embodiment of the present invention can be delivered through a normal DP and/or a base DP.

The link layer packet can include a fixed header, an extended header and/or a payload.

The fixed header is a header having a fixed size and the extended header is a header having a variable size depending on a packet configuration of the upper layer. The payload is a region in which data of the upper layer is transferred.

A header (fixed header or extended header) of a packet can include a field indicating payload type of the packet. In the case of the fixed header, first 3 bits of 1 byte can include data indicating the packet type of the upper layer and the remaining 5 bits can be used as an indicator part. The indicator part can include data indicating a payload configuration method and/or configuration information of the extended header, the configuration of the indicator part can depend on packet type.

A table shown in FIG. 76 shows types of upper layer packets included in the payload, according to packet type values.

IP packets and/or RoHC packets included in the payload can be delivered through DPs and signaling packets included in the payload can be delivered through the base DP according to system configuration. Accordingly, when various types of packets are simultaneously delivered, a data packet may be discriminated from a signaling packet by respectively assigning packet type values to the packets.

A packet type value of 000 indicates that an IPv4 packet is included in the payload.

A packet type value of 001 indicates that an IPv6 packet is included in the payload.

A packet type value of 010 indicates that a compressed IP packet is included in the payload. The compressed IP packet can include an IP packet to which header compression has been applied.

A packet type value of 110 indicates that a packet including signaling data is included in the payload.

A packet type value of 111 indicates that a framed packet is included in the payload.

Figure 77:
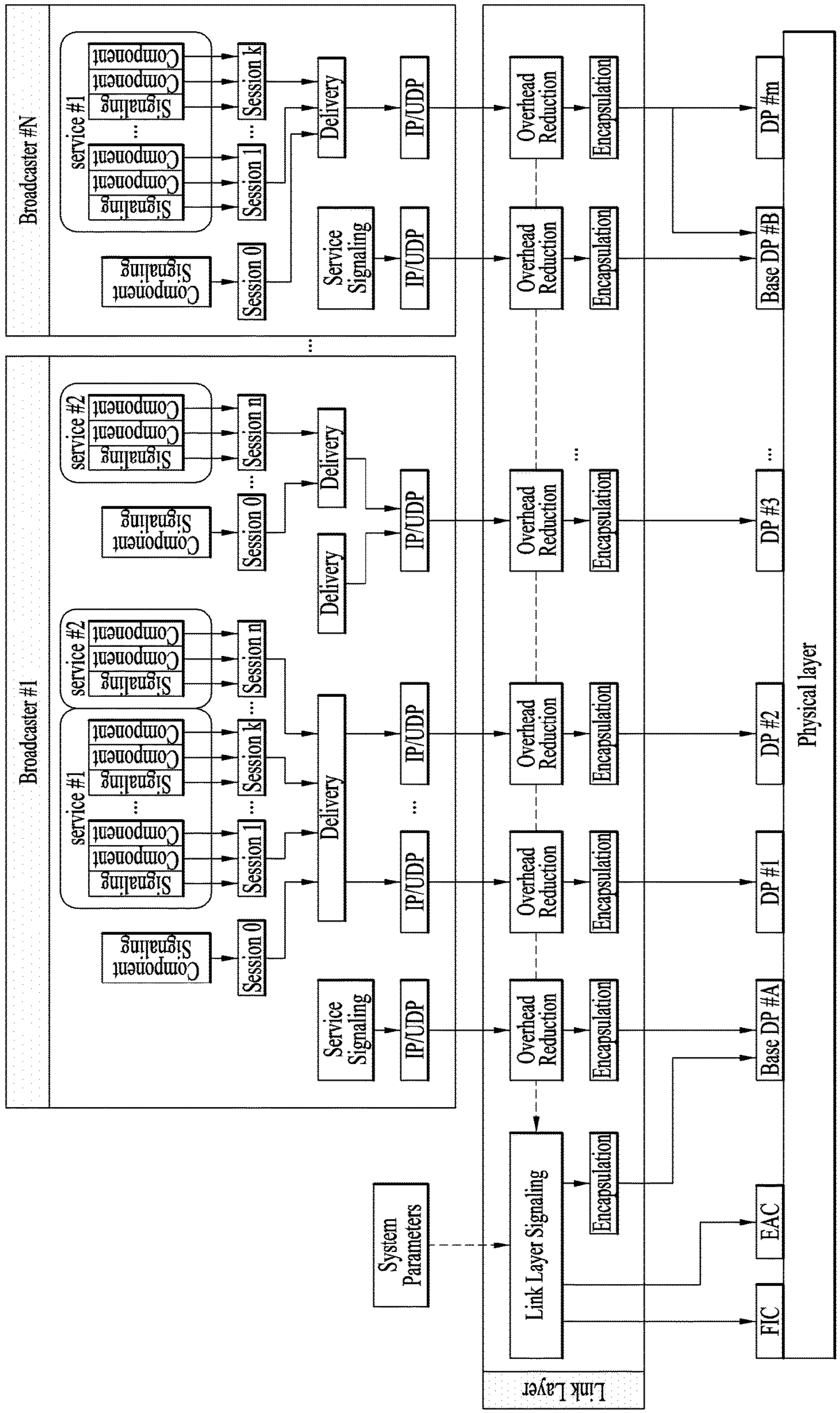
FIG. 77 illustrates operation of processing signals and/or data in each protocol stack of a transmitter when a logical data path of a physical layer includes a dedicated channel, a base DP and a normal DP according to another embodiment of the present invention.

FIG. 77 illustrates operation of processing signals and/or data in each protocol stack of the transmitter when logical data paths of the physical layer include dedicated channels, base DPs and normal DPs according to another embodiment of the present invention.

One or more broadcasters can provide broadcast services within a single frequency band. A broadcaster transmits a plurality of broadcast services. A single broadcast service can include one or more components. The user can receive broadcast content on a service basis.

In the broadcast system, a session based transport protocol can be used in order to support IP hybrid broadcast, and the contents of signaling delivered through each signaling path can be determined according to transport structure of the protocol.

As described above, data related to an FIC and/or an EAC can be delivered through dedicated channels. A base DP and a normal DP can be discriminately used in the broadcast system.

Configuration information of the FIC and/or the EAC can be included in physical layer signaling or a transmission parameter. The link layer can format signaling according to characteristics of the corresponding channel. Delivery of data through a specific channel of the physical layer can be performed from a logical standpoint and actual delivery operation can be performed according to characteristics of the physical layer.

The FIC can include information about services, which are transmitted at the corresponding frequency, of each broadcaster and paths for receiving the services. The FIC can include information for acquiring services and may be called service acquisition information.

The FIC and/or the EAC can be included in link layer signaling.

The link layer signaling can include the following information:

Parameters related to a system parameter transmitter and parameters related to broadcasters providing services;

Context information related to link layer IP header compression and identifiers of DPs to which the corresponding context is applied; and Upper layer IP address and UDP port number information, service and component information, emergency alert information, IP addresses of packet streams and signaling delivered from the IP layer, and a mapping relationship among UDP port numbers, session IDs and DPs.

As described above, when one or more broadcast services are delivered through a single frequency band, it is efficient for the receiver to check signaling information first and to decode only DPs related to the corresponding service instead of decoding all DPs.

In this case, the broadcast system can provide or acquire information for mapping DPs and services using the FIC and/or the base DP, as shown in the figure.

Processing of a broadcast signal or broadcast data in the transmitter, illustrated in the figure, will now be described. One or more broadcasters #1 to #N can process component signaling and/or data for one or more broadcast services such that the component signaling and/or the data can be delivered through one or more sessions. A single broadcast service can be delivered through one or more sessions. A broadcast service can include one or more components and/or signaling information for the broadcast service. The component signaling can include information used for the receiver to acquire components included in the broadcast service. Service signaling, component signaling and/or data for one or more broadcast services can be delivered to the link layer through processing in the IP layer.

When IP packets require overhead reduction, the transmitter performs overhead reduction and generates related information as link layer signaling in the link layer. The link layer signaling may include system parameters that describe the broadcast system in addition to the aforementioned information. The transmitter can process the IP packets in link layer processing stage and deliver the processed IP packets as more DPs in the physical layer.

The transmitter can transmit the link layer signaling to the receiver in the form or configuration of an FIC and/or an EAC. The transmitter may encapsulate the link layer signaling in the link layer and transmit the encapsulated signaling information to a base DP.

Figure 78:
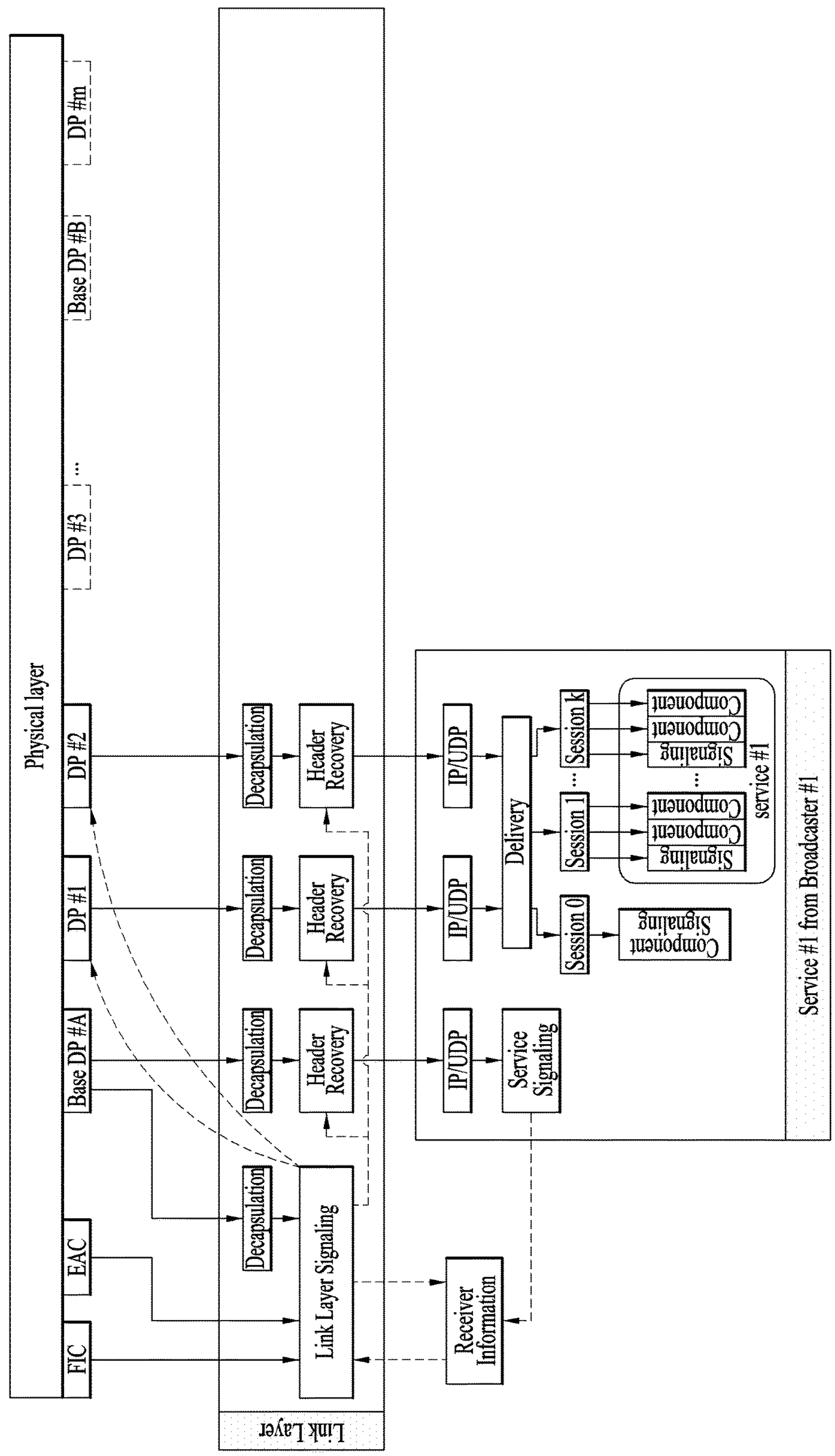
FIG. 78 illustrates operation of processing signals and/or data in each protocol stack of a receiver when a logical data path of a physical layer includes a dedicated channel, a base DP and a normal DP according to another embodiment of the present invention.

FIG. 78 illustrates operation of processing signals and/or data in each protocol stack of the receiver when logical data paths of the physical layer include dedicated channels, base DPs and normal DPs according to another embodiment of the present invention.

When the user selects or changes a service to be received, the receiver tunes to the corresponding frequency. The receiver reads information related to the corresponding channel, which is stored in a DB. Here, the information stored in the DB of the receiver may correspond to information included in an FIC and/or an EAC acquired during initial channel scan. The receiver may extract information delivered as described above.

The receiver receives the FIC and/or the EAC, receives information on a channel to be accessed thereby and then updates information stored in the DB. The receiver may acquire information about a mapping relationship between components of the service selected by the user and DPs through which the components are delivered or acquire information about a base DP and/or a normal DP through which signaling necessary to acquire the mapping relationship information is delivered. The receiver may omit a procedure of decoding or parsing the received FIC and/or EAC upon determining that version information of the FIC or information indicating whether the corresponding dedicated channel needs to be updated has not been changed.

The receiver can acquire link layer signaling packets including link layer signaling by decoding the base DP and/or DPs through which signaling information is delivered on the basis of information delivered through the FIC. The receiver may combine the received link layer signaling information with signaling information which has been received from a dedicated channel and use the combined information (receiver information shown in the figure).

The receiver can acquire information on a DP for receiving the service selected by the user, from among a plurality of DPs transmitted through the current channel, and overhead reduction information about packet streams of the corresponding DP using the FIC and/or the link layer signaling information.

When the information on the DP for receiving the selected service is delivered through upper layer signaling, the receiver can obtain signaling information stored in the DB and/or a shared memory so as to acquire information on DPs to be decoded, indicated by the signaling information.

When the link layer signaling and normal data (e.g. data included in broadcast content) are delivered through the same DP or only one DP is used to deliver the same, the receiver can temporarily store the normal data delivered through the DP in a buffer during decoding and/or parsing of the link layer signaling.

The receiver can acquire base DPs and/or DPs through which signaling information is delivered, obtain overhead reduction information about DPs to be received, from the acquired base DPs and DPs, perform decapsulation and/or header recovery on packet streams received through normal DPs using the overhead reduction information, process the packet streams into IP packet streams and deliver the IP packets streams to the upper layer.

FIG. 79 illustrates a syntax of an FIC according to another embodiment of the present invention.

Information included in the FIC illustrated in the figure may be selectively combined with the information included in the aforementioned FIC to configure the FIC.

The receiver can rapidly acquire information about the FIC using information included in the FIC. The receiver can acquire bootstrap related information using information included in the FIC. The FIC can include information for rapid channel scan and/or rapid service acquisition. The FIC may be given other names. For example, the FIC can be called a service list table, service acquisition information or the like. The FIC may be included in an IP packet in the IP layer and delivered according to a broadcast system. In this case, the IP address and/or UDP port for FIC delivery can be fixed to specific values, and the receiver can recognize that an IP packet delivered to the IP address and/or UDP port includes the FIC without additional processing.

The FIC may include FIC_protocol_version information, transport_stream_id information, num_partitions information, partition_id information, partition_protocol_version information, num_services information, service_id information, service_data_version information, service_channel_number information, service_category information, service_status information, service_distribution information, sp_indicator information, IP_version_flag information, SSC_source_IP_address_flag information, SSC_source_IP_address information, SSC_destination_IP_address information, SSC_destination_UDP_port information, SSC_TSI information, SSC_DP_ID information, num_partition_level_descriptors information, partition_level_descriptor( ) information, num_FIC_level_descriptors information and/or FIC_level_descriptor( ) information.

The FIC_protocol_version information indicates the protocol version of the FIC.

The transport_stream_id information identifies a broadcast stream. The transport_stream_id information can be used as information for identifying a broadcaster.

The num_partitions information indicates the number of partitions in the broadcast stream. The broadcast stream can be segmented into one or more partitions and delivered. Each partition can include one or more data pipes. Data pipes included in each partition may correspond to data pipes used by one broadcaster. In this case, a partition can be defined as a transport unit allocated per broadcaster.

The partition_id information identifies a partition. The partitioned information can identify a broadcaster.

The partition_protocol_inversion information indicates the version of a partition protocol.

The num_services information indicates the number of services included in the corresponding partition. A service can include one or more components.

The service_id information identifies a service.

The service_data_version information indicates a change in a signaling table (signaling information) for a service or a change in service entry for a service signaled by the FIC. The value of the service_data_version information can be incremented whenever the signaling table or service entry is changed.

The service_channel_number information indicates the channel number of the corresponding service.

The service_category information indicates the category of the corresponding service. The service category includes A/V content, audio content, ESG (Electronic Service Guide) and/or CoD (Content on Demand).

The service_status information indicates a status of the corresponding service. The service status may include "active", "suspended", "hidden" and "shown". The service status may include "inactive". In an inactive state, the corresponding broadcast service can be provided in the future while corresponding broadcast content is not currently provided, and thus the receiver may not show a scan result with respect to the corresponding broadcast service to a viewer when the viewer scans channels through the receiver.

The service_distribution information indicates a distribution state of data for the corresponding service. For example, the service_distribution information can indicate that the entire data of the service is included in a single partition, indicate that some part of the data of the service is not included in the current partition but content is presentable only with data included in the partition, indicate that other partitions are necessary to present the content, or indicate that other broadcast streams are necessary to present the content.

The sp_indicator information indicates application of service protection. For example, the sp_indicator information can indicate whether one or more components are protected (e.g. encoded) for significant presentation.

The IP_version_flag information indicates whether IP addresses indicated by the SSC_source_IP_address information and/or the SSC_destination_IP_address information correspond to IPv4 or IPv6.

The SSC_source_IP_address_flag information indicates presence of the SSC_source_IP_address information.

The SSC_source_IP_address information indicates the source IP address of an IP datagram which delivers signaling information for the corresponding broadcast service. The signaling information for the service may be called service layer signaling. The service layer signaling includes information that describes the broadcast service. For example, the service layer signaling can include information for identifying a data unit (session, DP or packet) that delivers a component constituting the broadcast service.

The SSC_destination_IP_address information indicates the destination IP address of the IP datagram (or channel) that delivers the signaling information for the broadcast service.

The SSC_destination_UDP_port information indicates a destination UDP port number for UDP/IP streams that deliver the signaling information for the broadcast service.

The SSC_TSI information indicates a transport session identifier (TSI) of an LCT channel (or session) through which the signaling information (or signaling table) for the broadcast service is delivered.

The SSC_DP_ID information is an identifier for identifying a DP including the signaling information (or signaling table) for the broadcast service. The DP including the signaling information can be assigned to the most robust DP in a broadcast delivery procedure.

The num_partition_level_descriptors information indicates the number of descriptors of the partition level for partitions.

The partition_level_descriptor( ) information includes zero or more descriptors which provide additional information for partitions.

The num_FIC_level_descriptors information indicates the number of descriptors of the FIC level for the FIC.

The FIC_level_descriptor( ) information includes zero or more descriptors which provide additional information for the FIC.

Figure 80:
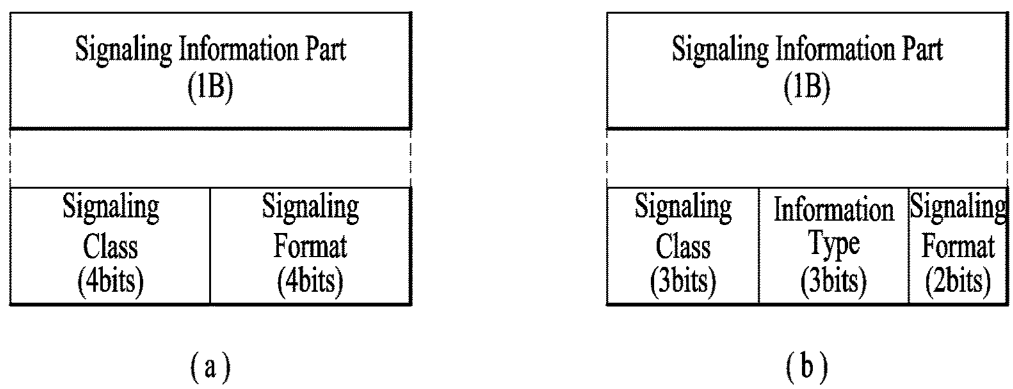
FIG. 80 illustrates signaling_information_part( ) according to an embodiment of the present invention.

FIG. 80 illustrates Signaling_Information_Part( ) according to an embodiment of the present invention.

In a broadcast system, additional information may be added to the extended header of a packet for delivering signaling information in the aforementioned packet structure for delivery through DPs. Such additional information is called Signaling_Information_Part( ) in the following description.

Signaling_Information_Part( ) may include information used to determine a processing module (or processor) for processing received signaling information. In a system configuration stage, the broadcast system can adjust the number of fields indicating information and the number of bits allocated per field within bytes allocated to Signaling_Information_Part( ). When signaling information is multiplexed and delivered, the receiver can use information included in Signaling_Information_Part( ) to determine whether to process the signaling information and to determine a signaling processing module to which the signaling information will be delivered.

The Signaling_Information_Part( ) may include Signaling_Class information, Information_Type information and/or signaling format information.

The Signaling_Class information can indicate the type of the delivered signaling information. The signaling information may correspond to an FIC, an EAC, link layer signaling information, service signaling information and/or upper layer signaling information. The number of bits of the field corresponding to Signaling_Class information and mapping of values of the field to signaling information types respectively indicated by the values can be determined according to system design.

The Information_Type information can be used to indicate details of the signaling information specified by the Signaling_Class information. Meaning of each value of the Information_Type information can be defined according to signaling information type indicated by the Signaling_Class information.

The signaling format informal ion indicates the form (or format) of signaling information configured in a payload. The signaling format information can indicate different signaling information formats and a newly designated signaling information format.

Signaling_Information_Part( ) shown in FIGS. 80(*a*) and 80(*b*) is exemplary and the number of bits allocated per field can be adjusted according to broadcast system characteristics.

Signaling_Information_Part( ) shown in FIG. 80(*a*) may include signaling class information and/or signaling format information. Signaling_Information_Part( ) can be used when the type of signaling information need not be designated or when information type in the signaling information can be recognized. In addition, when only one signaling format is used or when an additional protocol for signaling is present and thus the same signaling format is used all the time, Signaling_Information_Part( ) can be configured such that only a 4-bit signaling class field is used without the signaling format field and the remaining bits are reserved for future use, or various types of signaling are supported using an 8-bit signaling class field.

Signaling_Information_Part( ) shown in FIG. 80(*b*) additionally includes information type information in order to indicate more detailed information type or properties in a signaling class when the signaling class is designated and may include signaling format information. The signaling class information and the information type information can be used to determine signaling information decapsulation or processing of the corresponding signaling information. A structure or processing for link layer signaling has been described and will be described later in detail.

Figure 81:
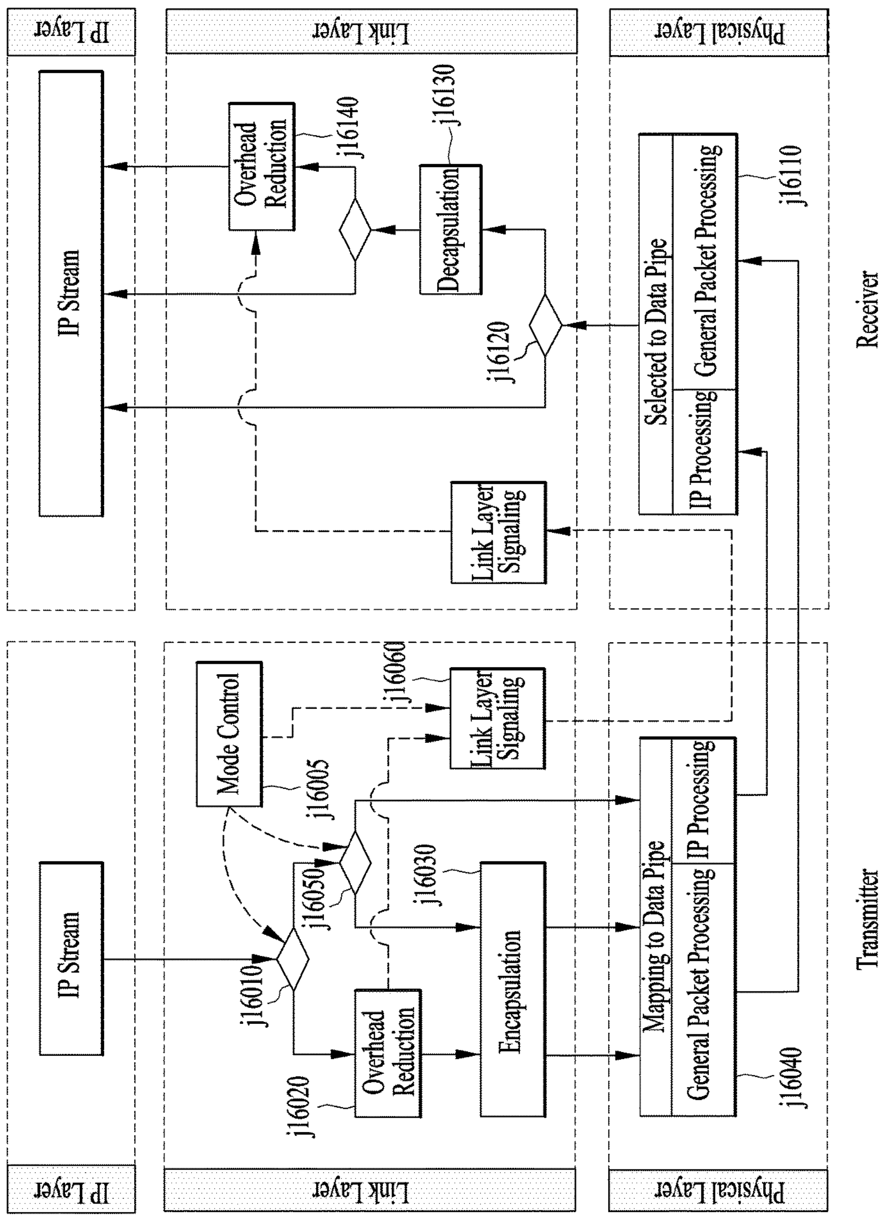
FIG. 81 illustrates a process of controlling operation modes of a transmitter and/or a receiver in link layers according to an embodiment of the present invention.

FIG. 81 illustrates a process of controlling operation modes of a transmitter and/or a receiver in link layers according to an embodiment of the present invention.

Determination of an operation mode of the transmitter or the receiver in the link layer can enable flexible design and efficient use of the broadcast system. According to a method for controlling a link layer mode proposed by the present invention, modes of the link layer for efficient operation of system bandwidth and processing time can be dynamically switched. In addition, when it is necessary to support a specific mode due to physical layer change or when the necessity for a specific mode is eliminated, this is easily handled. Furthermore, when a broadcaster providing a broadcast service intends to designate a method for delivering the broadcast service, the broadcast system can easily accept requests of the broadcaster.

A method for controlling a link layer operation mode may be configured to operate only within the link layer or performed through a data structure change in the link layer. In this case, in a network layer and/or a physical layer, independent operations of the layers can be performed without implementing additional functions. Link layer modes proposed by the present invention can be controlled with signaling or system internal parameters without modifying the system to be adapted to the physical layer structure. A specific mode may be operated only when the physical layer supports processing of corresponding input.

FIG. 81 shows a flow of processing signals and/or data by the transmitter and/or the receiver in IP layers, link layers and physical layers.

Functional blocks (which can be implemented as hardware and/or software) for mode control can be added to the link layers to manage parameters and/or signaling information for determining whether to process packets. The link layers can determine whether to execute corresponding functions in packet stream processing using information included in the mode control functional blocks.

Operation of the transmitter will now be described first.

The transmitter determines whether to perform overhead reduction j16020 on an IP packet stream using a mode control parameter j16005 upon input of the IP packet stream to the link layer. The mode control parameter can be generated in the transmitter by a service provider. The mode control parameter will be described in detail later.

When overhead reduction j16020 is performed, the transmitter generates information about overhead reduction and includes the generated information in link layer signaling information j16060. The link layer signaling information j16060 may include part or all of the mode control parameter. The link layer signaling information j16060 can be delivered in the form of a link layer signaling packet. While the link layer signaling packet can be mapped to a DP and delivered to the receiver, the link layer signaling packet may be delivered to the receiver through a predetermined region of a broadcast signal without being mapped to a DP.

The overhead-reduced packet stream is encapsulated (j16030) and input to a DP of the physical layer j16040. When the packet stream is not overhead-reduced, the transmitter determines whether to perform encapsulation on the packet stream (j16050).

The encapsulated packet stream is applied to a PD of the physical layer (j16040). Here, the physical layer performs processing on a general packet (link layer packet). When the IP packet stream is not overhead-reduced and encapsulated, the IP packet stream is directly delivered to the physical layer. In this case, the physical layer performs operation for processing the IP packet stream. When the IP packet stream is directly delivered to the physical layer, a parameter can be assigned such that the physical layer operates only when the physical layer supports IP packet input. That is, when the physical layer does not support IP packet processing, the mode control parameter can be controlled such that the process of directly delivering the IP packet stream to the physical layer is not performed.

The transmitter transmits the broadcast signal that has passed through the aforementioned process to the receiver.

Operation of the receiver will now be described.

When a specific DP is selected due to channel change according to user operation in the receiver and a packet stream is received through the specific DP (j16110), the receiver can check a mode in which the packet stream has been generated in the transmitter using the header of the packet stream and/or signaling information (j16120). Upon checking of the mode for the corresponding DP, the packet stream passes through decapsulation (j16130) and overhead reduction (j16140) and then is delivered to an upper layer through reception operation of the link layer. The overhead reduction process j16140 may include overhead recovery.

FIG. 92 illustrates link layer operation and formats of a packet delivered to the physical layer according to flag values in accordance with an embodiment of the present invention.

A link layer operation mode may be determined using the aforementioned signaling information. Signaling information related thereto can be directly delivered to the receiver. In this case, the aforementioned signaling data or link layer signaling packet may include information related to mode control which will be described later.

A method of indirectly notifying the receiver of a link layer operation mode may be provided in consideration of complexity of the receiver.

For operation mode control, the following two flags can be considered.

HCF (Header Compression Flag): this determines whether head compression is applied in the corresponding link layer and can be assigned values representing "Enable" and "Disable".

EF (Encapsulation Flag): this determines whether encapsulation is applied in the corresponding link layer and can be assigned values representing "Enable" and "Disable". When encapsulation needs to be necessarily performed according to header compression scheme, the EF can be subordinated to the HCF.

Values mapped to each flag may be assigned according to system configuration within the range including values representing "Enable" and "Disable", and the number of bits allocated to each flag may be changed. In an embodiment, 1 can be mapped to "enable" and 0 can be mapped to "disable".

FIG. 82 shows whether header compression and encapsulation operations are performed in the link layer and formats of a packet delivered to the physical layer according to whether the operations are performed, with respect to the HCF and EF. According to an embodiment of the present invention, the receiver can be aware of the format of the packet input to the physical layer through information on the HCF and EF.

FIG. 83 illustrates a descriptor for signaling the mode control parameter according to an embodiment of the present invention.

Flags, which are information about mode control in the link layer, correspond to signaling information and can be generated in the form of a descriptor in the transmitter and delivered to the receiver. Signaling including a flag corresponding to mode control information can be used to control an operation mode in the transmitter at a headend and whether signaling delivered to the receiver includes the flag can be optional.

When signaling including a flag corresponding to mode control information is delivered to the receiver, the receiver can directly select an operation mode for a corresponding DP and perform packet decapsulation. When the flag is not delivered to the receiver, the receiver can determine a mode in which the corresponding packet has been delivered using physical layer signaling or field information of the packet header delivered to the receiver.

A link layer mode control descriptor according to an embodiment of the present invention may include DP_id information, HCF information and/or EF information. The link layer mode control descriptor may be included in the aforementioned FIC, link layer signaling packet, signaling through a dedicated channel, PSI/SI and/or transport parameter in the physical layer.

The DP_id information identifies a DP to which a link layer mode has been applied.

The HCF information indicates whether header compression has been applied to the DP identified by the DP_id information.

The EF information indicates whether encapsulation has been performed on the DP identified by the DP_id information.

Figure 84:
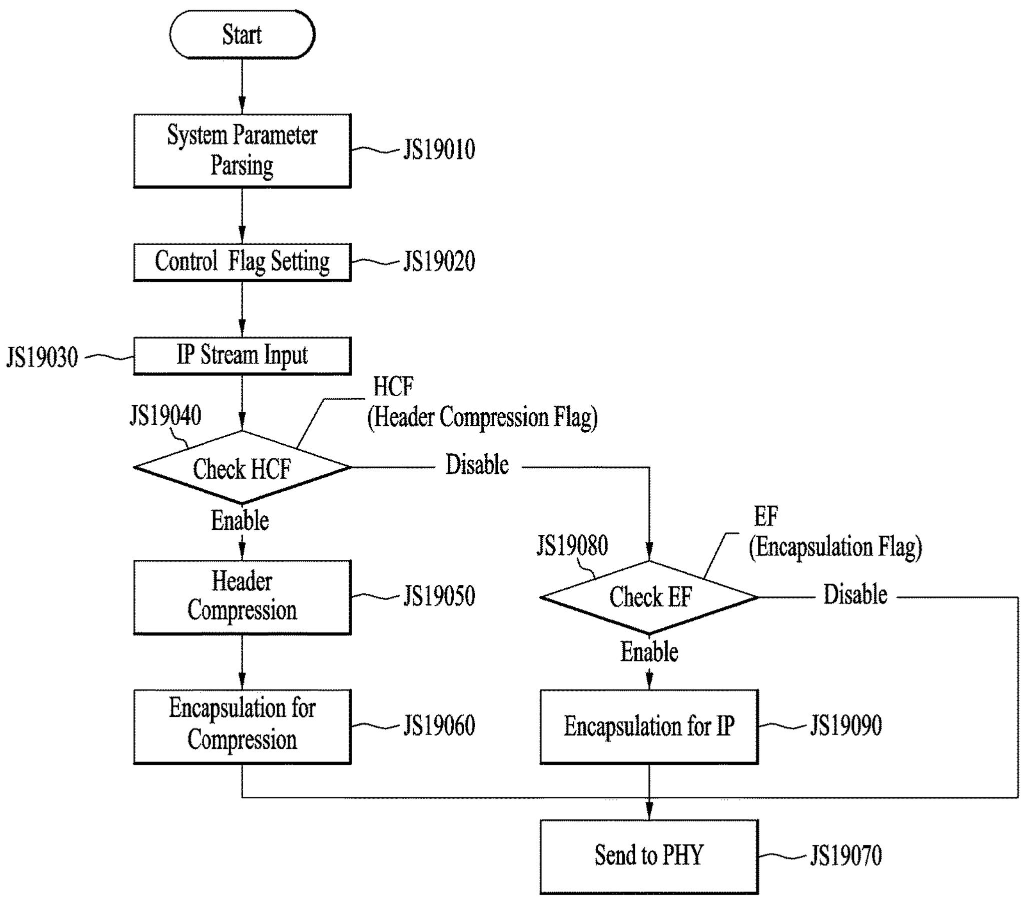
FIG. 84 is a flowchart illustrating a transmitter operation for controlling an operation mode according to an embodiment of the present invention.

FIG. 84 is a flowchart illustrating a transmitter operation of controlling an operation mode according to an embodiment of the present invention.

The transmitter may perform processing in an upper layer (e.g. IP layer) prior to processing in the link layer, which is not shown. The transmitter can generate an IP packet including broadcast data for a broadcast service.

The transmitter parses or generates a system parameter (JS19010). Here, the system parameter may correspond to the aforementioned signaling data or signaling information.

The transmitter sets a flag value with respect to operation mode control by receiving or setting a mode control related parameter or signaling information in broadcast data processing in the link layer (JS19020). This operation may be performed after header compression or encapsulation. That is, the transmitter can generate information related to the aforementioned operation after performing header compression or encapsulation.

The transmitter acquires a packet of the upper layer, which needs to be delivered through a broadcast signal (JS19030). Here, the upper layer packet may correspond to an IP packet.

The transmitter checks the HCF in order to determine whether to apply header compression to the upper layer packet (JS19040).

The transmitter applies header compression to the upper layer packet when the HCF is "enable" (JS19050). The transmitter may generate the HCF after header compression. The HCF can be used to signal whether header compression is applied.

The transmitter generates a link layer packet by encapsulating the upper layer packet to which header compression has been applied (JS19060). The transmitter may generate the EF after encapsulation. The EF can be used to signal whether encapsulation has been applied to the upper layer packet to the receiver.

The transmitter delivers the link layer packet to a physical layer processor (JS19070). Then, the physical layer processor generates a broadcast signal including the link layer packet and transmits the broadcast signal to the receiver.

The transmitter checks the EF to determine whether to apply encapsulation to the upper layer packet when the HCF is "disable" (JS19080).

The transmitter encapsulates the upper layer packet when the EF is "enable" (JS19090). The transmitter does not process the upper layer packet when the EF is "disable". The transmitter delivers the packet stream (link layer packet) which has been processed in the Link layer to the physical layer (JS19070). Header compression, encapsulation and/or generation of the link layer packet may be performed by a link layer packet generator (i.e. link layer processor) included in the transmitter.

The transmitter can generate service signaling channel (SCC) data. The service signaling channel data may be generated by a service signaling data encoder. The service signaling data encoder may be included in the link layer processor or provided separately from the link layer processor. The service signaling channel data may include the aforementioned FIC and/or EAT. The service signaling channel data can be delivered through an aforementioned dedicated channel.

Figure 85:
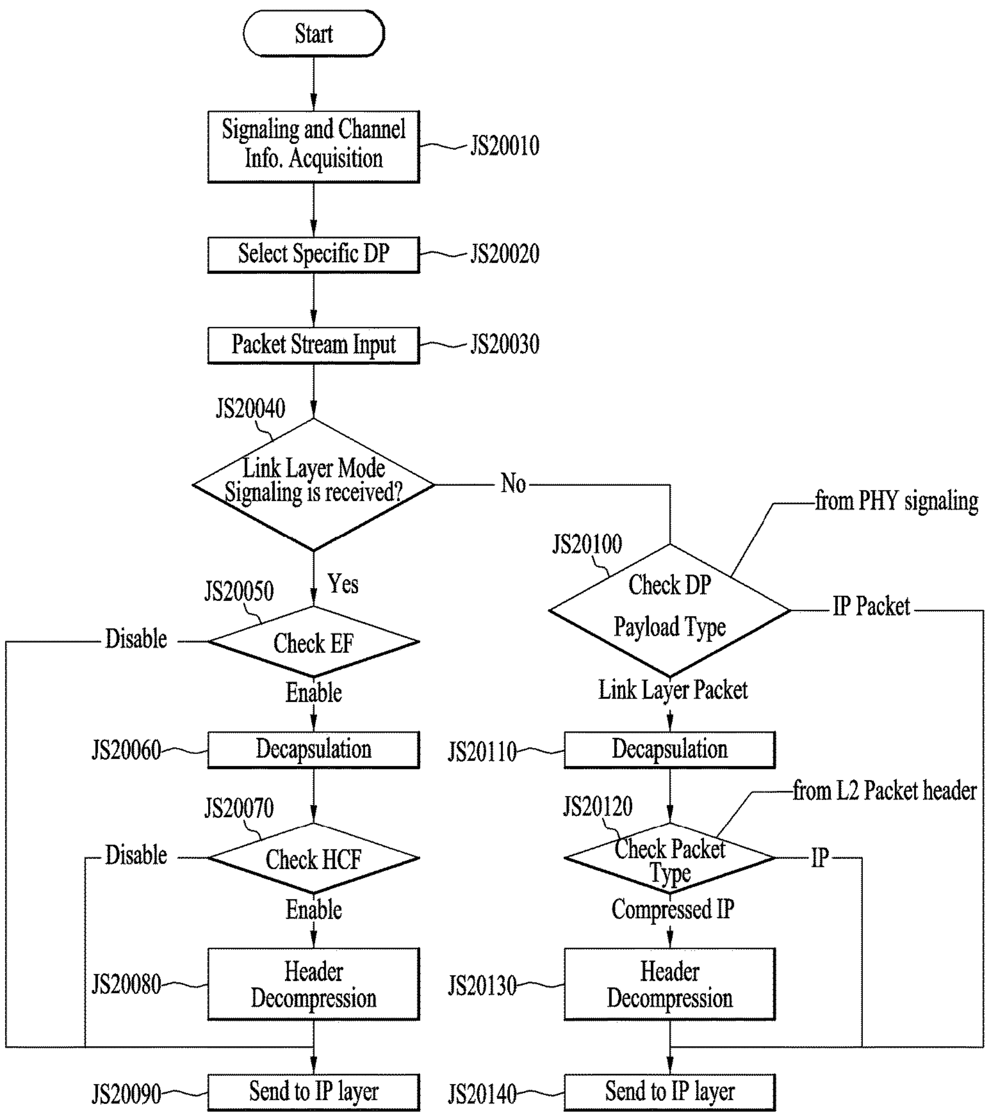
FIG. 85 is a flowchart illustrating a receiver operation for processing a broadcast signal according to operation mode according to an embodiment of the present invention.

FIG. 85 is a flowchart illustrating a receiver operation of processing a broadcast signal in response to operation modes according to an embodiment of the present invention.

The receiver can receive link layer operation mode related information along with a packet stream.

The receiver receives signaling information and/or channel information (JS20010). Here, the signaling information and the channel information have been described above.

The receiver selects a DP to be received and processed, according to the signaling information and/or the channel information (JS20020).

The receiver decodes the selected DP in the physical layer and receives a packet stream of the link layer (JS20030).

The receiver checks whether the received signaling information includes link layer mode control related signaling (JS20040).

The receiver checks the EF upon reception of link layer mode related information (JS20050).

The receiver decapsulates the packet stream of the link layer when the EF is "enable" (JS20060).

The receiver checks the HCF after packet decapsulation and performs header decompression when the HCF is "enable" (JS20080).

The receiver delivers the header-decompressed packet to an upper layer (e.g. IP layer) (JS20090). When the HCF and the EF are "disable" in the aforementioned process, the receiver recognizes the processed packet stream as an IP packet and delivers the IP packet to the IP layer.

The receiver operates as follows when the link layer mode related information is not received or when the corresponding system does not transmit the link layer mode related information to the receiver.

The receiver receives signaling information and/or channel information (JS20010) and selects a DP to be received according to the signaling information and/or channel information (JS20020). The receiver decodes the selected DP in the physical layer and acquires a packet stream (JS20030).

The receiver checks whether the received signaling information includes link layer mode control related signaling (JS20040).

Since the receiver has not received the link layer mode control related signaling, the receiver checks the format of the packet delivered thereto using physical layer signaling information (JS20100). Here, physical layer signaling information may include information for identifying the type of the packet included in the payload of the DP. The receiver sends the packet delivered from the physical layer to the IP layer without additionally processing the packet when the packet is an IP packet.

The receiver decapsulates the packet delivered from the physical layer when the packet has been encapsulated in the link layer (JS20110).

The receiver checks the format of the packet constituting the payload using information such as a link layer packet header during decapsulation (JS20120) and delivers the packet to an IP layer processor when the packet is an IP packet.

The receiver decompresses the packet when the link layer packet payload corresponds to compressed IP (JS20130).

The receiver delivers the IP packet to the IP layer processor (JS20140).

FIG. 86 illustrates information indicating encapsulation modes according to an embodiment of the present invention.

When processing in the link layer is performed in one or more modes in the broadcast system, a process of determining a mode in which processing in the link layer is performed may be needed (in the transmitter and/or the receiver). In a process of establishing a transmission link between the transmitter and the receiver, the transmitter and/or the receiver can check configuration information of the link layers thereof. This case may correspond to a case in which the receiver is initially set up or performs service scan or a case in which a mobile receiver newly enters a transmission radius of the transmitter. This process can be referred to as an initialization process or a bootstrapping process. This process may be configured as part of a procedure supported by the corresponding system, instead of being configured as an additional procedure, according to systems. This process is called an initialization process in the specification.

Parameters necessary in the initialization process may be determined by functions supported by the corresponding link layer and types of operation modes of the functions. A description will be given of functions constituting the link layer and parameters for determining operation modes according to the functions.

FIG. 86 shows parameters indicating encapsulation modes.

When a packet encapsulation process can be set in the link layer or an upper layer (e.g. IP layer), indices may be respectively allocated to encapsulation modes described below and appropriate field values may be respectively assigned to the indices. FIG. 86 shows an embodiment of field values respectively mapped to the encapsulation modes. While 2-bit field values are assigned in the present embodiment, the field values may be extended within a range permitted by the system when there are many supportable encapsulation modes.

In the present embodiment, when the field indicating an encapsulation mode is set to "00", the field can indicate that data bypasses without encapsulation in the link layer. When the field is set to "01", the field can indicate that data has been processed according to a first encapsulation scheme in the link layer. When the field is set to "10", the field can indicate that data has been processed according to a second encapsulation scheme in the link layer. When the field is set to "11", the field can indicate that data has been processed according to a third encapsulation scheme in the link layer.

FIG. 87 illustrates information indicating header compression modes according to an embodiment of the present invention.

Processing in the link layer may include an IP packet header compression function. When the link layer supports some IP header compression schemes, the transmitter can determine an IP header compression scheme to be used.

Since header compression mode determination generally includes the encapsulation function, the header compression mode can be disabled when the encapsulation mode is disabled. FIG. 87 shows an embodiment of field values mapped to respective header compression modes. While 3-bit field values are assigned in the present embodiment, the field values may be extended or reduced within a range permitted by the corresponding system according to supportable header compression modes.

In the present embodiment, when the field indicating a header compression mode is set to "000", the field can indicate that header compression has not been performed on data in the link layer. When the field is set to "001", the field can indicate that RoHC is used for header compression performed on data in the like layer. When the field is set to "010", the field can indicate that a second header compression scheme is used for header compression performed on data in the like layer. When the field is set to "011", the field can indicate that a third header compression scheme is used for header compression performed on data in the like layer. When the field is set to "100" to "111", the field values can be reserved for new header compression schemes for data in the link layer.

FIG. 88 illustrates information for indicating packet reconfiguration modes according to an embodiment of the present invention.

To apply header compression to a unidirectional link such as a broadcast system, the broadcast system (transmitter and/or receiver) needs to rapidly acquire context information. The broadcast system can transmit/receive header-compressed packet streams through an out-of-band scheme by reconfiguring a partially compressed packet and/or extracting context information. In the present invention, a mode in which processing such as packet reconfiguration and addition of information indicating a packet structure can be performed is called a packet reconfiguration mode.

Several packet reconfiguration modes may be present, and the broadcast system may designate a packet reconfiguration mode in the initialization process of the link layer. FIG. 88 shows an embodiment of indices and field values mapped to respective packet reconfiguration modes. While 2-bit field values are assigned in the present embodiment, the field values may be extended or reduced within a range permitted by the system according to supportable packet reconfiguration modes.

In the present embodiment, when the field indicating a packet reconfiguration mode is set to "00", the field can indicate that packet reconfiguration is not applied to a packet delivering data in the link layer. When the field is set to "01", the field can indicate that a first reconfiguration scheme is performed on the packet delivering data in the link layer. When the field is set to "10", the field can indicate that a second reconfiguration scheme is performed on the packet delivering data in the link layer. When the field is set to "11", the field can indicate that a third reconfiguration scheme is performed on the packet delivering data in the link layer.

FIG. 89 illustrates context transmission modes according to an embodiment of the present invention.

The aforementioned content information delivery scheme may include one or more transmission modes. That is, the broadcast system can transmit the aforementioned information through various methods. In the broadcast system, a context transmission mode can be determined according to system and/or logical transport paths of the physical layer, and information indicating the context transmission mode can be signaled. FIG. 89 shows an embodiment of indices and field values mapped to respective context transmission modes. While 3-bit field values are assigned in the present embodiment, the field values may be extended or reduced within a range permitted by the system according to supportable context transmission modes.

In the present embodiment, when the field indicating a context transmission mode is set to "000", the field can indicate that context information is transmitted in a first transmission mode. When the field is set to "001", the field can indicate that the context information is transmitted in a second transmission mode. When the field is set to "010", the field can indicate that the context information is transmitted in a third transmission mode. When the field is set to "011", the field can indicate that the context information is transmitted in a fourth transmission mode. When the field is set to "011", the field can indicate that the context information is transmitted in a fifth transmission mode. When the field is set to "101" to "111", the field values can be reserved for new transmission modes for transmitting the context information.

FIG. 90 illustrates initialization information when RoHC is applied as a header compression scheme according to an embodiment of the present invention.

While RoHC is used for header compression in the present invention, similar initialization information can be used in the broadcast system even when other header compression schemes are employed.

In the broadcast system, initialization information suitable for a compression scheme corresponding to a header compression mode may need to be transmitted. In the present embodiment, an initialization parameter for a case in which RoHC is set to a header compression mode is described. The initialization information for RoHC can be used to deliver information about a configuration of an ROHC channel corresponding to a link between a compressor and a decompressor.

A single RoHC channel may include one or more pieces of context information. Common information applied to all contexts in the RoHC channel can be included in the initialization information and transmitted/received. A path to which RoHC is applied and through which related information is transmitted can be called an RoHC channel, and the RoHC channel can be mapped to a link. In addition, the RoHC channel can be transmitted through a single DP. In this case, the RoHC channel can be indicated using the aforementioned information related to the DP.

The initialization information may include link_id information, max_cid information, large_cids information, num_profiles information, profiles( ) information, num_IP_stream information and/or IP_address( ) information.

The link_id information indicates the identifier of a link (RoHC channel) to which the initialization information is applied. When a link or an RoHC channel is transmitted through a single DP, DP_id can substitute for the link_id information.

The max_cid information indicates a maximum CID value. The max_cid information can be used to inform the decompressor of the maximum CID value.

The large_cids information has a Boolean value and indicates whether a CID configuration uses short CIDs (0 to 15) or embedded CIDs (0 to 16383). Accordingly, the size of a byte representing a CID can be determined.

The num_profiles information indicates the number of profiles supported by the identified RoHC channel.

The profiles( ) information indicates profiles of a header compression protocol in RoHC. Since the compressor and the decompressor can compress and decompress streams only when the compressor and the decompressor have the same profile in RoHC, the receiver can acquire an RoHC parameter used in the transmitter from the profiles( ) information.

The num_IP_stream information indicates the number of IP streams transmitted through the corresponding channel (e.g. RoHC Channel).

The IP_address information indicates the address of an IP stream. The IP_address information can indicate the destination address of a filtered IP stream input to the RoHC compressor (transmitter).

FIG. 91 illustrates information indicating a link layer signaling path configuration according to an embodiment of the present invention.

A broadcast system is designed such that a signaling information delivery path is not changed, in general. However, when the system is changed or when standards are switched, it is necessary to signal information about a physical layer configuration for delivery of link layer signaling information which does not have an IP packet format. In the case of a mobile receiver, since a path through which link layer signaling information is delivered may be changed if the mobile receiver moves between coverages of transmitters having different configurations, information on the link layer signaling path may need to be transmitted. FIG. 91 shows information indicating signaling paths through which signaling information is transmitted/received. For the information, an index may be extended or reduced according to a signaling path configured in the physical layer. A corresponding channel may be operated according to a procedure of the physical layer, separately from a link layer configuration.

The figure shows an embodiment of allocating a field value to a signaling path configuration. When a plurality of signaling paths is supported in the present embodiment, a smaller index value can be mapped to a signaling path having higher importance. A signaling path having priority may be identified according to index value.

Alternatively, the broadcast system can use all signaling paths having higher priority than a signaling path indicated by signaling path configuration information. For example, when a signaling path configuration index value is 3, a field value corresponding thereto is "011", In this case, the information can indicate that a dedicated data path, a specific signaling channel (FIC) and a specific signaling channel (EAC) having priorities of 1, 2 and 3 are all used.

The quantity of data delivering signaling information can be reduced according to the aforementioned signaling method.

FIG. 92 illustrates signaling path configuration information represented through a bit mapping method according to an embodiment of the present invention.

The aforementioned signaling path configuration information may be defined according to bit mapping and transmitted/received. Allocation of 4 bits to the signaling path configuration information can be considered in the present embodiment. Specifically, bits b1, b2, b3 and b4 are respectively mapped to signaling paths corresponding thereto. When the bit value of each bit position is 0, a path corresponding thereto is "disable". When the bit value of each bit position is 1, a path corresponding thereto is "enable". For example, when a 4-bit signaling path configuration field value is "1100", this can indicate that the broadcast system uses a dedicated data pipe and a specific signaling channel (FIC) in the link layer.

Figure 93:
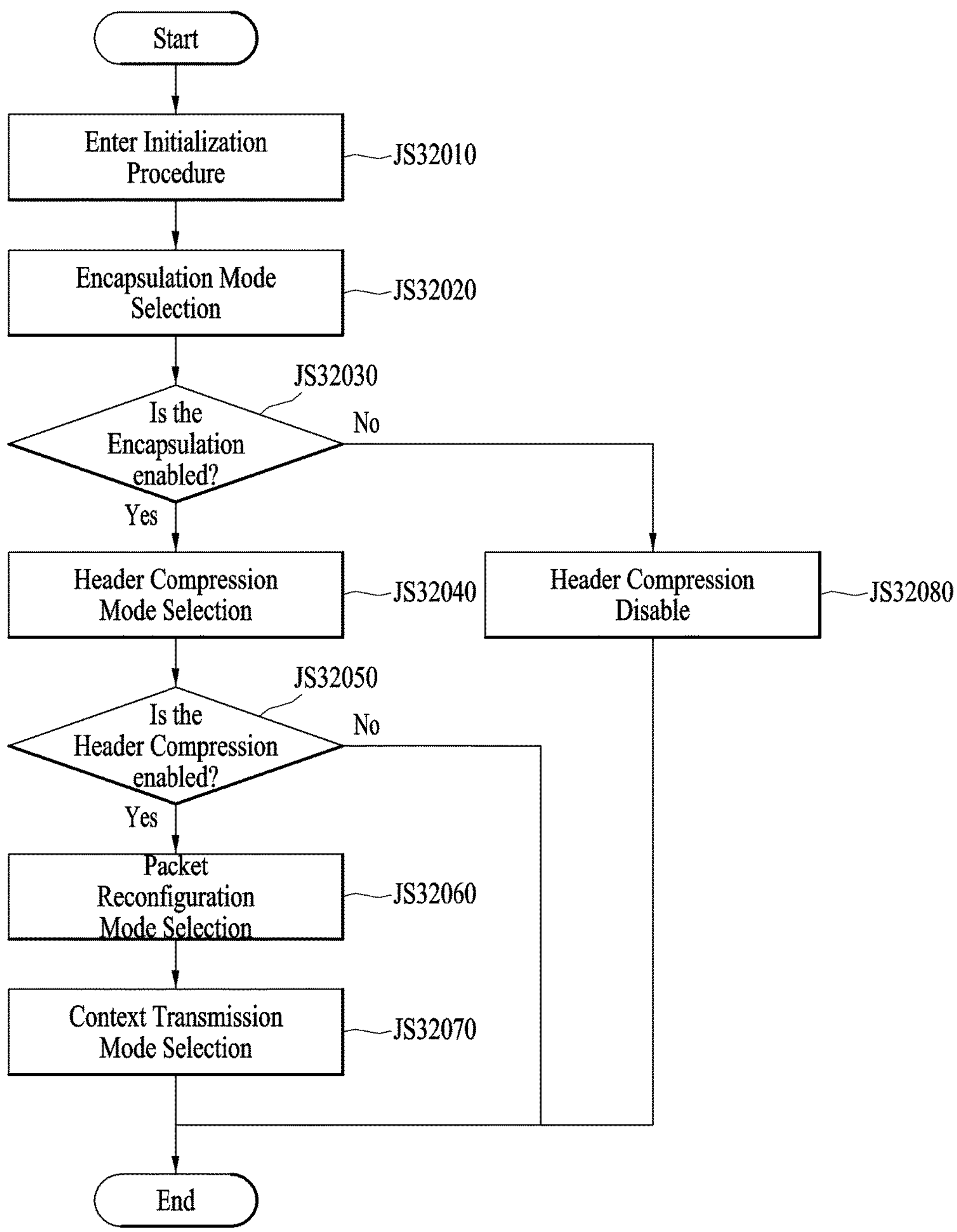
FIG. 93 is a flowchart illustrating a link layer initialization process according to an embodiment of the present invention.

FIG. 93 is a flowchart illustrating a link layer initialization procedure according to an embodiment of the present invention.

When a receiver is powered on or a mobile receiver enters a transmission area of a new transmitter, the receiver can perform an initialization procedure for part of or entire system configuration. In this case, the link layer initialization procedure can be performed along with the initialization procedure. The receiver can perform initial setup of the link layer using the aforementioned initialization parameter, as shown in the figure.

The receiver enters the link layer initialization procedure (JS32010).

Upon entering the link layer initialization procedure, the receiver selects an encapsulation mode (JS32020). The receiver can determine the encapsulation mode using the aforementioned initialization parameter.

The receiver determines whether encapsulation is enabled (JS32030). The receiver can determine whether encapsulation is enabled using the aforementioned initialization parameter.

Since a header compression scheme is applied after encapsulation, in general, the receiver can process the header compression mode as "disable" when the encapsulation mode is determined as "disable" (JS32080). In this case, the receiver need not perform the initialization procedure any more, and thus the receiver can immediately transmit data to another layer or change the procedure to a data processing procedure.

The receiver selects a header compression mode when the encapsulation mode is enabled (JS32040). The receiver can determine a header compression scheme applied to packets using the aforementioned initialization parameter in selection of the header compression mode.

The receiver determines whether header compression is enabled (JS32050). When header compression is disabled, the receiver can immediately transmit the data or change the procedure to the data processing procedure.

When header compression is enabled, the receiver selects a packet stream reconfiguration mode and/or a context transmission mode for the corresponding header compression scheme (JS32060 and JS32070). The receiver can determine the packet stream reconfiguration mode and/or the context transmission mode using the aforementioned information.

Subsequently, the receiver can deliver the data for other processing procedures or process the data.

Figure 94:
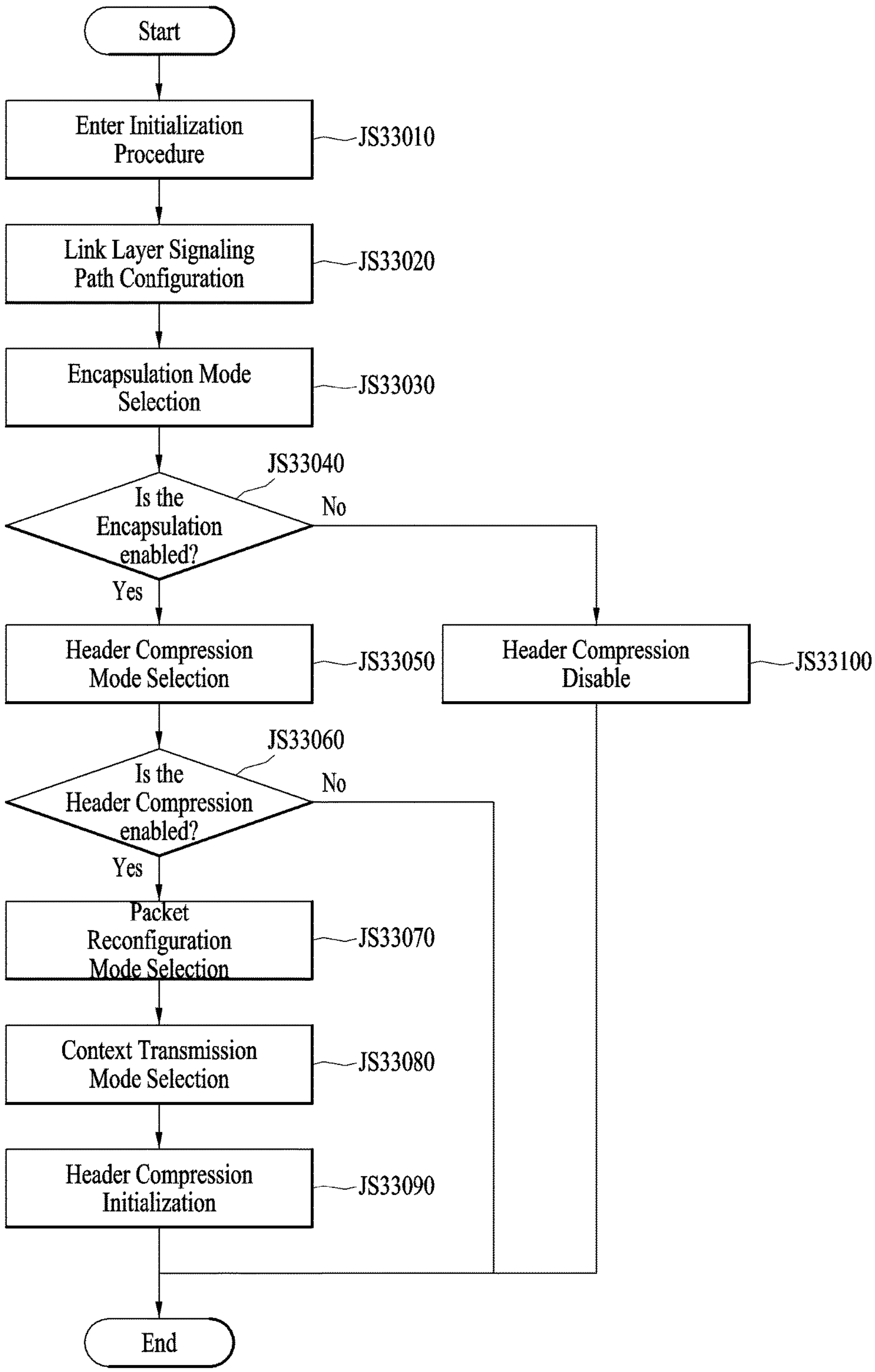
FIG. 94 is a flowchart illustrating a link layer initialization process according to another embodiment of the present invention.

FIG. 94 is a flowchart illustrating a link layer initialization procedure according to another embodiment of the present invention.

The receiver enters the link layer initialization procedure (JS33010).

The receiver determines a link layer signaling path configuration (JS33020). The receiver can determine a path through which link layer signaling information is transmitted using the aforementioned information.

The receiver selects an encapsulation mode (JS33030). The receiver can determine the encapsulation mode using the aforementioned initialization parameter.

The receiver determines whether encapsulation is enabled (JS33040). The receiver can determine whether encapsulation is enabled using the aforementioned initialization parameter.

Since a header compression scheme is applied after encapsulation, in general, the receiver can process the head compression mode as "disable" when the encapsulation mode is determined as "disable" (JS33040). In this case, the receiver need not perform the initialization procedure any more, and thus the receiver can immediately transmit data to another layer or change the procedure to a data processing procedure.

The receiver selects a header compression mode when the encapsulation mode is enabled (JS33050). The receiver can determine a header compression scheme applied to packets using the aforementioned initialization parameter in selection of the header compression mode.

The receiver determines whether header compression is enabled (JS33060). When header compression is disabled, the receiver can immediately transmit the data or change the procedure to the data processing procedure.

When header compression is enabled, the receiver selects a packet stream reconfiguration mode and/or a context transmission mode for the corresponding header compression scheme (JS33070 and JS33080). The receiver can determine the packet stream reconfiguration mode and/or the context transmission mode using the aforementioned information.

The receiver performs header compression initialization (HS33090). The receiver can perform header compression initialization using the aforementioned information. Subsequently, the receiver can deliver the data for other processing procedures or process the data.

FIG. 95 illustrates a signaling format for transmitting the initialization parameter according to an embodiment of the present invention.

To deliver the aforementioned initialization parameter to the receiver, the broadcast system can configure the corresponding information in the form of a descriptor and transmit/receive the descriptor. When a plurality of links operated by the link layer configured in the system is present, link_id information for identifying each link can be assigned to the corresponding link and different parameters can be applied according to link_id information. For example, when data delivered to the link layer is an IP stream, an IP address delivered from an upper layer can be designated in configuration information if the IP address is not changed for the IP stream.

A link layer initialization descriptor for transmitting the initialization parameter according to an embodiment may include descriptor_tag information, descriptor_length information, num_link information, link_id information, encapsulation_mode information, header_compression_mode information, packet_reconfiguration_mode information, context_transmission_mode information, max_cid information, large_cids information, num_profiles information and/or profiles( ) information. Description of the information is replaced by description of the aforementioned information in similar or identical names.

FIG. 96 illustrates a signaling format for transmitting the initialization parameter according to another embodiment of the present invention.

The figure shows a descriptor in a different format to deliver the aforementioned initialization parameter to the receiver. In the present embodiment, the aforementioned initial header compression configuration information is excluded. When an additional header compression initialization procedure is performed in link layer data processing or link layer packets have separate header compression parameters, the descriptor according to the present embodiment can be transmitted/received.

The link layer initialization descriptor for transmitting the initialization parameter according to another embodiment of the present invention may include descriptor_tag information, descriptor_length information, num_link information, link_id information, encapsulation_mode information, header_compression_mode information, packet_reconfiguration_mode information and/or context_transmission_mode information. Description of the information is replaced by description of the aforementioned information in similar or identical names.

FIG. 97 illustrates a signaling format for transmitting the initialization parameter according to another embodiment of the present invention.

The figure shows a descriptor in a different format to deliver the aforementioned initialization parameter to the receiver. In the present embodiment, the descriptor for transmitting the initialization parameter does not include the initial header compression configuration information and includes configuration information about a signaling path.

A configuration parameter for the signaling path can use the aforementioned 4-bit mapping method. When a broadcast system (transmitter or receiver) which processes broadcast signals is modified, a method of delivering link layer signaling or the contents of the link layer signaling may be changed. In this case, it is possible to cope with link layer signaling change by delivering the initialization parameter according to the present embodiment.

The link layer initialization descriptor for transmitting the initialization parameter according to another embodiment of the present invention may include descriptor_tag information, descriptor_length information, num_link information, signaling_path_configuration information, dedicated_DP_id information, link_id information, encapsulation_mode information, header_compression_mode information, packet_reconfiguration_mode information and/or context_transmission_mode information.

The dedicated_DP_id information identifies a dedicated DP through which link layer signaling information is delivered. When a dedicated DP is determined as a path through which signaling information is delivered in a signaling path configuration, DP_id corresponding to the dedicated DP may be designated, included in the descriptor for transmitting the initialization parameter and transmitted.

Description of information other than the dedicated_DP_id information is replaced by description of the aforementioned information in similar or identical names.

Figure 98:
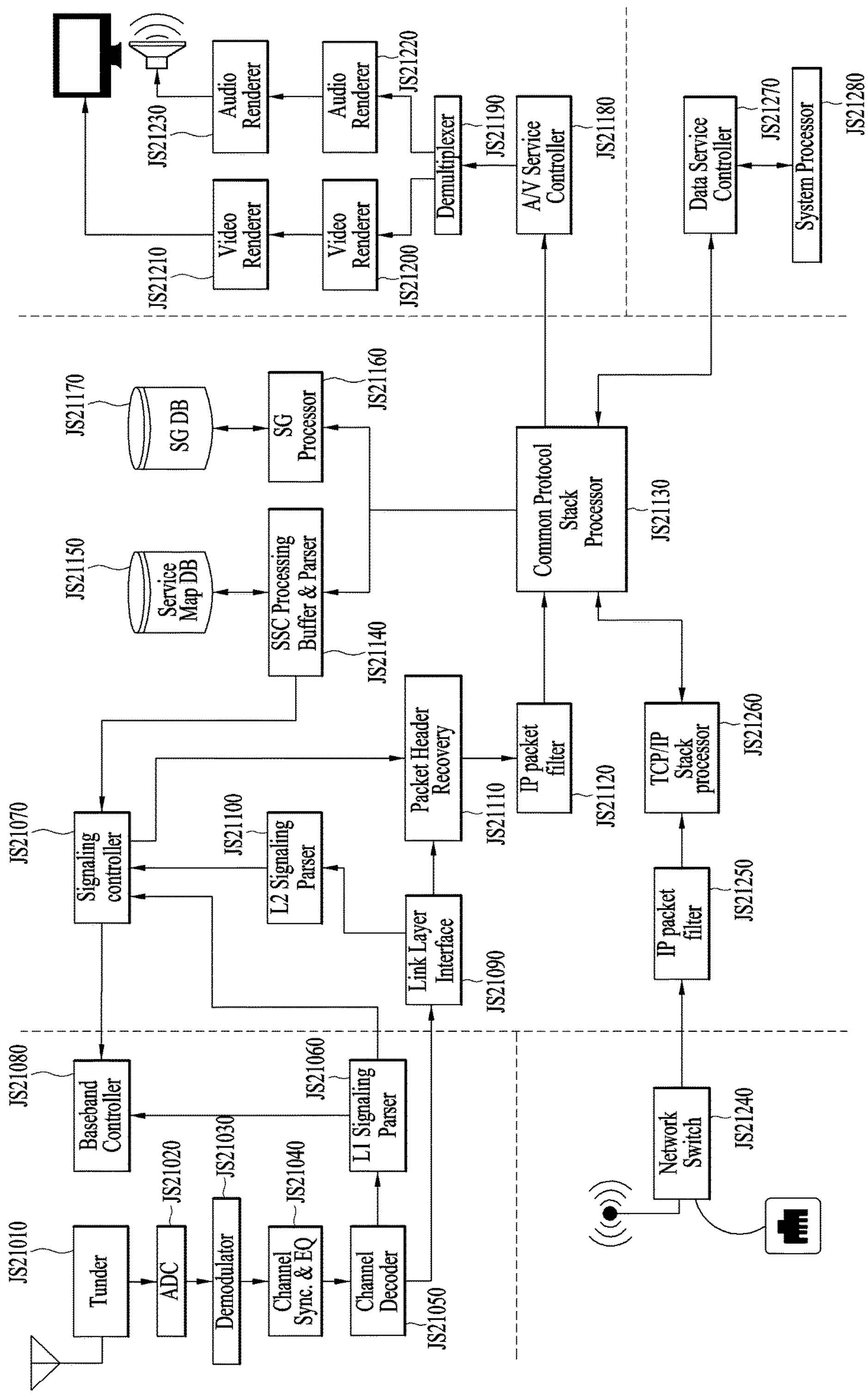
FIG. 98 illustrates a receiver according to an embodiment of the present invention.

FIG. 98 illustrates a receiver according to an embodiment of the present invention.

The receiver according to an embodiment of the present invention may include a tuner JS21010, an ADC JS21020, a demodulator JS21030, a channel synchronizer & equalizer JS21040, a channel decoder JS21050, an L1 signaling parser JS21060, a signaling controller JS21070, a baseband controller JS21080, a link layer interface JS21090, an L2 signaling parser JS21100, a packet header recovery module JS21110, an IP packet filter JS21120, a common protocol stack processor JS21130, an SSC processing buffer & parser JS21140, a service map database JS21150, a service guide processor JS21160, a service guide database JS21170, an AV service controller JS21180, a demultiplexer JS21190, a video decoder JS21200, a video renderer JS21210, an audio decoder JS21220, an audio renderer JS21230, a network switch JS21240, an IP packet filter JS21250, a TCP/IP stack processor JS21260, a data service controller JS21270 and/or a system processor JS21280.

The tuner JS21010 receives a broadcast signal.

The ADC JS21020 converts the broadcast signal into a digital signal when the broadcast signal is an analog signal.

The demodulator JS21030 demodulates the broadcast signal.

The channel synchronizer & equalizer JS21040 performs channel synchronization and/or equalization.

The channel decoder JS21050 decodes a channel in the broadcast signal

The L1 signaling parser JS21060 parses L1 signaling information from the broadcast signal. The L1 signaling information may correspond to physical layer signaling information. The L1 signaling information may include a transmission parameter.

The signaling controller JS21070 processes signaling information or delivers the signaling information to a device that requires the signaling information.

The baseband controller JS21080 controls processing of the broadcast signal in the baseband. The baseband controller JS21080 can perform processing in the physical layer for the broadcast signal using the L1 signaling information. While connection between the baseband controller JS21080 and other devices is not illustrated, the baseband controller can deliver the processed broadcast signal or broadest data to other devices.

The link layer interface JS21090 accesses a link layer packet and acquires the link layer packet.

The L2 signaling parser JS21100 parses L2 signaling information. The L2 signaling information may correspond to information included in the aforementioned link layer signaling packet.

The packet header recovery module JS21110 performs header decompression on a packet (IP packet) of an upper layer of the link layer when header compression has been applied to the packet. Here, the packet header recovery module JS21110 can recover the header of the packet of the upper layer using the aforementioned information for indicating whether header compression is applied.

The IP packet filter JS21120 filters IP packets delivered to a specific IP address and/or UDP number. The IP packets delivered to the specific IP address and/or UDP number may include the aforementioned signaling information delivered through dedicated channels. The IP packets delivered to the specific IP address and/or UDP number may include the aforementioned FIC, FIT, EAT and/or EAM (emergency alert message).

The common protocol processor JS21130 performs data processing according to the protocol of each layer. For example, the common protocol processor JS21130 decodes or parses an IP packet according to protocols of the IP layer and/or an upper layer of the IP layer.

The SSC processing buffer & parser JS21140 stores or parses signaling information delivered through an SSC (service signaling channel). A specific IP packet can be designated to the SSC, and the SSC can include information for service acquisition, property information about content included in services, DVBSI information and/or PSI/PSIP information.

The service map database JS21150 stores a service map table. The service map table includes property information about broadcast services. The service map table can be included in the SSC and transmitted.

The service guide processor JS21160 parses or decodes a service guide.

The service guide database JS21170 stores the service guide.

The AV service controller JS21180 performs control for acquiring broadcast AV data.

The demultiplexer JS21190 separates broadcast data into video data and audio data.

The video decoder JS21200 decodes the video data.

The video renderer JS21210 generates a video provided to a user using the decoded video data.

The audio decoder JS21220 decodes the audio data.

The audio renderer JS21230 generates audio to be provided to the user using the decoded audio data.

The network switch JS21240 controls interface with networks other than broadcast networks. For example, the network switch JS21240 can access an IP network to directly receive IP packets.

The packet filter JS21250 filters IP packets having a specific IP address and/or UDP number.

The TCP/IP stack processor JS21260 decapsulates IP packets according to TCP/IP protocol.

The data service controller JS21270 controls data service processing.

The system processor JS21280 controls the overall operation of the receiver.

Figure 99:
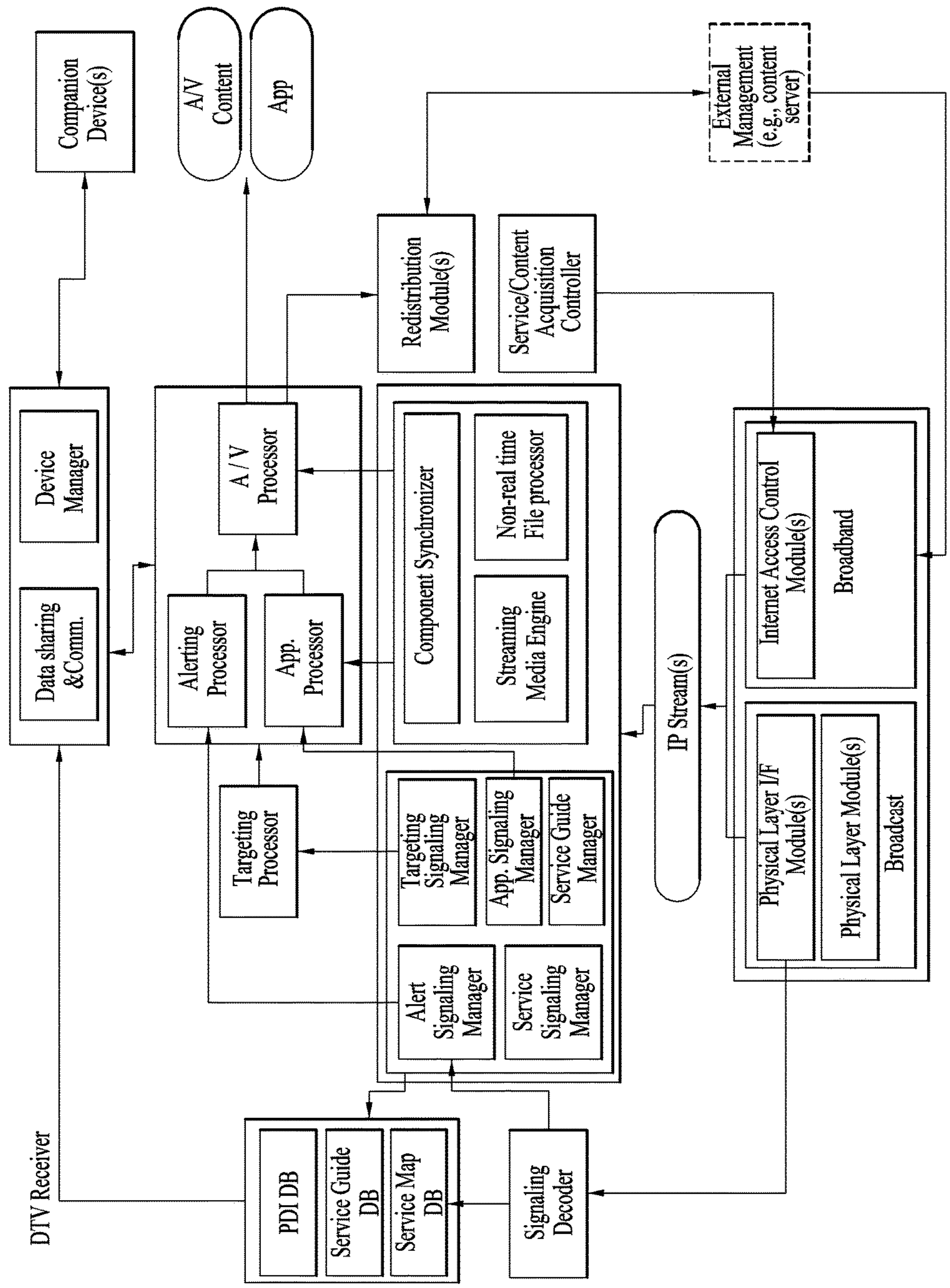
FIG. 99 illustrates a hybrid broadcast reception apparatus according to an embodiment of the present invention.

FIG. 99 illustrates a hybrid broadcast reception apparatus according to an embodiment of the present invention. A hybrid broadcast system can transmit broadcast signals in connection with terrestrial broadcast networks and the Internet. The hybrid broadcast reception apparatus can receive broadcast signals through a terrestrial broadcast network (broadcast) and the Internet (broadband). The hybrid broadcast reception apparatus may include one or more physical layer modules, one or more physical layer I/F modules, a service/content acquisition controller, one or more Internet access control modules, a signaling decoder, a service signaling manager, a service guide manager, an application signaling manager, an alert signal manager, an alert signal parser, a targeting signal parser, a streaming media engine, a non-real time file processor, a component synchronizer, a targeting processor, an application processor, an A/V processor, a device manager, a data sharing & communication unit, one or more redistribution modules, one or more companion devices and/or external management modules.

The physical layer modules receive can receive a broadcast related signal through a terrestrial broadcast channel, process the broadcast related signal, convert the processed signal into an appropriate format and deliver the converted signal to the physical layer I/F modules.

The physical layer I/F modules can acquire IP datagrams from information obtained from the physical layer modules. In addition, physical layer I/F modules can convert the acquired IP datagrams into specific frames (e.g. RS frames, GSE and the like).

The service/content acquisition controller can perform control operation for acquiring services, content and signaling data related thereto through broadcast and/or broadband channels.

The Internet access control modules can control receiver operation for acquiring services and content through broadband channels.

The signaling decoder can decode signaling information acquired through broadcast channels.

The service signaling manager can extract signaling information related to service scan and services/content from the IP datagrams, parse the extracted signaling information and manage the signaling information.

The service guide manager can extract announcement information from the IP datagrams, manage a service guide (SG) database and provide a service guide.

The application signaling manager can extract signaling information related to application acquisition from the IP datagrams, parse the extracted signaling information and manage the signaling information.

The alert signaling parser can extract signaling information related to alert from the IP datagrams, parse the extracted signaling information and manage the signaling information.

The targeting signal parser can extract signaling information related to services/content personalization or targeting from the IP datagrams, parse the extracted signaling information and manage the signaling information. In addition, the targeting signal parser can deliver the parsed signaling information to the targeting processor.

The streaming media engine can extract audio/video data for A/V streaming from the IP datagrams and decode the extracted audio/video data.

The non-real time file processor can extract data in a file format, such as NRT data and applications, from the IP datagrams, decode the extracted data and manage the data.

The component synchronizer can synchronize streaming audio/video data and NRT data.

The targeting processor can process services/content personalization related operations on the basis of targeting signaling information received from the targeting signal parser.

The application processor can process application related information, downloaded application status and display parameters.

The A/V processor can perform audio/video rendering related operations on the basis of decoded audio and video data, applications and data.

The device manager can perform connection with external device and data exchange with external devices. In addition, the device manager can perform management operation with respect to external devices, such as addition/deletion/update of connectable external devices.

The data sharing & communication unit can process information related to data transmission and exchange between the hybrid broadcast receiver and an external device. Here, transmittable and exchangeable data may correspond to signaling data, A/V data and the like.

The redistribution modules can acquire information related to future broadcast services and content when the broadcast receiver cannot directly receive terrestrial broadcast signals. In addition, the redistribution modules can support broadcast service and content acquisition by future broadcast systems when the broadcast receiver cannot directly receive terrestrial broadcast signals.

The companion devices can share audio data, video data or signaling data by being connected to the broadcast receiver according to the present invention. The companion devices can refer to external devices connected to the broadcast receiver.

The external management modules can refer to modules for providing broadcast services/content. For example, a future broadcast service/content server can be an external management module. The external management modules can refer to external devices connected to the broadcast receiver.

Figure 100:
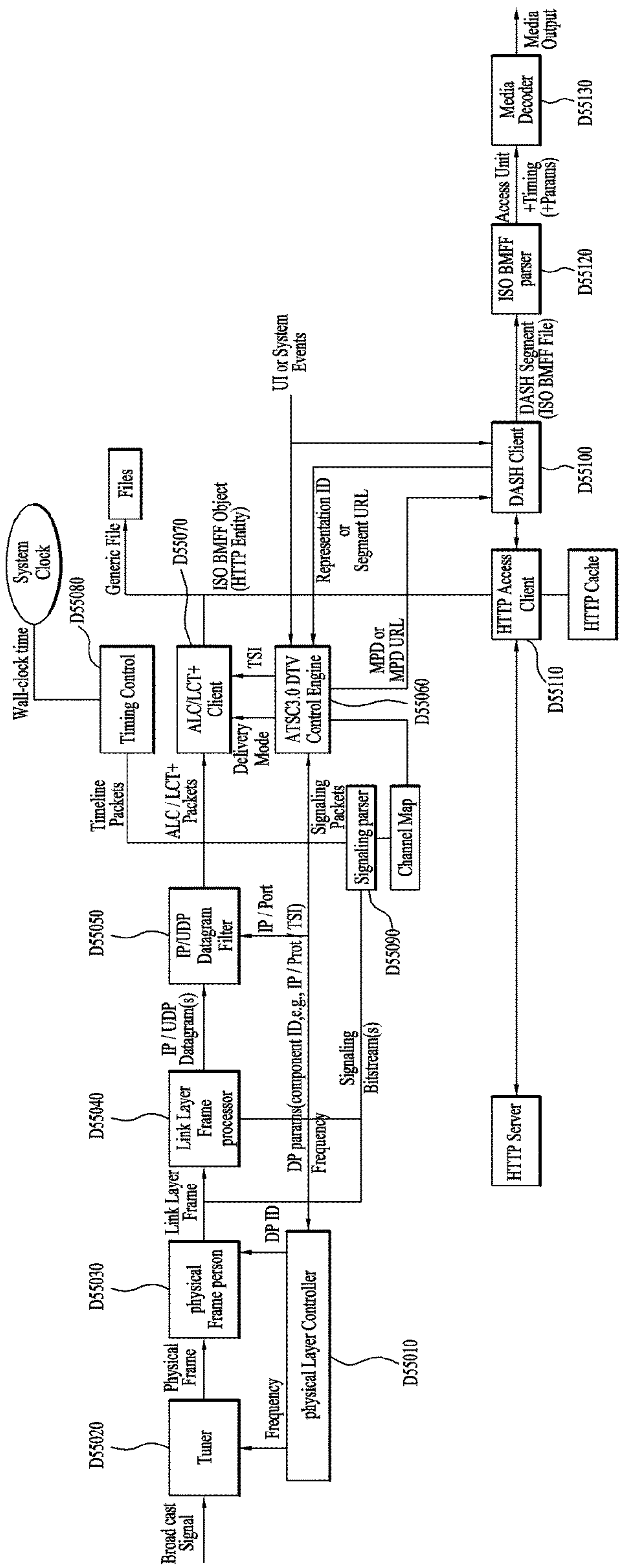
FIG. 100 is a block diagram of a hybrid broadcast receiver according to an embodiment of the present invention.

FIG. 100 is a block diagram of a hybrid broadcast receiver according to an embodiment of the present invention.

The hybrid broadcast receiver can receive hybrid broadcast services through interoperation of terrestrial broadcast and a broadband in DTV services of a future broadcast system. The hybrid broadcast receiver can receive broadcast A/V content transmitted through terrestrial broadcast and receive enhancement data associated with the broadcast A/V content or part of broadcast A/V content in real time. In the specification, broadcast A/V content can be referred to as media content.

The hybrid broadcast receiver may include a physical layer controller D55010, a tuner D55020, a physical frame parser D55030, a link layer frame parser D55040, an IP/UDP datagram filter D55050, an ATSC 3.0 digital television control engine D55060, an ALC/LCT+ client D55070, a timing controller D55080, a signaling parser D55090, a DASH (Dynamic Adaptive Streaming over HTTP) client D55100, an HTTP access client D55110, an ISO BMFF (Base Media File Format) parser, an ISO BMFF Parser D55120 and/or a media decoder D55130.

The physical layer controller D55010 can control operations of the tuner D55020 and the physical frame parser D55030 using RF information of a terrestrial broadcast channel to be received by the hybrid broadcast receiver.

The tuner D55020 can receive a broadcast signal through the terrestrial broadcast channel, process the broadcast signal and convert the processed signal into an appropriate format. For example, the tuner D55020 can convert the received terrestrial broadcast signal into a physical frame.

The physical frame parser D55030 can parse the received physical frame and acquire a link layer frame through processing related thereto.

The link layer parser D55040 can perform operation for acquiring link layer signaling or IP/UDP datagrams from the link layer frame. The link layer parser D55040 can output one or more IP/UDP datagrams.

The IP/UDP datagram filter D55050 can filter a specific IP/UDP datagram from the received one or more IP/UDP datagrams. That is, IP/UDP datagram filter D55050 can selectively filter an IP/UDP datagram selected by the ATSC 3.0 digital television control engine D55060 from among the one or more IP/UDP datagrams output from the link layer parser D55040. The IP/UDP datagram filter D55050 can output an application layer transport protocol packet such as ALC/LCT+.

The ATSC 3.0 digital television control engine D55060 can interface modules included in the hybrid broadcast receiver. In addition, the ATSC 3.0 digital television control engine D55060 can deliver a parameter necessary for each module to each module and control operation of each module through the parameter. In the present invention, the ATSC 3.0 digital television control engine D55060 can deliver media presentation description (MPD) and/or an MPD URL to the DASH client D55100. In the present invention, the ATSC 3.0 digital television control engine D55060 can deliver a delivery mode and/or a transport session identifier (TSI) to the ALC/LCT+ client D55070. Here, the TSI can indicate the identifier of a session in which a transport packet including a signaling message such as MPD or MPD URL related signaling is delivered, for example, an ALC/LCT+ session corresponding to an application layer transport protocol or a FLUTE session. In addition, the TSI may correspond to an Asset id of an MMT.

The ALC/LCT+ client D55070 can process the application layer transport protocol packet such as ALC/LCT+ and generate one or more ISO BMFF objects by collecting and processing a plurality of packets. The application layer transport protocol packet may include an ALC/LCT packet, an ALC/LCT+ packet, a ROUTE packet and/or an MTP packet.

The timing controller D55080 can process a packet including system time information so as to control a system clock.

The signaling parser D55090 can acquire and parse DTV broadcast service related signaling, generate a channel map on the basis of the parsed signaling and manage the channel map. In the present invention, the signaling parser can parse MPD extended from signaling information or MPD related information.

The DASH client D55100 can perform operations related to real-time streaming or adaptive streaming. The DASH client D55100 can receive DASH content from an HTTP server through the HTTP access client D55110. The DASH client D55100 can process received DASH segments and output ISO BMFF objects. In the present invention, the DASH client D55100 can deliver a fully qualified representation ID or segment URL to the ATSC 3.0 digital television control engine D55060. Here, the fully qualified representation ID can refer to an ID corresponding to a combination of MPD URL, period@id and representation@id, for example. In addition, the DASH client D55100 can receive MPD or MPD URL from the ATSC 3.0 digital television control engine D55060. The DASH client D55100 can receive a desired media stream or DASH segment from the HTTP server using the received MPD or MPD URL. In the specification, the DASH client D55100 can be referred to as a processor.

The HTTP access client D55110 can send a request for specific information to the HTTP server, receive a response to the request and process the response. The HTTP server can process the request received from the HTTP access client and provide a response to the request.

The ISO BMFF parser can extract audio/video data from the ISO BMFF objects.

The media decoder D55130 can decode the received audio/video data and perform processing for presenting the decoded audio/video data.

To provide hybrid broadcast service by the hybrid broadcast receiver according to the present invention through interoperation of a terrestrial broadcast network and a broadband network, extension or modification of MPD is required. The aforementioned terrestrial broadcast system can transmit the extended or modified MPD and the hybrid broadcast receiver can receive content through the broadcast network or broadband network using the extended or modified MPD. That is, the hybrid broadcast receiver can receive the extended or modified MPD through the terrestrial broadcast network and receive content through the terrestrial broadcast network or the broadband network on the basis of the MPD. A description will be given of elements and attributes that need to be added to the extended or modified MPD. The extended or modified MPD can be represented as MPD in the following.

The MPD can be extended or modified to represent ATSC 3.0 services. The extended or modified MPD may additionally include MPD@anchorPresentationTime, Common@presentable, Common.Targeting, Common.TargetDevice and/or Common@associatedTo.

The MPD@anchorPresentationTime can indicate an anchor of presentation time of segments included in the MPD, that is, base time. In the following, MPD@anchorPresentationTime can be used as effective time of the MPD. MPD@anchorPresentationTime can indicate the earliest play time of segments included in the MPD.

The MPD may further include common attributes and elements. The common attributes and elements can be applied to AdaptionSet and Representation in the MPD. Common@presentable can indicate that media described by the MPD is a presentable component.

Common.Targeting can indicate targeting properties and/or personalization properties of the media described by the MPD.

Common.TargetDevice can indicate a target device or target devices of the media described by the MPD.

Common@associatedTo can indicate adaptationSet and/or representation related to the media described by the MPD.

In addition, MPD@id, Period@id and AdaptationSet@id included in the MPD can be required to specify media content described by the MPD. That is, the DASH client can specify content to be received on the basis of the MPD using MPD@id, Period@id and AdaptationSet@id and notify the ATSC 3.0 digital television control engine of the content. The ATSC 3.0 digital television control engine can receive the content and deliver the content to the DASH client.

Figure 101:
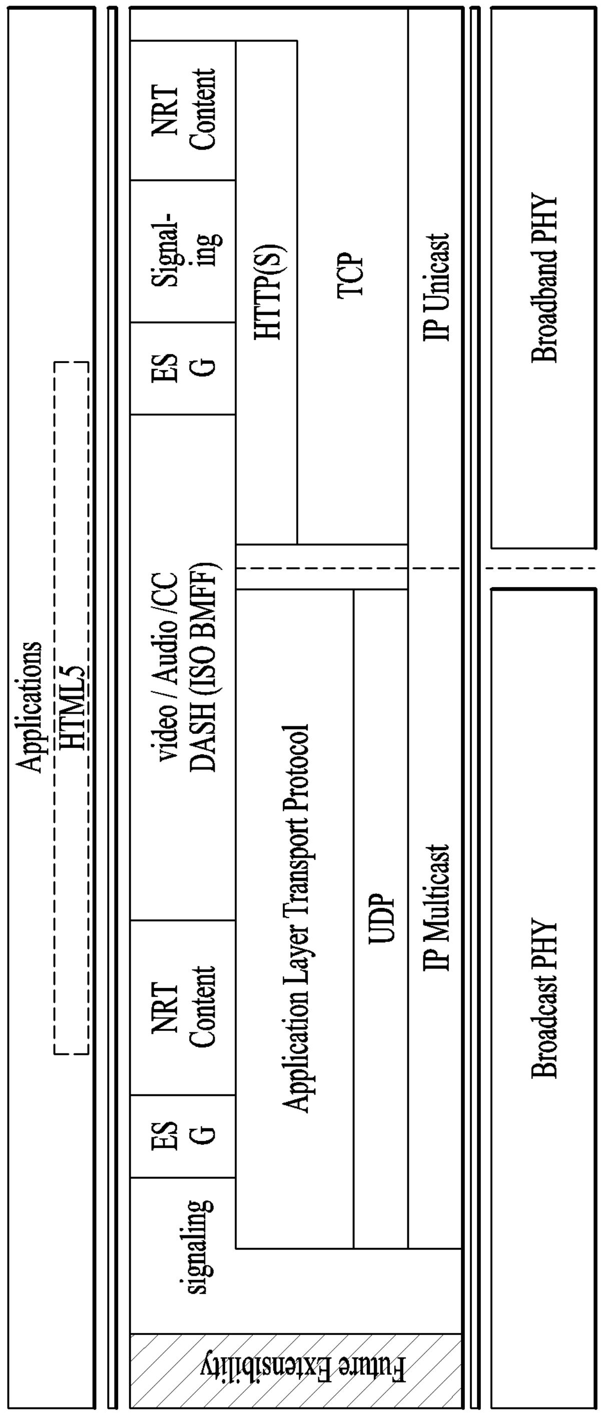
FIG. 101 illustrates a protocol stack of a future hybrid broadcast system according to an embodiment of the present invention.

FIG. 101 illustrates a protocol stack of a future hybrid broadcast system according to an embodiment of the present invention. As shown in the figure, the future broadcast system supporting IP based hybrid broadcast can encapsulate audio or video data of a broadcast service in ISO BMFF. Here, encapsulation can use a DASH segment or a media processing unit (MPU) of an MMT. In addition, the future broadcast system can transmit the encapsulated data equally through a broadcast network and the Internet or differently according to properties of the respective networks. The future broadcast system can transmit the encapsulated data using at least one of a broadcast network and a broadband network. When the broadcast network is used, the broadcast system can deliver the data encapsulated in ISO BMFF through an application layer transport protocol packet which supports real-time object delivery. For example, the broadcast system can encapsulate data into a transport packet of ROUTE or MMTP. The broadcast system can format the encapsulated data into IP/UDP datagrams, load the UP/UDP datagrams in a broadcast signal and transmit the broadcast signal. When the broadband network is used, the broadcast system can deliver the encapsulated data to a receiver through a streaming scheme such as DASH.

In addition, the broadcast system can deliver signaling information of broadcast services through the following method. When the broadcast network is used, the broadcast system can transmit the signaling information through a future broadcast delivery system and the broadcast network according to properties of the signaling information. Here, the broadcast system can transmit the signaling information through a specific data pipe (DP) of a transport frame included in a broadcast signal. Signaling transmitted through the broadcast network may be encapsulated in a bit stream or an IP/UDP datagram. When the broadband network is used, the broadcast system can return and deliver signaling data to a receiver in response to a request of the receiver.

In addition, the broadcast system can transmit an ESG or NRT content of a broadcast service through the following method. When the broadcast network is used, the broadcast system can encapsulate the ESG or NRT content into an application layer transport protocol packet, for example, a transport packet of ROUTE or MMTP. The broadcast system can format the encapsulated ESG or NRT content into an IP/UDP datagram, load the IP/UDP datagram in a broadcast signal and transmit the broadcast signal. When the broadband network is used, the broadcast system can return and deliver the ESG or NRT content to the receiver as a response to a request of the receiver.

Figure 102:
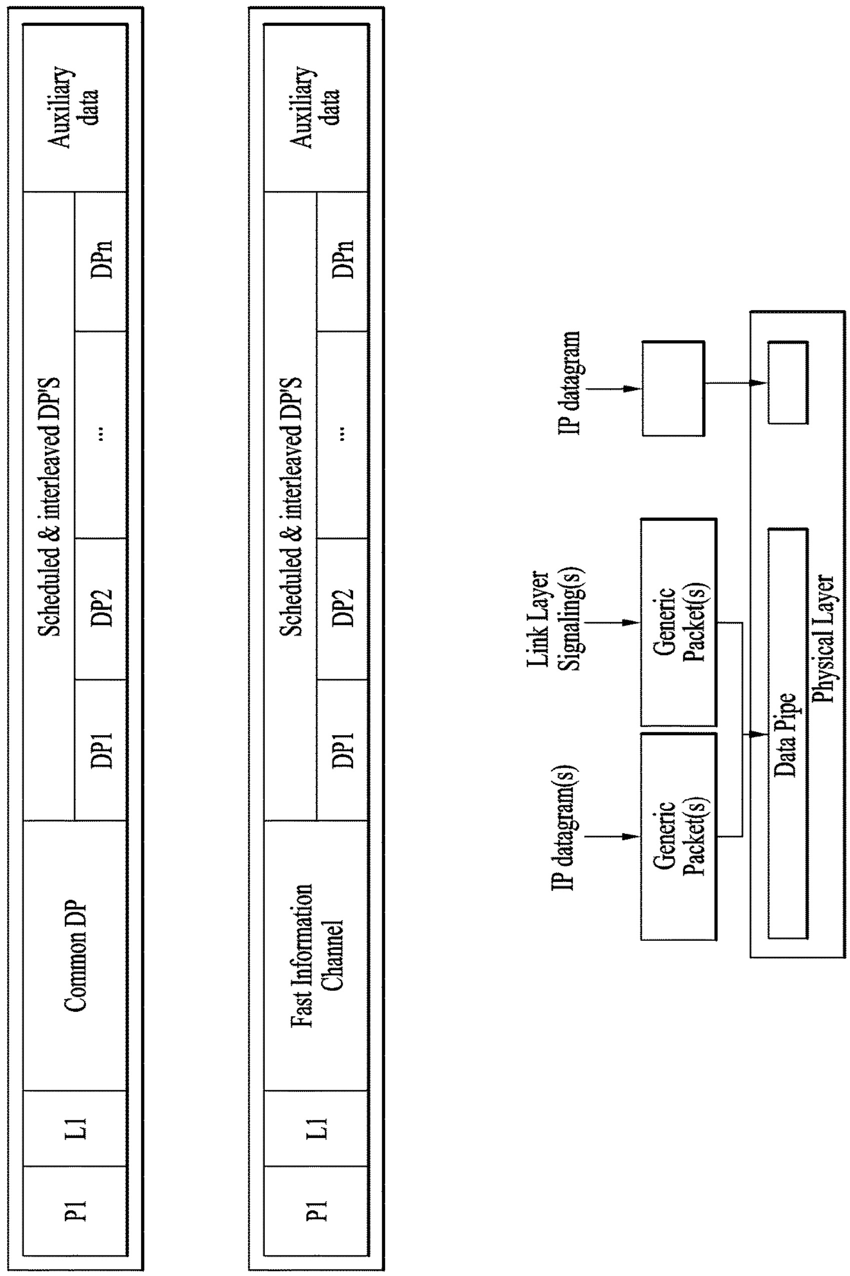
FIG. 102 illustrates a structure of a transport frame delivered to a physical layer of a future broadcast transmission system according to an embodiment of the present invention.

FIG. 102 illustrates a structure of a transport frame delivered to the physical layer of the future broadcast system according to an embodiment of the present invention. The future broadcast system can transmit a transport frame using a broadcast network. In the figure, P1 located at the head of the transport frame may refer to a symbol including information for transport signal detection. P1 may include tuning information and the receiver can decode an L1 part following P1 on the basis of a parameter included in the symbol P1. The broadcast system can include, in the L1 part, information about the configuration of the transport frame and properties of each DP. That is, the receiver can acquire the information about the configuration of the transport frame and properties of each DP by decoding the L1 part. In addition, the receiver can acquire information that needs to be shared among DPs through a common DP. According to an embodiment, the transport frame may not include the common DP.

In the transport frame, components such as audio, video and data are included in interleaved DP regions DP1 to DPn and transmitted. Here, a DP delivering components of each service (channel) can be signaled through L1 or common PLP.

In addition, the future broadcast system can transmit information for rapidly acquiring information about the service included in the transport frame. That is, the future broadcast system can enable a future broadcast receiver to rapidly acquire information related to the broadcast service and content included in the transport frame. When the transport frame includes services/content generated by one or more broadcasters, the broadcast system can enable the receiver to efficiently recognize the services/content according to the broadcasters. That is, the future broadcast system can include, in the transport frame, service list information about services included in the transport frame and transmit the transport frame.

To enable the receiver to rapidly scan broadcast services and content within the corresponding frequency, the broadcast system may transmit broadcast service related information through a separate channel, e.g., FIC if the FIC is present. As shown in the middle part of FIG. 102, the broadcast system can include information for broadcast service scan and acquisition in the transport frame and transmit the transport frame. Here, a region including the information about broadcast service scan and acquisition can be referred to as an FIC. The receiver can acquire information about broadcast services generated and transmitted by one or more broadcasters through the FIC and rapidly and easily scan broadcast services available in the receiver.

Furthermore, a specific DP included in the transport frame can serve as a base DP capable of rapidly and robustly delivering signaling information about broadcast services and content in the transport frame. Data delivered through DPs of a transport frame of a physical layer is shown in the lower part of FIG. 102. That is, link layer signaling or IP datagrams can be encapsulated in generic packets in a specific form and then delivered through a DP. Here, the IP datagrams may include signaling data. The link (low) layer signaling may include context information of fast service scan/acquisition and IP header compression and signaling related to emergency alert.

Figure 103:
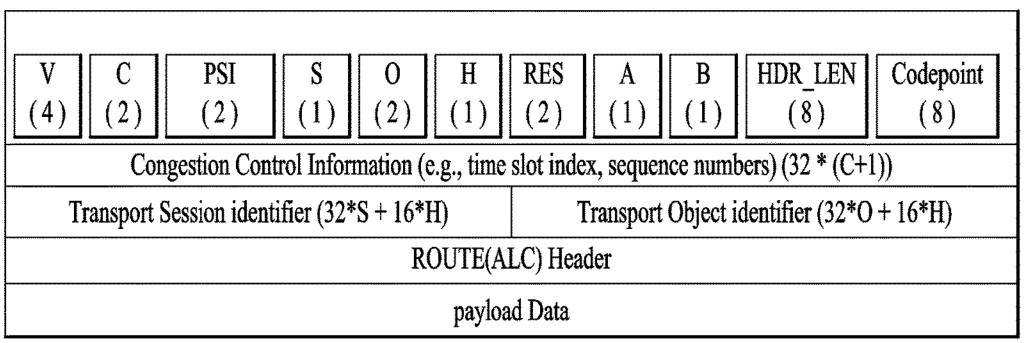
FIG. 103 illustrates a transport packet of an application layer transport protocol according to an embodiment of the present invention.

FIG. 103 illustrates a transport packet of the application layer transport protocol according to an embodiment of the present invention. An application layer transport session may be composed of a combination of an IP address and a port number. When the application layer transport protocol corresponds to ROUTE, a ROUTE session may be composed of one or more LCT (Layered Coding Transport) sessions. For example, when a single media component (e.g. DASH representation) is delivered through a single LCT transport session, one or more media components can be multiplexed and delivered through a single application layer transport session. Furthermore, one or more transport objects may be delivered through a single LCT transport session. Each transport object may be a DASH segment associated with DASH representation delivered through the transport session.

For example, when the application layer transport protocol is based on LCT, a transport packet can be configured as follows. The transport packet can include an LCT header, a ROUTE header and payload data. The transport packet may include the following fields.

The LCT header can include the following fields. A V (version) field can indicate version information of the corresponding transport protocol packet. A C field can indicate a flag associated with the length of a congestion control information field which will be described below. A PSI field can indicate protocol specific information. An S field can indicate a flag associated with the length of a transport session identifier (TSI) field. An O field can indicate a flag associated with the length of a transport object identifier (TOI) field. An H field can indicate whether a half word (16 bits) is added to the lengths of the TSI and TOI fields. An A (Close Session flag) field can represent that a session is ended or close. A B (Close Object flag) field can indicate that delivery of an object is terminated or termination of object delivery is close. A code point field can indicate information related to encoding or decoding of the payload of the corresponding packet. For example, payload type can correspond to this field. The congestion control information field can include information related to congestion control. For example, the information related to congestion control can include a current time slot index (CTSI), a channel number and a packet sequence number in the corresponding channel. The transport session identifier field can indicate the identifier of the transport session. The transport object identifier field can indicate the identifier of an object delivered through the corresponding transport session.

The ROUTE (ALC) header can include additional information of the LCT header, such as a payload identifier related to a forward error correction scheme.

The payload data can indicate a data part of the payload of the corresponding packet.

Figure 104:
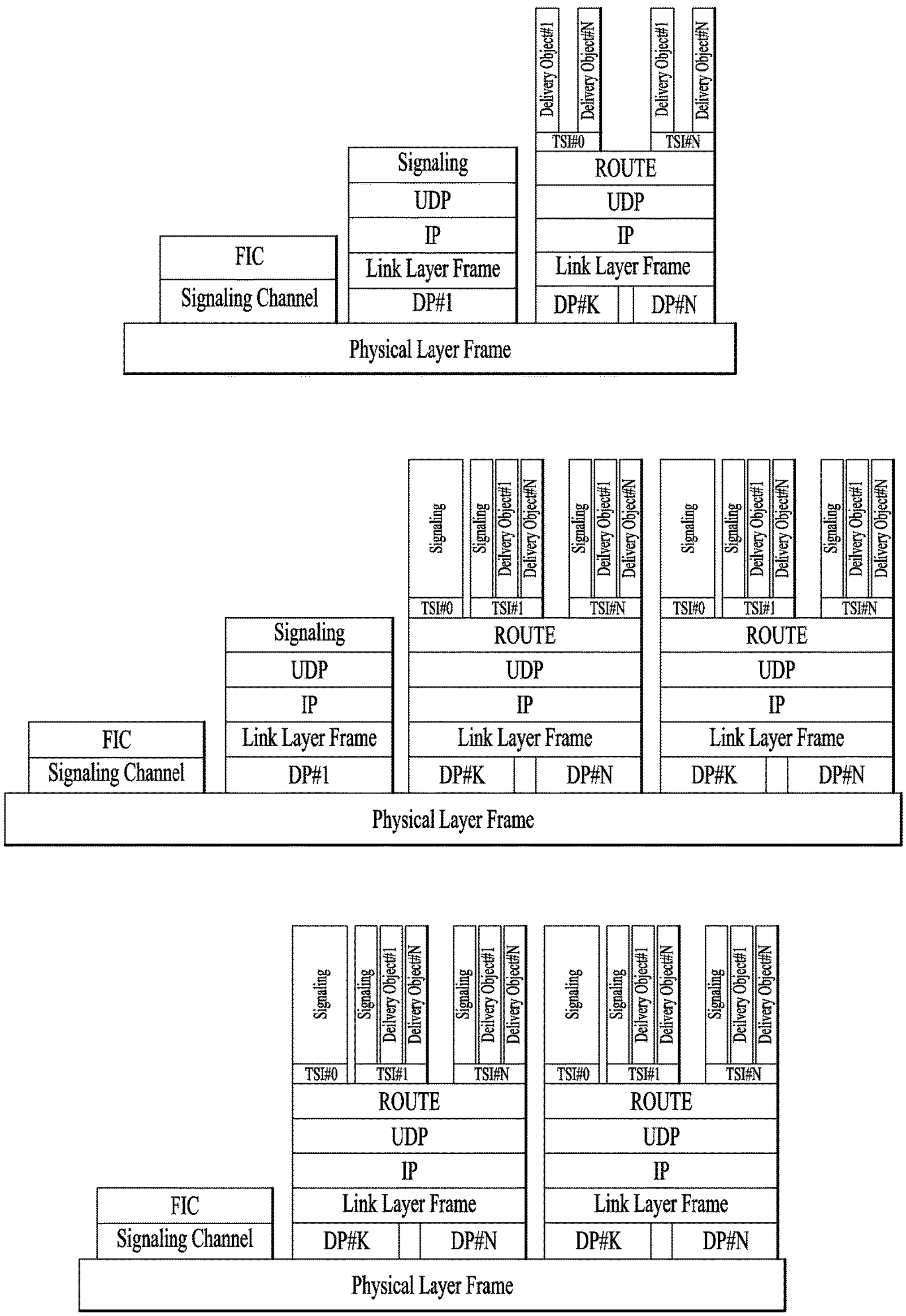
FIG. 104 illustrates a method through which a future broadcast system transmits signaling data according to an embodiment of the present invention.

FIG. 104 illustrates a method for delivering signaling data by the future broadcast system according to an embodiment of the present invention. Signaling data of the future broadcast system can be delivered as illustrated. To support rapid service/content scan and acquisition of the receiver, the future broadcast transmission system can deliver signaling data for a broadcast service transferred through a corresponding physical layer frame, through a fast information channel (FIC). In the specification, the FIC may refer to information about a service list. If a separate FIC is not present, the signaling data may be delivered through a path through which link layer signaling is delivered. That is, signaling information including information about a service and components (audio and video) of the service can be encapsulated in IP/UDP datagrams and delivered through one or more DPs. According to an embodiment, the signaling information about the service and service components may be encapsulated in an application layer transport packet (e.g. ROUTE packet or MMTP packet) and delivered.

The upper part of FIG. 104 shows an embodiment in which the aforementioned signaling data is delivered through an FIC and one or more DPs. In this case, the signaling data for supporting rapid service scan/acquisition can be delivered through the FIC and signaling data including detailed information about the corresponding service can be encapsulated in IP datagrams and delivered through specific DPs. In the specification, the signaling data including detailed information about the service may be referred to as service layer signaling.

The middle part of FIG. 104 shows an embodiment in which the aforementioned signaling data is delivered through an FIC and one or more DPs. In this case, the signaling data for supporting rapid service scan/acquisition can be delivered through the FIC and signaling data including detailed information about the corresponding service can be encapsulated in IP datagrams and delivered through specific DPs. In addition, part of signaling data including information about a specific component included in the service may be delivered through one or more transport sessions in an application layer transport protocol. For example, part of the signaling data can be delivered through one or more transport sessions in a ROUTE session.

The lower part of FIG. 104 shows an embodiment in which the aforementioned signaling data is delivered through an FIC and one or more DPs. In this case, the signaling data for supporting rapid service scan/acquisition can be delivered through the FIC and signaling data including detailed information about the corresponding service can be delivered through one or more transport sessions in a ROUTE session.

FIG. 105 illustrates a configuration of ExtendedLSID (Extended LCT Session

Instance Description) according to an embodiment of the present invention.

The present invention provides a service signaling method for supporting future hybrid broadcast based on interoperation of a terrestrial broadcast network and the Internet.

The present invention provides a service/content signaling method for supporting hybrid broadcast by which A/V can be received through a terrestrial broadcast network and A/V and enhancement data can be received through the Internet.

An embodiment of the present invention can provide a modified and/or extended ELSID structure by defining LSID, which defines a transport session structure in a ROUTE session, as one fragment of SLS description.

ELSID according to an embodiment of the present invention may include @id and/or a TransportSession element.

The @id indicates the identifier of an LSID instance. The value of this field can be identical to @serviceID of USD in a USBD fragment.

The TransportSession element provides information about LCT transport sessions which carry the source flow and/or the repair flow associated with the content components of the user service.

The TransportSession element according to an embodiment of the present invention may include @tsi, @BStreamID, @PLPID, @senderIPAddress, @destIPAddress, @port, @bandwidth, @startTime, @endTime, @scheduleReference, a SourceFlow element and/or a RepairFlow element.

@tsi specifies the transport session identifier associated with the source flow and/or repair flow. According to an embodiment of the present invention, this field can have values other than 0. That is, this field indicates a TSI value of an LCT channel.

@BStreamID indicates the identifier of a broadcast stream in which the contents of the corresponding LCT session are carried.

@PLPID specifies the identifier of a PLP within the broadcast stream in which the contents of the LCT session are carried.

@senderIPAddress specifies the IP address of the sender of the ROUTE session and an LCT transport session in the scope of the TSI. When the parent ROUTE session is the same ROUTE session to which the LCT session, carrying the SLS fragments for the user service, belongs, this field can be an optional field. That is, this field indicates the source IP address of a ROUTE session. When the value of this field is not present, a source IP address set to a default value may be the IP address of the current ROUTE session. That is, the IP address of a ROUTE session through which SLSID is delivered can be a default value. When the corresponding ROUTE session is not a primary session, the value of this field needs to be essentially present. The primary session refers to a ROUTE session through which SLS is delivered.

@destIPAddress specifies the destination IP address of the ROUTE session including the source flow and/or repair flow carried by the corresponding LCT session. When the parent ROUTE session is the same ROUTE session to which the LCT session, carrying the SLS fragments for the user service, belongs, this field can be an optional field. That is, this field indicates the destination IP address of a ROUTE session. When the value of this field is not present, a destination IP address set to a default value may be the destination IP address of the current ROUTE session. That is, the destination IP address of a ROUTE session through which SLSID is delivered can be a default value. When the corresponding ROUTE session is not a primary session, the value of this field must be present. The primary session refers to a ROUTE session through which SLS is delivered.

@port specifies the destination UDP port of the ROUTE session including the source flow and/or repair flow delivered through the corresponding LCT session. When the parent ROUTE session is the same ROUTE session to which the LCT session, carrying the SLS fragments for the user service, belongs, this field can be an optional field. That is, this field indicates the destination port of a ROUTE session. When the value of this field is not present, a destination port set to a default value may be the destination port of the current ROUTE session. That is, the destination port of a ROUTE session through which SLSID is delivered can be a default value. When the corresponding ROUTE session is not a primary session, the value of this field needs to be essentially present. The primary session refers to a ROUTE session through which SLS is delivered.

@bandwidth specifies the maximum bitrate required by the corresponding LCT session. This field represents the largest sum of the sizes of all packets transmitted during any one second long period of the session. This field can be represented in kilobits. That is, this field indicates the maximum bandwidth of the LCT channel.

@startTime specifies the start time of the LCT session as represented by 32 bits of an NTP timestamp. When this field is not present or set to 0 and @endTime has a value of 0, the LCT session can be regarded as permanent.

@endTime specifies the end time of the LCT session as represented by 32 bits of an NTP timestamp. When this field is not present or is set to 0, the LCT session is not bounded although the LCT session will not become active until after the start time.

@scheduleReference indicates URI reference to a schedule fragment providing a detailed transmission schedule for content delivered through the LCT session.

The SourceFlow element provides information about a source flow carried on this tsi.

The RepairFlow element provides information about a repair flow carried on this tsi.

Figure 106:
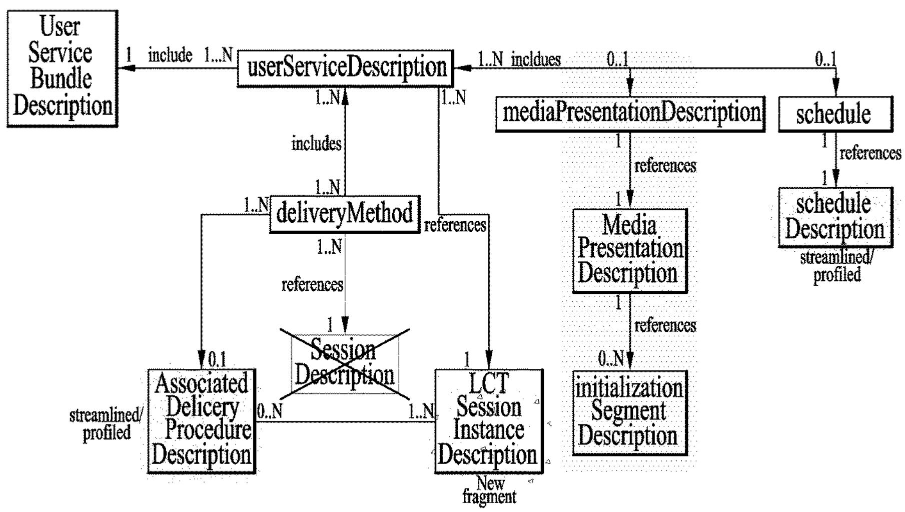
FIG. 106 illustrates a structure of signaling using an ELSID SLS fragment according to an embodiment of the present invention.

FIG. 106 illustrates a structure of signaling using an ELSID SLS fragment according to an embodiment of the present invention.

According to an embodiment of the present invention, User Service Bundle Description (USBD) may include one or more userServiceDescriptions. The userServiceDescriptions may include one or more deliveryMethods. The deliveryMethods may refer to Associated Delivery Procedure Description (streamlined/profiled). The userServiceDescription may refer to LCT Session Instance Description. The Associated Delivery Procedure Description (streamlined/profiled) and the LCT Session Instance Description may be connected to each other. The userServiceDescription may include mediaPresentationDescription. The mediaPresentationDescription may refer to Media Presentation Description and the Media Presentation Description may refer to Initialization Segment Description. The userServiceDescription may include a schedule, and the schedule may refer to Schedule Description (streamlined/profiled).

Figure 107:
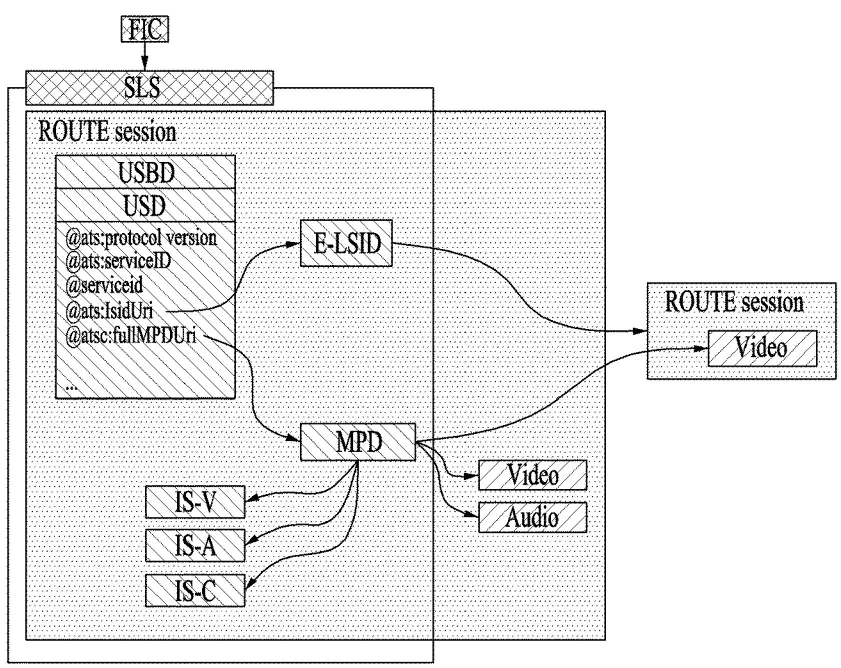
FIG. 107 illustrates a signaling structure showing SLS bootstrapping information through an FIC and a relationship between a ROUTE session and ELSID according thereto in accordance with an embodiment of the present invention.

FIG. 107 illustrates a signaling structure showing SLS bootstrapping information through an FIC and a relationship between a ROUTE session and ELSID according to an embodiment of the present invention.

According to an embodiment of the present invention, the FIC can function as the SLT.

USD according to an embodiment of the present invention can include any URI type element (@atsc:lsidUri) referring to ELSID.

According to an embodiment of the present invention, the receiver can be aware of a ROUTE session in which SLS is transmitted using SLS bootstrapping information included in the SLT (FIC). The receiver can parse USD within USBD in the ROUTE session through which SLS is transmitted, acquire ELSID which signals information about a ROUTE session through which content of the corresponding service is delivered using an @atsc:lsidUri field in the USD and obtain information about a ROUTE session, through which a video component of the corresponding service is delivered, through the ELSID. The receiver can acquire MPD associated with the corresponding service using an @atsc:fullMPDUri field in the USD, obtain information about video and/or audio components of the corresponding service through the MPD, and acquire initial segment information about the video component, initial segment information about the audio component and/or initial segment information about a caption component.

FIG. 108 illustrates a configuration of USBD according to an embodiment of the present invention.

An embodiment of the present invention can provide new signaling using LSID configured in extended USD and SLS fragments.

The USBD according to an embodiment of the present invention, shown in the figure, can be used for broadcast services.

The USBD according to an embodiment of the present invention includes a USD element and/or @fecDescriptionURI.

The USD element according to an embodiment of the present invention may include @atsc:protocolVersion, @atsc:atscServiceId, @atsc:fullMpdUri, @atsc:lsidUri, name, serviceLanguage, requiredCapabilities, deliveryMethod, r9:mediaPresentationDescription, r12:appService and/or @serviceId.

@atsc:protocolVersion indicates the protocol version.

@atsc:atscServiceId is a field for connection with a service entry of an SLT (FIC). That is, this field is a reference for the corresponding entry in LLS (SLT). The value of this attribute is the same as the value of serviceId allocated to the corresponding entry.

@atsc:fullMpdUri can refer to MPD fragments including description about content components of a service delivered selectively through a broadcast network.

@atsc:lsidUri can refer to SLSID fragments which provide access related parameters to a transport session in which content of the corresponding service is delivered. This field can execute the same function as @atsc:sTSIDUri.

The name element can indicate the name of a service given by a lang attribute. The name element can include a lang attribute which indicates the language of a service name. The language can be specified according to XML data type.

The serviceLanguage element can specify the available language of a service. The language can be specified according to XML data type.

The requiredCapabilities element can specify capabilities required for the receiver to generate significant presentation of content of the corresponding service. According to an embodiment, this field may specify a predefined capability group. The capability group may be a group of capability attribute values for significant presentation. This field can be called capabilitycode.

The deliveryMethod element can be a container of transport associated with information belonging to content of the corresponding service in broadcast and (optionally) broadband modes of access. When N pieces of data are included in the corresponding service, delivery methods for the respective pieces of data can be described by this element.

The r9:mediaPresentationDescription element can indicate information about MPD associated with the corresponding service. This element may have an mpdURI element as a lower element.

The r12:appService element can indicate information about app services associated with the corresponding service.

@serviceId can be a globally unique URI for identifying a unique service in the scope of BSID. The corresponding parameter can be used to link the USD information to ESG data (Service@globalServiceID).

The name element according to an embodiment of the present invention can include @lang which specifies the language of the corresponding service.

The requiredCapabilities element according to an embodiment of the present invention can include @feature which specifies capabilities required for content of the corresponding service.

The deliveryMethod element according to an embodiment of the present invention can include r7:unicastAccessURI, r8:alternativeAccessDelivery, r12:broadcastAppService, r12:unicastAppService, atsc:atscBroadcastAppService, atsc:atscForeignBroadcastAppService.@accessGroupId, associatedProcedureDescriptionURI, @protectionDescriptionURI, @sessionDescriptionURI and/or @accessPointName.

The r12:broadcastAppService element can represent DASH representations which have been multiplexed or non-multiplexed, including media components belonging to the service over all periods of affiliated media presentation, and are delivered through a broadcast network. That is, this field can refer to DASH representations delivered through a broadcast network. This element may have a basePattern element as a lower element.

The r12:unicastAppService element can represent DASH representations which have been multiplexed or non-multiplexed, including configuration media content components belonging to the service over all periods of affiliated media presentation, and are delivered through a broadband network. That is, this field can refer to DASH representations delivered through a broadband network. This element may have the basePattern element as a lower element.

The basePattern element can be a character pattern used by the receiver to be matched to all parts of a fragment URL used by a DASH client to request media fragments of parent representation in the included period. Matching implies delivery of the requested media fragments on broadcast transport. As to a URL address to which to which DASH representations represented by the r12:broadcastAppService element and the r12:unicastAppService element can be delivered, a part of the URL address may have a specific pattern. This pattern can be described by this field. Data can be identified using this information. The proposed default values may be changed according to embodiments. The illustrated use column relates to respective fields. Here, M refers to a mandatory field, O refers to an optional field, OD refers to an optional field having a default value and CM refers to a conditional mandatory field. 0 . . . 1 to 0 . . . N refer to the available numbers of corresponding fields.

The r12:appService element according to an embodiment of the present invention can include identicalContent, alternativeContent, @appServiceDescriptionURI and/or @mimeType.

The identicalContent element and the alternativeContent element respectively indicate information about identical content and alternative content of the corresponding app service and include the basePattern element as lower elements.

@appServiceDescriptionURI indicates a URI through which information about the corresponding app service can be acquired.

@mimeType indicates mimeType of the corresponding app service.

The USBD according to an embodiment of the present invention may further include @atsc:serviceStatus which specifies the status of the corresponding service. The value of @atsc:serviceStatus indicates whether the corresponding service is enabled or disabled. @atsc:serviceStatus indicates that the service is enabled when the value thereof is set to "1" (true). When this field is not used, a default value of 1 can be set.

FIG. 109 illustrates a configuration of SLSID according to another embodiment of the present invention.

According to an embodiment of the present invention, SLSID can substitute for LSID and thus each ROUTE session need not include one LSID.

According to an embodiment of the present invention, the SLSID can be included in service signaling about a service in which the SLSID appears. For example, when a single service includes a single ROUTE session, it may be useful to transmit SLS in an LCT session corresponding to TSI=0. For signaling efficiency, an LCT session in which SLS is delivered can be set to TSI=0 corresponding to a default value. When a single service includes a plurality of ROUTE sessions, SLS can be included in one of the ROUTE sessions and delivered. One or more pieces of SLS may be delivered in the same ROUTE session. In this case, SLS for each service may not be delivered in the LCT session corresponding to TSI=0.

An SLSID element according to an embodiment of the present invention may include @svcID, @version, @validFrom, @expires and/or an RS element.

@svcID indicates the ID of a service. This field can correspond to the service_id field of the SLT (FIT). That is, this field can be used as information for connecting SLSID and the SLT. According to another embodiment of the present invention, this field can refer to the service element of USD. That is, this field can be used as information for connecting SLSID and USD and can refer to a service having a ServiceId value corresponding to the value of this field.

@version indicates the version of SLSID. The receiver can be aware of whether SLSID has been changed using this field.

@validFrom indicates a data and time from which SLSID is valid.

@expires indicates a data and time when SLSID expires.

One SLSID can include one or more RS elements, and a single RS element includes information about a single ROUTE session.

The RS element according to an embodiment of the present invention may include @bsid, @sIpAddr, @dIpAddr, @dport, @PLPID and/or an LS element.

@bsid indicates the ID of a broadcast stream. This field specifies the ID of a broadcast stream through which a ROUTE session is transmitted. When the value of this field is not present, a broadcast stream set to a default value may be the current broadcast stream. That is, a broadcast stream through which STSID is delivered can be set to the default value. In other words, this field indicates the ID of a broadcast stream through which content components of a broadcastAppService element are transmitted. The broadcastAppService element is included in USD and represents DASH representation including media components belonging to the corresponding service. If the value of this field is not present, a broadcast stream set to a default value may be a broadcast stream having a PLP through which SLS fragments for the corresponding service are delivered. The value of this field may be the same as @bsid of the SLT.

@sIpAddr specifies the source IP address of a ROUTE session. When the value of this field is not present, a default source IP address may be the IP address of the current ROUTE session. That is, the IP address of a ROUTE session in which SLSID is delivered can be the default IP address. When the corresponding ROUTE session is not a primary session, the value of this field needs to be essentially present. The primary session refers to a ROUTE session through which SLS is delivered.

@dIpAddr specifies the destination IP address of a ROUTE session. When the value of this field is not present, a default destination IP address may be the IP address of the current ROUTE session. That is, the IP address of a ROUTE session in which SLSID is delivered can be the default IP address. When the corresponding ROUTE session is not a primary session, the value of this field needs to be essentially present. The primary session refers to a ROUTE session through which SLS is delivered.

@dport specifies the destination port of a ROUTE session. When the value of this field is not present, a default destination port may be the destination port of the current ROUTE session. That is, the destination port of a ROUTE session in which SLSID is delivered can be the default destination port. When the corresponding ROUTE session is not a primary session, the value of this field needs to be essentially present. The primary session refers to a ROUTE session through which SLS is delivered.

@PLPID specifies the ID of a PLP for a ROUTE session. When the value of this field is not present, a default PLP ID corresponds to the ID of the current PLP. That is, the ID of a PLP through which SLSID is delivered can be set to a default value.

A single RS element can include one or more LS elements. The LS element includes information about an LCT channel.

The LS element according to an embodiment of the present invention may include @tsi, @PLPID, @bw, @startTime, @endTime, a SrcFlow element and/or a RprFlow element.

@tsi specifies the TSI of an LCT channel.

@PLPID specifies the ID of a PLP through which the LCT channel is transmitted. The value of this field can override the value of @PLPID included in the RS element.

@bw indicates the maximum bandwidth of the LCT channel.

@startTime indicates the start time.

@endTime indicates the end time.

The SrcFlow element represents a source flow.

The RprFlow element represents a repair flow.

The SLSID according to the embodiment illustrated in the figure includes one or more RS elements and includes @PLPID as a mandatory field (M). @PLPID specifies the default PLPID for the corresponding ROUTE session.

FIG. 110 illustrates a configuration of SLSID according to another embodiment of the present invention.

The SLSID according to the present embodiment includes the same fields as the fields included in the SLSID according to the embodiment illustrated in the previous figure.

The SLSID according to the present embodiment includes one or more RS elements and includes @PLPID as an optional field having an optional default value. Here, @PLPID indicates the default PLPID for the corresponding ROUTE session. When the value of @PLPID is not present, this field has the same value as @slsplpId which indicates the ID of a PLP through which SLS of the SLT is delivered.

FIG. 111 illustrates a configuration of SLSID according to another embodiment of the present invention.

The SLSID according to the present embodiment includes the same fields as the fields included in the SLSID according to the embodiment illustrated in the previous figure.

However, the SLSID according to the present embodiment includes a TS element at the same level as the RS element. The TS element represents information about a transport session in a single ROUTE session. Fields included in the TS element represent the same information as the aforementioned fields included in the LS element. However, the fields included in the TS element specify information about a transport session other than the LCT session. @PLPID included in the TS element can override the default ROUTE session value.

The SLSID according to the present embodiment includes zero or more RS elements. The RS element represents information about an additional ROUTE session. @PLPID included in the RS element specifies the default PLP ID for the corresponding ROUTE session. When the value of @PLPID is not present, this field has the same value as @slsplpId which specifies the ID of a PLP through which SLS of the SLT is delivered.

FIG. 112 illustrates a configuration of SLSID according to another embodiment of the present invention.

The SLSID according to the present embodiment includes the same fields as the fields included in the SLSID according to the embodiment illustrated in the previous figure.

However, the SLSID according to the present embodiment includes a TransportSession element instead of the TS element. The TransportSession element represents information about an LCT session at the same level as the RS element. @PLPID included in the TransportSession element can override the default ROUTE session value.

The SLSID according to the present embodiment includes zero or more RS elements. The RS element represents information about an additional ROUTE session. @PLPID included in the RS element specifies the default PLP ID for the corresponding ROUTE session. When the value of @PLPID is not present, this field has the same value as @slsplpId which specifies the ID of a PLP through which SLS of the SLT is delivered.

FIG. 113 illustrates a configuration of a service map table (SMT) according to an embodiment of the present invention.

According to an embodiment of the present invention, when SLS signals location information of ROUTE sessions of components using SLSID, the SMT may not provide information of an additional ROUTE session.

According to an embodiment of the present invention, when a component is transmitted only through a pure broadcast network, location information of the component can be detected by combining MPD and SLSID even if the location information is not described in the SMT since a ComponentDescription element is an optional element.

The SMT according to an embodiment of the present invention can substitute for USD.

The SMT according to an embodiment of the present invention includes a service route element. The service route element may include @serviceID, ServiceName. Capabilities, ComponentMapDescription, Content Advisory Rating and/or CaptionServiceDescription.

@serviceID specifies the ID of the corresponding service. This field can be used as information for connecting to an SLT and/or STSID.

The ServiceName element represents the name of the corresponding service and includes @lang. @lang represents the language of the service name.

The Capabilities element represents capabilities necessary to reproduce the corresponding service.

The ComponentMapDescription element represents description about components of the corresponding service. The ComponentMapDescription element includes @mpdID and/or @perID. @mpdID specifies the ID of MPD associated with the corresponding service. @perID specifies the ID of a DASH period associated with the corresponding service.

The ContentAdvisoryRating element represents content advisory rating.

The CaptionServiceDescription element represents information about a captioning service.

Figure 114:
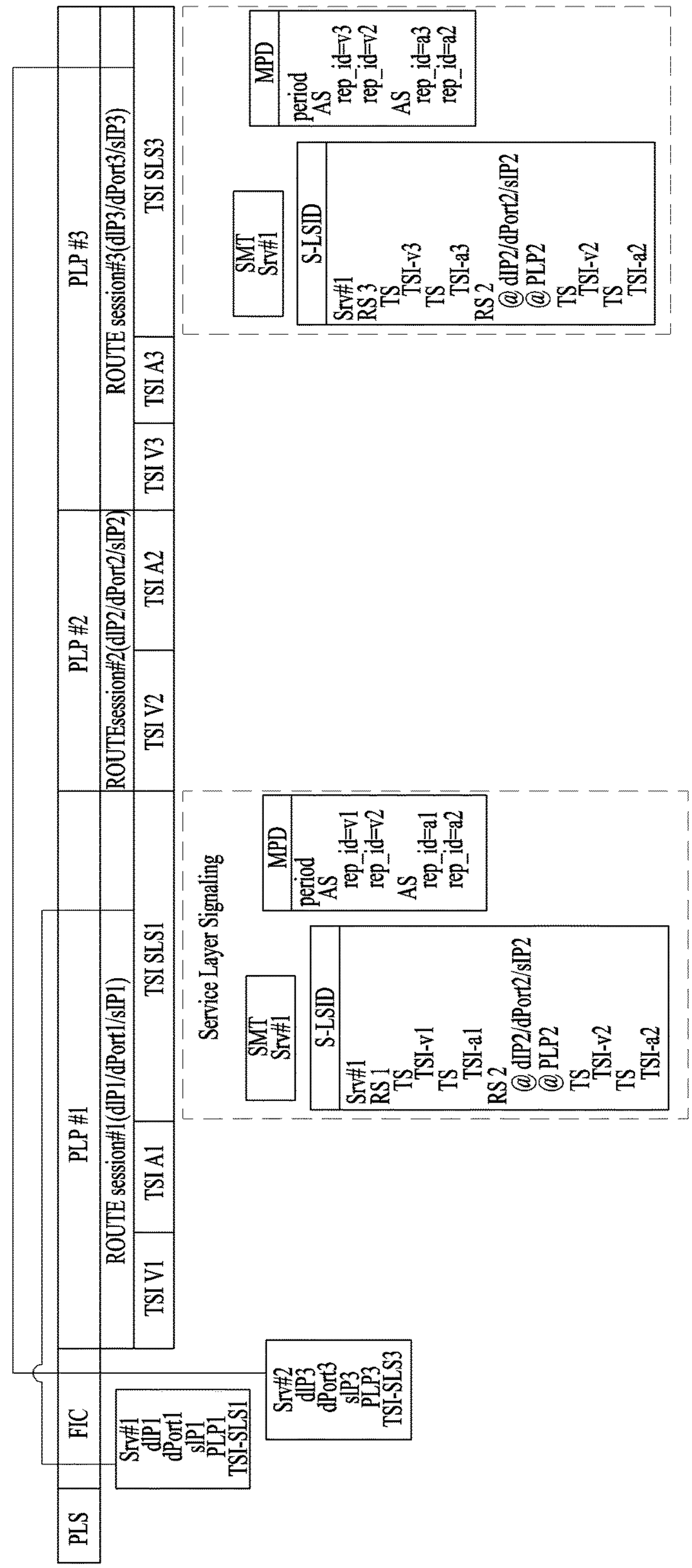
FIG. 114 illustrates a method of signaling location information of a component using SLSID and MPD according to an embodiment of the present invention.

FIG. 114 illustrates a method for signaling location information using SLSID and MPD according to an embodiment of the present invention.

According to an embodiment of the present invention, when ComponentMapDescription is not included in the SMT, that is, when a component is transmitted only through a pure broadest network, location information of the component can be provided using SLSID and MPD.

Referring to the figure, the receiver can be aware of a ROUTE session and an LCT session in which SLS about service #1 is delivered through an SLT (FIC) according to an embodiment of the present invention. The receiver can be aware of location information with respect to delivery of components of the corresponding service using the SMT, SLSID and MPD transmitted through the LCT session of the corresponding ROUTE session. Specifically, SLSID representing information about a transport session of the corresponding service can be acquired by matching the service ID of the SMT to the service ID of the SLSID, and the LCT session through which a specific component of the corresponding service is delivered can be recognized by matching the TS element (LS element) of the SLSID to rep_id of the MPD.

FIG. 115 illustrates a configuration of USBD according to another embodiment of the present invention.

According to an embodiment of the present invention, USBD can be modified or extended for the future broadcast system.

The USBD according to an embodiment of the present invention includes a USD element, @fecDescriptionURI, @atsc:protocolVersion, @atsc:atscServiceID and/or @BDId.

The USD element according to an embodiment of the present invention may include @atsc:fullMpdUri, @atsc:lsidUri, a name element, a serviceLanguage element, a requiredCapabilities element, a deliveryMethod element, an r9:mediaPresentationDescription element, an r9:schedule element, an r12:appService element, an r12:KeepUpdatedService element, @serviceId and/or @r7:serviceClass.

The name element according to an embodiment of the present invention can include @lang.

The requiredCapabilities element according to an embodiment of the present invention can include a feature element.

The deliveryMethod element according to an embodiment of the present invention may include an r7:unicastAccessURI element, an r8:alternativeAccessDelivery element, an r12:broadcastAppService element, an r12:unicastAppService element, an atsc:atscBroadcastAppService element, an atsc:atscForeignBroadcastAppService element, @accessGroupId, an associatedProcedureDescriptionURI element, @protectionDescriptionURI, @sessionDescriptionURI and/or @accessPointName.

The r7:unicastAccessURI element according to an embodiment of the present invention can include a basePattern element.

The r8:alternativeAccessDelivery element according to an embodiment of the present invention can include a unicastAccessURI element and/or a timeShifitingBuffer element.

The r12:broadcastAppService element according to an embodiment of the present invention can include a basePattern element and/or a serviceArea element.

The r12:unicastAppService element according to an embodiment of the present invention can include a basePattern element.

The atsc:atscBroadcastAppService element according to an embodiment of the present invention can include a basePattern element.

The atsc:atscForeignBroadcastAppService element according to an embodiment of the present invention can include @broadcastStreamID and/or a basePattern element.

@BDId according to an embodiment of the present invention can be a globally unique URI for identifying a unique service in the scope of BSID. The corresponding parameter can be used to link the USD information to ESG data (Service@globalServiceID). @serviceId according to an embodiment of the present invention can have the same value as @BDId. Description of other fields corresponds to description of fields having the same names included in the aforementioned USBD according to another embodiment of the present invention.

Figure 116:
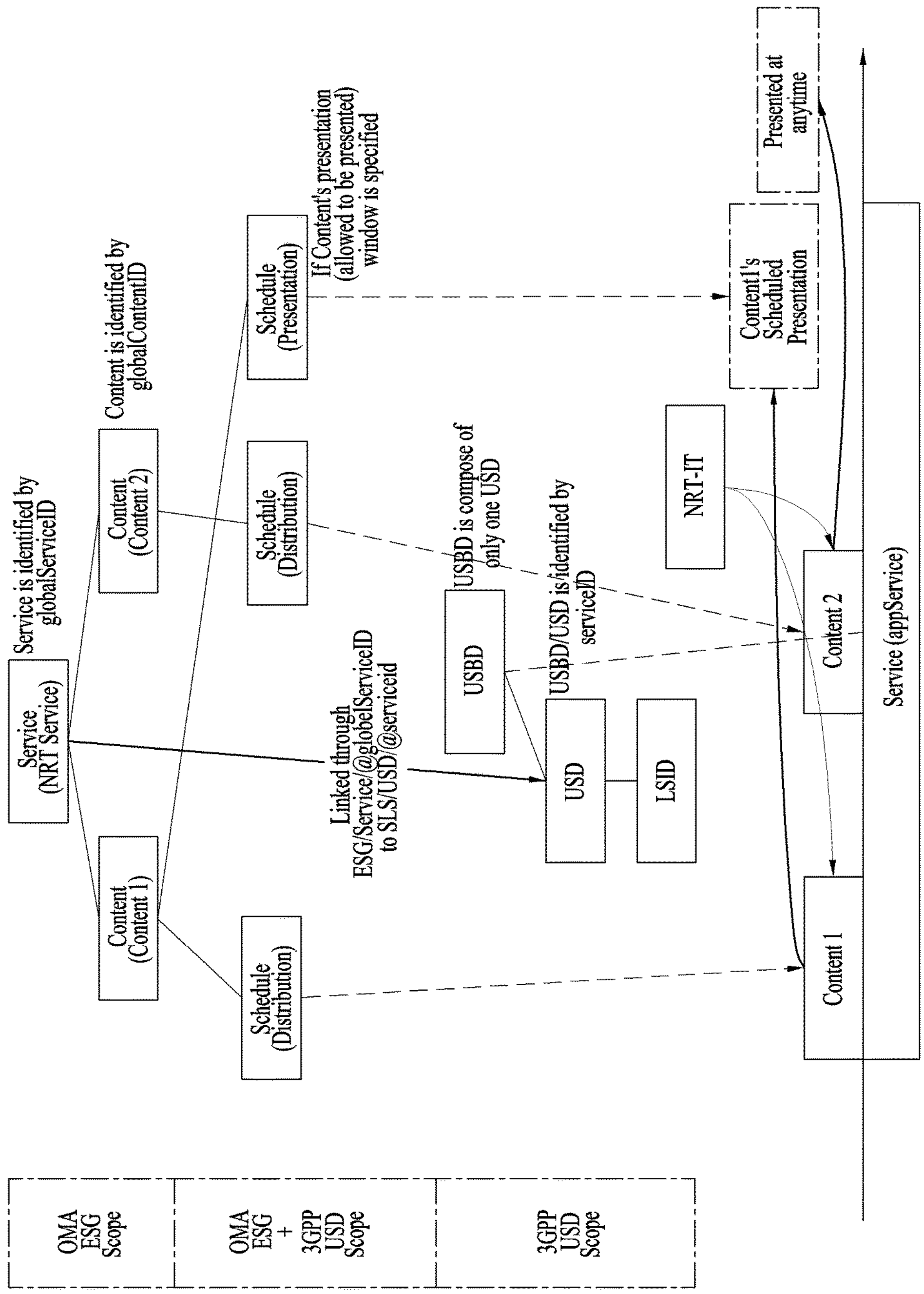
FIG. 116 illustrates a method of transmitting schedule information of an NRT service using an ESG schedule fragment according to an embodiment of the present invention.

FIG. 116 illustrates a method for delivering scheduling information of an NRT service using an ESG schedule fragment according to an embodiment of the present invention.

An embodiment of the present invention can provide a method for associating schedule information of each component of an NRT service with a schedule fragment of an ESG. Here, primary information of content can be signaled using an NRT-IT.

Referring to FIG. 116, an ESG level service and a USD level service can be linked using globalServiceID which identifies an ESG service fragment and serviceID which identifies USD. Furthermore, ESG level content and signaling level content can be linked using globalContentID which identifies an ESG content fragment and content identification information of the NRT-IT. Through the aforementioned links, an embodiment of the present invention can transmit scheduling information of the NRT service using a schedule fragment per content fragment of the ESG.

Figure 117:
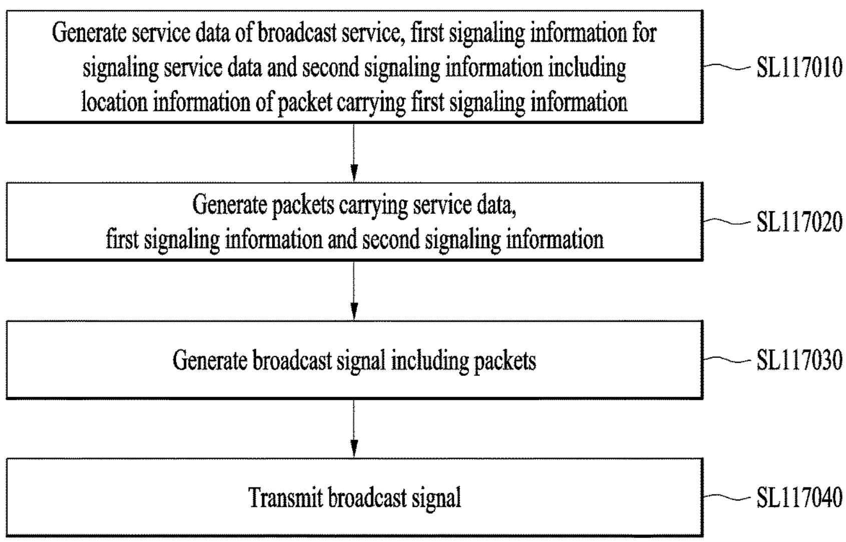
FIG. 117 is a flowchart illustrating a method for transmitting a broadcast signal according to an embodiment of the present invention.

FIG. 117 is a flowchart illustrating a method for transmitting a broadcast signal according to an embodiment of the present invention.

The method for transmitting a broadcast signal according to an embodiment of the present invention may include step SL117010 of generating service data of a broadcast service, first signaling information for signaling the service data and second signaling information including location information of a packet carrying the first signaling information, step SL117020 of generating packets carrying the service data, the first signaling information and the second signaling information, step SL117030 of generating a broadcast signal including the packets and/or step SL117040 of transmitting the broadcast signal. Here, the first signaling information may represent SLS and the second signaling information may represent an SLT. The second signaling information may include information for identifying the broadest service.

According to another embodiment of the present invention, the first signaling information may include at least one of third signaling information describing property information about the broadcast service, fourth signaling information including information about a ROUTE (Real time Object delivery over Unidirectional Transport) session through which the broadcast service is delivered and an LCT (Layered Coding Transport) session through which a component of the broadcast service is delivered, and fifth signaling information including information about media presentation corresponding to the broadcast service. Here, the third signaling information may represent USBD, the fourth signaling information may represent STSID and the fifth signaling information may represent MPD.

According to another embodiment of the present invention, the third signaling information may include at least one of information for referring to the broadcast service described by the second signaling information, information for referring to the fifth signaling information and information for referring to the fourth signaling information. The aforementioned information may represent @serviceId, @fullMPDUri and @sTSIDUri.

According to another embodiment of the present invention, the fourth signaling information may include at least one of information for referring to the broadcast service described by the third signaling information and information on location to which a component of the broadcast service is delivered. The aforementioned information may represent @serviceId and @tsi.

According to another embodiment of the present invention, the fifth signaling information may include representation information indicating information about the component of the broadcast service. The aforementioned information may represent a representation element.

According to another embodiment of the present invention, the component of the broadcast service may be acquired using the third signaling information, the fourth signaling information and the fifth signaling information.

According to another embodiment of the present invention, the component of the broadcast service may be acquired through the steps of acquiring the first signaling information using the second signaling information, acquiring the fourth signaling information and the fifth signaling information using the third signaling information included in the first signaling information, and acquiring the component of the broadcast service using the fifth signaling information and the fourth signaling information.

Figure 118:
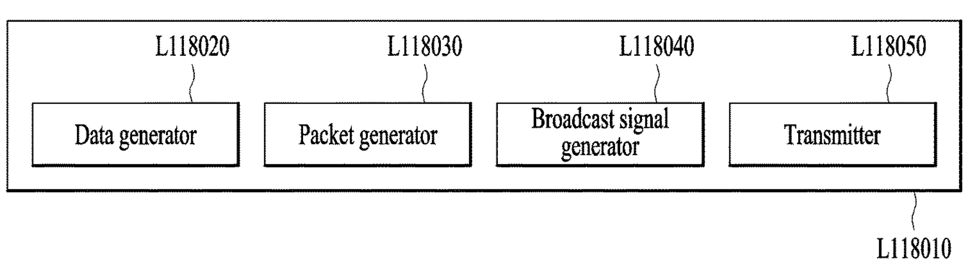
FIG. 118 illustrates a configuration of an apparatus for transmitting a broadcast signal according to an embodiment of the present invention.

FIG. 118 is a block diagram of an apparatus for transmitting a broadcast signal according to an embodiment of the present invention.

An apparatus L118010 for transmitting a broadcast signal according to an embodiment of the present invention may include a data generator L118020 for generating service data of a broadcast service, first signaling information for signaling the service data and second signaling information including location information of a packet carrying the first signaling information, a packet generator L118030 for generating packets carrying the service data, the first signaling information and the second signaling information, a broadcast signal generator L118040 for generating a broadcast signal including the packets and/or a transmitter L118050 for transmitting the broadcast signal. Here, the first signaling information may represent SLS and the second signaling information may represent an SLT. The second signaling information may include information for identifying the broadcast service.

According to another embodiment of the present invention, the first signaling information may include at least one of third signaling information describing property information about the broadcast service, fourth signaling information including information about a ROUTE (Real time Object delivery over Unidirectional Transport) session through which the broadcast service is delivered and an LCT (Layered Coding Transport) session through which a component of the broadcast service is delivered, and fifth signaling information including information about media presentation corresponding to the broadcast service. Here, the third signaling information may represent USBD, the fourth signaling information may represent STSID and the fifth signaling information may represent MPD.

According to another embodiment of the present invention, the third signaling information may include at least one of information for referring to the broadcast service described by the second signaling information, information for referring to the fifth signaling information and information for referring to the fourth signaling information. The aforementioned information may represent @serviceId, @fullMPDUri and @sTSIDUri.

According to another embodiment of the present invention, the fourth signaling information may include at least one of information for referring to the broadcast service described by the third signaling information and information on location to which a component of the broadcast service is delivered. The aforementioned information may represent @serviceId and @tsi.

According to another embodiment of the present invention, the fifth signaling information may include representation information indicating information about the component of the broadcast service. The aforementioned information may represent a representation element.

According to another embodiment of the present invention, the component of the broadcast service may be acquired using the third signaling information, the fourth signaling information and the fifth signaling information.

According to another embodiment of the present invention, the component of the broadcast service may be acquired through the steps of acquiring the first signaling information using the second signaling information, acquiring the fourth signaling information and the fifth signaling information using the third signaling information included in the first signaling information, and acquiring the component of the broadcast service using the fifth signaling information and the fourth signaling information.

Figure 119:
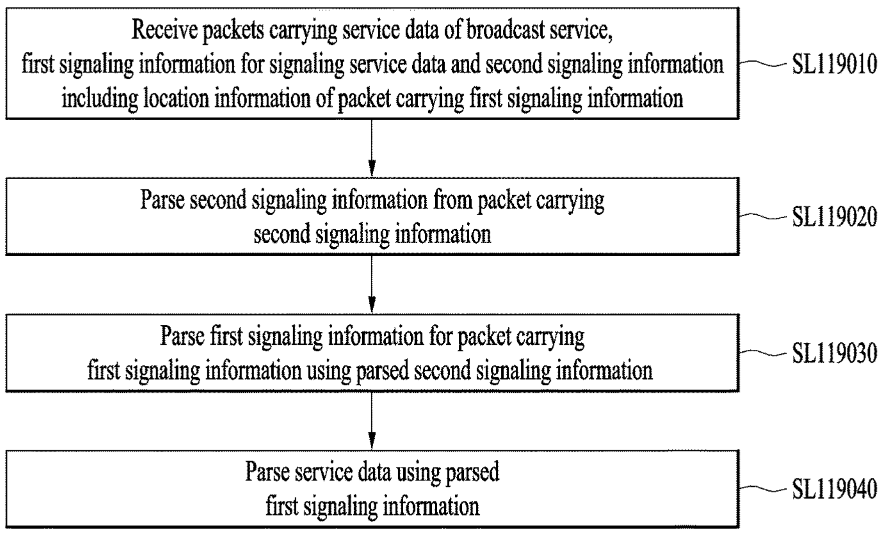

FIG. 119 is a flowchart illustrating a method for receiving a broadcast signal according to an embodiment of the present invention.

The method for receiving a broadcast signal according to an embodiment of the present invention may include step SL119010 of receiving packets carrying service data of a broadcast service, first signaling information for signaling the service data and second signaling information including location information of a packet carrying the first signaling information, step SL119020 of parsing the second signaling information from the packet carrying the second signaling information, step SL119030 of parsing the first signaling information from the packet carrying the first signaling information using the parsed second signaling information and/or step SL119040 of parsing the service data using the parsed first signaling information.

Figure 120:
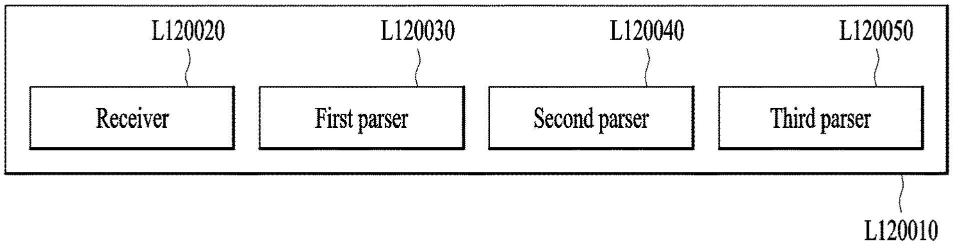

FIG. 120 is a block diagram of an apparatus for receiving a broadcast signal according to an embodiment of the present invention.

An apparatus L120010 for receiving a broadcast signal according to an embodiment of the present invention may include a receiver L120020 for receiving packets carrying service data of a broadcast service, first signaling information for signaling the service data and second signaling information including location information of a packet carrying the first signaling information, a first parser L120030 for parsing the second signaling information from the packet carrying the second signaling information, a second parser L120040 for parsing the first signaling information from the packet carrying the first signaling information using the parsed second signaling information and/or a third parser L120050 for parsing the service data using the parsed first signaling information.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

Various embodiments have been described in the best mode for carrying out the invention.

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

What is claimed is:

1. A method for transmitting a broadcast signal, the method comprising:

generating service data of a broadcast service, first signaling information for signaling the service data and second signaling information including information for discovering the first signaling information, wherein the second signaling information further includes information for identifying the broadcast service and uniform resource locator (URL) information for obtaining the first signaling information, the URL information to which additional information is appended is used for generating a request for obtaining the first signaling information, the additional information includes information for indicating which type of the first signaling information is requested, the first signaling information includes at least one of first metadata describing the broadcast service, second metadata including transport session description information for a Real time Object delivery over Unidirectional Transport (ROUTE) session through which the broadcast service is delivered and a Layered Coding Transport (LCT) channel through which a component of the broadcast service is delivered, and third metadata describing information for media presentation of the broadcast service, and the second metadata includes a ROUTE session element including information about the ROUTE session in which components of the broadcast service are carried;

generating the broadcast signal including the service data and the second signaling information; and transmitting the broadcast signal.

2. The method of claim 1, wherein the ROUTE session element includes an LCT session element including information about the LCT channel carrying components of the broadcast service.

3. An apparatus for transmitting a broadcast signal, the apparatus comprising:

a data generator configured to generate service data of a broadcast service, first signaling information for signaling the service data and second signaling information including information for discovering the first signaling information, wherein the second signaling information further includes information for identifying the broadcast service and uniform resource locator (URL) information for obtaining the first signaling information, the URL information to which additional information is appended is used for generating a request for obtaining the first signaling information, the additional information includes information for indicating which type of the first signaling information is requested, the first signaling information includes at least one of first metadata describing the broadcast service, second metadata including transport session description information for a Real time Object delivery over Unidirectional Transport (ROUTE) session through which the broadcast service is delivered and a Layered Coding Transport (LCT) channel through which a component of the broadcast service is delivered, and third metadata describing information for media presentation of the broadcast service, and the second metadata includes a ROUTE session element including information about the ROUTE session in which components of the broadcast service are carried;

a broadcast signal generator configured to generate the broadcast signal including the service data and the second signaling information; and a transmitter configured to transmit the broadcast signal.

4. The apparatus of claim 3, wherein the ROUTE session element includes an LCT session element including information about the LCT channel carrying components of the broadcast service.

5. A method for receiving a broadcast signal, the method comprising:

receiving the broadcast signal including service data of a broadcast service and second signaling information including information for discovering first signaling information, the first signaling information signaling the service data, wherein the second signaling information further includes information for identifying the broadcast service and uniform resource locator (URL) information for obtaining the first signaling information, the URL information to which additional information is appended is used for generating a request for obtaining the first signaling information, the additional information includes information for indicating which type of the first signaling information is requested, the first signaling information includes at least one of first metadata describing the broadcast service, second metadata including transport session description information for a Real time Object delivery over Unidirectional Transport (ROUTE) session through which the broadcast service is delivered and a Layered Coding Transport (LCT) channel through which a component of the broadcast service is delivered, and third metadata describing information for media presentation of the broadcast service, and the second metadata includes a ROUTE session element including information about the ROUTE session in which components of the broadcast service are carried;

parsing the second signaling information;

parsing the first signaling information using the second signaling information; and obtaining the service data using the first signaling information.

6. The method of claim 5, wherein the ROUTE session element includes an LCT session element including information about the LCT channel carrying components of the broadcast service.

7. The method of claim 5, wherein the receiving the first signaling information using the second signaling information further comprises:

sending the request for obtaining the first signaling information; and receiving the first signaling information having a type indicated by the additional information of the URL information.

8. An apparatus for receiving a broadcast signal, the apparatus comprising:

a receiver configured to receive the broadcast signal including service data of a broadcast service and second signaling information including information for discovering first signaling information, the first signaling information signaling the service data, wherein the second signaling information further includes information for identifying the broadcast service and uniform resource locator (URL) information for obtaining the first signaling information, the URL information to which additional information is appended is used for generating a request for obtaining the first signaling information, the additional information includes information for indicating which type of the first signaling information is requested, the first signaling information includes at least one of first metadata describing the broadcast service, second metadata including transport session description information for a Real time Object delivery over Unidirectional Transport (ROUTE) session through which the broadcast service is delivered and a Layered Coding Transport (LCT) channel through which a component of the broadcast service is delivered, and third metadata describing information for media presentation of the broadcast service, and the second metadata includes a ROUTE session element including information about the ROUTE session in which components of the broadcast service are carried;

a first parser configured to parse the second signaling information; and a second parser configured to parse the first signaling information using the second signaling information, wherein a processor obtains the service data using the first signaling information.

9. The apparatus of claim 8, wherein the ROUTE session element includes an LCT session element including information about the LCT channel carrying components of the broadcast service.

10. The apparatus of claim 8, wherein the receiver sends the request for obtaining the first signaling information and further receives the first signaling information having a type indicated by the additional information of the URL information.

* * * * *